US008160988B1

(12) United States Patent
Owen et al.

(10) Patent No.: US 8,160,988 B1
(45) Date of Patent: **\*Apr. 17, 2012**

(54) SYSTEM, METHOD AND COMPUTER PROGRAM PRODUCT FOR A COLLABORATIVE DECISION PLATFORM

(75) Inventors: Daniel L. Owen, Los Altos, CA (US); Michael W. Kusnic, Old Tappan, NJ (US)

(73) Assignee: Aloft Media, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/844,812

(22) Filed: Jul. 27, 2010

Related U.S. Application Data

(63) Continuation of application No. 12/615,250, filed on Nov. 9, 2009, now Pat. No. 7,970,722, which is a continuation of application No. 11/828,129, filed on Jul. 25, 2007, now Pat. No. 7,617,169, which is a continuation of application No. 11/045,543, filed on Jan. 28, 2005, now Pat. No. 7,401,059, which is a continuation of application No. 09/708,154, filed on Nov. 7, 2000, now Pat. No. 6,876,991.

(60) Provisional application No. 60/163,984, filed on Nov. 8, 1999.

(51) Int. Cl.
G06F 17/00 (2006.01)
G06N 5/02 (2006.01)
(52) U.S. Cl. .......................................... 706/46; 706/11
(58) Field of Classification Search ..................... 706/46
See application file for complete search history.

(56) References Cited

U.S. PATENT DOCUMENTS

| 3,360,874 A | 1/1968 | Myers ........................... 434/198 |
| 3,444,521 A | 5/1969 | Breese .......................... 340/352 |
| 3,573,747 A | 4/1971 | Adams et al. |
| 3,581,072 A | 5/1971 | Nymeyer ....................... 235/152 |
| 3,601,808 A | 8/1971 | Vlack |
| 3,611,281 A | 10/1971 | Evanoff .......................... 340/23 |
| 3,611,314 A | 10/1971 | Pritchard, Jr. et al. |
| 3,616,944 A | 11/1971 | Field ............................ 214/16 B |
| 3,634,669 A | 1/1972 | Soumas et al. ................ 235/184 |
| 3,656,148 A | 4/1972 | Belcher et al. ............. 340/324 A |
| 3,688,276 A | 8/1972 | Quinn |
| 3,702,007 A | 10/1972 | Davis, II ........................... 444/1 |

(Continued)

FOREIGN PATENT DOCUMENTS

AU    0768052    11/2003

(Continued)

OTHER PUBLICATIONS

US 7,734,534, 06/8/2010, Graff: Richard A. (withdrawn).

(Continued)

*Primary Examiner* — Michael B Holmes
(74) *Attorney, Agent, or Firm* — Patrick E. Caldwell, Esq.; The Caldwell Firm, LLC

(57) ABSTRACT

A decision making system, method and computer program product are provided. Initially, a plurality of attributes is defined. Thereafter, first information regarding the attributes is received from a receiving business. Second information is then received regarding proposed products or services in terms of the attributes. Such second information is received from a supplying business. In use, a decision process is executed based on the first information and the second information.

51 Claims, 47 Drawing Sheets

U.S. PATENT DOCUMENTS

| | | | |
|---|---|---|---|
| 3,710,948 A | 1/1973 | Sexton et al. ............... 210/484 |
| 3,729,712 A | 4/1973 | Glassman |
| 3,757,037 A | 9/1973 | Bialek ........................ 178/66 A |
| 3,779,244 A | 12/1973 | Weeks, Jr. et al. |
| 3,802,429 A | 4/1974 | Bird |
| 3,818,616 A | 6/1974 | Weber .............................. 35/74 |
| 3,824,375 A | 7/1974 | Gross et al. ............... 235/617 B |
| 3,837,331 A | 9/1974 | Ross ............................. 128/1 C |
| 3,848,235 A | 11/1974 | Lewis et al. |
| 3,850,161 A | 11/1974 | Liss ............................ 128/21 R |
| 3,863,625 A | 2/1975 | Viglione et al. ............ 128/21 B |
| 3,874,095 A | 4/1975 | DeWaele ...................... 35/31 R |
| 3,906,455 A | 9/1975 | Houston et al. |
| 3,944,723 A | 3/1976 | Fong .............................. 178/3 |
| 3,946,220 A | 3/1976 | Brobeck et al. ............... 235/168 |
| 3,967,616 A | 7/1976 | Ross ............................. 128/1 C |
| 3,993,046 A | 11/1976 | Fernandez et al. .......... 128/21 B |
| 4,007,362 A | 2/1977 | Sindermann .................. 235/151 |
| 4,016,542 A | 4/1977 | Azure |
| 4,031,368 A | 6/1977 | Colding et al. |
| 4,043,562 A | 8/1977 | Shillington .................... 273/164 |
| 4,081,607 A | 3/1978 | Vitols et al. ................. 179/1 SB |
| 4,107,467 A | 8/1978 | Johnson et al. ............. 179/2 DP |
| 4,118,788 A | 10/1978 | Roberts ........................ 364/900 |
| 4,133,034 A | 1/1979 | Etter .............................. 364/464 |
| 4,135,092 A | 1/1979 | Milly ............................. 250/343 |
| 4,149,246 A | 4/1979 | Goldman ....................... 364/200 |
| 4,181,948 A | 1/1980 | Jackson et al. ................ 364/478 |
| 4,186,438 A | 1/1980 | Benson et al. ................. 364/200 |
| 4,197,100 A | 4/1980 | Hausheer ......................... 55/382 |
| 4,230,031 A | 10/1980 | Pedroso et al. ........... 98/115 LH |
| 4,248,389 A | 2/1981 | Thompson et al. |
| 4,257,272 A | 3/1981 | Sloman ............................. 73/633 |
| 4,295,128 A | 10/1981 | Hashemian et al. ......... 340/506 |
| 4,298,898 A | 11/1981 | Cardot ............................ 360/67 |
| 4,300,040 A | 11/1981 | Gould et al. .................. 235/381 |
| 4,305,059 A | 12/1981 | Benton |
| 4,314,356 A | 2/1982 | Scarbrough ................... 364/900 |
| 4,336,589 A | 6/1982 | Smith et al. ................... 364/403 |
| 4,341,951 A | 7/1982 | Benton ........................... 235/379 |
| 4,346,442 A | 8/1982 | Musmanno ................... 364/408 |
| 4,365,634 A | 12/1982 | Bare et al. ..................... 128/640 |
| 4,376,978 A | 3/1983 | Musmanno ................... 364/408 |
| 4,377,741 A | 3/1983 | Brekka et al. ................. 235/472 |
| 4,383,298 A | 5/1983 | Huff et al. ..................... 364/300 |
| 4,385,393 A | 5/1983 | Chaure et al. .................. 375/30 |
| 4,393,584 A | 7/1983 | Bare et al. ....................... 29/877 |
| 4,396,985 A | 8/1983 | Ohara ............................ 364/405 |
| 4,412,287 A | 10/1983 | Braddock, III ............... 364/408 |
| 4,429,387 A | 1/1984 | Kaminski ...................... 370/522 |
| 4,435,769 A | 3/1984 | Nagano et al. ................ 364/464 |
| 4,438,824 A | 3/1984 | Mueller-Schloer |
| 4,442,494 A | 4/1984 | Fromson et al. .............. 364/511 |
| 4,445,171 A | 4/1984 | Neches .......................... 364/200 |
| 4,449,186 A | 5/1984 | Kelly et al. .................... 364/407 |
| 4,452,358 A | 6/1984 | Simpson ........................ 206/366 |
| 4,454,944 A | 6/1984 | Shillington et al. ........... 206/366 |
| 4,456,957 A | 6/1984 | Schieltz ......................... 364/200 |
| 4,459,663 A | 7/1984 | Dye ................................ 364/200 |
| 4,460,965 A | 7/1984 | Trehn et al. ................... 364/464 |
| 4,464,718 A | 8/1984 | Dixon et al. ................... 364/200 |
| 4,464,719 A | 8/1984 | Spellmann .................... 364/300 |
| 4,471,348 A | 9/1984 | London et al. ................ 340/722 |
| 4,478,783 A | 10/1984 | Broadwater ................... 376/211 |
| 4,490,847 A | 12/1984 | Aleksander et al. .......... 382/159 |
| 4,490,848 A | 12/1984 | Beall et al. .................... 382/152 |
| 4,491,725 A | 1/1985 | Pritchard ....................... 235/375 |
| 4,491,947 A | 1/1985 | Frank ............................. 370/94 |
| 4,493,105 A | 1/1985 | Beall et al. .................... 382/197 |
| 4,502,606 A | 3/1985 | Shillington et al. ........... 215/274 |
| 4,509,123 A | 4/1985 | Vereen .......................... 364/300 |
| 4,516,016 A | 5/1985 | Kodron .......................... 235/472 |
| 4,522,211 A | 6/1985 | Bare et al. ..................... 128/640 |
| 4,530,067 A | 7/1985 | Dorr ............................... 364/900 |
| 4,537,576 A | 8/1985 | Thorsheim et al. ........... 434/404 |
| 4,542,808 A | 9/1985 | Lloyd, Jr. et al. ............... 186/56 |
| 4,547,851 A | 10/1985 | Kurland ......................... 364/401 |
| 4,547,858 A | 10/1985 | Horak ............................ 364/513 |
| 4,549,663 A | 10/1985 | Corbett, Jr. et al. ............. 211/13 |
| 4,550,436 A | 10/1985 | Freeman et al. ................ 382/34 |
| 4,551,719 A | 11/1985 | Carlin et al. |
| 4,553,222 A | 11/1985 | Kurland et al. ............... 364/900 |
| 4,554,077 A | 11/1985 | Brown et al. .................. 210/656 |
| 4,558,211 A | 12/1985 | Berstein ........................ 235/380 |
| 4,559,600 A | 12/1985 | Rao ............................... 364/474 |
| 4,566,464 A | 1/1986 | Piccone et al. ................ 128/732 |
| 4,569,421 A | 2/1986 | Sandstedt ........................ 186/39 |
| 4,578,530 A | 3/1986 | Zeidler |
| 4,578,768 A | 3/1986 | Racine ........................... 364/560 |
| 4,579,053 A | 4/1986 | Beesley et al. ............ 100/229 A |
| 4,591,983 A | 5/1986 | Bennett et al. ................ 364/403 |
| 4,598,376 A | 7/1986 | Burton et al. ................. 364/470 |
| 4,600,112 A | 7/1986 | Shillington et al. ........... 215/274 |
| 4,605,124 A | 8/1986 | Sandel et al. .................. 206/223 |
| 4,614,861 A | 9/1986 | Pavlov et al. ................. 235/380 |
| 4,635,136 A | 1/1987 | Ciampa et al. ................ 358/342 |
| 4,635,189 A | 1/1987 | Kendall ......................... 364/200 |
| 4,636,622 A | 1/1987 | Clark ............................. 235/380 |
| 4,636,950 A | 1/1987 | Caswell et al. ............... 364/403 |
| 4,642,296 A | 2/1987 | Hubner .......................... 436/138 |
| 4,642,767 A | 2/1987 | Lerner ........................... 364/406 |
| 4,642,768 A | 2/1987 | Roberts ......................... 364/408 |
| 4,648,037 A | 3/1987 | Valentino ...................... 364/408 |
| 4,651,279 A | 3/1987 | Suzuki ........................... 364/405 |
| 4,654,482 A | 3/1987 | DeAngelis ....................... 379/95 |
| 4,656,591 A | 4/1987 | Goldberg ....................... 364/478 |
| 4,658,245 A | 4/1987 | Dye et al. ....................... 340/683 |
| 4,658,370 A | 4/1987 | Erman et al. .................. 364/513 |
| 4,667,292 A | 5/1987 | Mohlenbrock et al. ....... 364/406 |
| 4,667,821 A | 5/1987 | Shillington ................... 206/366 |
| 4,670,634 A | 6/1987 | Bridges et al. |
| 4,674,044 A | 6/1987 | Kalmus et al. ................ 364/408 |
| 4,674,676 A | 6/1987 | Sandel et al. .................. 229/142 |
| 4,677,552 A | 6/1987 | Sibley, Jr. ...................... 364/408 |
| 4,677,909 A | 7/1987 | Beesley et al. ................ 100/229 |
| 4,688,178 A | 8/1987 | Connelly et al. .............. 364/470 |
| 4,694,397 A | 9/1987 | Grant et al. .................... 364/408 |
| 4,697,243 A | 9/1987 | Moore et al. .................. 364/513 |
| 4,700,363 A | 10/1987 | Tomlinson et al. ............. 375/37 |
| 4,702,254 A | 10/1987 | Zabara ........................... 128/421 |
| 4,702,385 A | 10/1987 | Shillington et al. ............. 220/18 |
| D292,777 S | 11/1987 | Shillington et al. .......... D09/446 |
| 4,708,142 A | 11/1987 | DeCote, Jr. ............... 128/419 PT |
| 4,708,144 A | 11/1987 | Hamilton et al. ........ 128/419 PG |
| 4,711,994 A | 12/1987 | Greenberg ..................... 235/384 |
| 4,712,555 A | 12/1987 | Thornander et al. ..... 128/419 PG |
| 4,713,815 A | 12/1987 | Bryan et al. ..................... 714/46 |
| 4,717,042 A | 1/1988 | McLaughlin ..................... 221/3 |
| 4,722,055 A | 1/1988 | Roberts ......................... 364/408 |
| 4,723,214 A | 2/1988 | Frei ............................... 364/434 |
| 4,730,252 A | 3/1988 | Bradshaw ......................... 707/4 |
| 4,734,568 A | 3/1988 | Watanabe ...................... 235/487 |
| 4,734,858 A | 3/1988 | Schlafly ........................ 364/408 |
| 4,735,204 A | 4/1988 | Sussman et al. .......... 128/419 R |
| 4,736,860 A | 4/1988 | Bemis ........................... 220/1 T |
| 4,750,437 A | 6/1988 | Rouse ............................ 110/346 |
| 4,752,877 A | 6/1988 | Roberts et al. ................ 364/408 |
| 4,754,410 A | 6/1988 | Leech et al. ................... 364/513 |
| 4,755,940 A | 7/1988 | Brachtl et al. ................. 364/408 |
| 4,761,748 A | 8/1988 | Le Rat et al. .................. 364/551 |
| 4,763,277 A | 8/1988 | Ashford et al. ............... 364/513 |
| 4,773,011 A | 9/1988 | VanHoose |
| 4,774,663 A | 9/1988 | Musmanno et al. .......... 364/408 |
| 4,774,952 A | 10/1988 | Smits ......................... 128/419 D |
| 4,775,935 A | 10/1988 | Yourick ......................... 364/401 |
| 4,779,728 A | 10/1988 | Hanifl et al. .................. 206/366 |
| 4,783,740 A | 11/1988 | Ishizawa et al. .............. 364/403 |
| 4,785,969 A | 11/1988 | McLaughlin ..................... 221/2 |
| D298,864 S | 12/1988 | Jefferson ..................... D26/140 |
| 4,789,928 A | 12/1988 | Fujisaki ......................... 364/401 |
| 4,795,890 A | 1/1989 | Goldman ....................... 235/380 |
| 4,796,292 A | 1/1989 | Thomas ........................... 379/91 |
| 4,798,676 A | 1/1989 | Matkovich .................... 210/767 |
| 4,799,156 A | 1/1989 | Shavit et al. .................. 364/401 |
| 4,802,423 A | 2/1989 | Pennington ................... 110/233 |
| 4,804,090 A | 2/1989 | Schuh et al. ................... 206/366 |
| 4,807,177 A | 2/1989 | Ward ............................. 364/900 |

| Patent Number | Date | Inventor | Class |
|---|---|---|---|
| 4,809,154 A | 2/1989 | Newton | 364/148 |
| 4,809,697 A | 3/1989 | Causey, III et al. | 128/419 PT |
| 4,809,850 A | 3/1989 | Laible et al. | 206/366 |
| 4,812,628 A | 3/1989 | Boston et al. | 235/380 |
| 4,812,990 A | 3/1989 | Adams et al. | 364/444 |
| 4,812,994 A | 3/1989 | Taylor et al. | |
| 4,817,605 A | 4/1989 | Sholder | 128/419 PT |
| 4,821,118 A | 4/1989 | Lafreniere | 358/108 |
| 4,821,120 A | 4/1989 | Tomlinson | 358/142 |
| 4,823,264 A | 4/1989 | Deming | 364/408 |
| 4,823,265 A | 4/1989 | Nelson | 364/408 |
| 4,823,306 A | 4/1989 | Barbic et al. | 364/900 |
| 4,826,333 A | 5/1989 | Tanaka | 400/76 |
| 4,827,508 A | 5/1989 | Shear | 380/4 |
| 4,829,297 A | 5/1989 | Ilg et al. | |
| 4,831,526 A | 5/1989 | Luchs et al. | 364/401 |
| 4,837,693 A | 6/1989 | Schotz | 364/408 |
| 4,839,804 A | 6/1989 | Roberts et al. | 364/408 |
| 4,839,822 A | 6/1989 | Dormond et al. | 364/513 |
| 4,839,829 A | 6/1989 | Freedman | 364/519 |
| 4,842,138 A | 6/1989 | Sandel et al. | 206/370 |
| 4,843,546 A | 6/1989 | Yoshida et al. | 364/403 |
| 4,844,252 A | 7/1989 | Barron et al. | 206/223 |
| 4,851,988 A | 7/1989 | Trottier et al. | 364/200 |
| 4,852,794 A | 8/1989 | Bennett et al. | 229/73 |
| 4,853,208 A | 8/1989 | Reimers et al. | 423/659 |
| 4,860,317 A | 8/1989 | Tomlinson | 375/58 |
| 4,862,376 A | 8/1989 | Ferriter et al. | 364/468 |
| 4,864,507 A | 9/1989 | Ebling et al. | 364/468 |
| 4,866,635 A | 9/1989 | Kahn et al. | 364/513 |
| 4,867,164 A | 9/1989 | Zabara | 128/421 |
| 4,876,648 A | 10/1989 | Lloyd | 364/408 |
| 4,886,164 A | 12/1989 | Stein et al. | 206/366 |
| 4,887,206 A | 12/1989 | Natarajan | 364/401 |
| 4,887,208 A | 12/1989 | Schneider et al. | 364/403 |
| 4,897,781 A | 1/1990 | Chang et al. | 364/200 |
| 4,897,867 A | 1/1990 | Foster et al. | 379/94 |
| 4,901,249 A | 2/1990 | Shiota | 364/519 |
| 4,903,201 A | 2/1990 | Wagner | 364/408 |
| 4,912,671 A | 3/1990 | Ishida | 364/900 |
| 4,916,611 A | 4/1990 | Doyle, Jr. et al. | 364/401 |
| 4,919,086 A | 4/1990 | Shillington | 123/52 MC |
| 4,920,488 A | 4/1990 | Filley | 364/403 |
| 4,922,521 A | 5/1990 | Krikke et al. | 379/95 |
| 4,925,048 A | 5/1990 | Noack | 220/70 |
| 4,935,870 A | 6/1990 | Burk, Jr. et al. | 364/200 |
| 4,937,743 A | 6/1990 | Rassman et al. | 364/401 |
| 4,937,763 A | 6/1990 | Mott | 364/550 |
| 4,939,689 A | 7/1990 | Davis et al. | 364/900 |
| 4,940,157 A | 7/1990 | Inagaki | 220/254 |
| 4,941,178 A | 7/1990 | Chuang | 381/41 |
| 4,944,299 A | 7/1990 | Silvian | 128/419 PG |
| 4,945,476 A | 7/1990 | Bodick et al. | |
| 4,947,028 A | 8/1990 | Gorog | 235/381 |
| 4,949,248 A | 8/1990 | Caro | 364/200 |
| 4,950,105 A | 8/1990 | Meess et al. | 405/128 |
| 4,951,196 A | 8/1990 | Jackson | 364/401 |
| 4,953,085 A | 8/1990 | Atkins | 364/408 |
| 4,953,159 A | 8/1990 | Hayden et al. | 370/62 |
| 4,953,745 A | 9/1990 | Rowlett, Jr. | 221/5 |
| 4,958,280 A | 9/1990 | Pauly et al. | 364/403 |
| 4,958,292 A | 9/1990 | Kaneko et al. | 364/468 |
| 4,961,148 A | 10/1990 | Holda et al. | 364/468 |
| 4,964,043 A | 10/1990 | Galvin | 364/401 |
| 4,964,125 A | 10/1990 | Kim | 371/151 |
| 4,969,094 A | 11/1990 | Halley et al. | 364/408 |
| 4,972,318 A | 11/1990 | Brown et al. | 364/403 |
| 4,972,453 A | 11/1990 | Daniel, III et al. | 379/10 |
| 4,972,504 A | 11/1990 | Daniel, Jr. et al. | 455/2 |
| 4,972,950 A | 11/1990 | Shillington | 206/366 |
| 4,975,840 A | 12/1990 | DeTore et al. | 364/401 |
| 4,975,968 A | 12/1990 | Yukl | 382/1 |
| 4,977,595 A | 12/1990 | Ohta et al. | 380/24 |
| D313,670 S | 1/1991 | Barron et al. | D26/113 |
| 4,982,072 A | 1/1991 | Takigami | 235/384 |
| 4,982,346 A | 1/1991 | Girouard et al. | 364/550 |
| 4,984,155 A | 1/1991 | Geier et al. | 364/401 |
| 4,984,686 A | 1/1991 | Shillinton | 206/366 |
| 4,985,857 A | 1/1991 | Bajpai et al. | 702/184 |
| 4,987,538 A | 1/1991 | Johnson et al. | 705/2 |
| 4,989,602 A | 2/1991 | Sholder | 128/419 D |
| 4,992,939 A | 2/1991 | Tyler | 364/401 |
| 4,992,940 A | 2/1991 | Dworkin | 364/401 |
| 4,995,081 A | 2/1991 | Leighton et al. | 380/23 |
| 4,998,753 A | 3/1991 | Wichael | 283/82 |
| 4,998,975 A | 3/1991 | Cohen et al. | 128/419 D |
| 5,005,532 A | 4/1991 | Shillington | 123/52 M |
| 5,005,793 A | 4/1991 | Shillington | 248/229 |
| 5,006,983 A | 4/1991 | Wayne et al. | 364/401 |
| 5,006,998 A | 4/1991 | Yasunobu et al. | 364/513 |
| 5,008,853 A | 4/1991 | Bly et al. | 364/900 |
| 5,009,833 A | 4/1991 | Takeuchi et al. | 376/217 |
| 5,014,875 A | 5/1991 | McLaughlin et al. | 221/2 |
| 5,022,548 A | 6/1991 | Stakis | |
| 5,023,910 A | 6/1991 | Thomson | 381/37 |
| 5,024,326 A | 6/1991 | Sandel et al. | 206/366 |
| 5,024,327 A | 6/1991 | Shillington | 206/366 |
| 5,025,373 A | 6/1991 | Keyser, Jr. et al. | 364/408 |
| 5,025,807 A | 6/1991 | Zabara | 128/421 |
| D318,159 S | 7/1991 | Noack | D34/5 |
| 5,032,989 A | 7/1991 | Tornetta | 364/401 |
| 5,033,004 A | 7/1991 | Vandivier, III | 364/468 |
| 5,035,858 A | 7/1991 | Held et al. | 422/21 |
| 5,036,866 A | 8/1991 | Eldrige, Jr. et al. | 128/849 |
| 5,038,283 A | 8/1991 | Caveney | 364/401 |
| 5,040,534 A | 8/1991 | Mann et al. | 128/419 PG |
| 5,043,891 A | 8/1991 | Goldstein et al. | 364/419 |
| 5,046,002 A | 9/1991 | Takashi et al. | 364/200 |
| 5,046,614 A | 9/1991 | Torres et al. | 206/366 |
| 5,048,766 A | 9/1991 | Gaylor et al. | 241/65 |
| 5,050,031 A | 9/1991 | Weiley | 360/137 |
| 5,050,075 A | 9/1991 | Herman et al. | 364/200 |
| 5,053,607 A | 10/1991 | Carlson et al. | 235/379 |
| 5,058,033 A | 10/1991 | Bonissone et al. | 364/513 |
| 5,058,764 A | 10/1991 | Gaba | 220/481 |
| 5,060,153 A | 10/1991 | Nakagawa | 364/405 |
| 5,063,506 A | 11/1991 | Brockwell et al. | 364/402 |
| 5,064,124 A | 11/1991 | Chang | 241/33 |
| 5,068,859 A | 11/1991 | Collins et al. | 714/795 |
| 5,072,832 A | 12/1991 | Valentine et al. | 206/570 |
| 5,076,429 A | 12/1991 | Patrick et al. | 206/370 |
| 5,077,607 A | 12/1991 | Johnson et al. | 358/86 |
| 5,077,665 A | 12/1991 | Silverman et al. | 364/408 |
| 5,080,251 A | 1/1992 | Noack | 220/335 |
| 5,085,338 A | 2/1992 | Inagaki | 220/254 |
| 5,092,480 A | 3/1992 | Waterston | 220/234 |
| 5,097,950 A | 3/1992 | Weiss et al. | 206/366 |
| 5,101,352 A | 3/1992 | Rembert | 364/401 |
| 5,101,353 A | 3/1992 | Lupien et al. | 364/408 |
| 5,101,424 A | 3/1992 | Clayton et al. | 379/10 |
| 5,101,476 A | 3/1992 | Kukla | 340/286.01 |
| 5,103,079 A | 4/1992 | Barakai et al. | 235/380 |
| 5,103,820 A | 4/1992 | Markowitz | 128/419 OPG |
| 5,103,822 A | 4/1992 | Duncan | 128/419 PG |
| 5,103,997 A | 4/1992 | Shillington et al. | 220/481 |
| 5,104,047 A | 4/1992 | Simmons | 241/20 |
| 5,106,594 A | 4/1992 | Held et al. | 422/292 |
| 5,107,497 A | 4/1992 | Lirov et al. | 371/151 |
| 5,107,990 A | 4/1992 | Wicherski et al. | 206/366 |
| 5,109,337 A | 4/1992 | Ferriter et al. | 364/401 |
| 5,109,515 A | 4/1992 | Laggis et al. | 395/725 |
| 5,109,519 A | 4/1992 | Zimmet et al. | 395/800 |
| 5,117,354 A | 5/1992 | Long et al. | 364/401 |
| 5,117,355 A | 5/1992 | McCarthy | 364/405 |
| 5,119,318 A | 6/1992 | Paradies et al. | 395/61 |
| 5,122,950 A | 6/1992 | Benton et al. | 364/408 |
| 5,122,952 A | 6/1992 | Minkus | 364/419 |
| 5,124,125 A | 6/1992 | Brent | 422/21 |
| 5,124,909 A | 6/1992 | Blakely et al. | 395/200 |
| 5,124,911 A | 6/1992 | Sack | 364/401 |
| 5,125,995 A | 6/1992 | D'Haese et al. | 156/155 |
| 5,127,005 S | 6/1992 | Oda et al. | 371/151 |
| 5,128,861 A | 7/1992 | Kagami et al. | 364/403 |
| 5,132,968 A | 7/1992 | Cephus | 370/941 |
| 5,136,501 A | 8/1992 | Silverman et al. | 364/408 |
| 5,136,502 A | 8/1992 | Van Remortel et al. | |
| 5,136,686 A | 8/1992 | Koza | 395/13 |
| 5,138,569 A | 8/1992 | Valenzuela | 708/312 |

| Patent | Date | Inventor | Class |
|---|---|---|---|
| 5,140,692 A | 8/1992 | Morita | 395/600 |
| 5,144,556 A | 9/1992 | Wang et al. | 364/419 |
| 5,145,063 A | 9/1992 | Lee | 206/364 |
| 5,146,562 A | 9/1992 | Kukla | 715/751 |
| 5,148,365 A | 9/1992 | Dembo | 364/402 |
| 5,148,366 A | 9/1992 | Buchanan et al. | 364/419 |
| 5,148,368 A | 9/1992 | Okubo | |
| 5,152,751 A | 10/1992 | Kozlowski | 604/192 |
| 5,154,345 A | 10/1992 | Shillington | 232/44 |
| 5,159,315 A | 10/1992 | Schultz et al. | 340/539 |
| 5,159,685 A | 10/1992 | Kung | 395/575 |
| 5,159,687 A | 10/1992 | Richburg | 395/700 |
| 5,159,689 A | 10/1992 | Richburg | 717/106 |
| 5,161,211 A | 11/1992 | Taguchi et al. | 395/10 |
| 5,161,929 A | 11/1992 | Lichti, Sr. | 414/331 |
| 5,163,000 A | 11/1992 | Rogers et al. | |
| 5,163,131 A | 11/1992 | Row et al. | 395/200 |
| 5,164,897 A | 11/1992 | Clark et al. | 364/401 |
| 5,167,193 A | 12/1992 | Withers et al. | 110/346 |
| 5,168,444 A | 12/1992 | Cukor et al. | 364/401 |
| 5,168,445 A | 12/1992 | Kawashima et al. | 364/403 |
| 5,172,313 A | 12/1992 | Schumacher | 364/401 |
| 5,175,682 A | 12/1992 | Higashiyama et al. | 364/408 |
| D332,680 S | 1/1993 | Ramirez | D34/7 |
| 5,177,342 A | 1/1993 | Adams | 235/379 |
| 5,177,680 A | 1/1993 | Tsukino et al. | 364/401 |
| 5,177,684 A | 1/1993 | Harker et al. | 364/436 |
| 5,178,322 A | 1/1993 | Shillington | 232/44 |
| 5,179,626 A | 1/1993 | Thomson | 395/2 |
| 5,182,709 A | 1/1993 | Makus | 364/419 |
| 5,182,793 A | 1/1993 | Alexander et al. | 395/13 |
| 5,184,502 A | 2/1993 | Adams et al. | |
| 5,184,720 A | 2/1993 | Packer et al. | 206/366 |
| 5,189,606 A | 2/1993 | Burns et al. | 364/401 |
| D334,449 S | 3/1993 | Gaba et al. | D34/6 |
| 5,191,410 A | 3/1993 | McCalley et al. | 358/86 |
| 5,191,522 A | 3/1993 | Bosco et al. | 364/401 |
| 5,193,065 A | 3/1993 | Guerindon et al. | 364/468 |
| 5,195,030 A | 3/1993 | White | 364/401 |
| 5,195,635 A | 3/1993 | Cornwell | 206/366 |
| D334,973 S | 4/1993 | Valentine et al. | D24/227 |
| 5,202,825 A | 4/1993 | Miller et al. | 364/405 |
| 5,202,827 A | 4/1993 | Sober | 364/408 |
| 5,202,930 A | 4/1993 | Livshitz et al. | 382/3 |
| 5,204,821 A | 4/1993 | Inui et al. | 364/468 |
| 5,206,803 A | 4/1993 | Vitagliano et al. | 364/408 |
| 5,206,804 A | 4/1993 | Thies et al. | 364/401 |
| 5,208,665 A | 5/1993 | McCalley et al. | 358/86 |
| 5,211,424 A | 5/1993 | Bliss | 281/151 |
| 5,213,758 A | 5/1993 | Kawashima et al. | 422/21 |
| 5,216,593 A | 6/1993 | Dietrich et al. | 364/402 |
| 5,216,594 A | 6/1993 | White et al. | 364/403 |
| 5,220,501 A | 6/1993 | Lawlor et al. | 364/408 |
| 5,222,211 A | 6/1993 | Mueller et al. | 395/161 |
| 5,223,207 A | 6/1993 | Gross et al. | 376/216 |
| 5,224,034 A | 6/1993 | Katz et al. | 364/401 |
| 5,224,206 A | 6/1993 | Simoudis | 395/77 |
| 5,226,065 A | 7/1993 | Held et al. | 378/64 |
| 5,226,165 A | 7/1993 | Martin | 395/600 |
| 5,230,073 A | 7/1993 | Gausmann et al. | 395/600 |
| 5,230,496 A | 7/1993 | Shillington et al. | |
| 5,231,566 A | 7/1993 | Blutinger et al. | 364/401 |
| 5,231,569 A | 7/1993 | Myatt et al. | 364/408 |
| 5,231,571 A | 7/1993 | D'Agostino | 364/408 |
| 5,231,938 A | 8/1993 | Gore | 110/346 |
| 5,235,633 A | 8/1993 | Dennison et al. | 379/60 |
| 5,235,680 A | 8/1993 | Bijnagte | 395/161 |
| 5,236,135 A | 8/1993 | Wilson et al. | 241/21 |
| 5,237,496 A | 8/1993 | Kagami et al. | 364/401 |
| 5,237,497 A | 8/1993 | Sitarski | 364/402 |
| 5,237,498 A | 8/1993 | Tenma et al. | 364/406 |
| 5,237,499 A | 8/1993 | Garback | 364/407 |
| 5,239,617 A | 8/1993 | Gardner et al. | 395/12 |
| 5,240,108 A | 8/1993 | Tonna | 206/366 |
| 5,241,464 A | 8/1993 | Greulich et al. | 364/401 |
| 5,241,671 A | 8/1993 | Reed et al. | 395/600 |
| 5,243,655 A | 9/1993 | Wang | 380/51 |
| 5,245,535 A | 9/1993 | Weiss et al. | 364/407 |
| 5,247,575 A | 9/1993 | Sprague et al. | 380/9 |
| 5,249,120 A | 9/1993 | Foley | 364/401 |
| 5,249,680 A | 10/1993 | Shillington | 206/366 |
| 5,251,144 A | 10/1993 | Ramamurthi | 364/474.19 |
| 5,253,164 A | 10/1993 | Holloway et al. | 364/406 |
| 5,253,165 A | 10/1993 | Leiseca et al. | 364/407 |
| 5,253,166 A | 10/1993 | Dettelbach et al. | 364/407 |
| 5,255,184 A | 10/1993 | Hornick et al. | 364/407 |
| 5,255,207 A | 10/1993 | Cornwell | 364/512 |
| 5,256,861 A | 10/1993 | Anthony | 219/494 |
| 5,257,186 A | 10/1993 | Ukita et al. | |
| 5,257,577 A | 11/1993 | Clark | 100/99 |
| 5,263,156 A | 11/1993 | Bowen et al. | 395/600 |
| 5,265,006 A | 11/1993 | Asthana et al. | 364/401 |
| 5,265,008 A | 11/1993 | Benton et al. | 364/408 |
| 5,265,010 A | 11/1993 | Evans-Paganelli et al. | |
| 5,265,065 A | 11/1993 | Turtle | 395/600 |
| 5,265,724 A | 11/1993 | Dondlinger | 206/366 |
| 5,270,922 A | 12/1993 | Higgins | 364/408 |
| 5,271,892 A | 12/1993 | Hanson et al. | 422/25 |
| 5,273,392 A | 12/1993 | Bernard, II et al. | 414/786 |
| 5,274,572 A | 12/1993 | O'Neill et al. | 364/550 |
| 5,274,749 A | 12/1993 | Evans | 395/63 |
| 5,276,253 A | 1/1994 | Circeo, Jr. et al. | 588/253 |
| 5,277,869 A | 1/1994 | Glazer et al. | 422/26 |
| 5,278,751 A | 1/1994 | Adiano et al. | 364/402 |
| 5,281,391 A | 1/1994 | Hanson et al. | 422/25 |
| 5,281,816 A | 1/1994 | Jacobson et al. | 250/339 |
| 5,282,265 A | 1/1994 | Rohra Suda et al. | 395/12 |
| 5,283,731 A | 2/1994 | Lalonde et al. | 364/401 |
| 5,283,865 A | 2/1994 | Johnson | 395/161 |
| 5,285,383 A | 2/1994 | Lindsey et al. | 364/408 |
| 5,289,371 A | 2/1994 | Abel et al. | 364/401 |
| 5,289,787 A | 3/1994 | Eshleman | 110/235 |
| 5,291,395 A | 3/1994 | Abecassis | 364/401 |
| 5,291,396 A | 3/1994 | Calcerano et al. | 364/401 |
| 5,291,398 A | 3/1994 | Hagan | 364/408 |
| 5,291,560 A | 3/1994 | Daugman | 382/2 |
| 5,293,309 A | 3/1994 | Sakai et al. | 364/401 |
| 5,295,582 A | 3/1994 | Dan | 209/3 |
| 5,297,031 A | 3/1994 | Gutterman et al. | 364/408 |
| 5,297,032 A | 3/1994 | Trojan et al. | 364/408 |
| 5,297,042 A | 3/1994 | Morita | |
| 5,299,305 A | 3/1994 | Oomae et al. | 395/149 |
| D346,398 S | 4/1994 | Flanagan | D19/26 |
| 5,304,206 A | 4/1994 | Baker, Jr. et al. | 607/2 |
| 5,305,195 A | 4/1994 | Murphy | 364/401 |
| 5,305,197 A | 4/1994 | Axler et al. | 364/401 |
| 5,307,260 A | 4/1994 | Watanabe et al. | 364/401 |
| 5,309,355 A | 5/1994 | Lockwood | 364/401 |
| 5,310,997 A | 5/1994 | Roach et al. | 235/375 |
| 5,310,999 A | 5/1994 | Claus et al. | 235/384 |
| 5,311,123 A | 5/1994 | Webster et al. | 324/161 |
| 5,311,438 A | 5/1994 | Sellers et al. | 364/468 |
| 5,311,594 A | 5/1994 | Penzias | 380/23 |
| 5,311,876 A | 5/1994 | Olsen et al. | 128/731 |
| 5,312,429 A | 5/1994 | Noack | 606/167 |
| 5,315,303 A | 5/1994 | Tsou et al. | 342/27 |
| 5,315,634 A | 5/1994 | Tanaka et al. | 379/57 |
| 5,317,503 A | 5/1994 | Inoue | 364/400 |
| 5,317,646 A | 5/1994 | Sang, Jr. et al. | 382/9 |
| 5,317,677 A | 5/1994 | Dolan et al. | 395/77 |
| 5,319,542 A | 6/1994 | King, Jr. et al. | 364/401 |
| 5,319,544 A | 6/1994 | Schmerer et al. | 364/403 |
| 5,319,739 A | 6/1994 | Yoshiura et al. | 395/51 |
| 5,319,776 A | 6/1994 | Hile et al. | 395/575 |
| 5,321,605 A | 6/1994 | Chapman et al. | 364/402 |
| 5,321,751 A | 6/1994 | Ray et al. | 380/23 |
| 5,321,841 A | 6/1994 | East et al. | 395/725 |
| 5,322,603 A | 6/1994 | Kameda et al. | |
| 5,323,315 A | 6/1994 | Highbloom | 364/408 |
| 5,323,716 A | 6/1994 | Eshleman | 110/255 |
| 5,323,994 A | 6/1994 | Shillington et al. | 248/229 |
| 5,325,465 A | 6/1994 | Hung et al. | 395/63 |
| 5,325,484 A | 6/1994 | Motoyama | 395/162 |
| D349,058 S | 7/1994 | Farce | D09/523 |
| 5,326,959 A | 7/1994 | Perazza | 235/379 |
| 5,327,521 A | 7/1994 | Savic et al. | 395/281 |
| 5,330,448 A | 7/1994 | Chu | 604/280 |
| 5,330,504 A | 7/1994 | Somerville et al. | 607/5 |

| Patent | Date | Inventor | Class |
|---|---|---|---|
| 5,331,543 A | 7/1994 | Yajima et al. | 364/401 |
| 5,331,546 A | 7/1994 | Webber et al. | 364/407 |
| 5,333,237 A | 7/1994 | Stefanopoulos et al. | 395/12 |
| 5,334,822 A | 8/1994 | Sanford | 235/385 |
| 5,336,870 A | 8/1994 | Hughes et al. | 235/379 |
| 5,338,144 A | 8/1994 | Eshleman | 414/152 |
| 5,339,252 A | 8/1994 | White et al. | 364/468 |
| 5,339,411 A | 8/1994 | Heaton, Jr. | 395/600 |
| 5,339,955 A | 8/1994 | Horan et al. | 206/370 |
| 5,341,429 A | 8/1994 | Stringer et al. | 380/23 |
| 5,346,297 A | 9/1994 | Colson, Jr. et al. | 312/215 |
| 5,347,632 A | 9/1994 | Filepp et al. | 395/200 |
| 5,350,562 A | 9/1994 | Anthony | 422/1 |
| 5,351,186 A | 9/1994 | Bullock et al. | 364/401 |
| 5,351,293 A | 9/1994 | Michener et al. | 380/21 |
| D351,906 S | 10/1994 | Marsh | D24/131 |
| 5,353,719 A | 10/1994 | Eshleman et al. | 110/188 |
| 5,354,000 A | 10/1994 | Wright et al. | 241/33 |
| 5,355,474 A | 10/1994 | Thuraisngham et al. | 395/600 |
| 5,357,439 A | 10/1994 | Matsuzaki et al. | 364/468 |
| 5,361,199 A | 11/1994 | Shoquist et al. | 364/401 |
| 5,361,201 A | 11/1994 | Jost et al. | 364/401 |
| 5,361,709 A | 11/1994 | Eshleman | 110/255 |
| 5,363,093 A | 11/1994 | Williams et al. | 340/605 |
| 5,363,958 A | 11/1994 | Horan | 206/356 |
| 5,367,452 A | 11/1994 | Gallery et al. | 364/401 |
| 5,367,627 A | 11/1994 | Johnson | 395/161 |
| 5,367,664 A | 11/1994 | Magill et al. | 395/575 |
| 5,369,570 A | 11/1994 | Parad | 364/401 |
| 5,372,725 A | 12/1994 | Halff et al. | 210/761 |
| 5,377,098 A | 12/1994 | Sakai | 364/406 |
| 5,377,116 A | 12/1994 | Wayne et al. | |
| 5,377,269 A | 12/1994 | Heptig et al. | 380/25 |
| 5,377,323 A | 12/1994 | Vasudevan | 395/200 |
| 5,381,140 A | 1/1995 | Kuroda et al. | 340/961 |
| 5,383,111 A | 1/1995 | Homma et al. | 364/401 |
| 5,383,113 A | 1/1995 | Kight et al. | 364/401 |
| 5,384,092 A | 1/1995 | Sawhill et al. | 422/32 |
| 5,384,892 A | 1/1995 | Strong | 395/252 |
| 5,385,105 A | 1/1995 | Withers, Jr. et al. | 110/346 |
| 5,386,103 A | 1/1995 | DeBan et al. | 235/379 |
| 5,386,104 A | 1/1995 | Sime | 235/379 |
| 5,388,259 A | 2/1995 | Fleischman et al. | 395/600 |
| 5,388,535 A | 2/1995 | Eshleman | 110/255 |
| 5,389,084 A | 2/1995 | Horan et al. | 604/192 |
| 5,390,262 A | 2/1995 | Pope | 382/234 |
| 5,392,320 A | 2/1995 | Chao | 376/215 |
| 5,392,951 A | 2/1995 | Gardner et al. | 221/2 |
| 5,395,008 A | 3/1995 | Bemis et al. | 220/481 |
| 5,395,338 A | 3/1995 | Gaba | 604/110 |
| 5,395,393 A | 3/1995 | Wickham | 607/5 |
| 5,396,253 A | 3/1995 | Chia | 342/104 |
| 5,396,416 A | 3/1995 | Berkowitz et al. | 364/165 |
| 5,397,068 A | 3/1995 | Solomons et al. | 241/100 |
| 5,397,535 A | 3/1995 | Kaneko | 422/22 |
| 5,401,444 A | 3/1995 | Spinello | 264/5 |
| 5,401,944 A | 3/1995 | Bravman et al. | 235/375 |
| 5,402,336 A | 3/1995 | Spiegelhoff et al. | 364/401 |
| 5,402,521 A | 3/1995 | Niida et al. | 395/22 |
| 5,402,524 A | 3/1995 | Bauman et al. | 395/50 |
| 5,402,887 A | 4/1995 | Shillington | 206/366 |
| 5,404,292 A | 4/1995 | Hendrickson | |
| 5,405,048 A | 4/1995 | Rogers et al. | 221/211 |
| 5,406,265 A | 4/1995 | Trozzo et al. | 340/632 |
| 5,410,492 A | 4/1995 | Gross et al. | 364/492 |
| D358,326 S | 5/1995 | Tomasello | |
| D358,327 S | 5/1995 | Tomasello | D09/424 |
| D358,527 S | 5/1995 | Danielson et al. | |
| 5,412,190 A | 5/1995 | Josephson et al. | 235/379 |
| 5,412,804 A | 5/1995 | Krishna | 395/600 |
| 5,413,243 A | 5/1995 | Bemis et al. | 220/481 |
| 5,414,833 A | 5/1995 | Hershey et al. | 395/575 |
| 5,415,180 A | 5/1995 | Horan | 128/846 |
| 5,415,315 A | 5/1995 | Ramirez | 220/346 |
| 5,417,659 A | 5/1995 | Gaba | 604/110 |
| 5,418,951 A | 5/1995 | Damashek | 395/600 |
| 5,419,435 A | 5/1995 | Perzan et al. | 206/366 |
| 5,421,672 A | 6/1995 | Ankeny et al. | 405/128 |
| 5,423,033 A | 6/1995 | Yuen | 395/600 |
| 5,423,450 A | 6/1995 | Shillington et al. | 220/481 |
| 5,423,492 A | 6/1995 | Willis | 241/81 |
| 5,424,947 A | 6/1995 | Nagao et al. | |
| 5,425,458 A | 6/1995 | Gilcreest et al. | 209/655 |
| 5,427,238 A | 6/1995 | Weiss | 206/366 |
| 5,427,737 A | 6/1995 | Glazer et al. | 422/26 |
| 5,429,506 A | 7/1995 | Brophy et al. | 434/107 |
| 5,430,644 A | 7/1995 | Deaton et al. | 364/401 |
| 5,432,822 A | 7/1995 | Kaewell, Jr. | 375/340 |
| 5,432,904 A | 7/1995 | Wong | 395/161 |
| 5,433,412 A | 7/1995 | Watt et al. | 206/370 |
| 5,434,394 A | 7/1995 | Roach et al. | 235/375 |
| 5,440,731 A | 8/1995 | Nagashima et al. | 395/600 |
| 5,441,622 A | 8/1995 | Langford | 204/275 |
| 5,442,771 A | 8/1995 | Filepp et al. | 395/650 |
| 5,444,844 A | 8/1995 | Inoue et al. | 395/161 |
| 5,445,294 A | 8/1995 | Gardner et al. | 221/1 |
| 5,446,885 A | 8/1995 | Moore et al. | 395/600 |
| H1477 H | 9/1995 | Payne | 405/128 |
| 5,449,068 A | 9/1995 | Gharibian | 206/355 |
| 5,451,998 A | 9/1995 | Hamrick | 348/13 |
| 5,453,601 A | 9/1995 | Rosen | 235/379 |
| 5,453,933 A | 9/1995 | Wright et al. | 700/181 |
| 5,455,406 A | 10/1995 | Terashima et al. | 235/379 |
| 5,455,407 A | 10/1995 | Rosen | 235/380 |
| 5,455,903 A | 10/1995 | Jolissaint et al. | 395/155 |
| 5,457,792 A | 10/1995 | Virgil et al. | 395/600 |
| 5,459,304 A | 10/1995 | Eisenmann | 235/380 |
| 5,459,675 A | 10/1995 | Gross et al. | 364/492 |
| 5,460,294 A | 10/1995 | Williams | 221/2 |
| 5,465,206 A | 11/1995 | Hilt et al. | 364/406 |
| 5,465,291 A | 11/1995 | Barrus et al. | 379/67 |
| 5,465,321 A | 11/1995 | Smyth | 395/22 |
| 5,465,353 A | 11/1995 | Hull et al. | 395/600 |
| 5,465,461 A | 11/1995 | Sandel | 16/111 R |
| 5,465,841 A | 11/1995 | Wilson et al. | 206/366 |
| 5,467,270 A | 11/1995 | Matsumoto | 364/403 |
| 5,469,498 A | 11/1995 | Abe et al. | 379/127 |
| 5,469,600 A | 11/1995 | Sandel | 16/111 R |
| 5,470,022 A | 11/1995 | Wright et al. | 241/33 |
| 5,470,342 A | 11/1995 | Mann et al. | 607/5 |
| 5,471,575 A | 11/1995 | Giansante | 395/144 |
| 5,471,705 A | 12/1995 | Dao | |
| 5,472,167 A | 12/1995 | Shillington et al. | 248/552 |
| 5,474,181 A | 12/1995 | Shillington et al. | 206/370 |
| 5,475,585 A | 12/1995 | Bush | 364/401 |
| 5,476,634 A | 12/1995 | Bridges et al. | 422/22 |
| 5,477,465 A | 12/1995 | Zheng | 702/76 |
| 5,478,989 A | 12/1995 | Shepley | 235/375 |
| 5,479,344 A | 12/1995 | Keziah, Jr. | 364/40 B |
| 5,480,062 A | 1/1996 | Rogers et al. | 221/174 |
| 5,481,647 A | 1/1996 | Brody et al. | 395/51 |
| 5,483,445 A | 1/1996 | Pickering | 364/406 |
| 5,483,637 A | 1/1996 | Winokur et al. | |
| 5,484,988 A | 1/1996 | Hills et al. | 235/379 |
| 5,485,369 A | 1/1996 | Nicholls et al. | 364/401 |
| 5,486,410 A | 1/1996 | Groeger et al. | 428/283 |
| 5,488,725 A | 1/1996 | Turtle et al. | 395/600 |
| 5,490,217 A | 2/1996 | Wang et al. | 380/51 |
| 5,493,490 A | 2/1996 | Johnson | 364/401 |
| 5,493,491 A | 2/1996 | Calcerano et al. | 364/403 |
| 5,493,689 A | 2/1996 | Waclawsky et al. | 395/821 |
| 5,493,757 A | 2/1996 | Horan et al. | 16/114 R |
| 5,494,186 A | 2/1996 | Marsh | 220/481 |
| 5,495,610 A | 2/1996 | Shing et al. | 395/600 |
| 5,495,941 A | 3/1996 | Leonard | 206/366 |
| 5,496,991 A | 3/1996 | Delfer, III et al. | 235/379 |
| 5,497,488 A | 3/1996 | Akizawa et al. | 395/600 |
| 5,498,002 A | 3/1996 | Gechter | 463/31 |
| 5,498,003 A | 3/1996 | Gechter | 463/31 |
| 5,500,513 A | 3/1996 | Langhans et al. | 235/380 |
| 5,500,793 A | 3/1996 | Deming, Jr. et al. | 364/401 |
| 5,502,576 A | 3/1996 | Ramsay et al. | 358/444 |
| 5,502,636 A | 3/1996 | Clarke | 364/401 |
| 5,502,764 A | 3/1996 | Naccache | 380/23 |
| 5,504,321 A | 4/1996 | Sheldon | 235/492 |
| 5,504,674 A | 4/1996 | Chen et al. | 364/401 |
| 5,504,675 A | 4/1996 | Cragun et al. | 364/401 |
| 5,504,893 A | 4/1996 | Kawashima et al. | 395/600 |

| | | | | | | | |
|---|---|---|---|---|---|---|---|
| 5,506,794 | A | 4/1996 | Lange | 5,594,648 | A | 1/1997 | Nakaura ........................ 701/74 |
| 5,507,408 | A | 4/1996 | Mosior et al. .................. 220/346 | 5,596,642 | A | 1/1997 | Davis et al. ..................... 380/24 |
| 5,508,004 | A | 4/1996 | Held et al. ....................... 422/22 | 5,596,643 | A | 1/1997 | Davis et al. ..................... 380/24 |
| 5,508,706 | A | 4/1996 | Tsou et al. ..................... 342/192 | 5,602,886 | A | 2/1997 | Gross et al. ................... 376/253 |
| 5,508,912 | A | 4/1996 | Schneiderman ............... 364/401 | 5,603,013 | A | 2/1997 | Ohara .............................. 703/23 |
| 5,509,083 | A | 4/1996 | Abtahi et al. .................. 382/124 | 5,604,802 | A | 2/1997 | Holloway ........................ 380/24 |
| 5,511,908 | A | 4/1996 | Van Valkenburgh et al. . 405/128 | 5,605,245 | A | 2/1997 | Bemis et al. ................... 220/324 |
| 5,512,901 | A | 4/1996 | Chen et al. ..................... 342/175 | 5,608,622 | A | 3/1997 | Church ........................... 395/753 |
| 5,513,343 | A | 4/1996 | Sakano et al. | 5,608,898 | A | 3/1997 | Turpin et al. .................. 395/619 |
| 5,515,268 | A | 5/1996 | Yoda ............................... 364/401 | 5,609,820 | A | 3/1997 | Bridges et al. .................. 422/23 |
| 5,515,477 | A | 5/1996 | Sutherland ...................... 395/27 | 5,610,839 | A | 3/1997 | Karolak et al. ............. 364/514 C |
| 5,517,405 | A | 5/1996 | McAndrew et al. ............ 706/45 | 5,611,038 | A | 3/1997 | Shaw et al. .................... 715/202 |
| 5,517,406 | A | 5/1996 | Harris et al. ................... 364/408 | 5,611,051 | A | 3/1997 | Pirelli ............................ 395/210 |
| 5,517,596 | A | 5/1996 | Pechanek et al. ............... 395/23 | 5,611,270 | A | 3/1997 | Harrington ..................... 100/102 |
| 5,519,931 | A | 5/1996 | Reich | 5,615,269 | A | 3/1997 | Micali ............................. 380/49 |
| 5,520,282 | A | 5/1996 | Williams, Jr. .................. 206/370 | 5,616,136 | A | 4/1997 | Shillington et al. ........... 604/240 |
| 5,520,450 | A | 5/1996 | Colson, Jr. et al. ............ 312/215 | 5,620,466 | A | 4/1997 | Haefner et al. ..................... 607/5 |
| 5,523,052 | A | 6/1996 | Bridges et al. .................. 422/22 | 5,621,663 | A | 4/1997 | Skagerling .................... 364/550 |
| 5,523,942 | A | 6/1996 | Tyler et al. ..................... 364/401 | 5,621,797 | A | 4/1997 | Rosen .............................. 380/24 |
| 5,525,136 | A | 6/1996 | Rosen ............................... 55/486 | 5,621,812 | A | 4/1997 | Deaton et al. .................. 382/100 |
| 5,526,257 | A | 6/1996 | Lerner ............................ 364/401 | 5,623,547 | A | 4/1997 | Jones et al. ...................... 380/24 |
| 5,527,329 | A | 6/1996 | Gharibian ....................... 606/167 | 5,623,552 | A | 4/1997 | Lane ............................... 382/124 |
| 5,528,490 | A | 6/1996 | Hill ................................. 364/403 | 5,623,660 | A | 4/1997 | Josephson ...................... 395/609 |
| 5,530,438 | A | 6/1996 | Bickham et al. | D379,405 | S | 5/1997 | Shillington .................. D23/295 |
| 5,532,464 | A | 7/1996 | Josephson ...................... 235/379 | 5,626,240 | A | 5/1997 | Friedrichs et al. ............. 209/702 |
| 5,533,974 | A | 7/1996 | Gaba ............................... 604/110 | 5,627,908 | A | 5/1997 | Lee et al. ....................... 382/133 |
| 5,536,898 | A | 7/1996 | Conner et al. .................. 588/252 | 5,629,872 | A | 5/1997 | Gross et al. .................... 364/554 |
| 5,536,945 | A | 7/1996 | Reich | 5,629,982 | A | 5/1997 | Micali ............................. 380/30 |
| 5,537,313 | A | 7/1996 | Pirelli ............................. 364/403 | 5,630,069 | A | 5/1997 | Flores et al. ................... 395/207 |
| 5,537,314 | A | 7/1996 | Kanter ............................ 364/406 | 5,630,070 | A | 5/1997 | Dietrich et al. ................ 395/208 |
| 5,537,590 | A | 7/1996 | Amado ........................... 395/600 | 5,630,125 | A | 5/1997 | Zellweger ...................... 395/614 |
| 5,538,132 | A | 7/1996 | Propp et al. .................... 206/365 | 5,630,127 | A | 5/1997 | Moore et al. ................... 395/615 |
| 5,539,677 | A | 7/1996 | Smith ............................. 364/560 | 5,630,506 | A | 5/1997 | Thorne et al. .................. 206/366 |
| 5,539,877 | A | 7/1996 | Winokur et al. | 5,632,010 | A | 5/1997 | Briechle et al. .................... 345/1 |
| 5,541,832 | A | 7/1996 | Nakajima et al. .............. 364/148 | 5,634,127 | A | 5/1997 | Cloud et al. ................... 395/680 |
| 5,544,040 | A | 8/1996 | Gerbaulet .................. 364/401 R | 5,637,101 | A | 6/1997 | Shillington .................... 604/242 |
| 5,544,352 | A | 8/1996 | Egger ............................. 395/600 | 5,638,457 | A | 6/1997 | Deaton et al. .................. 382/100 |
| 5,546,507 | A | 8/1996 | Staub ................................ 395/76 | 5,638,492 | A | 6/1997 | Maeda et al. .................... 706/45 |
| 5,546,578 | A | 8/1996 | Takada ........................... 395/600 | 5,638,519 | A | 6/1997 | Haluska ......................... 395/228 |
| 5,548,506 | A | 8/1996 | Srinivasan ................. 364/401 R | 5,639,031 | A | 6/1997 | Wright et al. .................... 241/33 |
| 5,548,698 | A | 8/1996 | Smith et al. .................... 395/139 | 5,640,569 | A | 6/1997 | Miller et al. ................... 395/729 |
| 5,550,746 | A | 8/1996 | Jacobs | 5,640,835 | A | 6/1997 | Muscoplat ........................ 53/569 |
| 5,553,094 | A | 9/1996 | Johnson et al. ................ 375/200 | 5,641,423 | A | 6/1997 | Bridges et al. ................. 219/770 |
| 5,554,175 | A | 9/1996 | Alferness .......................... 607/5 | 5,642,419 | A | 6/1997 | Rosen .............................. 380/23 |
| 5,555,191 | A | 9/1996 | Hripcsak .................... 364/514 R | 5,643,402 | A | 7/1997 | Schmid .......................... 156/509 |
| 5,557,518 | A | 9/1996 | Rosen ............................. 364/408 | 5,644,493 | A | 7/1997 | Motai et al. |
| 5,557,780 | A | 9/1996 | Edwards et al. ............... 395/500 | 5,644,686 | A | 7/1997 | Hekmatpour .................... 395/50 |
| 5,566,327 | A | 10/1996 | Sehr ............................... 395/600 | 5,644,725 | A | 7/1997 | Schmerer ....................... 395/228 |
| 5,568,028 | A | 10/1996 | Uchiyama et al. ............. 318/566 | 5,644,727 | A | 7/1997 | Atkins ............................ 395/240 |
| 5,568,121 | A | 10/1996 | Lamensdorf ................... 340/539 | 5,644,778 | A | 7/1997 | Burks et al. .................... 395/800 |
| 5,568,871 | A | 10/1996 | Shantzis ......................... 209/703 | 5,646,864 | A | 7/1997 | Whitney .................... 364/514 B |
| 5,570,291 | A | 10/1996 | Dudle et al. ............. 364/468.01 | 5,647,502 | A | 7/1997 | Marsh ............................ 220/481 |
| 5,570,292 | A | 10/1996 | Abraham et al. | 5,649,114 | A | 7/1997 | Deaton et al. .................. 395/214 |
| 5,570,783 | A | 11/1996 | Thorne et al. .................. 206/366 | 5,649,116 | A | 7/1997 | McCoy et al. ................. 395/238 |
| 5,571,957 | A | 11/1996 | Tanaka ............................. 73/104 | 5,649,117 | A | 7/1997 | Landry ........................... 395/240 |
| 5,573,113 | A | 11/1996 | Shillington et al. ........... 206/366 | 5,650,770 | A | 7/1997 | Schlager et al. ............... 340/573 |
| 5,573,529 | A | 11/1996 | Haak et al. ......................... 606/1 | 5,651,125 | A | 7/1997 | Witt et al. ...................... 395/394 |
| 5,577,040 | A | 11/1996 | Klumpp ............................ 370/73 | 5,652,786 | A | 7/1997 | Rogers |
| 5,578,808 | A | 11/1996 | Taylor ............................ 235/380 | 5,655,008 | A | 8/1997 | Futch et al. |
| 5,579,232 | A | 11/1996 | Tong et al. | 5,655,068 | A | 8/1997 | Opoczynski |
| D376,647 | S | 12/1996 | Marsh et al. ................. D24/131 | 5,655,085 | A | 8/1997 | Ryan et al. ................. 364/401 R |
| 5,581,664 | A | 12/1996 | Allen et al. ...................... 395/51 | 5,655,088 | A | 8/1997 | Midorikawa et al. ......... 395/237 |
| 5,581,677 | A | 12/1996 | Myers et al. ................... 395/140 | 5,658,317 | A | 8/1997 | Haefner et al. ..................... 607/5 |
| 5,581,749 | A | 12/1996 | Hossain et al. ................ 395/600 | 5,659,469 | A | 8/1997 | Deaton et al. .................. 395/214 |
| 5,582,793 | A | 12/1996 | Glazer et al. .................... 422/26 | 5,661,735 | A | 8/1997 | Fischer .......................... 371/491 |
| 5,583,758 | A | 12/1996 | McIlroy et al. ................ 395/202 | 5,661,978 | A | 9/1997 | Holmes et al. ................... 62/36 |
| 5,584,016 | A | 12/1996 | Varghese et al. | 5,662,688 | A | 9/1997 | Haefner et al. ..................... 607/5 |
| 5,584,025 | A | 12/1996 | Keithley et al. ............... 395/615 | 5,664,110 | A | 9/1997 | Green et al. ................... 705/26 |
| 5,584,302 | A | 12/1996 | Sillaway et al. ............... 128/845 | 5,664,111 | A | 9/1997 | Nahan et al. .................... 705/27 |
| 5,586,033 | A | 12/1996 | Hall | 5,664,112 | A | 9/1997 | Sturgeon et al. ................ 705/28 |
| 5,586,066 | A | 12/1996 | White et al. ................... 364/576 | 5,664,115 | A | 9/1997 | Fraser ............................ 705/37 |
| 5,586,218 | A | 12/1996 | Allen ............................. 395/10 | 5,666,420 | A | 9/1997 | Micali ............................. 380/30 |
| 5,587,572 | A | 12/1996 | Kirby ........................ 235/98 R | 5,666,493 | A | 9/1997 | Wojcik et al. .................. 705/26 |
| 5,587,925 | A | 12/1996 | Li ................................... 364/508 | 5,667,069 | A | 9/1997 | Williams, Jr. .................. 206/370 |
| 5,590,038 | A | 12/1996 | Pitroda ........................... 395/241 | 5,668,928 | A | 9/1997 | Groner ........................... 704/243 |
| 5,590,197 | A | 12/1996 | Chen et al. ...................... 380/24 | 5,669,102 | A | 9/1997 | Sandel ....................... 16/114 R |
| 5,592,375 | A | 1/1997 | Salmon et al. ................. 395/207 | 5,672,883 | A | 9/1997 | Reich |
| 5,592,378 | A | 1/1997 | Cameron et al. .............. 395/227 | 5,675,662 | A | 10/1997 | Deaton et al. .................. 382/137 |
| 5,592,560 | A | 1/1997 | Deaton et al. .................. 382/100 | 5,676,255 | A | 10/1997 | Flowers ............................. 209/2 |

| Patent No. | Kind | Date | Inventor | Class |
|---|---|---|---|---|
| 5,677,997 | A | 10/1997 | Talatick | 706/45 |
| 5,678,568 | A | 10/1997 | Uchikubo et al. | 128/897 |
| 5,680,305 | A | 10/1997 | Apgar, IV | 364/401 R |
| 5,680,409 | A | 10/1997 | Qin et al. | 371/48 |
| 5,682,466 | A | 10/1997 | Maeda et al. | 706/46 |
| 5,682,482 | A | 10/1997 | Burt et al. | 395/242 |
| 5,684,965 | A | 11/1997 | Pickering | 395/234 |
| 5,684,984 | A | 11/1997 | Jones et al. | 395/610 |
| 5,684,999 | A | 11/1997 | Okamoto | 395/759 |
| 5,687,322 | A | 11/1997 | Deaton et al. | 395/214 |
| 5,688,399 | A | 11/1997 | Halff et al. | 210/178 |
| 5,689,062 | A | 11/1997 | Jawahir et al. | 73/104 |
| 5,689,650 | A | 11/1997 | McClelland et al. | 395/236 |
| 5,689,652 | A | 11/1997 | Lupien et al. | 395/237 |
| 5,690,683 | A | 11/1997 | Haefner et al. | 607/4 |
| 5,691,524 | A | 11/1997 | Josephson | 235/379 |
| 5,692,132 | A | 11/1997 | Hogan | 395/227 |
| 5,693,028 | A | 12/1997 | Shillington | 604/240 |
| 5,694,546 | A | 12/1997 | Reisman | |
| 5,694,551 | A | 12/1997 | Doyle et al. | 395/226 |
| 5,696,907 | A | 12/1997 | Tom | 395/238 |
| 5,696,909 | A | 12/1997 | Wallner | 395/244 |
| 5,699,528 | A | 12/1997 | Hogan | 395/240 |
| 5,701,115 | A | 12/1997 | Right et al. | 340/286.05 |
| 5,701,400 | A | 12/1997 | Amado | 706/45 |
| RE35,715 | E | 1/1998 | Circeo, Jr. et al. | 588/253 |
| 5,706,290 | A | 1/1998 | Shaw et al. | 370/465 |
| 5,706,321 | A | 1/1998 | Chen et al. | 376/463 |
| 5,706,406 | A | 1/1998 | Pollock | 395/55 |
| 5,709,842 | A | 1/1998 | Held et al. | 422/292 |
| 5,710,887 | A | 1/1998 | Chelliah et al. | 395/226 |
| 5,710,889 | A | 1/1998 | Clark et al. | 395/244 |
| 5,712,472 | A | 1/1998 | Lee | 235/486 |
| 5,712,914 | A | 1/1998 | Aucsmith et al. | 380/30 |
| 5,712,989 | A | 1/1998 | Johnson et al. | 395/228 |
| 5,712,990 | A | 1/1998 | Henderson | 395/228 |
| 5,713,923 | A | 2/1998 | Ward et al. | 607/3 |
| 5,715,298 | A | 2/1998 | Rogers | |
| 5,715,314 | A | 2/1998 | Payne et al. | 380/24 |
| 5,715,402 | A | 2/1998 | Popolo | 395/237 |
| 5,715,448 | A | 2/1998 | Suzuki et al. | 395/609 |
| 5,715,468 | A | 2/1998 | Budzinski | 395/759 |
| 5,716,114 | A | 2/1998 | Holmes et al. | 312/215 |
| 5,717,835 | A | 2/1998 | Hellerstein | 395/51 |
| 5,717,868 | A | 2/1998 | James | 395/235 |
| 5,717,989 | A | 2/1998 | Tozzoli et al. | 705/37 |
| 5,718,168 | A | 2/1998 | Harrington | 100/226 |
| 5,719,563 | A | 2/1998 | Thompson, Jr. | |
| 5,721,832 | A | 2/1998 | Westrope et al. | 395/227 |
| 5,721,898 | A | 2/1998 | Beardsley et al. | 395/603 |
| D391,726 | S | 3/1998 | Williams et al. | D34/11 |
| 5,724,262 | A | 3/1998 | Ghahramani | |
| 5,724,424 | A | 3/1998 | Gifford | 380/24 |
| 5,724,522 | A | 3/1998 | Kagami et al. | 395/226 |
| 5,725,993 | A | 3/1998 | Bringley et al. | 430/269 |
| 5,726,884 | A | 3/1998 | Sturgeon et al. | 395/209 |
| 5,726,898 | A | 3/1998 | Jacobs | |
| 5,727,048 | A | 3/1998 | Hiroshima et al. | |
| 5,727,161 | A | 3/1998 | Purcell, Jr. | 395/207 |
| 5,727,164 | A | 3/1998 | Kaye et al. | 395/228 |
| 5,727,165 | A | 3/1998 | Ordish et al. | 395/237 |
| 5,729,735 | A | 3/1998 | Meyering | 395/610 |
| 5,732,148 | A | 3/1998 | Keagy et al. | 382/124 |
| 5,732,397 | A | 3/1998 | DeTore et al. | 705/1 |
| 5,732,398 | A | 3/1998 | Tagawa | 705/5 |
| 5,732,400 | A | 3/1998 | Mandler et al. | 705/26 |
| 5,732,401 | A | 3/1998 | Conway | 705/29 |
| 5,735,639 | A | 4/1998 | Payne et al. | 405/128 |
| 5,735,797 | A | 4/1998 | Muzilla et al. | 600/441 |
| 5,737,215 | A | 4/1998 | Schricker et al. | 364/149 |
| 5,737,626 | A | 4/1998 | Hall et al. | |
| 5,737,726 | A | 4/1998 | Cameron et al. | 705/7 |
| 5,739,508 | A | 4/1998 | Uber, III | 235/375 |
| 5,740,033 | A | 4/1998 | Wassick et al. | 364/149 |
| 5,740,388 | A | 4/1998 | Hunt | 395/328 |
| 5,742,813 | A | 4/1998 | Kavanagh et al. | 395/608 |
| 5,743,860 | A | 4/1998 | Hively et al. | 600/544 |
| 5,745,382 | A | 4/1998 | Vilim et al. | |
| 5,745,654 | A | 4/1998 | Titan | 395/22 |
| 5,745,687 | A | 4/1998 | Randell | |
| 5,745,712 | A | 4/1998 | Turpin et al. | 395/333 |
| 5,745,765 | A | 4/1998 | Paseman | 395/701 |
| 5,745,776 | A | 4/1998 | Sheppard, II | 395/794 |
| 5,745,882 | A | 4/1998 | Bixler et al. | 705/26 |
| 5,747,053 | A | 5/1998 | Nashimoto et al. | 424/405 |
| 5,748,737 | A | 5/1998 | Daggar | 380/24 |
| 5,748,850 | A | 5/1998 | Sakurai | 395/50 |
| 5,749,081 | A | 5/1998 | Whiteis | 707/102 |
| 5,750,972 | A | 5/1998 | Botvin | 235/379 |
| 5,752,234 | A | 5/1998 | Withers | 705/2 |
| 5,752,244 | A | 5/1998 | Rose et al. | 707/5 |
| 5,754,191 | A | 5/1998 | Mills et al. | 345/508 |
| 5,754,738 | A | 5/1998 | Saucedo et al. | 706/11 |
| 5,754,766 | A | 5/1998 | Shaw et al. | 709/200 |
| 5,754,864 | A | 5/1998 | Hill | 395/712 |
| 5,754,939 | A | 5/1998 | Herz et al. | 455/42 |
| 5,755,698 | A | 5/1998 | Kagan et al. | 604/179 |
| 5,757,917 | A | 5/1998 | Rose et al. | 380/25 |
| 5,758,026 | A | 5/1998 | Lobley et al. | 395/12 |
| 5,758,095 | A | 5/1998 | Albaum et al. | 395/202 |
| 5,758,126 | A | 5/1998 | Daniels et al. | 395/500 |
| 5,758,147 | A | 5/1998 | Chen et al. | 395/606 |
| 5,758,327 | A | 5/1998 | Gardner et al. | 705/26 |
| 5,758,328 | A | 5/1998 | Giovannoli | 705/26 |
| 5,758,329 | A | 5/1998 | Wojcik et al. | 705/28 |
| 5,761,090 | A | 6/1998 | Gross et al. | |
| 5,761,432 | A | 6/1998 | Bergholm et al. | |
| 5,761,502 | A | 6/1998 | Jacobs | 395/614 |
| 5,761,649 | A | 6/1998 | Hill | 705/27 |
| 5,761,661 | A | 6/1998 | Coussens et al. | 707/9 |
| 5,764,509 | A | 6/1998 | Gross et al. | 364/149 |
| 5,764,515 | A | 6/1998 | Guerillot et al. | 364/420 |
| 5,764,543 | A | 6/1998 | Kennedy | 364/578 |
| 5,764,856 | A | 6/1998 | Jaenecke | 395/11 |
| 5,765,138 | A | 6/1998 | Aycock et al. | 705/7 |
| 5,768,142 | A | 6/1998 | Jacobs | |
| 5,768,389 | A | 6/1998 | Ishii | 380/30 |
| 5,768,501 | A | 6/1998 | Lewis | |
| 5,772,059 | A | 6/1998 | McCord | 220/254 |
| 5,774,379 | A | 6/1998 | Gross et al. | 364/576 |
| 5,774,569 | A | 6/1998 | Waldenmaier | 382/100 |
| 5,774,668 | A | 6/1998 | Choquier et al. | |
| 5,774,835 | A | 6/1998 | Ozawa | 704/205 |
| 5,774,839 | A | 6/1998 | Shlomot | 704/222 |
| 5,774,866 | A | 6/1998 | Horwitz et al. | 705/7 |
| 5,774,873 | A | 6/1998 | Berent et al. | 705/26 |
| 5,778,155 | A | 7/1998 | Hepner | 395/51 |
| 5,778,356 | A | 7/1998 | Heiny | 707/2 |
| 5,781,632 | A | 7/1998 | Odom | 380/24 |
| 5,781,772 | A | 7/1998 | Wilkinson, III et al. | 395/600 |
| 5,783,808 | A | 7/1998 | Josephson | 235/379 |
| 5,785,573 | A | 7/1998 | Rothbarth et al. | 446/171 |
| 5,785,591 | A | 7/1998 | Payne | 454/118 |
| 5,787,156 | A | 7/1998 | Katz | |
| 5,787,186 | A | 7/1998 | Schroeder | 382/115 |
| 5,787,235 | A | 7/1998 | Smith et al. | 706/47 |
| 5,787,402 | A | 7/1998 | Potter et al. | 705/37 |
| 5,787,438 | A | 7/1998 | Cink et al. | 707/103 |
| 5,787,443 | A | 7/1998 | Palmer | 707/202 |
| H1743 | H | 8/1998 | Graves et al. | |
| 5,790,674 | A | 8/1998 | Houvener et al. | 380/23 |
| 5,790,780 | A | 8/1998 | Brichta et al. | |
| 5,792,188 | A | 8/1998 | Starkweather et al. | 607/5 |
| 5,793,632 | A | 8/1998 | Fad et al. | |
| 5,794,006 | A | 8/1998 | Sanderman | 395/500 |
| 5,794,206 | A | 8/1998 | Wilkinson et al. | 705/1 |
| 5,794,207 | A | 8/1998 | Walker et al. | 705/23 |
| 5,794,210 | A | 8/1998 | Goldhaber et al. | 705/14 |
| 5,794,212 | A | 8/1998 | Mistr, Jr. | 705/26 |
| 5,794,216 | A | 8/1998 | Brown | 705/27 |
| 5,794,219 | A | 8/1998 | Brown | 705/37 |
| 5,794,789 | A | 8/1998 | Payson et al. | 209/549 |
| 5,799,087 | A | 8/1998 | Rosen | 380/24 |
| 5,799,157 | A | 8/1998 | Escallon | 395/227 |
| 5,799,285 | A | 8/1998 | Klingman | 705/26 |
| 5,799,289 | A | 8/1998 | Fukushima et al. | 705/400 |
| 5,799,311 | A | 8/1998 | Agrawal et al. | 707/102 |
| 5,801,366 | A | 9/1998 | Funk et al. | 235/380 |

| Patent | Kind | Date | Inventor | Class |
|---|---|---|---|---|
| 5,801,367 | A | 9/1998 | Asplund et al. | 235/384 |
| 5,802,502 | A | 9/1998 | Gell et al. | 705/37 |
| 5,805,458 | A | 9/1998 | McNamara et al. | 364/483 |
| 5,805,676 | A | 9/1998 | Martino | |
| 5,805,813 | A | 9/1998 | Schweitzer, III | |
| 5,806,048 | A | 9/1998 | Kiron et al. | 705/36 |
| 5,806,519 | A | 9/1998 | Evans, III et al. | 128/654 |
| 5,808,894 | A | 9/1998 | Wiens et al. | |
| 5,809,212 | A | 9/1998 | Shasha | 395/10 |
| 5,809,479 | A | 9/1998 | Martin et al. | 705/11 |
| 5,809,499 | A | 9/1998 | Wong et al. | 707/6 |
| 5,812,668 | A | 9/1998 | Weber | 380/24 |
| 5,812,670 | A | 9/1998 | Micali | 380/25 |
| 5,815,252 | A | 9/1998 | Price-Francis | 356/71 |
| 5,815,657 | A | 9/1998 | Williams et al. | 395/186 |
| 5,815,683 | A | 9/1998 | Vogler | 395/500 |
| 5,818,914 | A | 10/1998 | Fujisaki | |
| 5,819,028 | A | 10/1998 | Manghirmalani et al. | |
| 5,819,226 | A | 10/1998 | Gopinathan et al. | 705/1 |
| 5,819,241 | A | 10/1998 | Reiter | 705/408 |
| 5,819,263 | A | 10/1998 | Bromley et al. | 707/3 |
| 5,819,267 | A | 10/1998 | Uyama | 707/6 |
| 5,819,273 | A | 10/1998 | Vora et al. | 707/10 |
| 5,819,290 | A | 10/1998 | Fujita | 707/2 |
| 5,820,770 | A | 10/1998 | Cohen et al. | 216/22 |
| 5,821,872 | A | 10/1998 | Brown et al. | |
| 5,822,737 | A | 10/1998 | Ogram | 705/26 |
| 5,822,743 | A | 10/1998 | Gupta et al. | 706/50 |
| 5,826,014 | A | 10/1998 | Coley et al. | |
| 5,826,242 | A | 10/1998 | Montulli | 705/27 |
| 5,826,244 | A | 10/1998 | Huberman | 705/37 |
| 5,826,245 | A | 10/1998 | Sandberg-Diment | 705/44 |
| 5,828,567 | A | 10/1998 | Eryurek et al. | 364/184 |
| 5,829,002 | A | 10/1998 | Priest | 707/10 |
| 5,829,588 | A | 11/1998 | Bloomfield | 206/366 |
| 5,830,419 | A | 11/1998 | Held et al. | 422/307 |
| 5,832,196 | A | 11/1998 | Croslin et al. | |
| 5,832,459 | A | 11/1998 | Cameron et al. | 705/26 |
| 5,832,462 | A | 11/1998 | Midorikawa et al. | 705/35 |
| 5,832,463 | A | 11/1998 | Funk | 705/35 |
| 5,832,465 | A | 11/1998 | Tom | 706/51 |
| 5,832,497 | A | 11/1998 | Taylor | 707/104 |
| 5,833,683 | A | 11/1998 | Fuller et al. | 606/17 |
| 5,833,922 | A | 11/1998 | Held et al. | 422/22 |
| 5,835,683 | A | 11/1998 | Corella et al. | 395/75 |
| 5,835,896 | A | 11/1998 | Fisher et al. | 705/37 |
| 5,835,910 | A | 11/1998 | Kavanagh et al. | 707/103 |
| 5,835,911 | A | 11/1998 | Nakagawa et al. | 707/203 |
| 5,835,922 | A | 11/1998 | Shima et al. | 707/522 |
| 5,836,971 | A | 11/1998 | Starkweather | 607/4 |
| 5,836,989 | A | 11/1998 | Shelton | 607/27 |
| 5,837,171 | A | 11/1998 | Danzik et al. | 264/457 |
| 5,838,906 | A | 11/1998 | Doyle et al. | |
| 5,838,965 | A | 11/1998 | Kavanagh et al. | 395/614 |
| 5,839,117 | A | 11/1998 | Cameron et al. | 705/27 |
| 5,839,119 | A | 11/1998 | Krsul et al. | 705/39 |
| 5,840,026 | A | 11/1998 | Uber, III et al. | 600/431 |
| 5,842,178 | A | 11/1998 | Giovannoli | 705/26 |
| 5,842,201 | A | 11/1998 | Wallack | 707/3 |
| 5,842,221 | A | 11/1998 | Schmonsees | 707/104 |
| 5,842,652 | A | 12/1998 | Warsing et al. | 241/81 |
| 5,842,976 | A | 12/1998 | Williamson | 600/300 |
| 5,843,037 | A | 12/1998 | Uber, III | 604/151 |
| 5,843,130 | A | 12/1998 | Jazayeri | 607/5 |
| 5,844,553 | A | 12/1998 | Hao et al. | 345/329 |
| 5,844,554 | A | 12/1998 | Geller et al. | 345/333 |
| 5,845,255 | A | 12/1998 | Mayaud | 705/3 |
| 5,845,261 | A | 12/1998 | McAbian | 705/26 |
| 5,845,265 | A | 12/1998 | Woolston | 705/37 |
| 5,845,266 | A | 12/1998 | Lupien et al. | 705/37 |
| 5,845,296 | A | 12/1998 | Jasuja et al. | 707/205 |
| 5,847,392 | A | 12/1998 | Menconi | 235/492 |
| 5,847,845 | A | 12/1998 | Takahashi et al. | 358/475 |
| 5,847,971 | A | 12/1998 | Ladner et al. | 364/512 |
| 5,848,395 | A | 12/1998 | Edgar et al. | 705/9 |
| 5,848,399 | A | 12/1998 | Burke | 705/27 |
| 5,848,400 | A | 12/1998 | Chang | 705/35 |
| 5,848,427 | A | 12/1998 | Hyodo | 707/513 |
| 5,848,593 | A | 12/1998 | McGrady et al. | 128/897 |
| 5,848,692 | A | 12/1998 | Thorne et al. | 206/366 |
| 5,850,442 | A | 12/1998 | Muftic | 380/21 |
| 5,850,446 | A | 12/1998 | Berger et al. | 380/24 |
| 5,852,809 | A | 12/1998 | Abel et al. | 705/26 |
| 5,852,810 | A | 12/1998 | Sotiroff et al. | 705/27 |
| 5,852,812 | A | 12/1998 | Reeder | 705/39 |
| 5,855,005 | A | 12/1998 | Schuler et al. | 705/4 |
| 5,855,008 | A | 12/1998 | Goldhaber et al. | 705/14 |
| 5,856,931 | A | 1/1999 | McCasland | 364/550 |
| 5,857,174 | A | 1/1999 | Dugan | 705/1 |
| 5,857,978 | A | 1/1999 | Hively et al. | 600/544 |
| 5,857,993 | A | 1/1999 | Atanasoska et al. | 604/20 |
| 5,860,917 | A | 1/1999 | Comanor et al. | 600/300 |
| 5,862,223 | A | 1/1999 | Walker et al. | 380/25 |
| 5,862,530 | A | 1/1999 | Shillington | 2/439 |
| 5,864,286 | A | 1/1999 | Right et al. | 340/501 |
| 5,864,325 | A | 1/1999 | Briechle et al. | 345/1 |
| 5,864,483 | A | 1/1999 | Brichta | |
| 5,864,662 | A | 1/1999 | Brownmiller et al. | |
| 5,864,738 | A | 1/1999 | Kessler et al. | |
| 5,864,773 | A | 1/1999 | Barna et al. | 702/85 |
| 5,864,823 | A | 1/1999 | Levitan | 105/14 |
| 5,864,827 | A | 1/1999 | Wilson | 705/35 |
| 5,864,837 | A | 1/1999 | Maimone | 707/1 |
| 5,866,888 | A | 2/1999 | Bravman et al. | 235/375 |
| 5,867,387 | A | 2/1999 | Kavana | |
| 5,868,669 | A | 2/1999 | Iliff | 600/300 |
| 5,870,456 | A | 2/1999 | Rogers | |
| 5,870,473 | A | 2/1999 | Boesch et al. | 580/21 |
| 5,870,715 | A | 2/1999 | Belitz et al. | 705/22 |
| 5,870,717 | A | 2/1999 | Wiecha | 705/26 |
| 5,870,719 | A | 2/1999 | Maritzen et al. | 705/26 |
| 5,870,721 | A | 2/1999 | Norris | 705/38 |
| 5,870,724 | A | 2/1999 | Lawlor et al. | 705/42 |
| 5,870,755 | A | 2/1999 | Stevens et al. | 707/104 |
| 5,872,848 | A | 2/1999 | Romney et al. | 380/25 |
| 5,873,069 | A | 2/1999 | Reuhl et al. | 705/20 |
| 5,873,071 | A | 2/1999 | Ferstenberg et al. | 705/37 |
| 5,873,072 | A | 2/1999 | Kight et al. | 705/40 |
| 5,873,094 | A | 2/1999 | Talatick | 707/104.1 |
| 5,874,955 | A | 2/1999 | Rogowitz et al. | 345/339 |
| 5,875,110 | A | 2/1999 | Jacobs | |
| 5,875,236 | A | 2/1999 | Jankowitz et al. | 379/114 |
| 5,875,432 | A | 2/1999 | Sehr | 705/12 |
| 5,877,999 | A | 3/1999 | Holt et al. | 367/151 |
| 5,878,141 | A | 3/1999 | Daly et al. | 380/25 |
| 5,878,385 | A | 3/1999 | Bralich et al. | 704/9 |
| 5,878,401 | A | 3/1999 | Joseph | 705/22 |
| 5,878,403 | A | 3/1999 | DeFrancesco et al. | 705/38 |
| 5,878,416 | A | 3/1999 | Harris et al. | 707/10 |
| 5,878,419 | A | 3/1999 | Carter | 707/10 |
| 5,883,806 | A | 3/1999 | Meador et al. | |
| 5,883,955 | A | 3/1999 | Ronning | 380/4 |
| 5,884,270 | A | 3/1999 | Walker et al. | 705/1 |
| 5,884,272 | A | 3/1999 | Walker et al. | 705/1 |
| 5,884,281 | A | 3/1999 | Smith et al. | 705/26 |
| 5,884,288 | A | 3/1999 | Chang et al. | 705/40 |
| 5,884,290 | A | 3/1999 | Smorodinsky et al. | 705/44 |
| 5,884,294 | A | 3/1999 | Kadar et al. | 706/10 |
| 5,884,300 | A | 3/1999 | Brockman | 707/2 |
| 5,889,863 | A | 3/1999 | Weber | 380/25 |
| 5,890,129 | A | 3/1999 | Spurgeon | 705/4 |
| 5,890,137 | A | 3/1999 | Koreeda | 705/26 |
| 5,890,138 | A | 3/1999 | Godin et al. | 705/26 |
| 5,890,140 | A | 3/1999 | Clark et al. | 705/35 |
| 5,890,145 | A | 3/1999 | Kawamura | 706/46 |
| 5,890,175 | A | 3/1999 | Wong et al. | 707/505 |
| 5,891,169 | A | 4/1999 | Boheim et al. | 607/4 |
| 5,892,761 | A | 4/1999 | Stracke, Jr. | 370/395 |
| 5,892,900 | A | 4/1999 | Ginter et al. | 395/186 |
| 5,893,076 | A | 4/1999 | Hafner et al. | 705/28 |
| 5,893,077 | A | 4/1999 | Griffin | 705/34 |
| 5,893,080 | A | 4/1999 | McGurl et al. | 705/40 |
| 5,893,904 | A | 4/1999 | Harris et al. | 705/27 |
| 5,893,905 | A | 4/1999 | Main et al. | 705/11 |
| 5,894,558 | A | 4/1999 | Falker | 709/239 |
| 5,895,454 | A | 4/1999 | Harrington | 705/26 |
| 5,897,635 | A | 4/1999 | Torres et al. | 707/10 |
| 5,898,154 | A | 4/1999 | Rosen | 235/379 |

| Patent No. | Date | Inventor | Class |
|---|---|---|---|
| 5,898,594 A | 4/1999 | Leason et al. | |
| 5,898,762 A | 4/1999 | Katz | |
| 5,898,777 A | 4/1999 | Tycksen, Jr. et al. | 380/4 |
| 5,898,830 A | 4/1999 | Wesinger, Jr. et al. | |
| 5,899,980 A | 5/1999 | Wilf et al. | 705/26 |
| 5,899,985 A | 5/1999 | Tanaka | 706/45 |
| 5,903,652 A | 5/1999 | Mital | 380/25 |
| 5,903,721 A | 5/1999 | Sixtus | |
| 5,903,878 A | 5/1999 | Talati et al. | 705/26 |
| 5,903,880 A | 5/1999 | Biffar | 705/39 |
| 5,903,901 A | 5/1999 | Kawakura et al. | 707/501 |
| 5,905,736 A | 5/1999 | Ronen et al. | 370/546 |
| 5,905,973 A | 5/1999 | Yonezawa et al. | 705/27 |
| 5,905,975 A | 5/1999 | Ausubel | 705/37 |
| 5,905,978 A | 5/1999 | Smith et al. | 706/52 |
| 5,905,989 A | 5/1999 | Biggs | 707/104 |
| 5,906,677 A | 5/1999 | Dudley | 96/17 |
| 5,907,490 A | 5/1999 | Oliver | |
| 5,907,547 A | 5/1999 | Foladare et al. | 370/352 |
| 5,907,620 A | 5/1999 | Klemba et al. | 380/25 |
| 5,907,831 A | 5/1999 | Lotvin et al. | 705/14 |
| 5,908,343 A | 6/1999 | Rothbarth et al. | 446/171 |
| 5,909,023 A | 6/1999 | Ono et al. | 235/380 |
| 5,909,492 A | 6/1999 | Payne et al. | 380/24 |
| 5,909,670 A | 6/1999 | Trader et al. | 705/14 |
| 5,910,107 A | 6/1999 | Iliff | 600/300 |
| 5,910,987 A | 6/1999 | Ginter et al. | 380/24 |
| 5,912,818 A | 6/1999 | McGrady et al. | |
| 5,912,981 A | 6/1999 | Hansmire et al. | 382/116 |
| 5,913,211 A | 6/1999 | Nitta | 707/5 |
| 5,915,019 A | 6/1999 | Ginter et al. | 380/4 |
| 5,915,038 A | 6/1999 | Abdel-Mottaleb et al. | 382/209 |
| 5,915,209 A | 6/1999 | Lawrence | 455/312 |
| 5,915,245 A | 6/1999 | Patterson, Jr. et al. | 705/35 |
| 5,916,202 A | 6/1999 | Haswell | 604/356 |
| 5,917,428 A | 6/1999 | Discenzo et al. | |
| 5,917,893 A | 6/1999 | Katz | |
| 5,917,912 A | 6/1999 | Ginter et al. | 380/24 |
| 5,918,213 A | 6/1999 | Bernard et al. | 705/26 |
| 5,920,053 A | 7/1999 | DeBrouse | 235/375 |
| 5,920,054 A | 7/1999 | Uber, III | 235/375 |
| 5,920,629 A | 7/1999 | Rosen | 380/24 |
| 5,920,847 A | 7/1999 | Kolling et al. | 705/40 |
| 5,920,848 A | 7/1999 | Schutzer et al. | 705/42 |
| 5,920,861 A | 7/1999 | Hall et al. | 707/9 |
| 5,923,001 A | 7/1999 | Morris et al. | 177/245 |
| 5,923,552 A | 7/1999 | Brown et al. | |
| 5,924,068 A | 7/1999 | Richard et al. | 704/260 |
| 5,924,080 A | 7/1999 | Johnson | 705/26 |
| 5,924,082 A | 7/1999 | Silverman et al. | 705/37 |
| 5,924,083 A | 7/1999 | Silverman et al. | 705/37 |
| 5,926,793 A | 7/1999 | de Rafael et al. | 705/5 |
| 5,926,796 A | 7/1999 | Walker et al. | 705/16 |
| 5,928,272 A | 7/1999 | Adkins et al. | 607/45 |
| 5,928,323 A | 7/1999 | Gosling et al. | 709/203 |
| 5,930,753 A | 7/1999 | Potamianos et al. | 704/256 |
| 5,930,763 A | 7/1999 | Kaneko et al. | 705/8 |
| 5,930,764 A | 7/1999 | Melchione et al. | 705/10 |
| 5,930,767 A | 7/1999 | Reber et al. | 705/26 |
| 5,930,768 A | 7/1999 | Hooban | 705/27 |
| 5,930,773 A | 7/1999 | Crooks et al. | 705/30 |
| 5,930,776 A | 7/1999 | Dykstra et al. | 705/38 |
| 5,930,777 A | 7/1999 | Barber | 705/40 |
| 5,931,900 A | 8/1999 | Notani et al. | 709/201 |
| 5,931,917 A | 8/1999 | Nguyen et al. | 709/250 |
| 5,932,867 A | 8/1999 | Speckhart et al. | 235/491 |
| 5,933,599 A | 8/1999 | Nolan | |
| 5,933,809 A | 8/1999 | Hunt et al. | 705/3 |
| 5,933,829 A | 8/1999 | Durst et al. | 707/10 |
| 5,935,060 A | 8/1999 | Iliff | 600/300 |
| 5,936,219 A | 8/1999 | Yoshida et al. | 235/379 |
| 5,936,221 A | 8/1999 | Corder et al. | 235/380 |
| 5,936,860 A | 8/1999 | Arnold et al. | |
| 5,937,158 A | 8/1999 | Uranaka | 395/186 |
| 5,937,393 A | 8/1999 | O'Leary et al. | 705/21 |
| 5,940,082 A | 8/1999 | Brinegar et al. | 345/442 |
| 5,940,306 A | 8/1999 | Gardner et al. | |
| 5,940,807 A | 8/1999 | Purcell | 705/26 |
| 5,940,816 A | 8/1999 | Fuhrer et al. | 706/13 |
| 5,940,823 A | 8/1999 | Schreiber et al. | 707/3 |
| 5,941,385 A | 8/1999 | Barton | 206/366 |
| 5,941,947 A | 8/1999 | Brown et al. | 709/225 |
| 5,941,996 A | 8/1999 | Smith et al. | 714/47 |
| 5,943,421 A | 8/1999 | Grabon | 380/4 |
| 5,943,424 A | 8/1999 | Berger et al. | 380/25 |
| 5,943,429 A | 8/1999 | Handel | 381/942 |
| 5,943,656 A | 8/1999 | Crooks et al. | 705/30 |
| 5,946,659 A | 8/1999 | Lancelot et al. | 705/3 |
| 5,946,662 A | 8/1999 | Ettl et al. | 705/8 |
| 5,946,665 A | 8/1999 | Suzuki et al. | 705/26 |
| 5,946,666 A | 8/1999 | Nevo et al. | 705/36 |
| 5,946,667 A | 8/1999 | Tull, Jr. et al. | 705/36 |
| 5,947,285 A | 9/1999 | Gaba et al. | 206/366 |
| 5,947,950 A | 9/1999 | Shillington et al. | 604/403 |
| 5,948,054 A | 9/1999 | Nielsen | 709/200 |
| 5,948,061 A | 9/1999 | Merriman et al. | 709/219 |
| 5,949,045 A | 9/1999 | Ezawa et al. | 235/379 |
| 5,949,415 A | 9/1999 | Lin et al. | 345/335 |
| 5,949,876 A | 9/1999 | Ginter et al. | 380/4 |
| 5,950,147 A | 9/1999 | Sarangapani et al. | 702/179 |
| 5,950,169 A | 9/1999 | Borghesi et al. | 705/4 |
| 5,950,172 A | 9/1999 | Klingman | 705/26 |
| 5,950,176 A | 9/1999 | Keiser et al. | 705/37 |
| 5,950,177 A | 9/1999 | Lupien et al. | 705/37 |
| 5,950,178 A | 9/1999 | Borgato | 705/37 |
| 5,950,206 A | 9/1999 | Krause | 707/104 |
| 5,951,694 A | 9/1999 | Choquier et al. | 714/15 |
| 5,952,890 A | 9/1999 | Fallisgaard et al. | 331/18 |
| 5,953,423 A | 9/1999 | Rosen | 380/24 |
| 5,953,704 A | 9/1999 | McIlroy et al. | 705/2 |
| 5,953,707 A | 9/1999 | Huang et al. | 705/10 |
| 5,956,483 A | 9/1999 | Grate et al. | |
| 5,956,489 A | 9/1999 | San Andres et al. | |
| 5,956,509 A | 9/1999 | Kevner | 395/684 |
| 5,956,689 A | 9/1999 | Everhart, III | 705/3 |
| 5,956,700 A | 9/1999 | Landry | 705/40 |
| 5,958,241 A | 9/1999 | DeBenedetto et al. | 210/611 |
| 5,960,408 A | 9/1999 | Martin et al. | 705/11 |
| 5,960,411 A | 9/1999 | Hartman et al. | 705/26 |
| 5,960,419 A | 9/1999 | Fagg, III et al. | 706/59 |
| 5,963,648 A | 10/1999 | Rosen | 380/24 |
| 5,963,910 A | 10/1999 | Ulwick | 705/7 |
| 5,963,917 A | 10/1999 | Ogram | 705/26 |
| 5,963,918 A | 10/1999 | Reagan et al. | 705/28 |
| 5,963,919 A | 10/1999 | Brinkley et al. | 705/28 |
| 5,963,923 A | 10/1999 | Garber | 705/37 |
| 5,963,924 A | 10/1999 | Williams et al. | 705/40 |
| 5,963,925 A | 10/1999 | Kolling et al. | 705/40 |
| 5,965,858 A | 10/1999 | Suzuki et al. | 235/375 |
| 5,966,699 A | 10/1999 | Zandi | 705/38 |
| 5,968,110 A | 10/1999 | Westrope et al. | 703/27 |
| 5,970,469 A | 10/1999 | Scroggie et al. | 705/14 |
| 5,970,471 A | 10/1999 | Hill | 705/26 |
| 5,970,475 A | 10/1999 | Barnes et al. | 705/27 |
| 5,970,482 A | 10/1999 | Pham et al. | 706/16 |
| 5,973,731 A | 10/1999 | Schwab | 348/161 |
| 5,974,388 A | 10/1999 | Durham | 705/1 |
| 5,974,391 A | 10/1999 | Hongawa | 705/7 |
| 5,974,395 A | 10/1999 | Bellini et al. | 705/9 |
| 5,974,400 A | 10/1999 | Kagami et al. | 705/26 |
| 5,974,403 A | 10/1999 | Takriti et al. | 705/412 |
| 5,974,406 A | 10/1999 | Bisdikian et al. | 707/1 |
| 5,974,409 A | 10/1999 | Sanu et al. | 707/3 |
| 5,977,998 A | 11/1999 | Briechle et al. | 345/520 |
| 5,978,702 A | 11/1999 | Ward et al. | 607/3 |
| 5,978,768 A | 11/1999 | McGovern et al. | 705/1 |
| 5,978,773 A | 11/1999 | Hudetz et al. | 705/23 |
| 5,978,776 A | 11/1999 | Seretti et al. | 705/26 |
| 5,978,779 A | 11/1999 | Stein et al. | 705/37 |
| 5,978,840 A | 11/1999 | Nguyen et al. | 709/217 |
| 5,982,445 A | 11/1999 | Eyer et al. | 348/461 |
| 5,982,891 A | 11/1999 | Ginter et al. | 380/4 |
| 5,982,929 A | 11/1999 | Ilan et al. | 382/200 |
| 5,983,004 A | 11/1999 | Shaw et al. | |
| 5,983,138 A | 11/1999 | Kramer | 607/9 |
| 5,983,194 A | 11/1999 | Hogge et al. | 705/7 |
| 5,983,199 A | 11/1999 | Kaneko | 705/26 |
| 5,983,200 A | 11/1999 | Slotznick | 705/26 |

| Patent | Date | Inventor | Class |
|---|---|---|---|
| 5,983,202 A | 11/1999 | Yabe et al. | 705/28 |
| 5,983,207 A | 11/1999 | Turk et al. | 705/39 |
| 5,983,208 A | 11/1999 | Haller et al. | 705/40 |
| 5,983,243 A | 11/1999 | Heiney et al. | 707/500 |
| 5,983,273 A | 11/1999 | White et al. | 709/229 |
| 5,987,103 A | 11/1999 | Martino | |
| 5,987,132 A | 11/1999 | Rowney | 380/24 |
| 5,987,140 A | 11/1999 | Rowney et al. | 380/49 |
| 5,987,180 A | 11/1999 | Reitmeier | 382/236 |
| 5,987,399 A | 11/1999 | Wegerich et al. | 702/183 |
| 5,987,423 A | 11/1999 | Arnold et al. | 705/14 |
| 5,987,425 A | 11/1999 | Hartman et al. | 705/20 |
| 5,987,426 A | 11/1999 | Goodwin, III | 705/21 |
| 5,987,434 A | 11/1999 | Libman | 705/36 R |
| 5,987,435 A | 11/1999 | Weiss et al. | 705/36 |
| 5,987,440 A | 11/1999 | O'Neil et al. | 705/44 |
| 5,991,525 A | 11/1999 | Shah et al. | |
| 5,991,728 A | 11/1999 | DeBusk et al. | 705/2 |
| 5,991,738 A | 11/1999 | Ogram | 705/26 |
| 5,991,743 A | 11/1999 | Irving et al. | 705/36 |
| 5,991,750 A | 11/1999 | Watson | 705/44 |
| 5,993,046 A | 11/1999 | McGrady et al. | |
| 5,995,868 A | 11/1999 | Dorfmeister et al. | 600/544 |
| 5,995,937 A | 11/1999 | DeBusk et al. | 705/2 |
| 5,995,939 A | 11/1999 | Berman et al. | 705/3 |
| 5,995,947 A | 11/1999 | Fraser et al. | 705/38 |
| 5,995,951 A | 11/1999 | Ferguson | 706/10 |
| 5,995,975 A | 11/1999 | Malcolm | 707/103 |
| 5,996,076 A | 11/1999 | Rowney et al. | 713/201 |
| 5,999,525 A | 12/1999 | Krishnaswamy et al. | 370/352 |
| 5,999,625 A | 12/1999 | Bellare et al. | 380/24 |
| 5,999,914 A | 12/1999 | Blinn et al. | 705/26 |
| 5,999,915 A | 12/1999 | Nahan et al. | 705/27 |
| 5,999,917 A | 12/1999 | Facciani et al. | 705/36 |
| 5,999,933 A | 12/1999 | Mehta | 707/100 |
| 6,000,049 A | 12/1999 | Karino et al. | 714/724 |
| 6,002,767 A | 12/1999 | Kramer | 380/24 |
| 6,002,855 A | 12/1999 | Ladner et al. | |
| 6,003,006 A | 12/1999 | Colella et al. | 705/2 |
| 6,003,007 A | 12/1999 | DiRienzo | 705/4 |
| 6,003,012 A | 12/1999 | Nick | 705/10 |
| 6,003,020 A | 12/1999 | Hazlehurst et al. | 706/11 |
| 6,004,021 A | 12/1999 | Rothbarth | 364/578 |
| 6,006,016 A | 12/1999 | Faigon et al. | |
| 6,006,191 A | 12/1999 | DiRienzo | 705/2 |
| 6,006,192 A | 12/1999 | Cheng et al. | 705/7 |
| 6,006,196 A | 12/1999 | Feigin et al. | 705/10 |
| 6,006,199 A | 12/1999 | Berlin et al. | 705/26 |
| 6,006,201 A | 12/1999 | Berent et al. | 705/27 |
| 6,006,251 A | 12/1999 | Toyouchi et al. | 709/203 |
| 6,007,459 A | 12/1999 | Burgess | 482/4 |
| 6,009,406 A | 12/1999 | Nick | 705/10 |
| 6,009,408 A | 12/1999 | Buchanan | 705/11 |
| 6,009,412 A | 12/1999 | Storey | 705/14 |
| 6,009,420 A | 12/1999 | Fagg, III et al. | 706/45 |
| 6,010,444 A | 1/2000 | Honeycutt et al. | 588/255 |
| 6,012,041 A | 1/2000 | Brewer et al. | 705/28 |
| 6,012,043 A | 1/2000 | Albright et al. | 705/36 R |
| 6,012,046 A | 1/2000 | Lupien et al. | 705/37 |
| 6,012,051 A | 1/2000 | Sammon, Jr. et al. | 706/52 |
| 6,014,633 A | 1/2000 | DeBusk et al. | 705/7 |
| 6,014,634 A | 1/2000 | Scroggie et al. | 705/14 |
| 6,014,638 A | 1/2000 | Burge et al. | 705/27 |
| 6,014,641 A | 1/2000 | Loeb et al. | 705/34 |
| 6,014,643 A | 1/2000 | Minton | 705/37 |
| 6,014,644 A | 1/2000 | Erickson | 705/37 |
| 6,014,645 A | 1/2000 | Cunningham | 705/38 |
| 6,014,696 A | 1/2000 | Araki et al. | 709/219 |
| 6,016,344 A | 1/2000 | Katz | 379/260 |
| 6,016,449 A | 1/2000 | Fischell et al. | 607/45 |
| 6,016,465 A | 1/2000 | Kelly | 702/116 |
| 6,016,477 A | 1/2000 | Ehnebuske et al. | 705/7 |
| 6,016,479 A | 1/2000 | Taricani, Jr. | 705/19 |
| 6,016,483 A | 1/2000 | Rickard et al. | 705/37 |
| 6,016,484 A | 1/2000 | Williams et al. | 705/39 |
| 6,016,504 A | 1/2000 | Arnold et al. | 709/200 |
| 6,018,338 A | 1/2000 | Greulich et al. | 345/333 |
| 6,018,682 A | 1/2000 | Rise | 607/45 |
| 6,018,718 A | 1/2000 | Walker et al. | 705/14 |
| 6,018,722 A | 1/2000 | Ray et al. | 705/36 |
| 6,018,739 A | 1/2000 | McCoy et al. | 707/102 |
| 6,019,219 A | 2/2000 | Takahashi | |
| 6,019,242 A | 2/2000 | Wysocki et al. | 220/571 |
| 6,020,810 A | 2/2000 | Har-Even | 340/328 |
| 6,021,202 A | 2/2000 | Anderson et al. | 380/25 |
| 6,021,392 A | 2/2000 | Lester et al. | 705/2 |
| 6,021,397 A | 2/2000 | Jones et al. | 705/36 |
| 6,021,398 A | 2/2000 | Ausubel | 705/37 |
| 6,021,920 A | 2/2000 | Aldape | 221/96 |
| 6,022,315 A | 2/2000 | Iliff | 600/300 |
| 6,023,565 A | 2/2000 | Lawman et al. | |
| 6,023,679 A | 2/2000 | Acebo et al. | 705/5 |
| 6,023,683 A | 2/2000 | Johnson et al. | 705/26 |
| 6,023,685 A | 2/2000 | Brett et al. | 705/37 |
| 6,023,686 A | 2/2000 | Brown | 705/37 |
| 6,024,216 A | 2/2000 | Shillington et al. | 206/366 |
| 6,025,877 A | 2/2000 | Chang et al. | 348/395 |
| 6,026,374 A | 2/2000 | Chess | 705/26 |
| 6,026,376 A | 2/2000 | Kenney | 705/27 |
| 6,026,377 A | 2/2000 | Burke | 705/27 |
| 6,026,378 A | 2/2000 | Onozaki | 705/28 |
| 6,026,379 A | 2/2000 | Haller et al. | 705/34 |
| 6,026,383 A | 2/2000 | Ausubel | 705/37 |
| 6,026,393 A | 2/2000 | Gupta et al. | 707/3 |
| 6,027,490 A | 2/2000 | Radford et al. | 604/540 |
| 6,029,138 A | 2/2000 | Khorasani et al. | 705/2 |
| 6,029,140 A | 2/2000 | Martin et al. | 705/11 |
| 6,029,141 A | 2/2000 | Bezos et al. | 705/27 |
| 6,029,142 A | 2/2000 | Hill | 705/27 |
| 6,029,146 A | 2/2000 | Hawkins et al. | 705/35 |
| 6,029,149 A | 2/2000 | Dykstra et al. | 705/38 |
| 6,029,150 A | 2/2000 | Kravitz | 705/39 |
| 6,029,152 A | 2/2000 | Bublitz et al. | 705/40 |
| 6,029,153 A | 2/2000 | Bauchner et al. | 705/42 |
| 6,029,154 A | 2/2000 | Pettitt | 705/44 |
| 6,031,904 A | 2/2000 | An et al. | 379/201 |
| 6,032,121 A | 2/2000 | Dietrich et al. | 705/8 |
| 6,032,129 A | 2/2000 | Greef et al. | 705/27 |
| 6,032,133 A | 2/2000 | Hilt et al. | 705/40 |
| 6,032,145 A | 2/2000 | Beall et al. | 707/5 |
| 6,035,021 A | 3/2000 | Katz | |
| 6,035,284 A | 3/2000 | Straub et al. | 705/28 |
| 6,035,287 A | 3/2000 | Stallaert et al. | 705/37 |
| 6,035,288 A | 3/2000 | Solomon | 705/37 |
| 6,035,289 A | 3/2000 | Chou et al. | 705/37 |
| 6,036,344 A | 3/2000 | Goldenberg | 364/408 |
| 6,036,738 A | 3/2000 | Shanbrom | 55/524 |
| 6,038,540 A | 3/2000 | Krist et al. | 705/8 |
| 6,038,548 A | 3/2000 | Kamil | 705/35 |
| 6,038,597 A | 3/2000 | Van Wyngarden | 709/219 |
| 6,041,308 A | 3/2000 | Walker et al. | 705/14 |
| 6,041,311 A | 3/2000 | Chislenko et al. | 705/27 |
| 6,044,135 A | 3/2000 | Katz | |
| 6,044,361 A | 3/2000 | Kalagnanam et al. | 705/28 |
| 6,044,362 A | 3/2000 | Neely | 705/34 |
| 6,044,363 A | 3/2000 | Mori et al. | 705/37 |
| 6,044,376 A | 3/2000 | Kurtzman, II | 707/102 |
| 6,044,382 A | 3/2000 | Martino | 707/505 |
| 6,047,067 A | 4/2000 | Rosen | 380/24 |
| 6,047,259 A | 4/2000 | Campbell et al. | 705/3 |
| 6,047,265 A | 4/2000 | Sugimori | 705/26 |
| 6,047,268 A | 4/2000 | Bartoli et al. | 705/35 |
| 6,047,269 A | 4/2000 | Biffar | 705/39 |
| 6,047,887 A | 4/2000 | Rosen | 235/379 |
| 6,049,785 A | 4/2000 | Gifford | 705/39 |
| 6,049,793 A | 4/2000 | Tomita | 706/17 |
| 6,052,670 A | 4/2000 | Johnson | 705/27 |
| 6,052,671 A | 4/2000 | Crooks et al. | 705/34 |
| 6,052,675 A | 4/2000 | Checchio | 705/44 |
| 6,055,513 A | 4/2000 | Katz et al. | 705/26 |
| 6,055,514 A | 4/2000 | Wren | 705/27 |
| 6,055,516 A | 4/2000 | Johnson et al. | 705/27 |
| 6,055,519 A | 4/2000 | Kennedy et al. | 705/80 |
| RE36,693 E | 5/2000 | Reich | |
| 6,058,250 A | 5/2000 | Harwood et al. | |
| 6,058,373 A | 5/2000 | Blinn et al. | 705/26 |
| 6,058,378 A | 5/2000 | Clark et al. | 705/37 |
| 6,058,379 A | 5/2000 | Odom et al. | 705/37 |

| | | | | | | | |
|---|---|---|---|---|---|---|---|
| 6,058,381 | A | 5/2000 | Nelson .................... 705/40 | 6,113,495 | A | 9/2000 | Walker et al. ............. 463/42 |
| 6,058,426 | A | 5/2000 | Godwin et al. ............ 709/229 | 6,113,540 | A | 9/2000 | Iliff ........................ 600/300 |
| 6,061,506 | A | 5/2000 | Wollaston et al. ......... 395/500 | 6,114,946 | A | 9/2000 | Michels |
| 6,061,593 | A | 5/2000 | Fischell et al. ............ 600/544 | 6,115,690 | A | 9/2000 | Wong ....................... 705/7 |
| 6,061,660 | A | 5/2000 | Eggleston et al. .......... 705/14 | 6,115,691 | A | 9/2000 | Ulwick ..................... 705/7 |
| 6,061,665 | A | 5/2000 | Bahreman .................. 705/40 | 6,115,696 | A | 9/2000 | Auger ...................... 705/28 |
| 6,061,691 | A | 5/2000 | Fox ........................ 707/104 | 6,115,698 | A | 9/2000 | Tuck et al. ................ 705/37 |
| 6,061,792 | A | 5/2000 | Simon ...................... 713/176 | 6,116,461 | A | 9/2000 | Broadfield et al. .......... 221/98 |
| 6,061,798 | A | 5/2000 | Coley et al. ................ 713/201 | 6,118,938 | A | 9/2000 | Lawman et al. |
| 6,063,170 | A | 5/2000 | Deibert ..................... 96/224 | 6,119,074 | A | 9/2000 | Sarangapani ............... 702/185 |
| 6,064,968 | A | 5/2000 | Schanz ...................... 705/1 | 6,119,099 | A | 9/2000 | Walker et al. .............. 705/16 |
| 6,064,971 | A | 5/2000 | Hartnett .................... 706/46 | 6,119,101 | A | 9/2000 | Peckover ................... 705/26 |
| 6,064,982 | A | 5/2000 | Puri ........................ 705/27 | 6,119,103 | A | 9/2000 | Basch et al. ............... 705/35 |
| 6,064,987 | A | 5/2000 | Walker et al. .............. 705/38 | 6,119,104 | A | 9/2000 | Brumbelow et al. ......... 705/35 |
| 6,065,819 | A | 5/2000 | Holmes et al. ............. 312/215 | 6,119,105 | A | 9/2000 | Williams .................. 705/39 |
| 6,066,243 | A | 5/2000 | Anderson et al. ........... 204/403 | 6,119,106 | A | 9/2000 | Mersky et al. ............. 705/40 |
| 6,067,416 | A | 5/2000 | Fraser ..................... 395/712 | 6,119,149 | A | 9/2000 | Notani ..................... 709/205 |
| 6,067,523 | A | 5/2000 | Bair et al. ................. 705/3 | 6,119,869 | A | 9/2000 | Geiman .................... 209/702 |
| 6,067,525 | A | 5/2000 | Johnson et al. ............. 705/10 | 6,122,625 | A | 9/2000 | Rosen ...................... 705/65 |
| 6,067,528 | A | 5/2000 | Breed et al. ................ 705/26 | 6,122,643 | A | 9/2000 | Paik et al. ................ 707/104 |
| 6,067,532 | A | 5/2000 | Gebb ....................... 705/37 | 6,122,666 | A | 9/2000 | Beurket et al. ............. 709/226 |
| 6,070,145 | A | 5/2000 | Pinsley et al. .............. 705/10 | 6,122,767 | A | 9/2000 | Ohara ..................... 714/822 |
| 6,070,150 | A | 5/2000 | Remington et al. .......... 705/34 | 6,125,349 | A | 9/2000 | Maher ..................... 705/1 |
| 6,070,250 | A | 5/2000 | Yeager et al. ............... 714/11 | 6,125,352 | A | 9/2000 | Franklin et al. ............ 705/26 |
| 6,072,481 | A | 6/2000 | Matsushita et al. .......... 345/326 | 6,125,353 | A | 9/2000 | Yagasaki .................. 705/27 |
| 6,072,870 | A | 6/2000 | Nguyen et al. ............. 380/24 | 6,125,356 | A | 9/2000 | Brockman et al. .......... 705/37 |
| 6,073,109 | A | 6/2000 | Flores et al. ............... 705/8 | 6,125,359 | A | 9/2000 | Lautzenheiser et al. ...... 706/60 |
| 6,073,124 | A | 6/2000 | Krishnan et al. ............. 705/59 | 6,125,388 | A | 9/2000 | Reisman ................... 709/218 |
| 6,073,138 | A | 6/2000 | de l'Etraz et al. ............ 707/104 | 6,128,599 | A | 10/2000 | Walker et al. .............. 705/14 |
| 6,073,262 | A | 6/2000 | Larkin et al. ............... 714/736 | 6,128,600 | A | 10/2000 | Imamura et al. ............ 705/27 |
| 6,074,269 | A | 6/2000 | Rothbarth et al. ........... 446/268 | 6,128,603 | A | 10/2000 | Dent et al. ................. 705/40 |
| 6,076,023 | A | 6/2000 | Sato ........................ 700/214 | 6,128,624 | A | 10/2000 | Papierniak et al. .......... 707/104 |
| 6,076,066 | A | 6/2000 | DiRienzo et al. ............ 705/4 | 6,131,087 | A | 10/2000 | Luke et al. ................ 705/26 |
| 6,076,080 | A | 6/2000 | Morscheck et al. .......... 705/400 | 6,131,088 | A | 10/2000 | Hill ........................ 705/27 |
| 6,076,108 | A | 6/2000 | Courts et al. ............... 709/227 | 6,131,099 | A | 10/2000 | Johnson et al. ............ 707/104 |
| 6,078,889 | A | 6/2000 | Boucher et al. .............. 705/1 | 6,134,318 | A | 10/2000 | O'Neil ..................... 379/266 |
| 6,078,891 | A | 6/2000 | Riordan et al. .............. 705/10 | 6,134,326 | A | 10/2000 | Micali ..................... 380/30 |
| 6,078,905 | A | 6/2000 | Pich-LeWinter ............. 705/36 | 6,134,533 | A | 10/2000 | Shell ...................... 705/26 |
| 6,078,906 | A | 6/2000 | Huberman .................. 705/37 | 6,134,534 | A | 10/2000 | Walker et al. .............. 705/26 |
| 6,084,581 | A | 7/2000 | Hunt ....................... 345/302 | 6,134,535 | A | 10/2000 | Belzberg .................. 705/37 |
| 6,085,169 | A | 7/2000 | Walker et al. .............. 705/26 | 6,134,663 | A | 10/2000 | Nakamura et al. ........... 713/201 |
| 6,085,170 | A | 7/2000 | Tsukuda .................... 705/26 | 6,137,884 | A | 10/2000 | Micali ..................... 380/30 |
| 6,085,176 | A | 7/2000 | Woolston ................... 705/37 | 6,138,105 | A | 10/2000 | Walker et al. .............. 705/10 |
| 6,085,178 | A | 7/2000 | Bigus et al. ................ 705/80 | 6,138,107 | A | 10/2000 | Elgamal .................. 705/39 |
| 6,085,220 | A | 7/2000 | Courts et al. ............... 709/201 | 6,138,119 | A | 10/2000 | Hall et al. ................. 707/9 |
| 6,085,976 | A | 7/2000 | Sehr ....................... 235/384 | 6,138,558 | A | 10/2000 | Harrington ................ 100/102 |
| 6,088,626 | A | 7/2000 | Lilly et al. ................. 700/100 | 6,140,922 | A | 10/2000 | Kakou |
| 6,088,683 | A | 7/2000 | Jalili ....................... 705/26 | 6,141,666 | A | 10/2000 | Tobin ..................... 707/513 |
| 6,088,688 | A | 7/2000 | Crooks et al. ............... 705/412 | 6,141,750 | A | 10/2000 | Micali ..................... 713/168 |
| 6,088,797 | A | 7/2000 | Rosen ...................... 713/173 | 6,144,944 | A | 11/2000 | Kurtzman, II ............. 705/14 |
| 6,091,417 | A | 7/2000 | Lefkowitz .................. 345/357 | 6,144,960 | A | 11/2000 | Okada et al. .............. 707/10 |
| 6,091,857 | A | 7/2000 | Shaw et al. ................ 382/251 | 6,144,988 | A | 11/2000 | Kappel .................... 709/202 |
| 6,092,050 | A | 7/2000 | Lungren et al. ............. 705/10 | 6,148,065 | A | 11/2000 | Katz ....................... 379/882 |
| 6,092,053 | A | 7/2000 | Boesch et al. .............. 705/26 | 6,148,297 | A | 11/2000 | Swor et al. ................ 707/3 |
| 6,092,056 | A | 7/2000 | Tull, Jr. et al. .............. 705/36 | 6,148,331 | A | 11/2000 | Parry ...................... 709/218 |
| 6,097,995 | A | 8/2000 | Tipton et al. ............... 700/266 | 6,149,627 | A | 11/2000 | Uber, III .................. 604/151 |
| 6,098,051 | A | 8/2000 | Lupien et al. .............. 705/37 | 6,151,565 | A | 11/2000 | Lobley et al. .............. 703/2 |
| 6,098,106 | A | 8/2000 | Philyaw et al. ............. 709/238 | 6,151,582 | A | 11/2000 | Huang et al. .............. 705/8 |
| 6,101,410 | A | 8/2000 | Panescu et al. ............. 600/522 | 6,151,598 | A | 11/2000 | Shaw et al. ............... 707/3 |
| 6,101,480 | A | 8/2000 | Conmy et al. .............. 705/9 | 6,151,600 | A | 11/2000 | Dedrick .................. 707/10 |
| 6,101,485 | A | 8/2000 | Fortenberry et al. ......... 705/27 | 6,151,643 | A | 11/2000 | Cheng et al. .............. 710/36 |
| 6,102,958 | A | 8/2000 | Meystel et al. ............. 703/2 | 6,151,707 | A | 11/2000 | Hecksel et al. ............ 717/11 |
| 6,104,229 | A | 8/2000 | Lien ....................... 327/434 | 6,154,736 | A | 11/2000 | Chickering et al. ......... 706/59 |
| 6,104,868 | A | 8/2000 | Peters et al. | 6,154,879 | A | 11/2000 | Pare, Jr. et al. ............ 902/3 |
| 6,105,003 | A | 8/2000 | Morohashi et al. ........... 705/26 | 6,157,721 | A | 12/2000 | Shear et al. ............... 380/255 |
| 6,105,005 | A | 8/2000 | Fuhrer ..................... 705/35 | 6,157,915 | A | 12/2000 | Bhaskaran et al. .......... 705/7 |
| 6,105,007 | A | 8/2000 | Norris ..................... 705/38 | 6,157,917 | A | 12/2000 | Barber .................... 705/26 |
| 6,105,008 | A | 8/2000 | Davis et al. ............... 705/41 | 6,157,923 | A | 12/2000 | Ivler et al. ................ 707/3 |
| 6,107,768 | A | 8/2000 | Ouchi et al. | 6,157,924 | A | 12/2000 | Austin .................... 707/10 |
| 6,108,635 | A | 8/2000 | Herren et al. ............... 705/2 | 6,157,941 | A | 12/2000 | Verkler et al. ............. 709/202 |
| 6,108,639 | A | 8/2000 | Walker et al. .............. 705/26 | 6,160,204 | A | 12/2000 | Steffens .................. 800/284 |
| 6,108,656 | A | 8/2000 | Durst et al. ................ 707/10 | 6,161,098 | A | 12/2000 | Wallman .................. 705/36 |
| 6,108,665 | A | 8/2000 | Bair et al. ................. 707/104 | 6,161,099 | A | 12/2000 | Harrington et al. .......... 705/37 |
| 6,109,774 | A | 8/2000 | Holmes et al. | 6,161,102 | A | 12/2000 | Yanagihara et al. ......... 707/3 |
| 6,110,848 | A | 8/2000 | Bouchette ................. 442/384 | 6,163,604 | A | 12/2000 | Baulier et al. ............. 379/189 |
| 6,112,181 | A | 8/2000 | Shear et al. ................ 705/1 | 6,164,537 | A | 12/2000 | Mariani et al. ............ 235/383 |
| 6,112,189 | A | 8/2000 | Rickard et al. ............. 705/37 | 6,164,549 | A | 12/2000 | Richards .................. 235/492 |
| 6,112,190 | A | 8/2000 | Fletcher et al. ............. 705/38 | 6,167,378 | A | 12/2000 | Webber ................... 705/8 |
| 6,112,502 | A | 9/2000 | Frederick et al. ............ 53/411 | 6,167,383 | A | 12/2000 | Henson ................... 705/26 |

| Patent No. | Date | Inventor | Class |
|---|---|---|---|
| 6,167,386 A | 12/2000 | Brown | 705/37 |
| 6,169,488 B1 | 1/2001 | Ketler | 340/632 |
| 6,169,992 B1 | 1/2001 | Beall et al. | 707/103 |
| 6,170,002 B1 | 1/2001 | Ouchi | 709/206 |
| 6,175,921 B1 | 1/2001 | Rosen | 713/173 |
| 6,178,025 B1 | 1/2001 | Hardcastle et al. | 359/177 |
| 6,178,407 B1 | 1/2001 | Lotvin et al. | 705/14 |
| 6,178,442 B1 | 1/2001 | Yamazaki | 709/206 |
| 6,178,546 B1 | 1/2001 | McIntyre | 717/3 |
| 6,182,053 B1 | 1/2001 | Rauber et al. | 705/28 |
| 6,182,060 B1 | 1/2001 | Hedgcock et al. | 707/1 |
| 6,182,123 B1 | 1/2001 | Filepp et al. | 709/217 |
| 6,182,275 B1 | 1/2001 | Beelitz et al. | 717/1 |
| 6,185,450 B1 | 2/2001 | Seguine et al. | 600/509 |
| 6,185,573 B1 | 2/2001 | Angelucci et al. | 707/104 |
| 6,185,665 B1 | 2/2001 | Owada et al. | 711/170 |
| 6,185,683 B1 | 2/2001 | Ginter et al. | 713/176 |
| 6,188,290 B1 | 2/2001 | Fallisgaard et al. | 331/18 |
| 6,188,988 B1 | 2/2001 | Barry et al. | 705/3 |
| 6,188,994 B1 | 2/2001 | Egendorf | 705/40 |
| 6,189,008 B1 | 2/2001 | Easty et al. | 707/10 |
| 6,192,354 B1 | 2/2001 | Bigus et al. | 706/46 |
| 6,195,649 B1 | 2/2001 | Gifford | 705/75 |
| 6,195,651 B1 | 2/2001 | Handel et al. | 707/2 |
| 6,195,652 B1 | 2/2001 | Fish | 707/2 |
| 6,199,050 B1 | 3/2001 | Alaia et al. | 705/37 |
| 6,199,051 B1 | 3/2001 | Gifford | 705/75 |
| 6,199,079 B1 | 3/2001 | Gupta et al. | 707/507 |
| 6,199,114 B1 | 3/2001 | White et al. | 709/229 |
| 6,199,193 B1 | 3/2001 | Oyagi et al. | 717/1 |
| 6,199,204 B1 | 3/2001 | Donohue | 717/11 |
| 6,202,038 B1 | 3/2001 | Wegerich et al. | 702/183 |
| 6,202,051 B1 | 3/2001 | Woolston | 705/27 |
| 6,202,054 B1 | 3/2001 | Lawlor et al. | 705/14 |
| 6,204,056 B1 | 3/2001 | Barnes et al. | 435/392 |
| 6,205,435 B1 | 3/2001 | Biffar | 705/41 |
| 6,205,437 B1 | 3/2001 | Gifford | 705/75 |
| 6,206,282 B1 | 3/2001 | Hayes, Sr. et al. | 235/375 |
| 6,206,829 B1 | 3/2001 | Iliff | 600/300 |
| 6,209,019 B1 | 3/2001 | Okataku et al. | 709/107 |
| 6,212,280 B1 | 4/2001 | Howard, Jr. et al. | 380/279 |
| 6,212,303 B1 | 4/2001 | Doran et al. | 382/245 |
| 6,212,634 B1 | 4/2001 | Geer, Jr. et al. | 713/156 |
| 6,212,677 B1 | 4/2001 | Ohkubo et al. | 717/7 |
| 6,216,108 B1 | 4/2001 | LeVander | 705/7 |
| 6,216,114 B1 | 4/2001 | Alaia et al. | 705/37 |
| 6,217,525 B1 | 4/2001 | Medema et al. | 600/508 |
| 6,219,650 B1 | 4/2001 | Friend et al. | 705/36 |
| 6,219,652 B1 | 4/2001 | Carter et al. | 705/59 |
| 6,219,653 B1 | 4/2001 | O'Neill et al. | 705/400 |
| 6,219,736 B1 | 4/2001 | Klingman | 710/129 |
| 6,219,930 B1 | 4/2001 | Reid | 33/562 |
| 6,220,510 B1 | 4/2001 | Everett et al. | 235/380 |
| 6,223,163 B1 | 4/2001 | Van Luchene | 705/1 |
| 6,223,164 B1 | 4/2001 | Seare et al. | 705/2 |
| 6,223,167 B1 | 4/2001 | Alaia et al. | 705/37 |
| 6,223,215 B1 | 4/2001 | Hunt et al. | 709/217 |
| 6,225,995 B1 | 5/2001 | Jacobs et al. | 345/335 |
| 6,226,214 B1 | 5/2001 | Choi | |
| 6,226,617 B1 | 5/2001 | Suzuki et al. | 705/1 |
| 6,226,618 B1 | 5/2001 | Downs et al. | 705/1 |
| 6,226,750 B1 | 5/2001 | Trieger | 713/176 |
| 6,230,142 B1 | 5/2001 | Benigno et al. | 705/3 |
| 6,230,146 B1 | 5/2001 | Alaia et al. | 705/37 |
| 6,230,147 B1 | 5/2001 | Alaia et al. | 705/37 |
| 6,230,148 B1 | 5/2001 | Pare, Jr. et al. | 705/40 |
| 6,230,162 B1 | 5/2001 | Kumar et al. | 707/102 |
| 6,233,537 B1 | 5/2001 | Gryphon et al. | 703/1 |
| 6,233,581 B1 | 5/2001 | Rambaud et al. | 707/102 |
| 6,233,609 B1 | 5/2001 | Mittal | 709/219 |
| 6,236,975 B1 | 5/2001 | Boe et al. | 705/7 |
| 6,236,980 B1 | 5/2001 | Reese | 705/50 |
| 6,237,786 B1 | 5/2001 | Ginter et al. | 213/153 |
| 6,240,185 B1 | 5/2001 | Van Wie et al. | 380/232 |
| 6,240,396 B1 | 5/2001 | Walker et al. | 705/26 |
| H1960 H | 6/2001 | Conrad et al. | 588/253 |
| 6,243,691 B1 | 6/2001 | Fisher et al. | 705/37 |
| 6,246,972 B1 | 6/2001 | Klimasauskas | 703/2 |
| 6,246,996 B1 | 6/2001 | Stein et al. | 705/26 |
| 6,246,997 B1 | 6/2001 | Cybul et al. | 705/27 |
| 6,247,004 B1 | 6/2001 | Moukheibir | 706/46 |
| 6,247,044 B1 | 6/2001 | Gosling et al. | 709/203 |
| 6,247,592 B1 | 6/2001 | Racicot et al. | 206/366 |
| 6,248,985 B1 | 6/2001 | Tomasello | 219/679 |
| 6,249,772 B1 | 6/2001 | Walker et al. | 705/26 |
| 6,249,773 B1 | 6/2001 | Allard et al. | 705/26 |
| 6,249,775 B1 | 6/2001 | Freeman et al. | 705/36 |
| 6,249,912 B1 | 6/2001 | Blandy | 717/9 |
| 6,250,465 B1 | 6/2001 | Daniels et al. | 206/370 |
| 6,252,510 B1 | 6/2001 | Dungan | 340/632 |
| 6,253,186 B1 | 6/2001 | Pendleton, Jr. | 705/2 |
| 6,253,187 B1 | 6/2001 | Fox | 705/10 |
| 6,253,193 B1 | 6/2001 | Ginter et al. | 705/57 |
| 6,253,205 B1 | 6/2001 | Quarato et al. | 707/103 |
| 6,253,339 B1 | 6/2001 | Tse et al. | 714/47 |
| 6,256,536 B1 | 7/2001 | Kramer | 607/9 |
| 6,256,613 B1 | 7/2001 | Falchuk et al. | 705/2 |
| 6,256,771 B1 | 7/2001 | O'Neil et al. | 717/1 |
| 6,260,047 B1 | 7/2001 | Fox et al. | 707/104 |
| 6,260,427 B1 | 7/2001 | Jones et al. | |
| 6,263,255 B1 | 7/2001 | Tan et al. | 700/121 |
| 6,263,313 B1 | 7/2001 | Milsted et al. | 705/1 |
| 6,266,172 B1 | 7/2001 | Zirngibl | 359/189 |
| 6,266,442 B1 | 7/2001 | Laumeyer et al. | 382/190 |
| 6,266,651 B1 | 7/2001 | Woolston | 705/27 |
| 6,266,652 B1 | 7/2001 | Godin et al. | 705/37 |
| 6,266,659 B1 | 7/2001 | Nadkarni | 707/3 |
| 6,267,670 B1 | 7/2001 | Walker et al. | 463/17 |
| 6,269,275 B1 | 7/2001 | Slade | 700/90 |
| 6,269,343 B1 | 7/2001 | Pallakoff | 705/26 |
| 6,269,348 B1 | 7/2001 | Pare, Jr. et al. | 705/39 |
| 6,270,456 B1 | 8/2001 | Iliff | 600/300 |
| 6,272,127 B1 | 8/2001 | Golden et al. | 370/352 |
| 6,272,482 B1 | 8/2001 | McKee et al. | 706/47 |
| 6,272,506 B1 | 8/2001 | Bell | 707/507 |
| 6,275,268 B1 | 8/2001 | Ellis et al. | 348/564 |
| 6,275,818 B1 | 8/2001 | Subramanian et al. | 707/2 |
| 6,275,941 B1 | 8/2001 | Saito et al. | 713/176 |
| 6,279,042 B1 | 8/2001 | Ouchi | 709/240 |
| 6,279,112 B1 | 8/2001 | O'Toole, Jr. et al. | 713/201 |
| 6,282,276 B1 | 8/2001 | Felger | 379/144 |
| 6,282,522 B1 | 8/2001 | Davis et al. | 705/41 |
| 6,282,531 B1 | 8/2001 | Haughton et al. | 706/50 |
| 6,283,366 B1 | 9/2001 | Hills et al. | 235/379 |
| 6,285,722 B1 | 9/2001 | Banwell et al. | 375/354 |
| 6,285,987 B1 | 9/2001 | Roth et al. | 705/27 |
| 6,285,989 B1 | 9/2001 | Shoham | 705/37 |
| 6,286,002 B1 | 9/2001 | Axaopoulos et al. | 707/10 |
| 6,286,005 B1 | 9/2001 | Cannon | 707/100 |
| 6,286,139 B1 | 9/2001 | Decinque | 725/5 |
| 6,289,252 B1 | 9/2001 | Wilson et al. | 700/7 |
| 6,289,318 B1 | 9/2001 | Barber | 705/14 |
| 6,289,390 B1 | 9/2001 | Kavner | 709/310 |
| 6,289,462 B1 | 9/2001 | McNabb et al. | 713/201 |
| 6,289,513 B1 | 9/2001 | Bentwich | 717/106 |
| 6,292,547 B1 | 9/2001 | Katz | |
| 6,292,569 B1 | 9/2001 | Shear et al. | 380/255 |
| 6,292,784 B1 | 9/2001 | Martin et al. | 705/11 |
| 6,292,786 B1 | 9/2001 | Deaton et al. | 705/14 |
| 6,292,787 B1 | 9/2001 | Scott et al. | 705/36 |
| 6,292,894 B1 | 9/2001 | Chipman et al. | 713/168 |
| 6,295,513 B1 | 9/2001 | Thackston | 703/1 |
| 6,298,328 B1 | 10/2001 | Healy et al. | 705/10 |
| 6,298,329 B1 | 10/2001 | Walker et al. | 705/14 |
| 6,298,331 B1 | 10/2001 | Walker et al. | 705/15 |
| 6,301,574 B1 | 10/2001 | Thomas et al. | 707/1 |
| 6,302,461 B1 | 10/2001 | Debras et al. | 294/681 |
| 6,304,848 B1 | 10/2001 | Singer | 705/3 |
| 6,304,857 B1 | 10/2001 | Heindel et al. | 705/34 |
| 6,304,861 B1 | 10/2001 | Ferguson | 706/10 |
| 6,304,915 B1 | 10/2001 | Nguyen et al. | 709/250 |
| 6,306,117 B1 | 10/2001 | Uber, III | 604/151 |
| 6,307,958 B1 | 10/2001 | Deaton et al. | 382/139 |
| 6,308,138 B1 | 10/2001 | Jones et al. | 702/34 |
| 6,311,144 B1 | 10/2001 | Abu El Ata | 703/2 |
| 6,314,451 B1 | 11/2001 | Landsman et al. | 709/203 |
| 6,314,468 B1 | 11/2001 | Murphy et al. | 709/236 |
| 6,315,113 B1 | 11/2001 | Britton et al. | 206/210 |

| | | | | | | |
|---|---|---|---|---|---|---|
| 6,317,029 B1 | 11/2001 | Fleeter | | 6,377,986 B1 | 4/2002 | Philyaw et al. ............... 709/219 |
| 6,317,723 B1 | 11/2001 | Walker et al. .................. 705/16 | | 6,378,075 B1 | 4/2002 | Goldstein et al. ............. 713/200 |
| 6,317,727 B1 | 11/2001 | May ................................ 705/37 | | 6,381,582 B1 | 4/2002 | Walker et al. .................. 705/26 |
| 6,317,728 B1 | 11/2001 | Kane ............................... 705/37 | | 6,381,583 B1 | 4/2002 | Kenney ........................... 705/26 |
| 6,317,731 B1 | 11/2001 | Luciano .......................... 706/21 | | 6,381,584 B1 | 4/2002 | Ogram ............................ 705/26 |
| 6,317,761 B1 | 11/2001 | Landsman et al. ........... 707/513 | | 6,381,587 B1 | 4/2002 | Guzelsu .......................... 705/40 |
| 6,317,783 B1 | 11/2001 | Freishtat et al. .............. 709/218 | | 6,381,632 B1 | 4/2002 | Lowell ........................... 709/203 |
| 6,317,900 B1 | 11/2001 | Braxton ............................ 4/483 | | 6,384,744 B1 | 5/2002 | Philyaw et al. ................. 341/50 |
| 6,321,224 B1 | 11/2001 | Beall et al. ....................... 707/5 | | 6,385,201 B1 | 5/2002 | Iwata ............................. 370/400 |
| 6,321,231 B1 | 11/2001 | Jebens et al. ................. 707/104 | | 6,385,483 B1 | 5/2002 | Uber, III et al. .............. 600/431 |
| 6,321,375 B1 | 11/2001 | Blandy ............................ 717/4 | | 6,385,595 B1 | 5/2002 | Kolling et al. .................. 705/40 |
| 6,323,894 B1 | 11/2001 | Katz ............................... 348/15 | | 6,385,596 B1 | 5/2002 | Wiser et al. ..................... 705/51 |
| 6,324,522 B2 | 11/2001 | Peterson et al. ................ 705/28 | | 6,385,642 B1 | 5/2002 | Chlan et al. ................... 709/203 |
| 6,324,524 B1 | 11/2001 | Lent et al. ....................... 705/38 | | 6,385,646 B1 | 5/2002 | Brown et al. ................. 709/217 |
| 6,324,525 B1 | 11/2001 | Kramer et al. .................. 705/40 | | 6,385,723 B1 | 5/2002 | Richards ........................ 713/160 |
| 6,324,536 B1 | 11/2001 | Rofrano ............................ 707/5 | | 6,386,386 B1 | 5/2002 | George ........................... 220/526 |
| 6,324,538 B1 | 11/2001 | Wesinger, Jr. et al. ......... 707/10 | | 6,386,451 B1 | 5/2002 | Sehr ................................ 235/384 |
| 6,324,541 B1 | 11/2001 | de l'Etraz et al. ............ 707/104 | | 6,389,402 B1 | 5/2002 | Ginter et al. .................... 705/51 |
| 6,324,672 B1 | 11/2001 | Lawman et al. ................. 716/1 | | 6,389,403 B1 | 5/2002 | Dorak, Jr. ........................ 705/52 |
| 6,327,541 B1 | 12/2001 | Pitchford et al. ............... 702/62 | | 6,389,538 B1 | 5/2002 | Gruse et al. .................... 713/194 |
| 6,327,583 B1 | 12/2001 | Kindo ............................. 706/45 | | 6,389,541 B1 | 5/2002 | Patterson ....................... 713/201 |
| 6,327,619 B1 | 12/2001 | Blumenau ..................... 709/224 | | 6,393,409 B2 | 5/2002 | Young et al. .................... 705/37 |
| 6,328,217 B1 | 12/2001 | Everett et al. ................. 235/492 | | 6,397,193 B1 | 5/2002 | Walker et al. .................. 705/16 |
| 6,330,525 B1 | 12/2001 | Hays et al. ..................... 702/183 | | 6,397,197 B1 | 5/2002 | Gindlesperger ................ 705/37 |
| 6,330,546 B1 | 12/2001 | Gopinathan et al. ........... 705/35 | | 6,397,198 B1 | 5/2002 | Hoffman et al. ............... 705/44 |
| 6,330,548 B1 | 12/2001 | Walker et al. ................... 705/38 | | 6,398,245 B1 | 6/2002 | Gruse et al. ................... 280/228 |
| 6,330,551 B1 | 12/2001 | Burchetta et al. ............... 705/80 | | 6,401,078 B1 | 6/2002 | Roberts et al. ................. 705/28 |
| 6,330,610 B1 | 12/2001 | Docter et al. .................. 709/229 | | 6,401,080 B1 | 6/2002 | Bigus et al. .................... 705/37 |
| 6,332,129 B1 | 12/2001 | Walker et al. ................... 705/26 | | 6,401,111 B1 | 6/2002 | Dan et al. ...................... 709/204 |
| 6,332,146 B1 | 12/2001 | Jebens et al. ................. 707/104 | | 6,404,928 B1 | 6/2002 | Shaw et al. .................... 382/232 |
| 6,334,112 B1 | 12/2001 | Walker et al. ................... 705/23 | | 6,405,174 B1 | 6/2002 | Walker et al. .................. 705/14 |
| 6,334,113 B1 | 12/2001 | Walker et al. ................... 705/23 | | 6,405,180 B2 | 6/2002 | Tilfors et al. ................... 705/37 |
| 6,334,114 B1 | 12/2001 | Jacobs et al. .................... 705/26 | | 6,405,181 B2 | 6/2002 | Lent et al. ....................... 705/38 |
| 6,334,192 B1 | 12/2001 | Karpf ............................. 714/1 | | 6,408,215 B1 | 6/2002 | Anderson ...................... 700/28 |
| 6,336,095 B1 | 1/2002 | Rosen .............................. 705/1 | | 6,408,281 B1 | 6/2002 | Shell et al. ...................... 705/26 |
| 6,336,104 B1 | 1/2002 | Walker et al. ................... 705/38 | | 6,408,283 B1 | 6/2002 | Alaia et al. ..................... 705/37 |
| 6,338,007 B1 | 1/2002 | Broadfield et al. ............ 700/231 | | 6,408,284 B1 | 6/2002 | Hilt et al. ........................ 705/40 |
| 6,338,045 B1 | 1/2002 | Pappas | | 6,411,696 B1 | 6/2002 | Iverson et al. |
| 6,338,066 B1 | 1/2002 | Martin et al. .................. 707/10 | | 6,415,180 B1 | 7/2002 | Kramer et al. ................... 607/9 |
| 6,338,093 B1 | 1/2002 | DiRienzo ...................... 709/238 | | 6,415,265 B1 | 7/2002 | Shell et al. ...................... 705/26 |
| 6,339,732 B1 | 1/2002 | Phoon et al. .................. 700/237 | | 6,415,269 B1 | 7/2002 | Dinwoodie ..................... 705/37 |
| 6,341,353 B1 | 1/2002 | Herman et al. ................ 713/201 | | 6,415,271 B1 | 7/2002 | Turk et al. ...................... 705/39 |
| 6,341,369 B1 | 1/2002 | Degenaro et al. ............. 717/117 | | 6,415,320 B1 | 7/2002 | Hess et al. ..................... 709/219 |
| 6,343,277 B1 | 1/2002 | Gaus et al. ...................... 705/37 | | 6,418,415 B1 | 7/2002 | Walker et al. .................. 705/26 |
| 6,343,278 B1 | 1/2002 | Jain et al. ....................... 705/37 | | 6,418,421 B1 | 7/2002 | Hurtado et al. ................. 705/54 |
| 6,343,310 B1 | 1/2002 | DiRienzo ...................... 709/200 | | 6,418,470 B2 | 7/2002 | Blumenau ..................... 709/224 |
| 6,344,638 B1 | 2/2002 | Tomasello ..................... 219/770 | | 6,421,652 B2 | 7/2002 | Loeb et al. ...................... 705/14 |
| 6,345,090 B1 | 2/2002 | Walker et al. | | 6,421,653 B1 | 7/2002 | May ................................ 705/37 |
| 6,345,256 B1 | 2/2002 | Milsted et al. .................... 705/1 | | 6,421,667 B1 | 7/2002 | Codd et al. ....................... 707/4 |
| 6,349,134 B1 | 2/2002 | Katz | | 6,421,781 B1 | 7/2002 | Fox et al. ....................... 713/201 |
| 6,349,237 B1 | 2/2002 | Koren et al. ................... 700/96 | | 6,424,703 B1 | 7/2002 | Katz |
| 6,349,288 B1 | 2/2002 | Barber ............................ 705/26 | | 6,424,949 B1 | 7/2002 | Deaton et al. ................... 705/14 |
| 6,349,324 B1 | 2/2002 | Tokoro .......................... 709/200 | | 6,425,006 B1 | 7/2002 | Chari et al. .................... 709/224 |
| 6,351,735 B1 | 2/2002 | Deaton et al. ................... 705/14 | | 6,427,140 B1 | 7/2002 | Ginter et al. .................... 705/80 |
| 6,354,490 B1 | 3/2002 | Weiss et al. ................... 235/379 | | 6,430,542 B1 | 8/2002 | Moran ............................ 705/36 |
| 6,356,874 B1 | 3/2002 | Øhurn .............................. 705/6 | | 6,430,549 B1 | 8/2002 | Gershfield et al. ................ 707/2 |
| 6,356,878 B1 | 3/2002 | Walker et al. ................... 705/26 | | 6,430,567 B2 | 8/2002 | Burridge ....................... 707/102 |
| 6,356,921 B1 | 3/2002 | Kumar et al. | | 6,430,607 B1 | 8/2002 | Kavner .......................... 709/217 |
| 6,356,945 B1 | 3/2002 | Shaw et al. .................... 709/231 | | 6,434,223 B2 | 8/2002 | Katz |
| 6,357,043 B1 | 3/2002 | Ellis et al. ....................... 725/61 | | 6,434,531 B1 | 8/2002 | Lancelot et al. .................. 705/3 |
| 6,360,249 B1 | 3/2002 | Courts et al. .................. 709/203 | | 6,438,527 B1 | 8/2002 | Powar ............................ 705/40 |
| 6,360,273 B1 | 3/2002 | Beurket et al. ................ 709/244 | | 6,442,418 B1 | 8/2002 | Evans, III et al. ............. 600/431 |
| 6,363,358 B1 | 3/2002 | Palmer et al. ................... 705/28 | | 6,442,513 B1 | 8/2002 | Cheng et al. ................... 703/12 |
| 6,363,393 B1 | 3/2002 | Ribitzky ....................... 707/102 | | 6,442,594 B1 | 8/2002 | Ouchi ............................ 709/206 |
| 6,363,411 B1 | 3/2002 | Dugan et al. .................. 709/202 | | 6,442,663 B1 | 8/2002 | Sun et al. ....................... 711/202 |
| 6,363,488 B1 | 3/2002 | Ginter et al. ................... 713/201 | | 6,442,690 B1 | 8/2002 | Howard, Jr. et al. .......... 713/175 |
| 6,366,829 B1 | 4/2002 | Wallace ......................... 700/236 | | 6,443,843 B1 | 9/2002 | Walker et al. .................. 463/42 |
| 6,366,890 B1 | 4/2002 | Usrey ............................. 705/10 | | 6,446,865 B1 | 9/2002 | Holt et al. ..................... 235/382 |
| 6,366,967 B1 | 4/2002 | Wagner .......................... 710/33 | | 6,448,980 B1 | 9/2002 | Kumar et al. ................. 345/745 |
| 6,367,377 B1 | 4/2002 | Gawley et al. ................. 100/49 | | 6,449,346 B1 | 9/2002 | Katz |
| 6,370,510 B1 | 4/2002 | McGovern et al. .............. 705/1 | | 6,449,367 B2 | 9/2002 | Van Wie et al. ............... 380/232 |
| 6,370,567 B1 | 4/2002 | Ouchi ........................... 709/200 | | 6,449,599 B1 | 9/2002 | Payne et al. .................... 705/27 |
| 6,373,950 B1 | 4/2002 | Rowney ........................ 380/255 | | 6,450,356 B1 | 9/2002 | Alexander et al. |
| 6,374,240 B1 | 4/2002 | Walker et al. .................... 707/5 | | 6,452,924 B1 | 9/2002 | Golden et al. ................ 370/352 |
| 6,377,618 B1 | 4/2002 | Prasad et al. .................. 375/225 | | 6,453,297 B1 | 9/2002 | Burks et al. ...................... 705/3 |
| 6,377,927 B1 | 4/2002 | Loghmani et al. ............ 704/275 | | 6,453,348 B1 | 9/2002 | Barnier et al. ................ 709/225 |
| 6,377,935 B1 | 4/2002 | Deaton et al. ................... 705/14 | | 6,456,986 B1 | 9/2002 | Boardman et al. ........... 705/400 |
| 6,377,937 B1 | 4/2002 | Paskowitz ..................... 705/26 | | 6,457,027 B1 | 9/2002 | Orr ................................. 707/513 |
| 6,377,940 B2 | 4/2002 | Tilfors et al. ................... 705/37 | | 6,457,879 B1 | 10/2002 | Thurlow et al. |

| Patent No. | Date | Inventor | Class |
|---|---|---|---|
| 6,460,020 B1 | 10/2002 | Pool et al. | 705/26 |
| 6,460,072 B1 | 10/2002 | Arnold et al. | 709/203 |
| 6,462,761 B1 | 10/2002 | Hasuo | 345/838 |
| 6,463,418 B1 | 10/2002 | Todd | 705/26 |
| 6,463,421 B2 | 10/2002 | Junger | 705/28 |
| 6,466,663 B1 | 10/2002 | Ravenscroft et al. | 379/265 |
| 6,466,914 B2 | 10/2002 | Mitsuoka et al. | 705/9 |
| 6,466,915 B1 | 10/2002 | Suzuki et al. | 705/14 |
| 6,466,919 B1 | 10/2002 | Walker et al. | 705/37 |
| 6,466,967 B2 | 10/2002 | Landsman et al. | 709/203 |
| 6,470,303 B2 | 10/2002 | Kidd et al. | 703/8 |
| 6,470,322 B1 | 10/2002 | Walker et al. | 705/16 |
| 6,470,323 B1 | 10/2002 | Suzuki et al. | 705/27 |
| 6,473,744 B1 | 10/2002 | Tuck et al. | 705/412 |
| 6,473,748 B1 | 10/2002 | Archer | 706/45 |
| 6,473,752 B1 | 10/2002 | Fleming, III | 707/4 |
| 6,477,520 B1 | 11/2002 | Malaviya et al. | 706/47 |
| 6,477,578 B1 | 11/2002 | Mhoon | 709/229 |
| 6,480,894 B1 | 11/2002 | Courts et al. | 709/227 |
| 6,482,156 B2 | 11/2002 | Iliff | 600/300 |
| 6,483,895 B1 | 11/2002 | Bixler et al. | 379/671 |
| 6,484,149 B1 | 11/2002 | Jammes et al. | 705/26 |
| 6,484,153 B1 | 11/2002 | Walker et al. | 705/38 |
| 6,484,158 B1 | 11/2002 | Johnson et al. | 707/2 |
| 6,484,165 B1 | 11/2002 | Beall et al. | 707/3 |
| 6,484,189 B1 | 11/2002 | Gerlach, Jr. et al. | |
| 6,486,895 B1 | 11/2002 | Robertson et al. | 345/776 |
| 6,488,211 B1 | 12/2002 | Everett et al. | 235/492 |
| 6,488,675 B1 | 12/2002 | Radford et al. | 604/540 |
| 6,490,350 B2 | 12/2002 | McDuff et al. | |
| 6,490,358 B1 | 12/2002 | Geer, Jr. et al. | 380/286 |
| 6,490,567 B1 | 12/2002 | Gregory | 705/39 |
| 6,490,573 B1 | 12/2002 | Njemanze | 706/19 |
| 6,490,587 B2 | 12/2002 | Easty et al. | 707/10 |
| 6,493,682 B1 | 12/2002 | Horrigan et al. | 705/36 |
| 6,493,686 B1 | 12/2002 | Francone et al. | 706/12 |
| 6,496,932 B1 | 12/2002 | Trieger | 713/168 |
| 6,499,018 B1 | 12/2002 | Alaia et al. | 705/37 |
| 6,499,270 B2 | 12/2002 | Peroni et al. | 53/53 |
| 6,502,096 B1 | 12/2002 | Siefert | 707/10 |
| 6,505,172 B1 | 1/2003 | Johnson et al. | 705/27 |
| 6,505,174 B1 | 1/2003 | Keiser et al. | 705/37 |
| 6,505,773 B1 | 1/2003 | Palmer et al. | 235/380 |
| 6,507,822 B1 | 1/2003 | Walker et al. | 705/20 |
| 6,507,823 B1 | 1/2003 | Nel | 705/26 |
| 6,510,418 B1 | 1/2003 | Case et al. | 705/26 |
| 6,512,415 B1 | 1/2003 | Katz | |
| 6,513,014 B1 | 1/2003 | Walker et al. | 705/10 |
| 6,516,303 B1 | 2/2003 | Wallman | 705/36 |
| 6,516,318 B2 | 2/2003 | Nakamura et al. | 707/10 |
| 6,516,338 B1 | 2/2003 | Landsman et al. | 709/203 |
| 6,519,572 B1 | 2/2003 | Riordan et al. | 705/16 |
| 6,519,600 B1 | 2/2003 | Siefert | 707/10 |
| 6,526,449 B1 | 2/2003 | Philyaw et al. | 709/238 |
| 6,529,889 B1 | 3/2003 | Bromberg et al. | 706/45 |
| 6,529,908 B1 | 3/2003 | Piett et al. | 707/10 |
| 6,535,294 B1 | 3/2003 | Arledge, Jr. et al. | 358/115 |
| 6,535,913 B2 | 3/2003 | Mittal et al. | 709/219 |
| 6,539,404 B1 | 3/2003 | Ouchi | 707/500 |
| 6,542,874 B1 | 4/2003 | Walker et al. | 705/23 |
| 6,546,005 B1 | 4/2003 | Berkley et al. | 370/353 |
| 6,546,545 B1 | 4/2003 | Honarvar et al. | 717/100 |
| 6,549,891 B1 | 4/2003 | Rauber et al. | 705/28 |
| 6,552,723 B1 | 4/2003 | Duluk, Jr. et al. | 345/419 |
| 6,553,108 B1 | 4/2003 | Felger | 379/144 |
| 6,553,346 B1 | 4/2003 | Walker et al. | 705/1 |
| 6,553,407 B1 | 4/2003 | Ouchi | 709/206 |
| 6,556,977 B1 | 4/2003 | Lapointe et al. | 706/15 |
| 6,557,054 B2 | 4/2003 | Reisman | 710/33 |
| 6,560,549 B2 | 5/2003 | Fonkalsrud et al. | 702/41 |
| 6,560,569 B1 | 5/2003 | Abu El Ata | 703/2 |
| 6,560,581 B1 | 5/2003 | Fox et al. | 705/51 |
| 6,564,240 B2 | 5/2003 | Waldo et al. | 709/104 |
| 6,565,000 B2 | 5/2003 | Sehr | 235/384 |
| 6,567,783 B1 | 5/2003 | Notani et al. | 705/9 |
| 6,567,791 B2 | 5/2003 | Lent et al. | 705/38 |
| 6,567,820 B1 | 5/2003 | Scheifler et al. | 707/103 |
| 6,567,824 B2 | 5/2003 | Fox | |
| 6,570,967 B2 | 5/2003 | Katz | |
| 6,571,149 B1 | 5/2003 | Hahn-Carlson | 700/216 |
| 6,571,251 B1 | 5/2003 | Koski et al. | 707/102 |
| 6,573,047 B1 | 6/2003 | Hung et al. | 435/6 |
| 6,574,314 B1 | 6/2003 | Martino | |
| 6,574,607 B1 | 6/2003 | Carter et al. | 705/26 |
| 6,574,609 B1 | 6/2003 | Downs et al. | 705/50 |
| 6,575,372 B1 | 6/2003 | Everett et al. | 235/492 |
| 6,578,012 B1 | 6/2003 | Storey | 705/14 |
| 6,578,024 B2 | 6/2003 | Kuypers | 707/1 |
| 6,581,042 B2 | 6/2003 | Pare, Jr. et al. | 705/40 |
| 6,582,304 B2 | 6/2003 | Walker et al. | 463/17 |
| 6,582,310 B1 | 6/2003 | Walker et al. | 463/42 |
| 6,584,445 B2 | 6/2003 | Papageorge | 705/3 |
| 6,584,448 B1 | 6/2003 | Laor | 705/14 |
| 6,587,830 B2 | 7/2003 | Singer | 705/3 |
| 6,587,837 B1 | 7/2003 | Spagna et al. | 705/26 |
| 6,594,643 B1 | 7/2003 | Freeny, Jr. | 705/37 |
| 6,594,644 B1 | 7/2003 | Van Dusen | 705/39 |
| 6,594,692 B1 | 7/2003 | Reisman | 709/219 |
| 6,594,705 B1 | 7/2003 | Philyaw | 709/238 |
| 6,598,024 B1 | 7/2003 | Walker et al. | 705/16 |
| 6,598,029 B1 | 7/2003 | Johnson et al. | 705/37 |
| 6,599,324 B2 | 7/2003 | Saito et al. | 715/513 |
| 6,601,034 B1 | 7/2003 | Honarvar et al. | 705/7 |
| 6,601,036 B1 | 7/2003 | Walker et al. | 705/10 |
| 6,601,037 B1 | 7/2003 | Kolls | 705/14 |
| 6,601,038 B1 | 7/2003 | Kolls | 705/14 |
| 6,601,039 B1 | 7/2003 | Kolls | 705/14 |
| 6,601,040 B1 | 7/2003 | Kolls | 705/14 |
| 6,601,043 B1 | 7/2003 | Purcell | 705/26 |
| 6,601,044 B1 | 7/2003 | Wallman | 705/36 |
| 6,601,761 B1 | 8/2003 | Katis | 235/379 |
| 6,604,085 B1 | 8/2003 | Kolls | 705/14 |
| 6,604,086 B1 | 8/2003 | Kolls | 705/14 |
| 6,604,087 B1 | 8/2003 | Kolls | 705/14 |
| 6,604,088 B1 | 8/2003 | Landom et al. | 705/26 |
| 6,604,090 B1 | 8/2003 | Tackett et al. | 706/11 |
| 6,604,127 B2 | 8/2003 | Murphy et al. | 709/203 |
| 6,606,479 B2 | 8/2003 | Cook et al. | 434/350 |
| 6,606,602 B1 | 8/2003 | Kolls | 705/14 |
| 6,606,603 B1 | 8/2003 | Joseph et al. | 705/26 |
| 6,606,605 B1 | 8/2003 | Kolls | 705/26 |
| 6,608,628 B1 | 8/2003 | Ross et al. | 345/619 |
| 6,609,036 B1 | 8/2003 | Bickford | 700/30 |
| 6,609,102 B2 | 8/2003 | Kolls | 705/14 |
| 6,609,103 B1 | 8/2003 | Kolls | 705/14 |
| 6,609,109 B1 | 8/2003 | Bradley et al. | 705/35 |
| 6,609,120 B1 | 8/2003 | Honarvar et al. | 707/3 |
| 6,609,658 B1 | 8/2003 | Sehr | 235/384 |
| 6,609,659 B2 | 8/2003 | Sehr | 235/384 |
| 6,611,807 B1 | 8/2003 | Bernheim et al. | 705/4 |
| 6,611,810 B1 | 8/2003 | Kolls | 705/14 |
| 6,611,812 B2 | 8/2003 | Hurtado et al. | 705/26 |
| 6,611,818 B1 | 8/2003 | Mersky et al. | 705/40 |
| 6,611,862 B2 | 8/2003 | Reisman | 709/217 |
| 6,615,073 B1 | 9/2003 | Panescu et al. | 600/509 |
| 6,615,183 B1 | 9/2003 | Kolls | 705/26 |
| 6,615,268 B1 | 9/2003 | Philyaw et al. | 709/229 |
| 6,618,484 B1 | 9/2003 | Van Wie et al. | 380/232 |
| 6,618,707 B1 | 9/2003 | Gary | 705/37 |
| 6,618,746 B2 | 9/2003 | Desai et al. | 709/204 |
| 6,622,124 B1 | 9/2003 | Kolls | 705/14 |
| 6,622,165 B1 | 9/2003 | Philyaw | 709/217 |
| 6,629,079 B1 | 9/2003 | Spiegel et al. | 705/26 |
| 6,629,133 B1 | 9/2003 | Philyaw et al. | 709/217 |
| 6,629,135 B1 | 9/2003 | Ross, Jr. et al. | 709/218 |
| 6,629,154 B1 | 9/2003 | Jones et al. | 709/330 |
| 6,631,404 B1 | 10/2003 | Philyaw | 709/217 |
| 6,633,795 B1 | 10/2003 | Suzuki et al. | 700/213 |
| 6,636,833 B1 | 10/2003 | Flitcroft et al. | 705/1 |
| 6,636,892 B1 | 10/2003 | Philyaw | 709/217 |
| 6,636,896 B1 | 10/2003 | Philyaw | 709/238 |
| 6,641,532 B2 | 11/2003 | Iliff | 600/300 |
| 6,643,623 B1 | 11/2003 | Kolls | 705/14 |
| 6,643,624 B2 | 11/2003 | Philippe et al. | 705/26 |
| 6,643,692 B1 | 11/2003 | Philyaw et al. | 709/219 |
| 6,647,384 B2 | 11/2003 | Gilmour | 707/5 |
| 6,654,786 B1 | 11/2003 | Fox et al. | 709/203 |
| 6,654,793 B1 | 11/2003 | Wollrath et al. | 709/217 |

| Patent | Date | Inventor | Class |
|---|---|---|---|
| 6,658,106 B1 | 12/2003 | Atkinson et al. | |
| 6,658,464 B2 | 12/2003 | Reisman | 709/219 |
| 6,658,568 B1 | 12/2003 | Ginter et al. | 713/193 |
| 6,659,354 B2 | 12/2003 | Everett et al. | 235/492 |
| 6,662,166 B2 | 12/2003 | Pare, Jr. et al. | 705/39 |
| 6,664,860 B2 | 12/2003 | Fallisgaard et al. | 331/18 |
| 6,665,395 B1 | 12/2003 | Busey et al. | 379/265.09 |
| 6,669,832 B1 | 12/2003 | Saito et al. | 205/26 |
| 6,678,360 B1 | 1/2004 | Katz | 379/882 |
| 6,678,669 B2 | 1/2004 | Lapointe et al. | 706/15 |
| 6,681,010 B1 | 1/2004 | Anderson et al. | |
| 6,684,197 B1 | 1/2004 | Kolls | 705/41 |
| 6,684,269 B2 | 1/2004 | Wagner | 710/33 |
| RE38,432 E | 2/2004 | Fai et al. | 434/350 |
| 6,687,737 B2 | 2/2004 | Landsman et al. | 709/203 |
| 6,688,522 B1 | 2/2004 | Philyaw et al. | |
| 6,688,888 B1 | 2/2004 | Ho et al. | 434/322 |
| 6,690,794 B1 | 2/2004 | Terao et al. | 380/22 |
| 6,691,147 B1 | 2/2004 | Arunkumar et al. | 709/200 |
| 6,694,300 B1 | 2/2004 | Walker et al. | 705/14 |
| 6,694,356 B1 | 2/2004 | Philyaw | 709/217 |
| 6,694,365 B1 | 2/2004 | Wyngarden | 709/225 |
| 6,694,387 B2 | 2/2004 | Wagner | 710/33 |
| 6,697,783 B1 | 2/2004 | Brinkman et al. | 705/3 |
| 6,697,784 B2 | 2/2004 | Bacon et al. | 705/9 |
| 6,697,861 B2 | 2/2004 | Barnier et al. | 709/225 |
| 6,697,949 B1 | 2/2004 | Philyaw et al. | 713/201 |
| 6,701,315 B1 | 3/2004 | Austin | 707/10 |
| 6,701,354 B1 | 3/2004 | Philyaw et al. | 709/219 |
| 6,701,369 B1 | 3/2004 | Philyaw | 709/229 |
| 6,704,713 B1 | 3/2004 | Brett | 705/37 |
| 6,704,749 B2 | 3/2004 | Palmer et al. | |
| 6,704,756 B2 | 3/2004 | Wollrath et al. | 707/206 |
| 6,708,208 B1 | 3/2004 | Philyaw | 709/223 |
| 6,710,786 B1 | 3/2004 | Jacobs et al. | 345/744 |
| 6,711,256 B1 | 3/2004 | O'Neil | |
| 6,714,196 B2 | 3/2004 | McCormack et al. | 345/423 |
| 6,714,919 B1 | 3/2004 | Findley | 705/44 |
| 6,725,209 B1 | 4/2004 | Iliff | 706/45 |
| 6,725,260 B1 | 4/2004 | Philyaw | 709/220 |
| 6,725,447 B1 | 4/2004 | Gilman et al. | 717/105 |
| 6,727,294 B2 | 4/2004 | Kanayama et al. | 523/136 |
| 6,728,737 B2 | 4/2004 | Wollrath et al. | 707/206 |
| 6,728,947 B1 | 4/2004 | Bengston | 717/103 |
| 6,731,625 B1 | 5/2004 | Eastep et al. | 370/352 |
| 6,731,971 B2 | 5/2004 | Evans, III et al. | 600/431 |
| 6,732,161 B1 | 5/2004 | Hess et al. | 709/219 |
| 6,735,574 B1 | 5/2004 | Bull | 705/32 |
| 6,735,596 B2 | 5/2004 | Corynen | 707/102 |
| 6,736,325 B1 | 5/2004 | Peacham | 235/492 |
| 6,738,749 B1 | 5/2004 | Chasko | 705/17 |
| 6,739,947 B1 | 5/2004 | Molnar | 451/8 |
| 6,742,120 B1 | 5/2004 | Markakis et al. | 713/184 |
| 6,742,127 B2 | 5/2004 | Fox et al. | 713/201 |
| 6,742,715 B2 | 6/2004 | Everett et al. | 235/492 |
| 6,744,894 B1 | 6/2004 | Saito | 380/277 |
| 6,745,234 B1 | 6/2004 | Philyaw et al. | 709/217 |
| 6,745,259 B2 | 6/2004 | Wagner | 710/33 |
| 6,748,376 B1 | 6/2004 | Beall et al. | 707/3 |
| 6,754,636 B1 | 6/2004 | Walker et al. | 705/26 |
| 6,754,641 B2 | 6/2004 | Kolls | 705/44 |
| 6,754,698 B1 | 6/2004 | Philyaw et al. | 709/203 |
| 6,757,663 B1 | 6/2004 | Rogers et al. | 705/24 |
| 6,757,710 B2 | 6/2004 | Reed | 709/203 |
| 6,758,398 B1 | 7/2004 | Philyaw et al. | 235/454 |
| 6,760,736 B2 | 7/2004 | Waldo et al. | 707/206 |
| 6,761,319 B2 | 7/2004 | Peachman et al. | 235/462 |
| 6,763,336 B1 | 7/2004 | Kolls | 705/44 |
| 6,769,009 B1 | 7/2004 | Reisman | 709/201 |
| 6,771,317 B2 | 8/2004 | Ellis et al. | 348/569 |
| 6,772,162 B2 | 8/2004 | Waldo et al. | 707/10 |
| 6,782,087 B1 | 8/2004 | Atkinson et al. | |
| 6,785,659 B1 | 8/2004 | Landsman et al. | 705/14 |
| 6,785,661 B1 | 8/2004 | Mandler et al. | 705/39 |
| 6,788,997 B1 | 9/2004 | Frederick | 700/236 |
| 6,791,588 B1 | 9/2004 | Philyaw | 345/862 |
| 6,792,452 B1 | 9/2004 | Philyaw | 709/217 |
| 6,796,492 B1 | 9/2004 | Gatto | 235/379 |
| 6,799,174 B2 | 9/2004 | Chipman et al. | 707/3 |
| 6,799,725 B1 | 10/2004 | Hess et al. | |
| 6,801,820 B1 | 10/2004 | Lilly et al. | 700/100 |
| 6,804,783 B1 | 10/2004 | Wesinger, Jr. et al. | 713/200 |
| 6,807,532 B1 | 10/2004 | Kolls | 705/10 |
| 6,816,875 B2 | 11/2004 | Wollrath et al. | 707/206 |
| 6,816,894 B1 | 11/2004 | Philyaw et al. | 709/219 |
| 6,823,388 B1 | 11/2004 | Philyaw et al. | 709/227 |
| 6,824,057 B2 | 11/2004 | Rathus et al. | |
| 6,826,541 B1 | 11/2004 | Johnston et al. | 705/10 |
| 6,826,552 B1 | 11/2004 | Grosser et al. | 706/47 |
| 6,826,592 B1 | 11/2004 | Philyaw et al. | 709/202 |
| 6,827,267 B2 | 12/2004 | Rathus et al. | |
| 6,829,595 B2 | 12/2004 | Justice | 705/64 |
| 6,829,650 B1 | 12/2004 | Philyaw et al. | 709/238 |
| 6,830,187 B2 | 12/2004 | Rathus et al. | |
| 6,830,188 B2 | 12/2004 | Rathus et al. | |
| 6,832,223 B1 | 12/2004 | Scheifler et al. | 707/10 |
| 6,834,268 B2 | 12/2004 | Junger | 705/28 |
| 6,834,804 B2 | 12/2004 | Rathus et al. | |
| 6,836,799 B1 | 12/2004 | Philyaw et al. | 709/224 |
| 6,839,687 B1 | 1/2005 | Dent et al. | 705/40 |
| 6,843,411 B2 | 1/2005 | Rathus et al. | 235/375 |
| 6,843,417 B1 | 1/2005 | Philyaw et al. | |
| 6,843,419 B2 | 1/2005 | Rathus et al. | |
| 6,845,364 B1 | 1/2005 | Pool et al. | 705/26 |
| 6,845,388 B1 | 1/2005 | Philyaw | 709/204 |
| 6,845,505 B1 | 1/2005 | Adunuthula et al. | 718/105 |
| 6,847,854 B2 | 1/2005 | Discenzo | 700/99 |
| 6,847,965 B2 | 1/2005 | Walker et al. | 707/5 |
| 6,849,045 B2 | 2/2005 | Iliff | 600/300 |
| 6,850,907 B2 | 2/2005 | Lutnick et al. | 705/37 |
| 6,850,918 B1 | 2/2005 | Burchetta et al. | 705/80 |
| 6,850,996 B2 | 2/2005 | Wagner | 710/33 |
| 6,859,784 B1 | 2/2005 | van Duyne et al. | 705/10 |
| 6,859,787 B2 | 2/2005 | Fisher et al. | 705/26 |
| 6,859,791 B1 | 2/2005 | Spagna et al. | 705/51 |
| 6,860,424 B1 | 3/2005 | Philyaw et al. | |
| 6,862,732 B1 | 3/2005 | Schultz et al. | 718/102 |
| 6,868,403 B1 | 3/2005 | Wiser et al. | 705/51 |
| 6,868,408 B1 | 3/2005 | Rosen | 705/64 |
| 6,868,433 B1 | 3/2005 | Philyaw | 709/203 |
| 6,871,220 B1 | 3/2005 | Rajan et al. | 709/218 |
| 6,873,978 B1 | 3/2005 | Boucher et al. | 705/401 |
| 6,876,978 B1 | 4/2005 | Walker et al. | 705/26 |
| 6,876,991 B1 | 4/2005 | Owen et al. | 706/46 |
| 6,877,032 B1 | 4/2005 | Philyaw | 709/217 |
| 6,879,962 B1 | 4/2005 | Smith et al. | 705/22 |
| 6,879,966 B1 | 4/2005 | Lapsley et al. | 705/78 |
| 6,880,123 B1 | 4/2005 | Landsman et al. | |
| 6,882,981 B2 | 4/2005 | Philippe et al. | 705/26 |
| 6,885,981 B2 | 4/2005 | Bomar, Jr. et al. | 703/8 |
| 6,885,994 B1 | 4/2005 | Scroggie et al. | 705/14 |
| 6,886,750 B2 | 5/2005 | Rathus et al. | |
| 6,889,074 B2 | 5/2005 | Uber, III et al. | 600/431 |
| 6,889,194 B1 | 5/2005 | Kadaba | 705/1 |
| 6,889,198 B2 | 5/2005 | Kawan | 705/14 |
| 6,889,214 B1 | 5/2005 | Pagel et al. | 705/410 |
| 6,898,299 B1 | 5/2005 | Brooks | 382/115 |
| 6,898,469 B2 | 5/2005 | Bickford | 700/30 |
| 6,898,581 B1 | 5/2005 | Cordery et al. | 705/400 |
| 6,898,591 B1 | 5/2005 | Moon et al. | 707/3 |
| 6,901,240 B2 | 5/2005 | Tokoro | 455/303 |
| 6,901,283 B2 | 5/2005 | Evans, III et al. | 600/431 |
| 6,901,301 B2 | 5/2005 | Bradshaw | 700/48 |
| 6,901,393 B1 | 5/2005 | Owen et al. | 706/46 |
| 6,901,433 B2 | 5/2005 | San Andres et al. | 709/216 |
| 6,907,315 B1 | 6/2005 | Hartman et al. | 700/216 |
| 6,907,399 B1 | 6/2005 | Cordery et al. | 705/1 |
| 6,907,405 B2 | 6/2005 | Brett | 705/37 |
| 6,910,047 B1 | 6/2005 | Boucher et al. | 707/103 |
| 6,910,628 B1 | 6/2005 | Sehr | 235/384 |
| 6,912,510 B1 | 6/2005 | Shepherd | 705/37 |
| 6,912,528 B2 | 6/2005 | Homer | 707/9 |
| 6,915,169 B2 | 7/2005 | Flynn et al. | 607/122 |
| 6,915,271 B1 | 7/2005 | Meyer et al. | 705/14 |
| 6,920,433 B1 | 7/2005 | Seretti et al. | 705/37 |
| 6,925,444 B1 | 8/2005 | McCollom et al. | 705/14 |
| 6,925,644 B2 | 8/2005 | Waldo et al. | 718/104 |
| 6,926,203 B1 | 8/2005 | Sehr | 235/492 |

| Patent | Date | Inventor | Class |
|---|---|---|---|
| 6,929,182 B2 | 8/2005 | Rathus et al. | |
| 6,934,684 B2 | 8/2005 | Alpdemir et al. | 704/265 |
| 6,938,007 B1 | 8/2005 | Iulianello et al. | 705/34 |
| 6,938,021 B2 | 8/2005 | Shear et al. | 705/67 |
| 6,938,263 B2 | 8/2005 | Wollrath et al. | 719/330 |
| 6,941,273 B1 | 9/2005 | Loghmani et al. | 705/26 |
| 6,941,454 B1 | 9/2005 | Spraggs | 713/150 |
| 6,945,457 B1 | 9/2005 | Barcelou | 235/380 |
| 6,951,008 B2 | 9/2005 | Quaile | 706/54 |
| 6,954,741 B1 | 10/2005 | Burchetta et al. | 705/80 |
| 6,954,782 B1 | 10/2005 | Thurlow et al. | 709/206 |
| 6,954,802 B2 | 10/2005 | Sutherland et al. | 710/5 |
| 6,957,202 B2 | 10/2005 | Skaanning et al. | 706/20 |
| 6,957,427 B1 | 10/2005 | Wollrath et al. | 718/1 |
| 6,959,288 B1 | 10/2005 | Medina et al. | 705/51 |
| 6,963,847 B1 | 11/2005 | Kennedy et al. | 705/8 |
| 6,963,856 B2 | 11/2005 | Lutnick et al. | 705/37 |
| 6,965,272 B2 | 11/2005 | Trefethen et al. | 331/44 |
| 6,965,868 B1 | 11/2005 | Bednarek | 705/9 |
| 6,968,319 B1 | 11/2005 | Remington et al. | 705/40 |
| 6,968,375 B1 | 11/2005 | Brown | 709/224 |
| 6,970,914 B1 | 11/2005 | Philyaw et al. | 709/217 |
| 6,973,477 B1 | 12/2005 | Martino | 709/203 |
| 6,980,968 B1 | 12/2005 | Walker et al. | 705/38 |
| 6,981,059 B1 | 12/2005 | Philyaw et al. | 709/245 |
| 6,983,227 B1 | 1/2006 | Thalhammer-Reyero | 703/2 |
| 6,983,253 B1 | 1/2006 | Maul et al. | 705/4 |
| 6,983,257 B2 | 1/2006 | Gatto | 705/36 |
| 6,983,371 B1 | 1/2006 | Hurtado et al. | 713/189 |
| 6,985,888 B1 | 1/2006 | Cordery et al. | 705/60 |
| 6,985,954 B1 | 1/2006 | Philyaw et al. | 709/229 |
| 6,990,630 B2 | 1/2006 | Landsman et al. | 715/500 |
| 6,993,572 B2 | 1/2006 | Ross, Jr. et al. | 709/218 |
| 6,996,535 B1 | 2/2006 | Ono et al. | 705/26 |
| 6,996,539 B1 | 2/2006 | Wallman | 705/36 |
| 6,996,542 B1 | 2/2006 | Landry | 705/40 |
| 6,999,938 B1 | 2/2006 | Libman | 705/10 |
| 7,006,881 B1 * | 2/2006 | Hoffberg et al. | 700/83 |
| 7,006,989 B2 | 2/2006 | Bezos et al. | 705/26 |
| 7,007,166 B1 | 2/2006 | Moskowitz et al. | 713/176 |
| 7,010,577 B1 | 3/2006 | Philyaw et al. | 709/217 |
| 7,016,863 B1 | 3/2006 | Kamakura et al. | 705/26 |
| 7,016,870 B1 | 3/2006 | Jones et al. | 705/35 |
| 7,016,878 B2 | 3/2006 | Yoshioka et al. | 705/51 |
| 7,020,622 B1 | 3/2006 | Messer | 705/26 |
| 7,020,631 B2 | 3/2006 | Freeman et al. | 705/36 R |
| 7,024,377 B1 | 4/2006 | Goldschmidt et al. | 705/26 |
| 7,028,034 B2 | 4/2006 | Wesinger, Jr. et al. | 707/10 |
| 7,028,187 B1 | 4/2006 | Rosen | 713/175 |
| 7,031,901 B2 | 4/2006 | Abu El Ata | 703/21 |
| 7,035,786 B1 | 4/2006 | Abu El Ata et al. | 703/21 |
| 7,035,832 B1 | 4/2006 | Kara | 705/408 |
| 7,039,595 B1 | 5/2006 | Lilly et al. | 705/8 |
| 7,039,597 B1 | 5/2006 | Notani et al. | 705/9 |
| 7,039,599 B2 | 5/2006 | Merriman et al. | 705/14 |
| 7,039,603 B2 | 5/2006 | Walker et al. | 705/26 |
| 7,040,504 B2 | 5/2006 | Broadfield et al. | 221/98 |
| 7,043,441 B1 | 5/2006 | Maher | 705/1 |
| 7,043,536 B1 | 5/2006 | Philyaw et al. | 709/219 |
| 7,043,682 B1 | 5/2006 | Ferguson | 714/796 |
| 7,044,993 B1 | 5/2006 | Bolduc | 55/524 |
| 7,047,218 B1 | 5/2006 | Wallman | 705/36 R |
| 7,050,873 B1 | 5/2006 | Discenzo | 700/99 |
| 7,050,995 B2 | 5/2006 | Wojcik et al. | 705/28 |
| 7,051,212 B2 | 5/2006 | Ginter et al. | 713/193 |
| 7,054,830 B1 | 5/2006 | Eggleston et al. | 705/14 |
| 7,058,596 B1 | 6/2006 | Wojcik et al. | 705/26 |
| 7,058,954 B1 | 6/2006 | Wollrath et al. | 719/310 |
| 7,062,274 B2 | 6/2006 | Shell et al. | 455/445 |
| 7,062,458 B2 | 6/2006 | Maggioncalda et al. | 705/36 |
| 7,062,500 B1 | 6/2006 | Hall et al. | 707/102 |
| 7,062,757 B2 | 6/2006 | Honarvar et al. | 717/127 |
| 7,069,451 B1 | 6/2006 | Ginter et al. | 713/200 |
| 7,069,576 B1 | 6/2006 | Knudson et al. | 725/105 |
| 7,069,582 B2 | 6/2006 | Philyaw et al. | 726/3 |
| 7,072,850 B1 | 7/2006 | Van Luchene | 705/14 |
| 7,076,453 B2 | 7/2006 | Jammes et al. | 705/26 |
| 7,076,456 B1 | 7/2006 | Rofrano | 705/27 |
| 7,076,458 B2 | 7/2006 | Lawlor et al. | 705/35 |
| 7,076,475 B2 | 7/2006 | Honarvar | 706/47 |
| 7,076,652 B2 | 7/2006 | Ginter et al. | 713/153 |
| 7,080,544 B2 | 7/2006 | Stepanik et al. | 73/31.02 |
| 7,082,426 B2 | 7/2006 | Musgrove et al. | 707/3 |
| 7,085,366 B2 | 8/2006 | O'Neil | |
| 7,085,729 B1 | 8/2006 | Kennedy et al. | 705/10 |
| 7,085,814 B1 | 8/2006 | Gandhi et al. | 709/208 |
| 7,089,209 B1 | 8/2006 | Kolls | 705/39 |
| 7,089,291 B1 | 8/2006 | Philyaw | 709/217 |
| 7,092,897 B2 | 8/2006 | Wallace | 705/22 |
| 7,092,914 B1 | 8/2006 | Shear et al. | 705/67 |
| 7,095,840 B2 | 8/2006 | Dezonno et al. | |
| 7,095,854 B1 | 8/2006 | Ginter et al. | 380/233 |
| 7,099,832 B2 | 8/2006 | Walker et al. | 705/14 |
| 7,100,199 B2 | 8/2006 | Ginter et al. | 726/4 |
| 7,103,568 B1 | 9/2006 | Fusz et al. | 705/26 |
| 7,103,594 B1 | 9/2006 | Wolfe | 707/5 |
| 7,107,224 B1 | 9/2006 | Weller et al. | 705/10 |
| 7,107,228 B1 | 9/2006 | Walker et al. | 705/26 |
| 7,107,244 B2 | 9/2006 | Kight et al. | 705/40 |
| 7,110,959 B2 | 9/2006 | Hahn-Carlson | 705/8 |
| 7,110,971 B2 | 9/2006 | Wallman | 705/36 |
| 7,110,983 B2 | 9/2006 | Shear et al. | 705/55 |
| 7,110,984 B1 | 9/2006 | Spagna et al. | 705/57 |
| 7,117,162 B1 | 10/2006 | Seal et al. | 705/9 |
| 7,117,165 B1 | 10/2006 | Adams et al. | 705/26 |
| 7,117,176 B2 | 10/2006 | Wallman | 705/36 |
| 7,117,240 B1 | 10/2006 | Philyaw et al. | 709/201 |
| 7,120,800 B2 | 10/2006 | Ginter et al. | 713/193 |
| 7,120,802 B2 | 10/2006 | Shear et al. | 713/194 |
| 7,124,092 B2 | 10/2006 | O'Toole, Jr. et al. | 705/14 |
| 7,124,302 B2 | 10/2006 | Ginter et al. | 713/189 |
| 7,127,464 B2 | 10/2006 | Wesinger, Jr. et al. | 707/10 |
| 7,127,478 B1 | 10/2006 | Schoenwolf et al. | 707/204 |
| 7,127,495 B2 | 10/2006 | Brown | 709/217 |
| 7,130,807 B1 | 10/2006 | Mikurak | 705/7 |
| 7,130,818 B2 | 10/2006 | Fisher et al. | 705/26 |
| 7,130,823 B1 | 10/2006 | Rayner et al. | 705/37 |
| 7,130,828 B2 | 10/2006 | Phillips et al. | 705/41 |
| 7,130,888 B1 | 10/2006 | Hickman et al. | 709/208 |
| 7,131,890 B1 | 11/2006 | Molnar | 451/8 |
| 7,133,835 B1 | 11/2006 | Fusz et al. | 705/26 |
| 7,133,845 B1 | 11/2006 | Ginter et al. | 705/51 |
| 7,133,846 B1 | 11/2006 | Ginter et al. | 705/54 |
| 7,136,710 B1 * | 11/2006 | Hoffberg et al. | 700/83 |
| 7,136,835 B1 | 11/2006 | Flitcroft et al. | 705/39 |
| 7,139,726 B2 | 11/2006 | Fisher et al. | 705/26 |
| 7,139,743 B2 | 11/2006 | Indeck et al. | 707/1 |
| 7,143,062 B2 | 11/2006 | Turk et al. | 705/38 |
| 7,143,063 B2 | 11/2006 | Lent et al. | 705/38 |
| 7,143,066 B2 | 11/2006 | Shear et al. | 705/54 |
| 7,143,290 B1 | 11/2006 | Ginter et al. | 713/176 |
| 7,143,337 B2 | 11/2006 | Landsman et al. | 715/500 |
| 7,146,341 B1 | 12/2006 | Light et al. | 705/64 |
| 7,149,303 B1 | 12/2006 | Laurinavichus | 379/265.01 |
| 7,149,716 B2 | 12/2006 | Gatto | 705/36 R |
| 7,149,720 B1 | 12/2006 | Shepherd | 705/37 |
| 7,149,958 B2 | 12/2006 | Landsman et al. | 715/500 |
| 7,152,045 B2 | 12/2006 | Hoffman | 705/43 |
| 7,152,200 B2 | 12/2006 | Albert et al. | 715/500 |
| 7,152,208 B2 | 12/2006 | Ohashi | 715/530 |
| 7,155,157 B2 | 12/2006 | Kaplan | 434/350 |
| 7,155,663 B2 | 12/2006 | Landsman et al. | 715/500 |
| 7,158,947 B1 | 1/2007 | Findley | 705/26 |
| 7,159,037 B1 | 1/2007 | Philyaw et al. | 709/245 |
| 7,159,043 B2 | 1/2007 | Bateman et al. | 710/6 |
| 7,162,434 B1 | 1/2007 | Walker et al. | 705/14 |
| 7,165,174 B1 | 1/2007 | Ginter et al. | 713/153 |
| 7,167,818 B2 | 1/2007 | Brown | 703/11 |
| 7,167,838 B1 | 1/2007 | Gatto | 705/36 R |
| 7,171,388 B2 | 1/2007 | Phillips et al. | 705/41 |
| 7,171,446 B1 | 1/2007 | Gosling et al. | 709/203 |
| 7,174,314 B2 | 2/2007 | Phillips et al. | 705/41 |
| 7,174,315 B2 | 2/2007 | Phillips et al. | 705/41 |
| 7,174,316 B2 | 2/2007 | Phillips et al. | 705/41 |
| 7,174,317 B2 | 2/2007 | Phillips et al. | 705/41 |
| 7,178,020 B2 | 2/2007 | DiRienzo | 713/153 |
| 7,181,410 B1 | 2/2007 | Jones et al. | 705/6 |
| 7,184,977 B1 | 2/2007 | Crim et al. | 705/34 |

| Patent No. | Date | Inventor | Class |
|---|---|---|---|
| 7,184,990 B2 | 2/2007 | Walker et al. | 705/400 |
| 7,194,423 B2 | 3/2007 | Walker et al. | 705/14 |
| 7,194,436 B2 | 3/2007 | Tammaro | 705/38 |
| 7,197,444 B2 | 3/2007 | Bomar, Jr. et al. | 703/8 |
| 7,197,481 B1 | 3/2007 | Yamamoto et al. | 705/28 |
| 7,197,543 B2 | 3/2007 | Philyaw et al. | 709/217 |
| 7,201,580 B2 | 4/2007 | Ho et al. | 434/30 |
| 7,203,656 B2 | 4/2007 | Lotvin et al. | 705/13 |
| 7,203,661 B1 | 4/2007 | Graff | 705/36 R |
| 7,203,725 B1 | 4/2007 | Gilmour et al. | 709/206 |
| 7,206,748 B1 | 4/2007 | Gruse et al. | 705/1 |
| 7,206,763 B2 | 4/2007 | Turk | 705/39 |
| 7,210,148 B2 | 4/2007 | Arnold et al. | 719/330 |
| 7,213,003 B1 | 5/2007 | Kight et al. | 705/40 |
| 7,216,084 B2 | 5/2007 | Brinkman et al. | 705/2 |
| 7,222,079 B1 | 5/2007 | Seare et al. | 705/3 |
| 7,222,085 B2 | 5/2007 | Stack | 705/10 |
| 7,222,087 B1 | 5/2007 | Bezos et al. | 705/26 |
| 7,222,111 B1 | 5/2007 | Budike, Jr. | 705/412 |
| 7,222,156 B2 | 5/2007 | Gupta et al. | 709/206 |
| 7,223,235 B2 | 5/2007 | Brown | 600/300 |
| 7,223,236 B2 | 5/2007 | Brown | 600/300 |
| 7,225,142 B1 | 5/2007 | Apte et al. | 705/14 |
| 7,228,187 B2 | 6/2007 | Tich et al. | 700/83 |
| 7,228,199 B2 | 6/2007 | Wallace | 700/236 |
| 7,228,282 B1 | 6/2007 | Philyaw et al. | 705/1 |
| 7,233,912 B2 | 6/2007 | Walker et al. | 705/14 |
| 7,233,913 B2 | 6/2007 | Scroggie et al. | 705/14 |
| 7,233,948 B1 | 6/2007 | Shamoon et al. | 707/9 |
| 7,236,942 B1 | 6/2007 | Walker et al. | 705/14 |
| 7,240,022 B1 | 7/2007 | Bistriceanu et al. | 705/14 |
| 7,240,023 B1 | 7/2007 | Powell | 705/14 |
| 7,240,031 B1 | 7/2007 | Kight et al. | 705/40 |
| 7,241,219 B2 | 7/2007 | Walker et al. | 463/20 |
| 7,243,081 B2 | 7/2007 | Friend et al. | 705/36 |
| 7,246,093 B1 | 7/2007 | Katz | 705/37 |
| 7,248,719 B2 | 7/2007 | Hoffman et al. | 382/115 |
| 7,249,027 B1 | 7/2007 | Ausubel | 705/1 |
| 7,249,114 B2 | 7/2007 | Burchetta et al. | 705/80 |
| 7,252,636 B2 | 8/2007 | Brown | 600/300 |
| 7,257,566 B2 | 8/2007 | Danielson et al. | 706/52 |
| 7,257,604 B1 | 8/2007 | Wolfe | |
| 7,257,614 B2 | 8/2007 | Philyaw et al. | 709/202 |
| 7,258,666 B2 | 8/2007 | Brown | 600/300 |
| 7,263,497 B1 | 8/2007 | Wiser et al. | 705/26 |
| 7,264,591 B2 | 9/2007 | Brown | 600/300 |
| 7,265,853 B1 | 9/2007 | Kara et al. | 358/115 |
| 7,269,564 B1 | 9/2007 | Milsted et al. | 705/1 |
| 7,269,591 B2 | 9/2007 | Wesinger, Jr. et al. | 707/10 |
| 7,272,569 B1 | 9/2007 | Walker et al. | 705/16 |
| 7,272,639 B1 | 9/2007 | Levergood et al. | 709/218 |
| 7,277,865 B1 | 10/2007 | Silverstone et al. | 705/26 |
| 7,277,867 B2 | 10/2007 | Brown et al. | 705/37 |
| 7,280,979 B1 | 10/2007 | Katz et al. | 705/26 |
| 7,281,133 B2 | 10/2007 | Ginter et al. | 713/176 |
| 7,283,973 B1 | 10/2007 | Loghmani et al. | 705/26 |
| 7,283,974 B2 | 10/2007 | Katz et al. | 705/26 |
| 7,284,066 B1 | 10/2007 | Philyaw et al. | 709/238 |
| 7,287,091 B2 | 10/2007 | Philyaw et al. | 709/238 |
| 7,289,971 B1 | 10/2007 | O'Neil et al. | 705/44 |
| 7,297,109 B2 | 11/2007 | Brown | 600/300 |
| 7,297,111 B2 | 11/2007 | Iliff | 600/300 |
| 7,298,851 B1 | 11/2007 | Hendricks et al. | 380/282 |
| 7,299,201 B2 | 11/2007 | Jammes et al. | 705/26 |
| 7,299,501 B2 | 11/2007 | Hendricks | 726/27 |
| 7,300,402 B2 | 11/2007 | Iliff | 600/300 |
| 7,302,415 B1 | 11/2007 | Saito | 705/557 |
| 7,303,081 B2 | 12/2007 | Mallett et al. | 209/702 |
| 7,305,278 B2 | 12/2007 | Enright et al. | 700/115 |
| 7,305,348 B1 | 12/2007 | Brown | 705/1 |
| 7,305,371 B2 | 12/2007 | Brueckner et al. | 706/45 |
| 7,305,451 B2 | 12/2007 | San Andres et al. | 709/216 |
| 7,306,560 B2 | 12/2007 | Iliff | 600/300 |
| 7,308,483 B2 | 12/2007 | Philyaw | 709/217 |
| 7,310,051 B2 | 12/2007 | Lawrence | |
| 7,310,668 B2 | 12/2007 | Brown | 709/224 |
| 7,311,207 B2 | 12/2007 | Mallett et al. | 209/702 |
| 7,313,431 B2 | 12/2007 | Uber, III et al. | 600/431 |
| 7,314,173 B2 | 1/2008 | Philyaw et al. | 235/454 |
| 7,318,106 B2 | 1/2008 | Philyaw | 709/238 |
| 7,318,224 B2 | 1/2008 | Honarvar et al. | 717/170 |
| 7,318,529 B2 | 1/2008 | Mallett et al. | 209/702 |
| 7,319,477 B2 | 1/2008 | Katz | |
| 7,319,886 B2 | 1/2008 | Tokoro | |
| 7,319,976 B1 | 1/2008 | Peckover | 705/14 |
| 7,320,030 B2 | 1/2008 | Brown | 709/224 |
| 7,321,748 B2 | 1/2008 | Tokoro | 455/303 |
| 7,321,871 B2 | 1/2008 | Scott et al. | 705/36 R |
| 7,321,876 B1 | 1/2008 | Wolfston | 705/39 |
| 7,321,883 B1 | 1/2008 | Freedy et al. | 706/45 |
| 7,321,941 B1 | 1/2008 | Philyaw et al. | 709/245 |
| 7,324,972 B1 | 1/2008 | Oliver et al. | 705/40 |
| 7,333,851 B2 | 2/2008 | Echauz et al. | 600/544 |
| 7,333,953 B1 | 2/2008 | Banaugh et al. | 705/40 |
| 7,334,024 B2 | 2/2008 | Martino | 709/217 |
| 7,336,788 B1 | 2/2008 | Hendricks | 380/239 |
| 7,337,133 B1 | 2/2008 | Bezos et al. | 705/27 |
| RE40,186 E | 3/2008 | Walker et al. | 705/14 |
| 7,340,045 B2 | 3/2008 | Felger | |
| 7,343,222 B2 | 3/2008 | Solomon | 700/245 |
| 7,343,492 B2 | 3/2008 | Moskowitz et al. | 713/176 |
| 7,344,496 B2 | 3/2008 | Iliff | 600/300 |
| 7,346,564 B1 | 3/2008 | Kirklin et al. | 705/28 |
| 7,346,768 B2 | 3/2008 | DiRienzo | 713/150 |
| 7,346,858 B1 | 3/2008 | Berg et al. | 715/853 |
| 7,351,142 B2 | 4/2008 | Walker et al. | 463/17 |
| 7,353,180 B1 | 4/2008 | Silverstone et al. | 705/7 |
| 7,356,502 B1 | 4/2008 | LaBadie et al. | 705/38 |
| 7,360,244 B2 | 4/2008 | Coley et al. | 726/11 |
| 7,362,775 B1 | 4/2008 | Moskowitz | 370/468 |
| 7,363,273 B2 | 4/2008 | Phillips et al. | 705/41 |
| 7,364,068 B1 | 4/2008 | Strubbe et al. | 235/376 |
| 7,370,008 B1 | 5/2008 | Hill | 705/27 |
| 7,370,114 B1 | 5/2008 | Philyaw et al. | 709/231 |
| 7,376,891 B2 | 5/2008 | Hitchock et al. | 715/221 |
| 7,379,900 B1 | 5/2008 | Wren | 705/26 |
| 7,379,901 B1 | 5/2008 | Philyaw | 705/26 |
| 7,380,273 B2 | 5/2008 | Coley et al. | 726/12 |
| 7,383,200 B1 | 6/2008 | Walker et al. | 705/10 |
| 7,383,220 B1 | 6/2008 | Keith | 705/37 |
| 7,383,222 B2 | 6/2008 | Keith | 705/37 |
| 7,383,226 B2 | 6/2008 | Kight et al. | 705/40 |
| 7,383,333 B2 | 6/2008 | Philyaw et al. | 709/224 |
| 7,383,447 B2 | 6/2008 | Saito | 713/193 |
| 7,383,573 B2 | 6/2008 | Coley et al. | 726/12 |
| 7,386,508 B1 | 6/2008 | Walker et al. | 705/39 |
| 7,386,600 B1 | 6/2008 | Philyaw | 709/224 |
| 7,389,211 B2 | 6/2008 | Abu El Ata et al. | 703/2 |
| 7,389,331 B2 | 6/2008 | Van Wyngarden | 709/219 |
| 7,392,095 B2 | 6/2008 | Flynn et al. | 607/127 |
| 7,392,167 B2 | 6/2008 | Brown | 703/11 |
| 7,392,285 B2 | 6/2008 | Philyaw | 709/204 |
| 7,392,312 B1 | 6/2008 | Philyaw | 709/225 |
| 7,392,395 B2 | 6/2008 | Ginter et al. | 713/176 |
| 7,392,945 B1 | 7/2008 | Philyaw | 235/383 |
| 7,395,226 B2 | 7/2008 | Messer | 705/26 |
| 7,398,244 B1 | 7/2008 | Keith | 705/37 |
| 7,398,458 B2 | 7/2008 | Ferguson | 714/796 |
| 7,398,541 B2 | 7/2008 | Bennington et al. | 725/40 |
| 7,401,059 B1 | 7/2008 | Owen et al. | 706/46 |
| 7,401,286 B1 | 7/2008 | Hendricks et al. | 715/203 |
| 7,403,901 B1 * | 7/2008 | Carley et al. | 705/2 |
| 7,403,922 B1 | 7/2008 | Lewis et al. | 705/38 |
| 7,404,207 B2 | 7/2008 | Perry | 726/15 |
| 7,409,073 B2 | 8/2008 | Moskowitz et al. | 382/100 |
| 7,409,632 B1 | 8/2008 | DiRienzo | 715/226 |
| 7,412,434 B1 | 8/2008 | Klug et al. | 707/1 |
| 7,412,666 B2 | 8/2008 | Philyaw | 715/852 |
| 7,415,511 B2 | 8/2008 | Philyaw et al. | 709/219 |
| 7,415,617 B2 | 8/2008 | Ginter et al. | 713/189 |
| 7,418,397 B2 | 8/2008 | Kojima et al. | 705/1 |
| 7,418,483 B2 | 8/2008 | Hess et al. | 709/219 |
| 7,421,724 B2 | 9/2008 | Klosterman et al. | 725/42 |
| 7,424,521 B1 | 9/2008 | Philyaw et al. | 709/219 |
| 7,424,737 B2 | 9/2008 | Wesinger, Jr. et al. | 726/11 |
| 7,425,978 B2 | 9/2008 | Katz | |
| 7,426,495 B1 | 9/2008 | Corless | 705/75 |
| 7,427,281 B2 | 9/2008 | Uber, III | 604/508 |

| Patent | Type | Date | Inventor | Class |
|---|---|---|---|---|
| 7,428,511 | B2 | 9/2008 | Takahashi et al. | 705/44 |
| 7,433,828 | B2 | 10/2008 | Brinkman et al. | 705/3 |
| 7,437,313 | B1 | 10/2008 | Mussman | 705/26 |
| 7,437,431 | B2 | 10/2008 | San Andres et al. | 709/219 |
| 7,437,475 | B2 | 10/2008 | Philyaw | 709/238 |
| 7,440,907 | B2 | 10/2008 | Lilly et al. | 705/8 |
| 7,440,993 | B1 | 10/2008 | Philyaw et al. | 709/203 |
| RE40,576 | E | 11/2008 | Goodwin, III | 709/232 |
| 7,447,914 | B1 | 11/2008 | Saito | 713/191 |
| 7,448,040 | B2 | 11/2008 | Ellis et al. | 719/310 |
| 7,451,005 | B2 * | 11/2008 | Hoffberg et al. | 700/83 |
| 7,451,892 | B2 | 11/2008 | Walker et al. | 221/237 |
| 7,454,358 | B2 | 11/2008 | Mallett et al. | 705/1 |
| 7,454,381 | B2 | 11/2008 | Walker et al. | 705/37 |
| 7,457,962 | B2 | 11/2008 | Moskowitz | 713/176 |
| 7,463,925 | B2 | 12/2008 | Kramer | 607/15 |
| 7,469,339 | B2 | 12/2008 | Everett et al. | 713/172 |
| 7,471,981 | B2 | 12/2008 | Kramer | 607/9 |
| 7,472,074 | B1 | 12/2008 | Walker et al. | 705/26 |
| 7,475,028 | B2 | 1/2009 | Loeb et al. | 705/26 |
| 7,475,039 | B2 | 1/2009 | Remington et al. | 705/40 |
| 7,475,043 | B2 | 1/2009 | Light et al. | 705/64 |
| 7,478,066 | B2 | 1/2009 | Remington et al. | 705/40 |
| 7,478,076 | B1 | 1/2009 | Owen et al. | 706/46 |
| 7,478,239 | B1 | 1/2009 | Rosen | 713/172 |
| 7,479,060 | B2 | 1/2009 | Walker et al. | 463/17 |
| 7,480,929 | B2 | 1/2009 | Klosterman et al. | 725/44 |
| 7,483,739 | B2 | 1/2009 | Kramer | 607/9 |
| 7,483,871 | B2 | 1/2009 | Herz | 707/2 |
| 7,487,117 | B1 | 2/2009 | Tamura et al. | 705/27 |
| 7,487,128 | B2 | 2/2009 | Spagna et al. | 705/51 |
| 7,487,155 | B2 | 2/2009 | Jebens et al. | 707/10 |
| 7,490,135 | B2 | 2/2009 | Klug et al. | 709/217 |
| 7,493,283 | B1 | 2/2009 | Philyaw | 705/26 |
| 7,493,384 | B1 | 2/2009 | Philyaw | 709/224 |
| 7,493,641 | B2 | 2/2009 | Klosterman et al. | 725/44 |
| 7,494,417 | B2 | 2/2009 | Walker et al. | 463/25 |
| 7,496,523 | B2 | 2/2009 | Walker et al. | 705/14 |
| 7,496,638 | B2 | 2/2009 | Philyaw | 709/217 |
| 7,499,898 | B1 | 3/2009 | Owen et al. | 706/46 |
| 7,499,979 | B2 | 3/2009 | Hess et al. | 709/213 |
| 7,502,832 | B2 | 3/2009 | San Andres et al. | 709/216 |
| 7,505,913 | B2 | 3/2009 | Tobin | 705/1 |
| 7,505,915 | B2 | 3/2009 | Silverman et al. | 705/1 |
| 7,505,922 | B1 | 3/2009 | Philyaw | 705/26 |
| 7,505,939 | B2 | 3/2009 | Lent et al. | 705/38 |
| 7,506,020 | B2 | 3/2009 | Ellis | 709/201 |
| 7,508,840 | B2 | 3/2009 | Delaney | 370/466 |
| 7,509,268 | B2 | 3/2009 | Walker et al. | 705/14 |
| 7,509,270 | B1 | 3/2009 | Hendricks et al. | 705/26 |
| 7,509,277 | B1 | 3/2009 | Gatto | 705/36 R |
| 7,509,360 | B2 | 3/2009 | Wollrath et al. | 707/206 |
| 7,512,548 | B1 | 3/2009 | Bezos et al. | 705/26 |
| 7,516,088 | B2 | 4/2009 | Johnson et al. | 705/16 |
| 7,516,089 | B1 | 4/2009 | Walker et al. | 705/26 |
| 7,516,101 | B2 | 4/2009 | Remington et al. | 705/40 |
| 7,516,192 | B2 | 4/2009 | Brown | 709/217 |
| 7,519,444 | B2 | 4/2009 | Lilly et al. | 700/100 |
| 7,519,549 | B1 | 4/2009 | Johnson et al. | 705/28 |
| 7,523,063 | B2 | 4/2009 | Harrington et al. | 705/37 |
| 7,523,161 | B2 | 4/2009 | Philyaw | 709/204 |
| 7,533,064 | B1 | 5/2009 | Boesch | 705/67 |
| 7,533,171 | B2 | 5/2009 | Brown | 709/224 |
| 7,533,177 | B2 | 5/2009 | Philyaw et al. | 709/227 |
| 7,536,352 | B2 | 5/2009 | Lapsley et al. | 705/44 |
| 7,536,478 | B2 | 5/2009 | Philyaw et al. | 709/238 |
| 7,539,637 | B2 | 5/2009 | Gatto | 705/36 R |
| 7,539,648 | B1 | 5/2009 | Cordery et al. | 705/60 |
| 7,542,919 | B1 | 6/2009 | Mueller et al. | 705/16 |
| 7,545,816 | B1 | 6/2009 | Coutts et al. | 370/400 |
| 7,546,254 | B2 | 6/2009 | Bednarek | 705/26 |
| 7,546,267 | B2 | 6/2009 | Wallman | 705/37 |
| 7,546,277 | B1 | 6/2009 | Tedesco et al. | 705/400 |
| 7,546,346 | B2 | 6/2009 | Ouchi | 709/206 |
| 7,547,251 | B2 | 6/2009 | Walker et al. | 463/17 |
| 7,548,988 | B2 | 6/2009 | Philyaw et al. | 709/231 |
| 7,552,082 | B2 | 6/2009 | Wallman | 705/37 |
| 7,552,090 | B1 | 6/2009 | Barber | 705/40 |
| 7,552,190 | B1 | 6/2009 | Freishtat et al. | 709/217 |
| 7,555,458 | B1 | 6/2009 | Felger | 705/38 |
| 7,558,407 | B2 | 7/2009 | Hoffman et al. | 382/115 |
| 7,558,752 | B1 | 7/2009 | Ephrati et al. | 705/37 |
| 7,558,838 | B2 | 7/2009 | Philyaw | 709/217 |
| 7,562,040 | B2 | 7/2009 | Loeper | 705/36 R |
| 7,567,934 | B2 | 7/2009 | Flitcroft et al. | 705/37 |
| 7,568,100 | B1 | 7/2009 | Moskowitz et al. | 713/176 |
| 7,571,136 | B2 | 8/2009 | May | 705/37 |
| 7,571,850 | B2 | 8/2009 | Barcelou | 235/379 |
| 7,572,169 | B1 | 8/2009 | Molnar | 451/8 |
| 7,575,158 | B2 | 8/2009 | Barcelou | 235/379 |
| 7,577,092 | B2 | 8/2009 | San Andres et al. | 370/230 |
| 7,577,609 | B1 | 8/2009 | Maher | 705/39 |
| 7,580,860 | B2 | 8/2009 | Junger | 705/22 |
| 7,581,092 | B2 | 8/2009 | Shear et al. | 713/2 |
| RE40,924 | E | 9/2009 | Nicholls et al. | 705/28 |
| 7,584,108 | B2 | 9/2009 | Brown | 705/2 |
| 7,584,358 | B2 | 9/2009 | Everett et al. | 713/172 |
| 7,587,333 | B1 | 9/2009 | Walker et al. | 705/15 |
| 7,587,334 | B2 | 9/2009 | Walker et al. | 705/16 |
| 7,587,469 | B2 | 9/2009 | Brown | 709/217 |
| 7,590,549 | B2 | 9/2009 | Brown | 705/2 |
| 7,590,853 | B1 | 9/2009 | Shear et al. | 713/176 |
| 7,590,866 | B2 | 9/2009 | Hurtado et al. | 713/189 |
| 7,591,420 | B2 | 9/2009 | Barcelou | 235/380 |
| 7,593,869 | B2 | 9/2009 | Nahan et al. | 705/26 |
| 7,593,870 | B2 | 9/2009 | Jalili | 705/26 |
| 7,593,896 | B1 | 9/2009 | Flitcroft et al. | 705/39 |
| 7,596,510 | B2 | 9/2009 | Fisher et al. | 705/26 |
| 7,596,786 | B2 | 9/2009 | Philyaw et al. | 717/174 |
| 7,597,248 | B2 | 10/2009 | Barcelou | 235/379 |
| 7,597,251 | B2 | 10/2009 | Barcelou | 235/380 |
| 7,600,007 | B1 | 10/2009 | Lewis | 709/223 |
| 7,600,677 | B2 | 10/2009 | Barcelou | 235/380 |
| 7,603,308 | B2 | 10/2009 | Gatto | 705/36 R |
| 7,603,690 | B2 | 10/2009 | Knudson et al. | 725/105 |
| 7,606,355 | B2 | 10/2009 | Hutchison et al. | |
| 7,606,401 | B2 | 10/2009 | Hoffman et al. | 382/124 |
| 7,606,729 | B1 | 10/2009 | Walker et al. | 705/14 |
| 7,606,737 | B2 | 10/2009 | Hutchison et al. | 705/26 |
| 7,606,854 | B2 | 10/2009 | Ellis, III | 709/201 |
| 7,610,217 | B1 | 10/2009 | Mori et al. | 705/26 |
| 7,610,245 | B2 | 10/2009 | Dent et al. | 705/40 |
| 7,613,590 | B2 | 11/2009 | Brown | 702/188 |
| 7,613,621 | B2 | 11/2009 | Brown | 705/2 |
| 7,613,633 | B1 | 11/2009 | Woolston | 705/26 |
| 7,613,652 | B2 | 11/2009 | Young et al. | 705/37 |
| 7,613,659 | B1 | 11/2009 | Hoffman et al. | 705/44 |
| 7,617,125 | B1 | 11/2009 | Light et al. | 705/26 |
| 7,617,973 | B2 | 11/2009 | Barcelou | 235/380 |
| 7,620,605 | B2 | 11/2009 | Hoffman et al. | 705/52 |
| 7,620,619 | B1 | 11/2009 | Walker et al. | 707/3 |
| 7,621,444 | B2 | 11/2009 | Barcelou | 235/379 |
| 7,624,028 | B1 | 11/2009 | Brown | 705/3 |
| 7,624,044 | B2 | 11/2009 | Wren | 705/26 |
| 7,627,499 | B2 | 12/2009 | Hahn-Carlson | 705/26 |
| 7,630,919 | B1 | 12/2009 | Obrecht | 705/26 |
| 7,631,193 | B1 | 12/2009 | Hoffman | 713/186 |
| 7,634,529 | B2 | 12/2009 | Ellis, III | 709/201 |
| 7,636,667 | B2 | 12/2009 | Brown | 705/2 |
| 7,636,688 | B2 | 12/2009 | Kitchen et al. | 705/39 |
| 7,636,689 | B2 | 12/2009 | Dent et al. | 705/40 |
| 7,636,788 | B2 | 12/2009 | Philyaw et al. | 709/238 |
| 7,643,971 | B2 | 1/2010 | Brown | 703/2 |
| 7,647,241 | B1 | 1/2010 | Lilly et al. | 705/10 |
| 7,647,243 | B2 | 1/2010 | Woolston | 705/26 |
| 7,647,269 | B2 | 1/2010 | Brett | 705/37 |
| 7,647,502 | B2 | 1/2010 | Moskowitz | 713/176 |
| 7,647,503 | B2 | 1/2010 | Moskowitz | 713/176 |
| 7,653,687 | B2 | 1/2010 | Reisman | 709/203 |
| 7,657,484 | B2 | 2/2010 | Ganesan et al. | 705/40 |
| 7,657,560 | B1 | 2/2010 | DiRienzo | |
| 7,657,561 | B2 | 2/2010 | Gibbon et al. | |
| 7,660,744 | B2 | 2/2010 | Philippe et al. | 705/26 |
| 7,660,874 | B1 | 2/2010 | Meltzer et al. | 709/218 |
| 7,661,590 | B1 | 2/2010 | Gatto | 235/384 |
| 7,664,263 | B2 | 2/2010 | Moskowitz | 380/205 |
| 7,664,672 | B1 | 2/2010 | Walker et al. | 705/26 |
| 7,664,958 | B2 | 2/2010 | Moskowitz | 713/176 |

| Patent | Type | Date | Inventor | Class |
|---|---|---|---|---|
| 7,665,109 | B2 | 2/2010 | Matthews, III et al. | 725/51 |
| 7,665,656 | B2 | 2/2010 | Gatto | 235/379 |
| 7,668,782 | B1 | 2/2010 | Reistad et al. | 705/50 |
| 7,668,886 | B2 | 2/2010 | Hartman et al. | 707/705 |
| 7,669,055 | B2 | 2/2010 | Everett et al. | 713/173 |
| 7,669,762 | B2 | 3/2010 | Hutchison et al. | 235/383 |
| 7,672,892 | B2 | 3/2010 | Odom et al. | 705/37 |
| 7,684,999 | B2 | 3/2010 | Brown | 705/2 |
| 7,685,046 | B2 | 3/2010 | Wallman | 705/36 R |
| 7,685,053 | B2 | 3/2010 | Graff | 705/37 |
| 7,689,440 | B2 | 3/2010 | Brown | 705/2 |
| 7,689,468 | B2 | 3/2010 | Walker et al. | 705/26 |
| 7,689,497 | B2 | 3/2010 | May | 705/37 |
| 7,689,684 | B2 | 3/2010 | Donoho et al. | 709/224 |
| 7,689,826 | B2 | 3/2010 | Everett et al. | 713/173 |
| 7,693,748 | B1 | 4/2010 | Mesaros | 705/26 |
| 7,693,790 | B2 | 4/2010 | Lawlor et al. | 705/40 |
| 7,693,796 | B2 | 4/2010 | Light et al. | 705/64 |
| 7,694,129 | B2 | 4/2010 | DiRienzo | 713/153 |
| 7,698,173 | B1 | 4/2010 | Burge et al. | 705/26 |
| 7,698,210 | B2 | 4/2010 | Brett | 705/37 |
| 7,698,567 | B2 | 4/2010 | Hoffman | 713/186 |
| 7,699,220 | B2 | 4/2010 | Barcelou | 235/380 |
| 7,702,540 | B1 | 4/2010 | Woolston | 705/26 |
| 7,702,736 | B2 | 4/2010 | Ouchi | 709/206 |
| 7,702,737 | B2 | 4/2010 | Ouchi | 709/206 |
| 7,702,752 | B2 | 4/2010 | Kirsch et al. | 709/219 |
| 7,702,908 | B2 | 4/2010 | Everett et al. | 713/172 |
| 7,703,683 | B2 | 4/2010 | Rathus et al. | |
| 7,707,259 | B2 | 4/2010 | Ouchi | 709/206 |
| 7,707,270 | B2 | 4/2010 | Brown | 709/217 |
| 7,707,408 | B2 | 4/2010 | Everett et al. | 713/160 |
| 7,708,199 | B2 | 5/2010 | Gatto | 235/381 |
| 7,711,599 | B1 | 5/2010 | Libman | |
| 7,711,604 | B1 | 5/2010 | Walker et al. | 705/26 |
| 7,711,650 | B1 | 5/2010 | Kara | 705/60 |
| 7,711,658 | B2 | 5/2010 | Tedesco et al. | 705/400 |
| 7,712,668 | B2 | 5/2010 | Rathus et al. | |
| 7,716,088 | B2 | 5/2010 | Spiegel et al. | 705/27 |
| 7,716,349 | B1 | 5/2010 | Hendricks | 709/229 |
| 7,717,344 | B2 | 5/2010 | Rathus et al. | |
| 7,717,784 | B2 | 5/2010 | Walker et al. | 463/17 |
| 7,720,705 | B2 | 5/2010 | Stein | 705/10 |
| 7,720,746 | B2 | 5/2010 | Brett | 705/37 |
| 7,725,375 | B2 | 5/2010 | Shepherd | 705/35 |
| 7,725,570 | B1 | 5/2010 | Lewis | 709/224 |
| 7,725,571 | B1 | 5/2010 | Lewis | 709/224 |
| 7,730,172 | B1 | 6/2010 | Lewis | 709/224 |
| 7,730,177 | B2 | 6/2010 | Brown | 709/224 |
| 7,730,310 | B2 | 6/2010 | Everett et al. | 713/172 |
| 7,730,311 | B2 | 6/2010 | Everett et al. | 713/172 |
| 7,730,312 | B2 | 6/2010 | Everett et al. | 713/172 |
| 7,730,317 | B2 | 6/2010 | Moskowitz et al. | 713/176 |
| 7,730,323 | B2 | 6/2010 | Saito | 713/189 |
| 7,730,324 | B2 | 6/2010 | Saito | 713/191 |
| 7,734,553 | B2 | 6/2010 | Shear et al. | 705/64 |
| 7,734,718 | B2 | 6/2010 | Brown | 709/217 |
| 7,734,747 | B2 | 6/2010 | Murphy et al. | 709/223 |
| 7,734,923 | B2 | 6/2010 | Everett et al. | 713/172 |
| 7,738,659 | B2 | 6/2010 | Moskowitz | 380/252 |
| 7,739,353 | B2 | 6/2010 | Philyaw | 709/217 |
| 7,747,463 | B1 | 6/2010 | Phillips et al. | |
| 7,747,476 | B2 | 6/2010 | Messer | 705/27 |
| 7,747,507 | B2 | 6/2010 | Brett | 705/37 |
| 7,747,527 | B1 | 6/2010 | Korala | 705/43 |
| 7,752,466 | B2 | 7/2010 | Ginter et al. | 713/194 |
| 7,756,746 | B2 | 7/2010 | Walker et al. | 705/15 |
| 7,756,781 | B2 | 7/2010 | Lent et al. | 705/38 |
| 7,757,254 | B2 | 7/2010 | Shoff et al. | 725/44 |
| 7,761,308 | B2 | 7/2010 | Falchuk et al. | 705/2 |
| 7,761,312 | B2 | 7/2010 | Brown | 705/3 |
| 7,761,712 | B2 | 7/2010 | Moskowitz et al. | 713/176 |
| 7,761,916 | B2 | 7/2010 | Shear et al. | 726/22 |
| 7,765,112 | B2 | 7/2010 | Brown | 705/2 |
| 7,765,138 | B2 | 7/2010 | Loeper | 705/36 R |
| 7,765,279 | B1 | 7/2010 | Kaib et al. | 709/218 |
| 7,769,001 | B2 | 8/2010 | Narasimhan et al. | 370/356 |
| 7,769,600 | B2 | 8/2010 | Iliff | 705/2 |
| 7,769,605 | B2 | 8/2010 | Brown | 705/3 |
| 7,769,644 | B2 | 8/2010 | Naghshineh et al. | 705/28 |
| 7,769,673 | B2 | 8/2010 | Brett | 705/37 |
| 7,770,017 | B2 | 8/2010 | Moskowitz et al. | 713/176 |
| 7,774,230 | B2 | 8/2010 | Libman | |
| 7,774,257 | B2 | 8/2010 | Maggioncalda et al. | 705/36 R |
| 7,774,264 | B1 | 8/2010 | Ausubel | 705/37 |
| 7,774,812 | B2 | 8/2010 | Knudson et al. | 725/45 |
| 7,774,934 | B2 | 8/2010 | Sundberg et al. | 29/876 |
| 7,778,395 | B2 | 8/2010 | Martino | 379/671 |
| 7,778,845 | B2 | 8/2010 | Brown | 705/2 |
| 7,778,867 | B2 | 8/2010 | Libman | 705/141 |
| 7,778,901 | B2 | 8/2010 | Ganesan et al. | 705/35 |
| 7,779,125 | B2 | 8/2010 | Wyngarden | 709/225 |
| 7,779,261 | B2 | 8/2010 | Moskowitz et al. | 713/176 |
| 7,788,155 | B2 | 8/2010 | Jones et al. | 705/36 R |
| 7,788,189 | B2 | 8/2010 | Budike, Jr. | 705/400 |
| RE41,657 | E | 9/2010 | Saito | 705/51 |
| 7,792,696 | B1 | 9/2010 | Philyaw et al. | 705/141 |
| 7,792,702 | B1 | 9/2010 | Katz et al. | 705/26 |
| 7,792,705 | B2 | 9/2010 | Bezos et al. | 705/26 |
| 7,792,707 | B2 | 9/2010 | Alaia et al. | 705/26 |
| 7,792,986 | B2 | 9/2010 | Donoho et al. | 709/236 |
| 7,793,830 | B2 | 9/2010 | Barcelou | 235/379 |
| 7,797,164 | B2 | 9/2010 | Junger et al. | 705/1 |
| 7,801,767 | B2 | 9/2010 | Fisher et al. | 705/26 |
| 7,801,817 | B2 | 9/2010 | Saito | 705/51 |
| 7,802,718 | B2 | 9/2010 | Barcelou | 235/379 |
| 7,805,368 | B2 | 9/2010 | Phillips et al. | 705/41 |
| 7,805,756 | B2 | 9/2010 | Ellis | 726/11 |
| RE41,903 | E | 10/2010 | Wenig et al. | 709/203 |
| 7,809,642 | B1 | 10/2010 | Phillips et al. | 705/41 |
| 7,809,643 | B2 | 10/2010 | Phillips et al. | 705/41 |
| 7,813,822 | B1 * | 10/2010 | Hoffberg | 700/94 |
| 7,813,966 | B2 | 10/2010 | Alaia et al. | 705/26 |
| 7,813,989 | B2 | 10/2010 | Jones et al. | 705/36 R |
| 7,814,143 | B2 | 10/2010 | Brown et al. | 709/203 |
| 7,814,233 | B2 | 10/2010 | Ellis | 709/250 |
| 7,818,253 | B2 | 10/2010 | Phillips et al. | 705/41 |
| 7,818,284 | B1 | 10/2010 | Walker et al. | 707/102 |
| 7,818,399 | B1 | 10/2010 | Ross, Jr. et al. | 709/218 |
| 7,818,423 | B1 | 10/2010 | Philyaw | 709/225 |
| 7,819,316 | B2 | 10/2010 | Philyaw | 235/383 |
| 7,822,197 | B2 | 10/2010 | Moskowitz | 380/28 |
| 7,822,625 | B2 | 10/2010 | Brown | 705/2 |
| 7,822,647 | B1 | 10/2010 | Mussman et al. | 705/26 |
| 7,822,657 | B2 | 10/2010 | Brown | 705/35 |
| 7,822,676 | B2 | 10/2010 | Shepherd | 705/37 |
| 7,822,829 | B2 | 10/2010 | Philyaw et al. | 709/219 |
| 7,827,040 | B2 | 11/2010 | Brown | 705/2 |
| 7,827,056 | B2 | 11/2010 | Walker et al. | |
| 7,827,057 | B1 | 11/2010 | Walker et al. | |
| 7,827,062 | B2 | 11/2010 | Merriman et al. | |
| 7,827,064 | B2 | 11/2010 | Foster | 705/20 |
| 7,827,075 | B2 | 11/2010 | Hess et al. | 705/27 |
| 7,827,109 | B2 | 11/2010 | Saito | 705/51 |
| 7,830,915 | B2 | 11/2010 | Moskowitz | 370/468 |
| 7,830,962 | B1 | 11/2010 | Fernandez et al. | |
| 7,831,470 | B1 | 11/2010 | Walker et al. | |
| 7,831,477 | B2 | 11/2010 | Woolston | 705/26 |
| 7,831,480 | B2 | 11/2010 | Burchetta et al. | 705/26 |
| 7,831,523 | B2 | 11/2010 | Burchetta et al. | 705/80 |
| 7,831,823 | B2 | 11/2010 | Ginter et al. | 713/155 |
| 7,835,508 | B1 | 11/2010 | Katz | |
| 7,835,509 | B2 | 11/2010 | Katz | |
| 7,835,688 | B2 | 11/2010 | Tokoro | 455/303 |
| 7,835,989 | B1 | 11/2010 | Hendricks et al. | 705/50 |
| 7,837,101 | B2 | 11/2010 | Barcelou | 235/380 |
| 7,839,432 | B2 | 11/2010 | Fernandez et al. | 348/143 |
| 7,839,984 | B2 | 11/2010 | Katz | |
| 7,840,440 | B2 | 11/2010 | Burchetta et al. | 705/26 |
| 7,844,074 | B2 | 11/2010 | Moskowitz et al. | 382/100 |
| 7,844,488 | B2 | 11/2010 | Merriman et al. | 705/14 |
| 7,844,538 | B2 | 11/2010 | Wallman | 705/37 |
| 7,848,496 | B2 | 12/2010 | Katz | |
| 7,848,958 | B2 | 12/2010 | Brown et al. | 705/26 |
| 7,849,393 | B1 | 12/2010 | Hendricks et al. | 715/203 |
| 7,853,455 | B2 | 12/2010 | Brown | 705/2 |
| 7,853,488 | B1 | 12/2010 | Mussman et al. | 705/26 |
| 7,853,524 | B2 | 12/2010 | Kight et al. | 705/40 |

| Patent Number | Date | Inventor | Class |
|---|---|---|---|
| 7,853,600 B2 | 12/2010 | Herz et al. | 707/749 |
| 7,856,375 B2 | 12/2010 | Libman | |
| 7,856,376 B2 | 12/2010 | Storey | |
| 7,856,379 B2 | 12/2010 | Walker et al. | 705/16 |
| 7,860,744 B2 | 12/2010 | Libman | |
| 7,860,753 B2 | 12/2010 | Walker et al. | 705/26 |
| 7,861,166 B1 | 12/2010 | Hendricks | 715/277 |
| 7,862,506 B2 | 1/2011 | Brown | 600/300 |
| 7,864,356 B2 | 1/2011 | Kara et al. | 358/115 |
| 7,865,395 B2 | 1/2011 | Klug et al. | 705/144 |
| 7,865,404 B2 | 1/2011 | Peckover | 705/26 |
| 7,867,165 B2 | 1/2011 | Brown | 600/300 |
| 7,869,852 B2 | 1/2011 | Brown | 600/347 |
| 7,870,034 B2 | 1/2011 | Rupp et al. | 705/26 |
| 7,870,055 B2 | 1/2011 | Fisher et al. | 705/37 |
| 7,870,080 B2 | 1/2011 | Budike, Jr. | 705/412 |
| 7,870,158 B2 | 1/2011 | DiRienzo | 707/791 |
| 7,870,189 B2 | 1/2011 | Philyaw | 709/203 |
| 7,870,249 B2 | 1/2011 | Brown | 709/224 |
| 7,870,393 B2 | 1/2011 | Moskowitz et al. | 713/176 |
| 7,870,587 B2 | 1/2011 | Ellis et al. | 725/60 |
| 7,871,327 B2 | 1/2011 | Walker et al. | 463/25 |
| 7,871,376 B2 | 1/2011 | Brown | 600/300 |
| 7,877,271 B2 | 1/2011 | Brown | 705/2 |
| 7,877,274 B2 | 1/2011 | Brown | 705/3 |
| 7,877,276 B2 | 1/2011 | Brown | 705/3 |
| 7,877,412 B2 | 1/2011 | Homer | 707/783 |
| 7,904,187 B2 * | 3/2011 | Hoffberg et al. | 700/83 |
| 7,912,761 B2 | 3/2011 | Vaid | 705/26.2 |
| 7,966,078 B2 * | 6/2011 | Hoffberg et al. | 700/17 |
| 7,974,714 B2 * | 7/2011 | Hoffberg | 700/94 |
| 7,987,003 B2 * | 7/2011 | Hoffberg et al. | 700/17 |
| 8,005,777 B1 * | 8/2011 | Owen et al. | 706/46 |
| 8,028,066 B2 | 9/2011 | Lewis | 709/224 |
| 8,031,060 B2 * | 10/2011 | Hoffberg et al. | 340/426.16 |
| 8,046,313 B2 * | 10/2011 | Hoffberg et al. | 706/14 |
| 2002/0007362 A1 | 1/2002 | Collins et al. | 707/5 |
| 2002/0042730 A1 | 4/2002 | Homer | 705/8 |
| 2002/0076254 A1 | 6/2002 | Kaplan | 434/107 |
| 2002/0095345 A1 | 7/2002 | Panelli et al. | 705/26 |
| 2002/0120567 A1 | 8/2002 | Caplan et al. | 705/40 |
| 2002/0120568 A1 | 8/2002 | Leblang et al. | 705/40 |
| 2002/0152163 A1 | 10/2002 | Bezos et al. | 705/40 |
| 2003/0054888 A1 | 3/2003 | Walker et al. | 463/42 |
| 2003/0233278 A1 | 12/2003 | Marshall | 705/14 |
| 2004/0006478 A1 | 1/2004 | Alpdemir et al. | 704/275 |
| 2004/0057569 A1 | 3/2004 | Busey et al. | 379/265.09 |
| 2004/0081951 A1 | 4/2004 | Vigue et al. | 434/350 |
| 2004/0095378 A1 | 5/2004 | Vigue et al. | 345/723 |
| 2004/0148366 A1 | 7/2004 | Ross, Jr. et al. | 709/218 |
| 2004/0167823 A1 | 8/2004 | Neely et al. | 705/26 |
| 2004/0249719 A1 | 12/2004 | Urpani | 705/26 |
| 2005/0187936 A1 | 8/2005 | Homer | 707/9 |
| 2005/0251440 A1 | 11/2005 | Bednarek | 705/10 |
| 2006/0203993 A1 | 9/2006 | Busey et al. | 379/265.09 |
| 2007/0160970 A1 | 7/2007 | Kaplan | 434/350 |
| 2008/0140676 A1 | 6/2008 | Silverstone et al. | 707/10 |
| 2008/0249879 A1 | 10/2008 | Walker et al. | 705/14 |
| 2009/0222358 A1 | 9/2009 | Bednarek | 705/27 |
| 2010/0218104 A1 | 8/2010 | Lewis | 715/736 |
| 2010/0241501 A1 | 9/2010 | Marshall | 705/14.13 |
| 2011/0113067 A1 | 5/2011 | Homer | 707/783 |
| 2011/0119308 A1 | 5/2011 | Homer | 707/783 |
| 2011/0119769 A1 | 5/2011 | Homer | 726/27 |
| 2011/0125552 A1 | 5/2011 | Stein | 705/7.32 |

FOREIGN PATENT DOCUMENTS

| | | |
|---|---|---|
| DE | 4409458 | 9/1995 |
| DE | 19840383 | 3/2000 |
| DE | 19900500 | 1/2009 |
| EP | 0141858 | 10/1984 |
| EP | 0135485 | 3/1985 |
| EP | 0205873 | 12/1986 |
| EP | 0230349 | 7/1987 |
| EP | 0236587 | 9/1987 |
| EP | 0357719 | 3/1990 |
| EP | 0387389 | 9/1990 |
| EP | 0411748 | 2/1991 |
| EP | 0463616 | 1/1992 |
| EP | 0504616 | 2/1992 |
| EP | 0502161 | 9/1992 |
| EP | 0454122 | 8/1995 |
| EP | 0478634 | 8/1995 |
| EP | 0407026 | 11/1995 |
| EP | 0416482 | 11/1995 |
| EP | 0491455 | 12/1995 |
| EP | 0520620 | 6/1996 |
| EP | 0462815 | 9/1996 |
| EP | 0716386 | 1/1997 |
| EP | 0728339 | 5/1997 |
| EP | 0663654 | 9/1997 |
| EP | 0542298 | 4/1998 |
| EP | 0173249 | 7/1998 |
| EP | 0741348 | 8/1998 |
| EP | 0522231 | 9/1998 |
| EP | 0738446 | 9/1998 |
| EP | 0770967 | 12/1998 |
| EP | 0502164 | 4/1999 |
| EP | 0911738 | 4/1999 |
| EP | 0697271 | 3/2000 |
| EP | 0826184 | 3/2000 |
| EP | 0913057 | 4/2000 |
| EP | 0990962 | 4/2000 |
| EP | 0710125 | 5/2000 |
| EP | 0828223 | 5/2000 |
| EP | 0683466 | 4/2001 |
| EP | 0778535 | 5/2001 |
| EP | 0697669 | 6/2001 |
| EP | 0749606 | 8/2001 |
| EP | 0880088 | 1/2002 |
| EP | 0803105 | 2/2002 |
| EP | 1115095 | 3/2002 |
| EP | 0692766 | 5/2002 |
| EP | 0992952 | 6/2002 |
| EP | 0734556 | 9/2002 |
| EP | 1012773 | 1/2003 |
| EP | 1280091 | 1/2003 |
| EP | 0851358 | 3/2003 |
| EP | 1131754 | 7/2003 |
| EP | 0789884 | 9/2003 |
| EP | 0762306 | 10/2003 |
| EP | 0853287 | 10/2003 |
| EP | 1083939 | 4/2005 |
| EP | 1522947 | 5/2005 |
| EP | 1062582 | 6/2005 |
| EP | 1032920 | 8/2005 |
| EP | 0915422 | 3/2006 |
| EP | 0791202 | 5/2006 |
| EP | 0886954 | 5/2006 |
| EP | 0891590 | 7/2006 |
| EP | 1693795 | 11/2006 |
| EP | 1182597 | 5/2010 |
| FR | 2490371 | 3/1982 |
| FR | 2585153 | 4/1987 |
| FR | 2634570 | 4/1990 |
| FR | 2658635 | 8/1991 |
| FR | 2733846 | 11/1996 |
| FR | 2739951 | 4/1997 |
| FR | 2783619 | 3/2000 |
| GB | 1489572 | 10/1977 |
| GB | 2102606 | 2/1983 |
| GB | 2105075 | 3/1983 |
| GB | 2273593 | 6/1994 |
| GB | 2275550 | 8/1994 |
| GB | 2308210 | 6/1997 |
| GB | 2315579 | 2/1998 |
| GB | 2326001 | 12/1998 |
| GB | 2336211 | 10/1999 |
| SG | 0105592 | 12/1992 |
| SG | 0085593 | 1/2002 |
| WO | WO9010910 | 9/1990 |
| WO | WO9011571 | 10/1990 |
| WO | WO9011572 | 10/1990 |
| WO | WO9105572 | 5/1991 |
| WO | WO9116691 | 10/1991 |
| WO | WO9204920 | 4/1992 |
| WO | WO9210901 | 6/1992 |
| WO | WO9302422 | 2/1993 |

| | | |
|---|---|---|
| WO | WO9303446 | 2/1993 |
| WO | WO9306931 | 4/1993 |
| WO | WO9314463 | 7/1993 |
| WO | WO9324892 | 12/1993 |
| WO | WO9325953 | 12/1993 |
| WO | WO9407207 | 3/1994 |
| WO | WO9415294 | 7/1994 |
| WO | WO9416508 | 7/1994 |
| WO | WO9428497 | 12/1994 |
| WO | WO9503595 | 2/1995 |
| WO | WO9508810 | 3/1995 |
| WO | WO9512176 | 5/1995 |
| WO | WO9512859 | 5/1995 |
| WO | WO9514496 | 6/1995 |
| WO | WO9516971 | 6/1995 |
| WO | WO9517733 | 7/1995 |
| WO | WO9522800 | 8/1995 |
| WO | WO9526535 | 10/1995 |
| WO | WO9526536 | 10/1995 |
| WO | WO9600949 | 1/1996 |
| WO | WO9612242 | 4/1996 |
| WO | WO9613013 | 5/1996 |
| WO | WO9621192 | 7/1996 |
| WO | WO9627155 | 9/1996 |
| WO | WO9630059 | 10/1996 |
| WO | WO9635184 | 11/1996 |
| WO | WO9705589 | 2/1997 |
| WO | WO9709666 | 3/1997 |
| WO | WO9716897 | 5/1997 |
| WO | WO9717663 | 5/1997 |
| WO | WO9718519 | 5/1997 |
| WO | WO9720592 | 6/1997 |
| WO | WO9724691 | 7/1997 |
| WO | WO9725684 | 7/1997 |
| WO | WO9726612 | 7/1997 |
| WO | WO9729445 | 8/1997 |
| WO | WO9729447 | 8/1997 |
| WO | WO9734246 | 9/1997 |
| WO | WO9735268 | 9/1997 |
| WO | WO9740463 | 10/1997 |
| WO | WO9802836 | 1/1998 |
| WO | WO9803925 | 1/1998 |
| WO | WO9804083 | 1/1998 |
| WO | WO9804086 | 1/1998 |
| WO | WO9808177 | 2/1998 |
| WO | WO9810361 | 3/1998 |
| WO | WO9816893 | 4/1998 |
| WO | WO9821679 | 5/1998 |
| WO | WO9826337 | 6/1998 |
| WO | WO9826364 | 6/1998 |
| WO | WO9832088 | 7/1998 |
| WO | WO9833134 | 7/1998 |
| WO | WO9834167 | 8/1998 |
| WO | WO9837675 | 8/1998 |
| WO | WO9838558 | 9/1998 |
| WO | WO9841942 | 9/1998 |
| WO | WO9844442 | 10/1998 |
| WO | WO9849639 | 11/1998 |
| WO | WO9849641 | 11/1998 |
| WO | WO9849642 | 11/1998 |
| WO | WO9858338 | 12/1998 |
| WO | WO9905501 | 2/1999 |
| WO | WO9909503 | 2/1999 |
| WO | WO9909506 | 2/1999 |
| WO | WO9913425 | 3/1999 |
| WO | WO9913427 | 3/1999 |
| WO | WO9923573 | 5/1999 |
| WO | WO9923592 | 5/1999 |
| WO | WO9927492 | 6/1999 |
| WO | WO9939290 | 8/1999 |
| WO | WO9950995 | 10/1999 |
| WO | WO9952025 | 10/1999 |
| WO | WO9963472 | 12/1999 |
| WO | WO9967712 | 12/1999 |
| WO | WO0011671 | 3/2000 |
| WO | WO0013123 | 3/2000 |
| WO | WO00043935 | 7/2000 |
| WO | WO 00/54178 | 9/2000 |
| WO | WO0104822 | 1/2001 |
| WO | WO 01/46884 | 6/2001 |
| WO | WO0155939 | 8/2001 |

OTHER PUBLICATIONS

"IBM's Deep Dive Strategy Process," in Continuous Strategy, Washington, DC: Corporate Strategy Board, 2000; pp. 15-35.
"A Guide to CPFR Implementation," ECR Europe, Apr. 2001.
"ABAP/4 Development Workbench."
"Aries for Windows—The Integrated Production, Reserve and Economic Evaluation System".
"Configurable Materials in Purchasing."
"Consignment."
"CPFR: Collaborative Planning, Forecasting, and Replenishment Voluntary Guidelines," Voluntary Interindustry Commerce Standards, 1998.
"Database Administration."
"Decision Analysis Software for Microsoft Windows, Student Edition," ADA Decision Systems, 1992.
"Dialogue Decision Process: Alternatives."
"EC Enterprise Controlling."
"FI Financial Accounting."
"General Information," EDI (Electronic Data Interchange).
"IM Investment Management."
"LO Logistics Information System."
"MIT Libraries' catalog—Barton—Full Catalog—Full Record," Massachusetts Institute of Technology, http://library.mit.edu/item/000911321, last accessed on Jan. 29, 2008.
"MM External Services Management."
"MM Purchasing Guide."
"MM Vendor Evaluation."
"NetIQ AppManager Suite," NetIQ Corporation, 2005.
"PM Plant Maintenance."
"Quick Start: Introduction to Decision Analysis with Supertree, PC Version," SDG Decision Systems, Feb. 1989.
"R/3 Internet Application Components."
"Readings in Electronic Commerce," Addison Wesley Longman, Inc., 1997.
"Sales."
"SAP Business-to-Business Procurement."
"SAP Open Information Warehouse Frontend for Microsoft Excel."
"Strategic Management of R&D: Overview," Strategic Decisions Group, May 22, 1995.
"SunNetManager 2.2.3 User's Guide," Sun Microsystems, Inc., 1995.
"Supertree in Use," SDG Decision Systems, 1986.
"System Administration."
"The Manual Decision Advisor: vol. 1—Project Analysis," Strategic Decisions Group, 1998.
2010_10_08d01 Dfts Invalidity Contentions & Disclosures under Pr 3-3 & 3-4.
2010_10_08d02 Dfts Invalidity Contentions-Chart A01.
2010_10_08d03 Dfts Invalidity Contentions-Chart A02.
2010_10_08d04 Dfts Invalidity Contentions-Chart A03.
2010_10_08d05 Dfts Invalidity Contentions-Chart A04.
2010_10_08d06 Dfts Invalidity Contentions-Chart A05.
2010_10_08d07 Dfts Invalidity Contentions-Chart A06.
2010_10_08d08 Dfts Invalidity Contentions-Chart A07.
2010_10_08d09 Dfts Invalidity Contentions-Chart A08.
2010_10_08d10 Dfts Invalidity Contentions-Chart A09.
2010_10_08d11Dfts Invalidity Contentions-Chart A10.
2010_10_08d12Dfts Invalidity Contentions-Chart A11.
2010_10_08d13Dfts Invalidity Contentions-Chart A12.
2010_10_08d14Dfts Invalidity Contentions-Chart A13.
2010_10_08d15Dfts Invalidity Contentions-Chart A14.
2010_10_08d16Dfts Invalidity Contentions-Chart A15.
2010_10_08d17Dfts Invalidity Contentions-Chart A16.
2010_10_08d18Dfts Invalidity Contentions-Chart A17.
2010_10_08d19Dfts Invalidity Contentions-Chart A18.
2010_10_08d20Dfts Invalidity Contentions-Chart A19.
2010_10_08d21Dfts Invalidity Contentions-Chart A20.
2010_10_08d22Dfts Invalidity Contentions-Chart A21.

2010_10_08d23Dfts Invalidity Contentions-Chart A22.
2010_10_08d24Dfts Invalidity Contentions-Chart A23.
2010_10_08d25Dfts Invalidity Contentions-Chart A24.
2010_10_08d26Dfts Invalidity Contentions-Chart A25.
2010_10_08d27Dfts Invalidity Contentions-Chart B01.
2010_10_08d28Dfts Invalidity Contentions-Chart B02.
2010_10_08d29 Dfts Invalidity Contentions-Chart B03.
2010_10_08d30Dfts Invalidity Contentions-Chart B04.
2010_10_08d31Dfts Invalidity Contentions-Chart B05.
2010_10_08d32 Dfts Invalidity Contentions-Chart B06.
2010_10_08d33Dfts Invalidity Contentions-Chart B07.
2010_10_08d34Dfts Invalidity Contentions-Chart B08.
2010_10_08d35 Dfts Invalidity Contentions-Chart B09.
2010_10_08d36Dfts Invalidity Contentions-Chart B10.
2010_10_08d37Dfts Invalidity Contentions-Chart B11.
2010_10_08d38Dfts Invalidity Contentions-Chart B12.
2010_10_08d39Dfts Invalidity Contentions-Chart B13.
2010_10_08d40Dfts Invalidity Contentions-Chart B14.
2010_10_08d41Dfts Invalidity Contentions-Chart B15.
2010_10_08d42Dfts Invalidity Contentions-Chart B16.
2010_10_08d43Dfts Invalidity Contentions-Chart B17.
2010_10_08d44Dfts Invalidity Contentions-Chart B18.
2010_10_08d45Dfts Invalidity Contentions-Chart B19.
2010_10_08d46Dfts Invalidity Contentions-Chart B20.
2010_10_08d47Dfts Invalidity Contentions-Chart B21.
2010_10_08d48Dfts Invalidity Contentions-Chart B22.
2010_10_08d49Dfts Invalidity Contentions-Chart B23.
2010_10_08d50Dfts Invalidity Contentions-Chart B24.
2010_10_08d51Dfts Invalidity Contentions-Chart B25.
A Framework for Managing Enterprise Knowledge for Collaborative Decision Support Zhang, N.; Lu, W.F.; Industrial Informatics, 2007 5th IEEE International Conference on vol. 1, Jun. 23-27, 2007 pp. 517-522.
Abbas, "The Evolution of Decision Analysis," Department of Management Science and Engineering, Stanford University.
ADA Decision Systems, "DPL Standard Version User Guide"; 1995.
ADA Decision Systems; DPL Advanced Version User Guide; 1995.
Address supply chain visibility from knowledge management perspective Zhang, N.; He, W.; Lee, E.W.; Industrial Informatics, 2008. INDIN 2008. 6th IEEE International Conference on Jul. 13-16, 2008 pp. 865-870 Digital Object Identifier 10.1109/INDIN.2008. 4618222.
Aloft Opposition to Defs' MFSJ (CPN156), Case No. 6:08-cv-00051 (ED. Tex. (Tyler Div.))(May 22, 2009).
Aloft Surreply to MFSJ (CPN165), Case No. 6:08-cv-00051 (ED. Tex. (Tyler Div.))(Jun. 19, 2009).
Aloft's Opening Claim Construction Brief (CPN203), Case No. 6:08-cv-00051 (ED. Tex. (Tyler Div.))(Oct. 13, 2009).
Aloft's Reply to Defs' Response Claim Construction Brief (CPN213), Case No. 6:08-cv-00051 (ED. Tex. (Tyler Div.)) (Nov. 6, 2009).
Aloft's Response Re MSJ of Invalidity (CPN212), Case No. 6:08-cv-00051 (ED. Tex. (Tyler Div.))(Nov. 6, 2009).
An Adaptive Predictive Approach to Emergency Frequency Control in Electric Power Systems Larsson, M.; Decision and Control, 2005 and 2005 European Control Conference. CDC-ECC '05. 44th IEEE Conference on Dec. 12-15, 2005 pp. 4434-4439.
An automatic beat detection algorithm for pressure signals Aboy, M.; McNames, J.; Tran Thong; Tsunami, D.; Ellenby, M.S.; Goldstein, B.; Biomedical Engineering, IEEE Transactions on vol. 52, Issue 10, Oct. 2005 pp. 1662-1670 Digital Object Identifier 10.1109/TBME. 2005.855725.
An ICU protocol development and management system Jiabin Xie; Nerlikar, A.; Glover, J.R.; McKinley, B.A.; Computer-Based Medical Systems, 2000. CBMS 2000. Proceedings. 13th IEEE Symposium on Jun. 22-24, 2000 pp. 43-47 Digital Object Identifier 10.1109/CBMS. 2000.856872.
Analysis of Complex Decisionmaking Processes Hill, J. Douglas; Ollila, Richard G.; Systems, Man and Cybernetics, IEEE Transactions on vol. 8, Issue 3, Mar. 1978 pp. 193-204 Digital Object Identifier 10.1109/TSMC.1978.4309930.
ARIES for Windows (Release Nov. 1996).
ARIES Help File.

Barabba et al., "Communication in Action: GM's Dialogue Decision Process," Strategic Communication Management, Dec./Jan. 1997, pp. 24-28.
Barabba et al., Hearing the Voice of the Market, Competitive Advantage through Creative Use of Market Information, Boston: Harvard Business School Press, 1991.
Barabba, V., "Meeting of the Minds: Creating the Market-Based Enterprise," Harvard Business School Press: Boston; 1995.
Beck, Gary F.; "Examination of MWD Wireline Replacement by Decision Analysis Methods: Two Case Histories"; The Log Analyst, pp. 62-80; May-Jun. 1997.
Benotto, F.; Bressani, T.; Calvo, D.; Iazzi, F.; Lamberti, C.; "The Trigger of the TOFUS Detector." Nuclear Science Symposium and Medical Imaging Conference, 1991., Conference Record of the 1991 IEEE Nov. 2-9, 1991 pp. 584-588 vol. 1 Digital Object Identifier 10.1109/NSSMIC.1991.259004.
Bhargava, H. K., et al.; "Beyond Spreadsheets: Tools for Building Decision Support Systems"; IEEE Computer vol. 32, pp. 31-39; Mar. 1999.
Bodily, Samuel E., Allen, Michael S.; "A Dialogue Process for Choosing Value-Creating Strategies"; Interfaces 29:6, pp. 16-28; Nov.-Dec. 1999.
Buck-Emden et al., "SAP R/3 System: A Client/Server Technology," Addison-Wesley, 1996.
Business Wire, "Lumina Decision Systems Powers Up Business Modeling with Analytica 2.0; New Versions of Analytica Feature OLE Linking and ODBC Integration"; Jul. 1999.
Car purchase decisions Yato, A.; Rodriguez, J.R.; Cangur, G.; Boonbutra, R.; Kumte, R.; Lahagu, R.; Management of Engineering and Technology, 2001. PICMET '01. Portland International Conference on vol. 1, Jul. 29-Aug. 2, 2001 p. 126 vol. 1 Digital Object Identifier 10.1109/PICMET.2001.951835.
Clemen, Robert T., "Making Hard Decisions, An Introduction to Decision Analysis", Second Edition; 1996.
Clemen, Robert T., "Making Hard Decisions, An Introduction to Decision Analysis"; 1991.
Collaborative Decision Making framework for multi-agent system Indiramma, M.; Anandakumar, K.R.; Computer and Communication Engineering, 2008. ICCCE 2008. International Conference on May 13-15, 2008 pp. 1140-1146 Digital Object Identifier 10.1109/IC-CCE.2008.4580785.
Collaborative medical reasoning in telemedicine Quintero, J.; Abraham, M.; Aguilera, A.; Villegas,.; Montilla, G.; Solaiman, B.; Engineering in medicine and biology society, 2001. Proceedings of the 23rd annual international conference of the IEEE vol. 4, Oct. 25-28, 2001 pp. 3622-3625 vol. 4.
Collaborative Problem Solving and Groupware for Software Development DeFranco-Tommarello, J.; Deek, F.P.; Engineering Management Review, IEEE vol. 35, Issue 4, Fourth Quarter 2007 pp. 54-54 Digital Object Identifier 10.1109/EMR.2007.4489950.
Complementary decision making system for aiding medical image diagnosis Tan, T.Z.; Ng, G.S.; Quek, C.; Neural Networks, 2007. IJCNN 2007. International Joint Conference on Aug. 12-17, 2007 pp. 2324-2329 Digital Object Identifier 10.1109/UCNN.2007.4371321.
Computational Prediction Models for Early Detection of Risk of Cardiovascular Events Using Mass Spectrometry Data Pham, T.D.; Honghui Wang; Xiaobo Zhou; Dominik Beck; Brandl, M.; Hoehn, G.; Azok, J.; Brennan, M.-L.; Hazen, S.L.; Li, K.; Wong, S.T.C.; Information Technology in Biomedicine, IEEE Trans on vol. 12, Issue 5, Sep. 2008 pp. 636-643.
Consumer Decision Process Model in Multi-channel Retail Banking Jingdong Cui; Service Systems and Service Management, 2007 International Conference on Jun. 9-11, 2007 pp. 1-6 Digital Object Identifier 10.1109/ICSSSM.2007.4280113.
Daniel L. Owen, "The Use of Influence Diagrams in Structuring Complex Decision Problems" Proceedings, Second Lawrence Symposium on Systems and Decision Sciences, Oct. 3-4, 1978.
Decision support systems for improving the quality of medical care Ghosh, B.; Industrial and information systems, 2008. ICIIS 2008. IEEE Region 10 and the third international conference on Dec. 8-10, 2008 pp. 1-1 Digital Object Identifier 10.1109/ICIINFS.2008. 4798330.
Declaration associated with Civil Case No. 2:06-cv-440.

Defendant's Invalidity Contentions, Case No. 6:08-cv-00051 (ED. Tex. (Tyler Div.))(Jun. 6, 2009).

Defs' First Amended Invalidity Contentions, Case No. 6:08-cv-00051 (ED. Tex. (Tyler Div.))(Sep. 11, 2009).

Defs' MSJ (CPN136), Case No. 6:08-cv-00051 (ED. Tex. (Tyler Div.))(Apr. 17, 2009).

Defs' Objection to Love's SJM (CPN177), Case No. 6:08-cv-00051 (ED. Tex. (Tyler Div.))(Aug. 21, 2009).

Defs' Reply (CPN214), Case No. 6:08-cv-00051 (ED. Tex. (Tyler Div.))(Nov. 12, 2009).

Design of organizational decision support systems: the use of a data extraction scheme to facilitate model-database communication Miller, L.L.; Nilakanta, S.; System Sciences, 1991. Proceedings of the Twenty-Fourth Annual Hawaii International Conference on vol. iv, Jan. 8-11, 1991 pp. 67-72 vol. 4.

Documentation associated with Civil Action No. 6:08-cv-51.

Dr. Michael W. Kusnic, "Collaborative Decisionmaking Platform: Value Creation and Organizational Learning through Collaborative Decisionmaking," Strategic Business Processes, inc.

Dr. Michael W. Kusnic, "The Potential for the Knowledge Management Business: Lessons Learned from the Experience at General Motors," Strategic Business Processes, inc.

Economic Analysis Systems, Inc.; "TERAS Evaluation Module Tutorial"; 1996.

Economic Analysis Systems, Inc.; "TERAS Evaluation Module User's Manual"; 1997.

Engineering for intelligent systems Kokol, P.; Zorman, M.; Podgorelec, V.; Babic, S.H.; Systems, Man, and Cybernetics, 1999. IEEE SMC '99 Conference Proceedings. 1999 IEEE International Conference on vol. 6, Oct. 12-15, 1999 pp. 306-311 vol. 6 Digital Object Identifier 10.1109/ICSMC.1999.816569.

Equis International, "MetaStock for Windows 95 & NT User's Manual Version 6.5"; 1997.

Eschenbach, Ted G., "Spiderplots versus Tornado Diagrams for Sensitivity Analysis"; Interfaces 22:6, pp. 40-46; Nov.-Dec. 1992.

E-workbench: A case for collaborative decision support in e-health Anya, O.; Tawfik, H.; Nagar, A.; Amin, S.; Computer Modelling and Simulation, 2009. UKSIM '09. 11th International Conference on Mar. 25-27, 2009 pp. 634-639 Digital Object Identifier 10.1109/UKSIM.2009.81.

Fair Issac's Answer (CPN081), Case No. 6:08-cv-00304 (ED. Tex. (Tyler Div.))(Mar. 24, 2010).

Filtering of Muscle Artifact from the Electroencephalogram Johnson, Timothy L.; Wright, Stuart C.; Segall, Adrian; Biomedical Engineering, IEEE Transactions on vol. BME-26, Issue 10, Oct. 1979 pp. 556-563 Digital Object Indentifier 10.1109/TBME.1979.326443.

General Motors Decision Support Center; "A Coach's Guide to the DDP"; Apr. 1993.

GLOBEtrotter Software; "FLEXlm End User Manual," FLEXlm version 6.1; Oct. 1998.

Goodson, et al.; "Strategic Planning of the NWS Offshore Expansion Activities"; Society of Petroleum Engineers, SPE 50112, pp. 361-365; 1998.

Grier et al "A decision Support Expert System for Correciton of Manufacturing Process Problems"; Dec. 1990; ACM.

Guttman, "Merchant Differentiation through Integrative Negotiation in Agent-mediated Electronic Commerce," Massachusetts Institute of Technology, 1998.

Haeckel, Stephan H.; "Adaptive Enterprise, Creating and Leading Sense-and-Respond Organizations"; 1999.

Hall's Answer (CPN068), Case No. 6:08-cv-00304 (ED. Tex. (Tyler Div.))(Feb. 5, 2010).

Hegdal, et al.; "Production Forecasting of an Unstable Compacting Chalk Field Using Uncertainty Analysis"; Society of Professional Engineers, SPE 50644, pp. 149-160; Oct. 1998.

Henrion, et al.; "Innovations in Integrated Assessment: The Tracking and Analysis Framework (TAF)"; Presented at the Air and Waste Management Conference on Acid Rain and Electric Utilities, Jan. 1997, Scottsdale, Arizona.

Henrion, Max; "Reusable Influence Diagram Modules for Rapid Program Planning and Decision Analysis"; Lumina Decision Systems Phase I SBIR Final Report Apr. 20, 1996.

Holtzman, "Intelligent Decision Systems," Addison-Wesley Publishing Company, Inc., 1989, pp. 56-106.

Holtzman, "Intelligent Decision Systems," Stanford University, 1985.

Howard, Ronald A.; "An Assessment of Decision Analysis"; Operations Research vol. 28, No. 1, pp. 4-27; Jan.-Feb. 1980.

Howard, Ronald A.; "Decision Analysis: Practice and Promise"; Management Science vol. 34. No. 6, pp. 679-695; Jun. 1988.

Hoy, Wayne K., Tarter, C. John, "Administrators Solving the Problem of Practice, Decision-Making Concepts, Cases, and Consequences"; 1995.

Huang et al., "A Sense-and-Respond Approach to Business Transformation," Proceedings of the IEEE International Conference on E-Commerce Technology for Dynamic Business (CEC-East'04), 2004.

Infor's Amended Answer (CPN139), Case No. 6:08-cv-00051 (ED. Tex. (Tyler Div.))(May 4, 2009).

Infors' Amended Initial Disclosures, Case No. 6:08-cv-00051 (ED. Tex. (Tyler Div.))(Sep. 21, 2009).

Infor's Answer (CPN087), Case No. 6:08-cv-00051 (ED. Tex. (Tyler Div.))(Nov. 26, 2008).

Infor's Answer (CPN114), Case No. 6:08-cv-00051 (ED. Tex. (Tyler Div.))(Mar. 23, 2009).

Interpreting associate rules in granular data model via decision logic Lin, T.Y.; Fuzzy Information, 2004. Processing NAFIPS '04. IEEE Annual Meeting of the vol. 1, Jun. 27-30, 2004 pp. 57-62 vol. 1 Digital Object Identfier 10.1109/NAFIPS.2004.1336249.

Jnt Claim (CPN196), Case No. 6:08-cv-00051 (ED. Tex. (Tyler Div.))(Sep. 29, 2009).

Kano et al., "International Multi-Company Collaborative Engineering: A Study of Japanese Engineering and Construction Firms," Massachusetts Institute of Technology, 1994.

Keeney, Ralph L., Raiffa, Howard, "Decisions With Multiple Objectives-Preferences and Value Tradeoffs" 1975. 588 pages.

Kirkwood, Craig W.; "An Overview of Methods for Applied Decision Analysis"; Interfaces 22:3; Nov.-Dec. 1992.

Krumm, F.W., Rolle, C.F., "Management and Application of Decision and Risk Analysis in Du Pont"; Interfaces 22:3; Nov.-Dec. 1992.

Kusnic, et al.; "The Unifying Vision Process: Value Beyond Traditional Decision Analysis in Multiple-Decision-Maker Environments"; Interfaces 22:6, pp. 150-166; Nov.-Dec. 1992.

Landmark Graphics Corp.; "Software Requirements Specification: 3M Sensitivity Analysis"; Nov. 1996.

Logcher et al., "Ghost: A Project Network Generator," J. of Computing in Civil Engineering, ASCE, vol. 2, No. 3, Jul. 1988, pp. 239-254.

McNamee et al., "Decision Analysis with Supertree," 2nd Edition, The Scientific Press, pp. 281-304.

Megil, Robert E.; "An Introduction to Exploration Economics, Third Edition"; 1988.

Michael J. Bender & Slobodan P. Simonovic, "A System Approach for Collaborative Decision Support in Water Resources Planning" IEEE, 1996.

Michael W. Kusnic and Daniel Owen, "An Achievable Vision for the Strategic Knowledge Management Business," Strategic Business Processes, inc.

Miller et al., "Development of Automated Aids for Decision Analysis," Technical Report, Stanford Research Institute, May 1976.

Multimedia as value enabler for decision making in virtual enterprises Arunkumar, S.; Jain, S.K.; Engineering and Technology Management, 1996. IEMC 96. Proceedings., International Conference on Aug. 18-20, 1996 pp. 34-41 Digital Object Identifier 10.1109/IEMC. 1996.547786.

Murtha, J. A.; "Decisions Involving Uncertainty: An @ Risk Tutorial for the Petroleum Industry"; 1995.

Murtha, J. A.; "Monte Carlo Simulation: Its Status and Future," Society of Petroleum Engineers, SPE 37932, pp. 361-373; Apr. 1997.

Neal, Larry Jr.; "Use of the Decision Quality Process for Strategic Planning in the Duri Field, Indonesia," Society of Petroleum Engineers, SPE 28743, pp. 31-46; Nov. 1994.

Nessralla, "*Letter re Sky Technologies LLC v. SAG AG, SAP Americas, Inc and Oracle Corporation* Subpoena for Records of the Massachusetts Institute of Technology," Jan. 30, 2008.

Oliver et al. (ed.), "Influence Diagrams, Belief Nets and Decision Analysis," John Wiley & Sons Ltd., 1990.

Omega Research, Inc.; "Reference Manual: Omega Research Analysis Techniques"; 1997.

Omega Research, Inc.; "TradeStation User's Manual Version 4"; 1997.

Oracle's Answer (CPN072), Case No. 6:08-cv-00051 (ED. Tex. (Tyler Div.))(Oct. 20, 2008).

Oracle's Answer (CPN117), Case No. 6:08-cv-00051 (ED. Tex. (Tyler Div.))(Mar. 23, 2009).

Oracle's MSJ of Invalidity (CPN207), Case No. 6:08-cv-00051 (ED. Tex. (Tyler Div.))(Oct. 27, 2009).

Oracle's Responsive Claim Construction Brief (CPN208), Case No. 6:08-cv-00051 (ED. Tex. (Tyler Div.))(Oct. 27, 2009).

Order Adopting Recommendation and Denying MSJ (CPN182), Case No. 6:08-cv-00051 (ED. Tex. (Tyler Div.)) (Aug. 28, 2009).

Owen et al., "Collaborative Decision-Making in Adaptive Enterprises," in Adaptive Enterprise, Boston: Harvard Business School Press, 1999; pp. 225-242.

Owen et al., "Some Experiences with Improving the Quality of Decisions in Large Organizations with Multiple Decision Makers," Proceedings of ORSA/TIMS, Phoenix, AZ, Nov. 2, 1993.

Owen et al., "Multi-agent trading environment," BT Technol J, vol. 17, No. 3, Jul. 1999, pp. 33-43.

Owen, "The Concept of Influence and Its Use in Structuring Complex Decision Problems," Stanford University, Nov. 1978.

Palisade Corp.; "@ RISK: Risk Analysis and Simulation Add-In for Microsoft Excel or Lotus 1-2-3 User's Manual"; 1995.

Palisade Corp.; "Guide to Using, Top Rank, What-If Analysis Add-In for Microsoft Excel and Lotus 1-2-3"; Jul. 2000.

Palisade Corp.; "TopRank: Revolutionizing "What-if" Analysis!"; Analytical Power Tools Update vol. 3, No. 2; 1995.

Palisade Corp.; "TopRank: Revolutionizing "What-if" Analysis!"; Analytical Power Tools Update vol. 3, No. 3; 1995.

Palisade Corp.; "TopRank: Revolutionizing "What-if" Analysis!"; Analytical Power Tools Update vol. 3, No. 4, 1995.

Palisade Corp.; "User's Guide, Precision Tree, Decision Analysis Add-In for Microsoft Excel"; Oct. 2004.

Palisade Corp.; Analytical Power Tools Update vol. 3, #2, "Top Rank: Revolutionizing "What If" Analysis!".

Palisade Corporation; @ RISK Reference Guide.

Palisade Corporation; @ RISK, "Plant Decision Trees Right in Your Spreadsheet".

Palisade Corporation; @ RISK, Worlds Best Risk Analysis Software.

Palisade Corporation; @ RISK, The @ Risk Tutorial.

Palisade Corporation; "@RISK: Risk Analysis and Simulation Add-In for Microsoft Excel," Windows or Apple Macintosh Version, Release 1.12 User's Guide; Jul. 1, 1993.

Palisade Corporation; "@RISK: Risk Analysis and Simulation Add-In for Microsoft Excel," Windows Version User's Guide; Feb. 1, 1995.

PMSIM Systems, Understanding PMSIM, "Volvo, Mekroprint, Hardi International, Kongskilde, Vestas, Ericsson, Muller Print, Bang & Olufsen, Gillette and Tornos Bechler are just some of the many companies using PMSIM Today." (1997).

Poulsen, R.S. et al., "Region of interest finding in reduced resolution colour imagery: Application to cancer cell detection in cell overlaps and clusters" Engineering in Medicine and Biology Society, 1995., IEEE 17th Annual Conference vol. 1, Sep. 20-23, 1995 pp. 499-500 vol. 1 Digital Object Identifier 10.1109/IEMBS.1995.575219.

Prevision, Inc.; "Strategist User Manual, Beta Version 1.0.B.14"; Aug. 1997.

Program decision logic optimization using predication and control speculation Hwu, W.-M.W.; August., D.I.; Sias, J.W.; Proceedings of the IEEE vol. 89, Issue 11, Nov. 2001 pp. 1660-1675 Digital Object Identifier 10.1109/5.964444.

Raiffa, Howard; "Decision Analysis, A Personal Account of how it got Started and Evolved"; Operations Research vol. 50, No. 1, pp. 179-185; Jan.-Feb. 2002.

Report and Recommendation of Magistrate (CPN 175), Case No. 6:08-cv-00051 (ED. Tex. (Tyler Div.))(Aug. 10, 2009).

Research on the IDSS of High-Speed Railway Based on Multi-agent Zi-yu, Liu; Lei, Huang; Management Science and Engineering, 2007. ICMSE 2007. International Conference on Aug. 20-22, 2007 pp. 79-84 Digital Object Identifier 10.1109/ICMSE.2007.4421828.

Ronald A. Howard, "Information Value Theory" IEEE Transactions on Systems Science and Cybernetics, vol. ssc-2, No. 1, Aug. 1966 pp. 22-26.

Sage's Answer (CPN070), Case No. 6:08-cv-00051 (ED. Tex. (Tyler Div.))(Oct. 20, 2008).

Sage's Answer (CPN118), Case No. 6:08-cv-00051 (ED. Tex. (Tyler Div.))(Mar. 23, 2009).

Sairamesh et al., "NetBazaar: Networked Electronic Markets for Trading Computation and Information Services," Springer-Verlag Berlin Heidelberg, 1998, ECDL'98, LNCS 1513, pp. 839-856.

Sanders, "Automated Creation of Clinical-Practice Guidelines from Decision Models," Gillian D. Sanders, Jun. 1998.

SAP's 1st Amended Answer (CPN140), Case No. 6:08-cv-00051 (ED. Tex. (Tyler Div.))(May 4, 2009).

SAP's Answer (CPN074), Case No. 6:08-cv-00051 (ED. Tex. (Tyler Div.))(Oct. 20, 2008).

SAP's Answer (CPN116), Case No. 6:08-cv-00051 (ED. Tex. (Tyler Div.))(Mar. 23, 2009).

Schutzmen, Fred G.; "Product Review: Trade Station v. 3.5"; Stocks & Commodities v13, pp. 586-589.

Scottrade's Answer (CPN037), Case No. 6:08-cv-00304 (ED. Tex. (Tyler Div.))(Dec. 7, 2009).

Scottrade's Answer (CPN053), Case No. 6:08-cv-00304 (ED. Tex. (Tyler Div.))(Dec. 30, 2009).

Screen images of Aries Program output displays.

Sculley et al., "B2B Exchanges: The Killer Application in the Business-to-Business Internet Revolution," ISI Publications, 2000, pp. 195-247.

Skinner, David C.; "Introduction to Decision Analysis, A Practitioner's Guide to Improving Decision Quality, Second Edition"; 1999.

Sriram et al., "Computer-Aided Cooperative Product Development: A Case Study," International Journal of Systems Automation: Research and Applications (SARA), 1991, vol. 1, No. 1, pp. 89-112.

Sriram et al., "DICE: An Object-Oriented Programming Environment for Cooperative Engineering Design," Artificial Intelligence in Engineering Design, vol. 3, Academic Press Inc., 1992, pp. 303-366.

Sriram et al., "The MIT Dice Project," Computer, vol. 26, No. 1, 1993, pp. 64-65.

Sriram et al., "Transaction-Management Issues in Collaborative Engineering," J. of Computing in Civil Engineering, ASCE, vol. 6, No. 1, Jan. 1992, pp. 85-105.

Steve Glickman, "Interpreting Business Assessment Results" Jun. 8, 1998.

Study of Cockpit's Perspective on Human-Human Interactions to Guide Collaborative Decision Making Design in Air Traffic Management Groppe, M.; Bui, M.; Advances in Computer-Human Interaction, 2008 First International Conference on Feb. 10-12, 2008 pp. 107-113 Digital Object Identifier 10.1109/ACHI.2008.51.

Subpoena associated with Civil Case No. 2:06-cv-440.

Sweeney, John; "Product Review: Option Station, Version 1.2 Build 6"; Stocks & Commodities V15:14 (659-662).

Sweeney, John; "Product Review: Trade Station version 4, Build 15"; Stocks & Commodities v14.14, pp. 649-654.

TERAS Production 2000 Suite, Including Drilling 2000 (Release 1998.1.0), Halliburton.

Teras Suite 1998 (Release 1991.1.0 alpha 3).

The IDoc Interface Concept.

Thompson, R. R.; "A Methodology to Quantify Uncertainties and Leveraging Issues in Oil and Gas Project Economics," Society of Petroleum Engineers, SPE 19861, pp. 741-750; Oct. 1989.

U.S. Patent File History for U.S. Appl. No. 09/270,007, filed Mar. 16, 1999.

U.S. Patent File History for U.S. Appl. No. 09/311,150, filed May 13, 1999.

Understanding Challenges in Preserving and Reconstructing Computer-Assisted Medical Decision Processes Sang-Chul Lee; Bajcsy, P.; Machine Learning and Applications, 2007. ICMLA 2007. Sixth International Conference on Dec. 13-15, 2007 pp. 524-529 Digital Object Identifier 10.1109/ICMLA.2007.92.

Understanding PMSIM (Excerpt) CP 104-01.02 US) (1997).

U.S. Appl. No. 60/163,984 Nov. 8, 1999.

Using discrete event simulation to evaluate housestaff work schedules Klein, R.W.; Dame, M.A.; Dittus, R.S.; DeBrota, D.J.; Simulation Conference, 1990. Proceedings., Winter Dec. 9-12, 1990 pp. 738-742 Digital Object Identifier 10.1109/WSC.1990.129606.

Web based platform for management of heterogeneous medical data Ogescu, C.; Plaisanu, C.; Bistriceanu, D.; Automation, Quality and Testing, Robotics, 2008. AQTR 2008. IEEE International Conference on vol. 3, May 22-25, 2008 pp. 257-260 Digital Object Identifier 10.1109/AQTR.2008.4588923.

Wong "Preference-Based Decision Making for Cooperative Knowledge-Based Systems" Oct. 1994; Institute for New Generation Computer Technology; pp. 407-435.

Younes, Hakan L.; "Current Tools for Assisting Intelligent Agents in Real-Time Decision Making"; Thesis Paper at Royal Institute of Technology School of Electrical Engineering and Information Technology; Dec. 1998.

Office Action Summary from U.S. Appl. No. 09/708,154 which was mailed on Jul. 3, 2003.

Office Action Summary from U.S. Appl. No. 09/708,154 which was mailed on Apr. 22, 2004.

Office Action Summary from U.S. Appl. No. 09/708,154 which was mailed on Jun. 9, 2004.

Notice of Allowance from U.S. Appl. No. 09/708,154 which was mailed on Oct. 25, 2004.

Office Action Summary from U.S. Appl. No. 11/045,543 which was mailed on Dec. 1, 2006.

Office Action Summary from U.S. Appl. No. 11/045,543 which was mailed on Aug. 27, 2007.

Office Action Summary from U.S. Appl. No. 11/045,543 which was mailed on Nov. 27, 2007.

Notice of Allowance from U.S. Appl. No. 11/045,543 which was mailed on Mar. 17, 2008.

Office Action Summary from U.S. Appl. No. 11/768,861 which was mailed on Sep. 10, 2008.

Notice of Allowance from U.S. Appl. No. 11/768,861 which was mailed on Mar. 13, 2009.

Notice of Allowance from U.S. Appl. No. 11/768,861 which was mailed on Aug. 13, 2009.

Office Action Summary from U.S. Appl. No. 11/768,836 which was mailed on Sep. 9, 2008.

Notice of Allowance from U.S. Appl. No. 11/768,836 which was mailed on Jul. 13, 2009.

Office Action Summary from U.S. Appl. No. 11/768,815 which was mailed on Aug. 28, 2008.

Notice of Allowance from U.S. Appl. No. 11/768,815 which was mailed on Nov. 24, 2008.

Office Action Summary from U.S. Appl. No. 11/828,115 which was mailed on Sep. 29, 2008.

Notice of Allowance from U.S. Appl. No. 11/828,115 which was mailed on Dec. 31, 2008.

Office Action Summary from U.S. Appl. No. 11/828,129 which was mailed on Oct. 17, 2008.

Notice of Allowance from U.S. Appl. No. 11/828,129 which was mailed on May 22, 2009.

Notice of Allowance from U.S. Appl. No. 11/828,129 which was mailed on Sep. 29, 2009.

Office Action Summary from U.S. Appl. No. 12/615,250 which was mailed on Jul. 2, 2010.

Office Action Summary from U.S. Appl. No. 12/615,250 which was mailed on Sep. 28, 2010.

Office Action Summary from U.S. Appl. No. 12/615,250 which was mailed on Jan. 3, 2011.

Notice of Allowance from U.S. Appl. No. 12/615,250 which was mailed on Jan. 27, 2011.

Notice of Allowance from U.S. Appl. No. 12/615,250 which was mailed on Mar. 23, 2011.

Office Action Summary from U.S. Appl. No. 12/844,814 which was mailed on Dec. 8, 2010.

Office Action Summary from U.S. Appl. No. 09/708,244 which was mailed on Mar. 15, 2004.

Notice of Allowance from U.S. Appl. No. 09/708,244 which was mailed on Jan. 19, 2005.

U.S. Appl. No. 09/708,154, filed Nov. 7, 2000.

U.S. Appl. No. 11/045,543, filed Dec. 12, 2008.
U.S. Appl. No. 11/768,861, filed Jun. 27, 2007.
U.S. Appl. No.11/768,836, filed Jun. 27, 2007.
U.S. Appl. No. 11/768,815, filed Jun. 27, 2007.
U.S. Appl. No. 11/828,115, filed Jul. 25, 2007.
U.S. Appl. No. 11/828,129, filed Jul. 25, 2007.
U.S. Appl. No. 12/615,250, filed Nov. 9, 2009.
U.S. Appl. No. 12/844,814, filed Jul. 27, 2010.
U.S. Appl. No. 09/708,244, filed Nov. 7, 2000.
U.S. Appl. No. 11/336,070, filed Jan. 20, 2006.

Office Action Summary from U.S. Appl. No. 11/045,543 mailed on Aug. 27, 2007.

Final Office Action Summary from U.S. Appl. No. 11/045,543 mailed on Nov. 27, 2007.

Office Action Summary from U.S. Appl. No. 11/768,861 which was mailed on Sep. 10, 2009.

Office Action Summary from U.S. Appl. No. 11/768,836 mailed on Sep. 9, 2008.

Notice of Allowance from U.S. Appl. No. 11/768,836 mailed on Jul. 13, 2009.

Notice of Allowance from U.S. Appl. No. 11/828,129 mailed on May 22, 2009.

Notice of Allowance from U.S. Appl. No. 11/828,129 mailed on Sep. 29, 2009.

Ogescu, C.; Plaisanu, C.; Bistriceanu, D.; "Web Based Platform for Management of Heterogeneous Medical Data." Automation, Quality and Testing, Robotics, 2008. AQTR 2008. IEEE International Conference on vol. 3, May 22-25, 2008 pp. 257-260 Digital Object Identifier 10.1109/AQTR.2008.4588923.

Jingdong Cui, "Consumer Decision Process Model in Multi-channel Retail Banking;" Service Systems and Service Management, 2007 International Conference on Jun. 9-11, 2007 pp. 1-6 Digital Object Identifier 10.1109/ICSSSM.2007.4280113.

Lee, Sang-Chul; Bajcsy, P.; "Understanding Challenges in Preserving and Reconstructing Computer-Assisted Medical Decision Processes." Machine Learning and Applications, 2007. ICMLA 2007. Sixth International Conference on Dec. 13-15, 2007 pp. 524-529 Digital Object Identifier 10.1109/ICMLA.2007.92.

Miller, L.L.; Nilakanta, S.; "Design of Organizational Decision Support Systems: The Use of a Data Extraction Scheme to Facilitate Model-Database Communication." System Sciences, 1991. Proceedings of the Twenty-Fourth Annual Hawaii International Conference on vol. iv, Jan. 8-11, 1991 pp. 67-72 vol. 4.

Yato, A.; Rodriguez, J.R.; Cangur, G.; Boonbutra, R.; Kumte, R.; Lahagu, R.; "Car Purchase Decisions." Management of Engineering and Technology, 2001. PICMET '01. Portland International Conference on vol. 1, Jul. 29-Aug. 2, 2001 p. 126 vol. 1 Digital Object Identifier 10.1109/PICMET.2001.951835.

Arunkumar, S.; Jain, S.K.; "Multimedia as Value Enabler for Decision Making in Virtual Enterprises." Engineering and Technology Management, 1996. IEMC 96. Proceedings, International Conference on Aug. 18-20, 1996 pp. 34-41 Digital Object Identifier 10.1109/IEMC.1996.547786.

J. Douglas; Ollila, Richard G.; "Analysis of Complex Decisionmaking Processes." Hill Systems, Man and Cybernetics, IEEE Transactions on vol. 8, Issue 3, Mar. 1978 pp. 193-204 Digital Object Identifier 10.1109/TSMC.1978.4309930.

Klein, R.W.; Dame, M.A.; Dittus, R.S.; DeBrota, D.J.; "Using Discrete Event Simulation to Evaluate Housestaff Work Schedules." Simulation Conference, 1990. Proceedings., Winter Dec. 9-12, 1990 pp. 738-742 Digital Object Identifier 10.1109/WSC.1990.129606.

Zhang, N.; Lu, W.F.; "A Framework for Managing Enterprise Knowledge for Collaborative Decision Support." Industrial Informatics, 2007 5$^{th}$ IEEE International Conference on vol. 1, Jun. 23-27, 2007 pp. 517-522.

Zhang, N.; He, W.; Lee, E.W.; "Address Supply Chain Visibility from Knowledge Management Perspective." Industrial Informatics 2008. INDIN 2008. 6$^{th}$ IEEE International Conference on Jul. 13-16, 2008 pp. 865-870 Digital Object Identifier 10.1109/INDIN.2008.4618222.

Indiramma, M.; Anandakumar, K.R.; "Collaborative Decision Making Framework for Multi-agent System." Computer and Communication Engineering, 2008. ICCCE 2008. International Conference on May 13-15, 2008 pp. 1140-1146 Digital Object Identifier 10.1109/ICCCE.2008.4580785.

Groppe, M.; Bui, M.; "Study of Cockpit's Perspective on Human-Human Interactions to Guide Collaborative Decision Making Design in Air Traffic Management." Advances in Computer-Human Interaction, 2008 First International Conference on Feb. 10-15, 2008 pp. 107-113 Digital Object Identifier 10.1109/ACHI.2008.51.

Jiabin Xie; Nerlikar, A.; Glover, J.R.; McKinley, B.A.; "An ICU Protocol Development and Management System." Computer-Based Medical Systems, 2000. CBMS 2000. Proceedings. 13th IEEE Symposium on Jun. 22-24, 2000 pp. 43-47 Digital Object Identifier 10.1109/CBMS.2000.856872.

Aboy, M.; McNames, J.; Tran Thong; Tsunami, D.; Ellenby, M.S.; Goldstein, B.; "An Automatic Beat Detection Algorithm for Pressure Signals." Biomedical Engineering, IEEE Transactions on vol. 52, Issue 10, Oct. 2005 pp. 1662-1670 Digital Object Identifier 10.1109/TBME.2005.855725.

Pham, T.D.; Honghui Wang; Xiaobo Zhou; Dominik Beck; Brandl, M.; Hoehn, G.; Azok, J.; Brennan, M.-L.; Hazen, S.L.; Li, K.; Wong, S.T.C.; "Computational Prediction Models for Early Detection of Risk of Cardiovascular Events Using Mass Spectrometry Data." Information Technology in Biomedicine, IEEE Trans on vol. 12, Issue 5, Sep. 2008 pp. 636-643.

Poulsen, R.S.; Pedron, I.; "Region of Interest Finding in Reduced *Resolution* Colour Imagery. Application to Cancer Cell Cetection in Cell Overlaps and Clusters." Engineering in Medicine and Biology Society, 1995., IEEE 17th Annual Conference vol. 1, Sep. 20-23, 1995 pp. 499-500 vol. 1 Digital Object Identifier 10.1109/IEMBS.1995.575219.

Larsson, M.; "An Adaptive Predictive Approach to Emergency Frequency Control in Electric Power Systems." Decision and Control, 2005 and 2005 European Control Conference. CDC-ECC '05. 44th IEEE Conference on Dec. 12-15, 2005 pp. 4434-4439.

Johnson, Timothy L.; Wright, Stuart C.; Segall, Adrian; "Filtering of Muscle Artifact from the Electroencephalogram." Biomedical Engineering, IEEE Transactions on vol. BME-26, Issue 10, Oct. 1979 pp. 556-563 Digital Object Indentifier 10.1109/TBME.1979.326443.

DeFranco-Tommarello, J.; Deek, F.P.; "Collaborative Problem Solving and Groupware for Software Development." Engineering Management Review, IEEE vol. 35, Issue 4, Fourth Quarter 2007 pp. 54-54 Digital Object Identifier 10.1109/EMR.2007.4489950.

Nessralla, "Letter *re Sky Technologies LLC* v. *SAP AG, SAP Americas, Inc and Oracle Corporation* Subpoena for Records of the Massachusetts Institute of Technology," Jan. 30, 2008.

McNamee et al., "Decision Analysis with Supertree," $2^{nd}$ Edition, The Scientific Press, pp. 281-304.

* cited by examiner

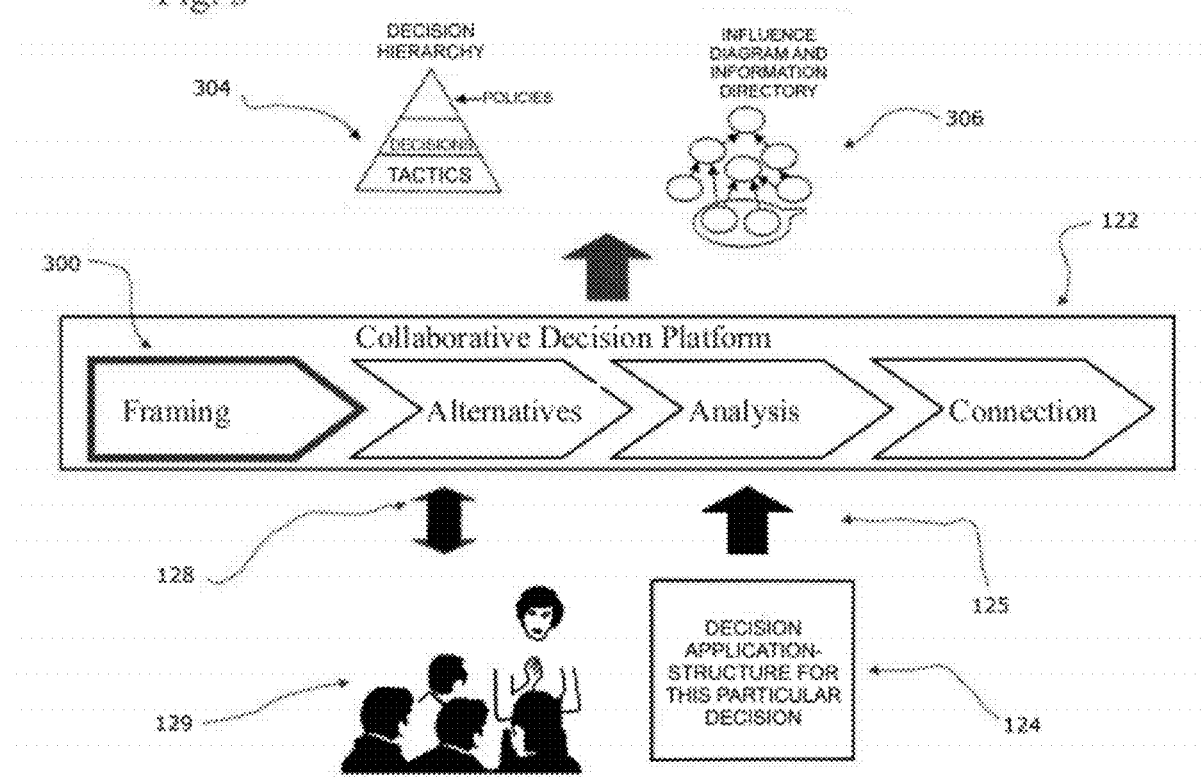

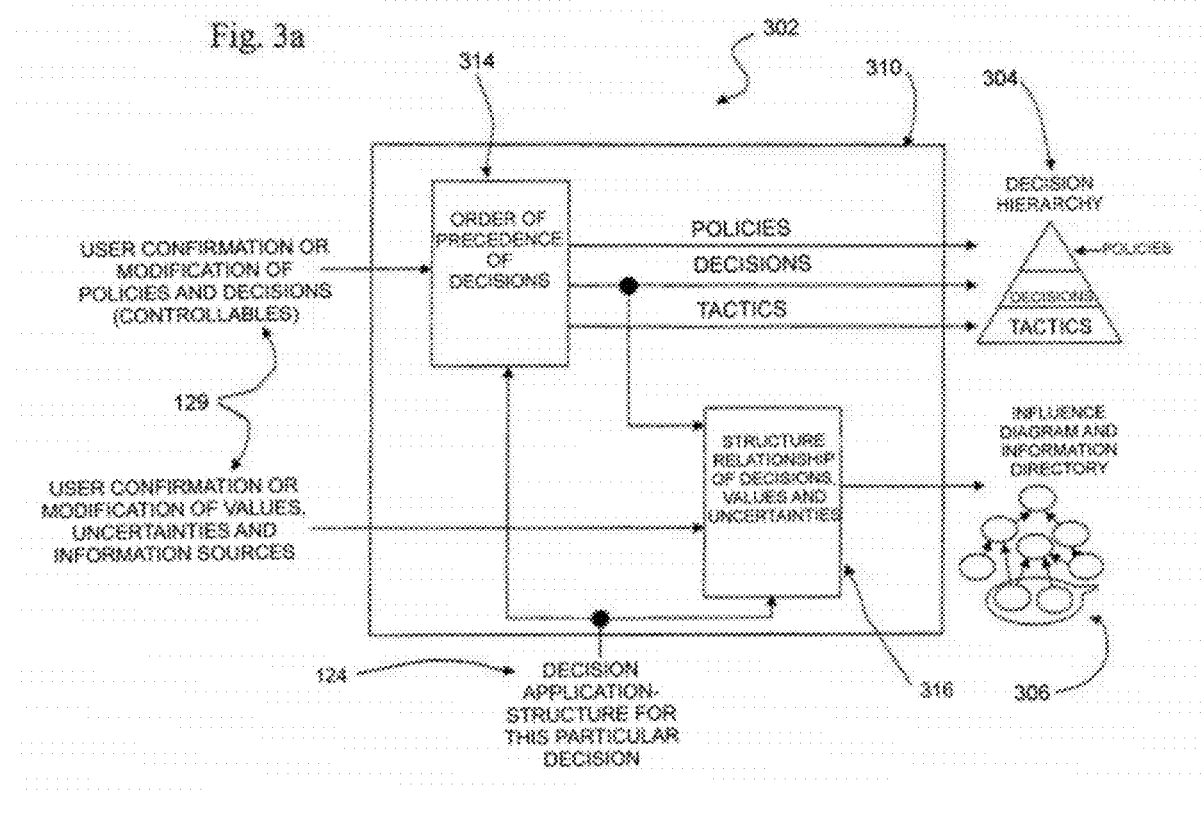

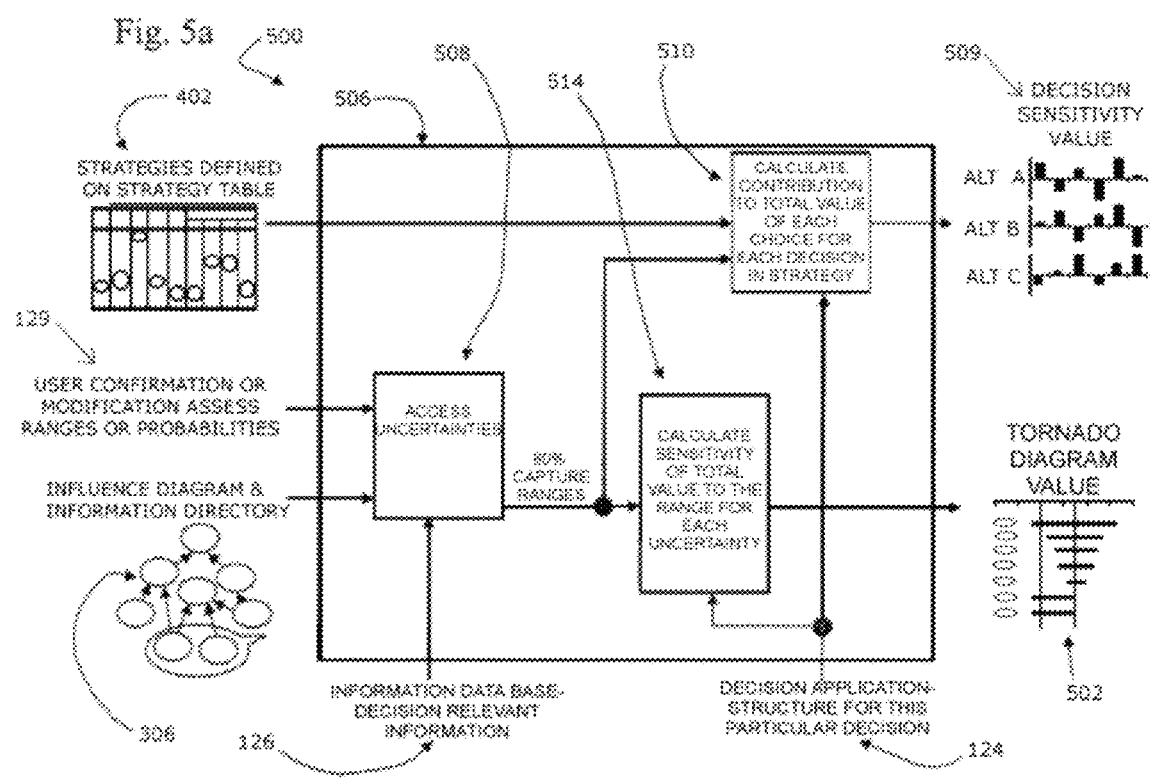

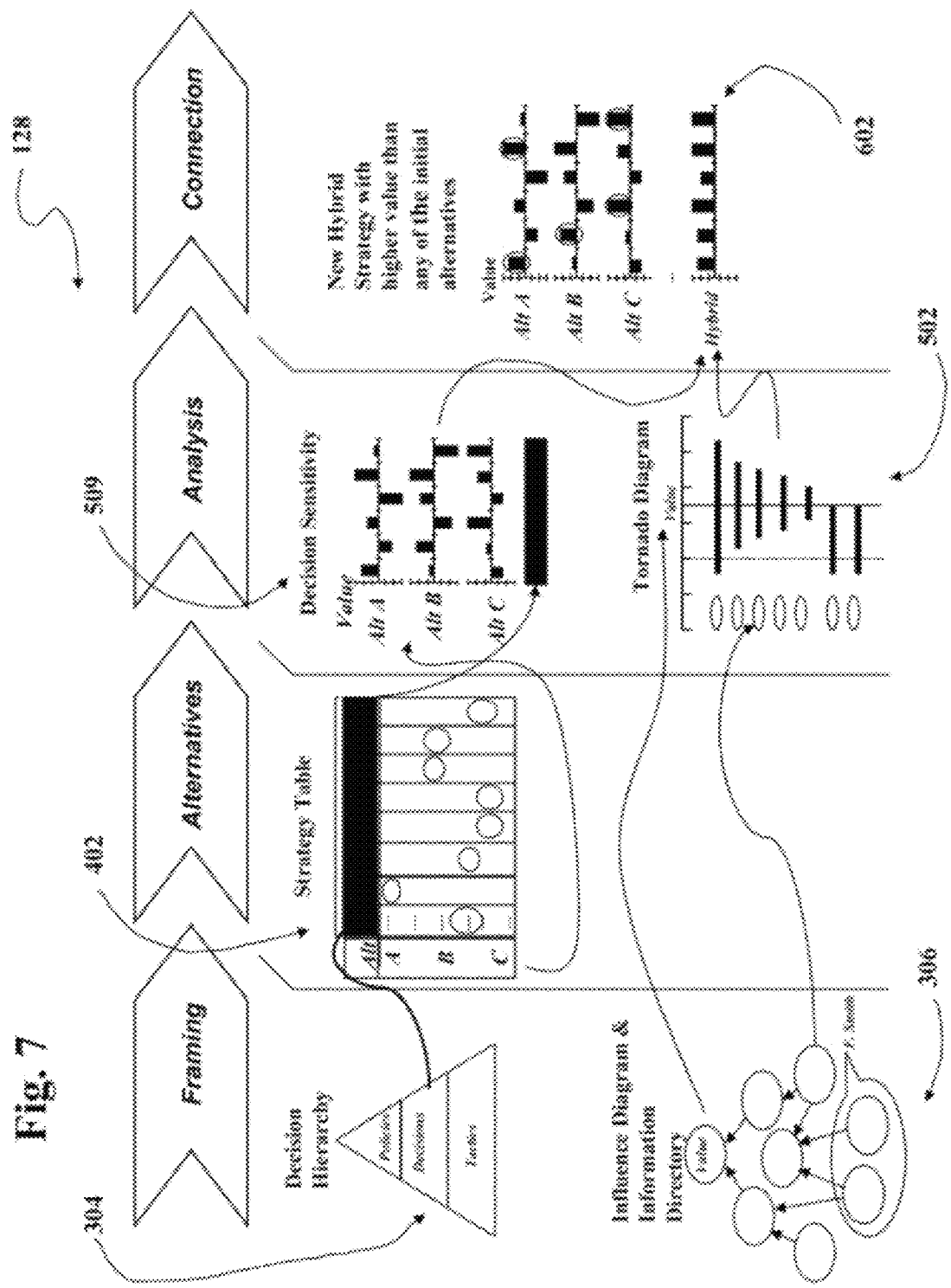

| Strategy Table | | | |
|---|---|---|---|
| Strategy Name | Initial Participation July 1, 2000 | Participation Adjustment Jan 1, 2001 | |
| No Participation | 0% | 0% | |
| In and Out | 5% | 5% | |
| Out and In | 7% | 7% | |
| | 10% | 10% | |

Fig. 8c

Strategy Table

| Strategy Name | Initial Participation July 1, 2000 | Participation Adjustment Jan 1, 2001 |
|---|---|---|
| No Participation | 0% | 0% |
| In and Out | 5% | 5% |
| Out and In | 7% | 7% |
|  | 10% | 10% |

Fig. 8d

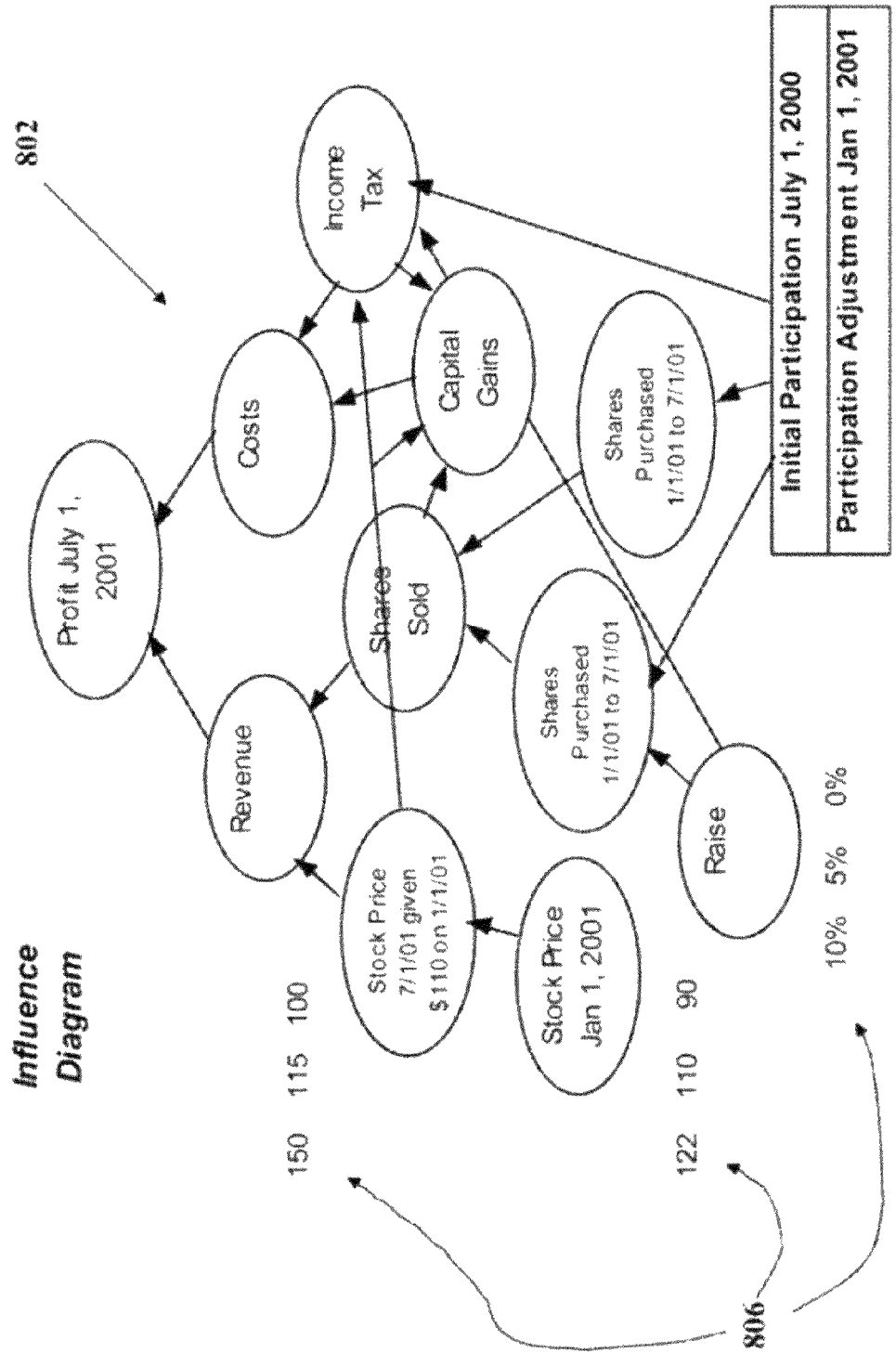

Strategy Table

| Strategy Name | Initial Participation July 1, 2000 | Participation Adjustment Jan 1, 2001 |
|---|---|---|
| No Participation | 0% | 0% |
| In and Out | 5% | 5% |
| Out and In | 7% | 7% |
| Maximum Contribution | 10% | 10% |

Fig. 8h

Strategy Table

| Strategy Name | Target Customers | Enterprise | Contact Center Personalization | Contact Center Operations | Sales Force Channel | Service Channel | Sales/Service Automation | New |
|---|---|---|---|---|---|---|---|---|
| (Momentum) | Current | Current | One Size Fits All | Outsource | Outsource | Outsource | None | |
| Low Cost | Lifetime Value | New Region | (Selected Segments) | (Current) | (Tele Sales) | Tele Sales | Multiple Legacy | |
| Increased Value | (Deselect) | (Global) | All Segments | Consolidate | Indirect | Indirect | Package | |
| | Consolidate Segments | | Every Contact | Improve Efficiency | Direct | Direct | Process Based | |
| | Needs/Wants | | | New | Combined | Combined | | |
| | | | | | Portal | Portal | | |

Add Strategy    Reset Strategy

Strategy Table

| | | | | | |
|---|---|---|---|---|---|
| Strategy Name | Momentum | Low Cost | (Increased Value) | | |
| Target Customers | Current | Lifetime Value | Closest | Consolidate Segments | (Needs/Wants) |
| Enterprise Reach | Current | New Region | (Global) | | |
| Contact Center Personalization | One Size Fits All | Selected Segments | All Segments | (Every Contact) | |
| Contact Center Operations | Outsource | Current | Consolidate | Improve Efficiency | (New) |
| Sales Force Channel | Outsource | Tele Sales | Indirect | Direct | (Combined) | Portal |
| Service Channel | Outsource | Tele Sales | Indirect | Direct | (Combined) | Portal |
| SelfService Automation | None | Multiple Legacy | (Package) | Process Based | |
| New | | | | | |

[Add Strategy] [Reset Strategy]

| C3 Attribute | Value of a one percent increase in the C3 attribute for a typical New Vehicle for Automotive manufacturer ($ Millions/year) | Alternative 3: Best Buy/ Cost-Driven (Percent increase in the C3 attribute) | Total value for C3 attribute increase ($ Millions/year) |
|---|---|---|---|
| Sales Volume (units) | 100 | +2 | 200 |
| Variable Margin (%) | 170 | +1 | 170 |
| Investment Cost ($) | -20 | +2 | -40 |
| Fixed Cost ($) | -10 | +2 | -20 |
| Total | | | 310 |

Strategy Table

| Strategy Name | Target Customers | Enterprise Reach | Contact Center Personalization | Contact Center Operations | Sales Force Channel | Service Channel | Sales/Service Automation | New |
|---|---|---|---|---|---|---|---|---|
| Momentum | Current | Current | One Size Fits All | Outsource | Outsource | Outsource | None | |
| Low Cost | Lifetime Value | New Region | Selected Segments | Current | Tele Sales | Tele Sales | Multiple Legacy | |
| Increased Value | Deselect | Global | All Segments | Consolidate | Indirect | Indirect | Package | |
| Hybrid | Consolidate Segments | | Every Contact | Improve Efficiency | Direct | Direct | Process Based | |
| | Needs/Wants | | | New | Combined | Combined | | |
| | | | | | Portal | Portal | | |

Add Strategy | Reset Strategy

SYSTEM, METHOD AND COMPUTER PROGRAM PRODUCT FOR A COLLABORATIVE DECISION PLATFORM

RELATED APPLICATION(S)

This is a continuation of co-pending prior application Ser. No. 12/615,250 filed on Nov. 9, 2009, which is a continuation of application Ser. No. 11/828,129 filed on Jul. 25, 2007, which is a continuation of application Ser. No. 11/045,543 filed on Jan. 28, 2005, which has issued under U.S. Pat. No. 7,401,059, which is a continuation of application Ser. No. 09/708,154 filed on Nov. 7, 2000, which has issued under U.S. Pat. No. 6,876,991, and which claims the priority of a previously filed provisional application with the title "Collaborative Decision Platform" filed Nov. 8, 1999 under Ser. No. 60/163,984, which are each incorporated herein by reference in their entirety.

FIELD OF THE INVENTION

The present invention relates to decision making logic, and more particularly to a computer-based platform which supports a decision making process.

BACKGROUND OF THE INVENTION

One of the first recorded decision making processes was proposed in the $18^{th}$ century when Benjamin Franklin suggested a process by which one of two decision alternatives could be selected through listing advantages of the alternatives side by side and canceling out advantages or groups of advantages judged to be equal on both sides. Subsequently many decision processes have been proposed and are in use today. These include popular ones, such as Kepner-Tregoe where criteria for making the decision are listed and the alternatives are assessed (on a scale from 1 to 10) as to how they perform on each of the criteria. The criteria are also weighted on a similar scale and the best alternative is judged to be the highest dot product of the criteria weights and the respective assessments for the alternative against the criteria. Various modifications to this basic process in order to take into account complexities of having multiple decision makers, refining the assessment process through pair-wise comparison, etc., have resulted in many other such decision processes such as Value Management, Analytic Hierarchy Process, and others. There are also several methodologies (such as decision analyses using decision trees and probability methods) aimed at assisting a decision-maker think through the options one has in making a decision and potential outcomes of each option. However ninny of these decision processes are in fact not processes, but only individual tools to compare pre-defined alternatives within a pre-specified problem frame.

In order to create a process which enables multiple decision makers to make strategic decisions in organizationally and technically complex circumstances, the Dialogue Decision Process (DDP) was proposed as a sequence of four steps (framing, alternatives, analysis, connection) and is well described, in literature [Barabba, V. P., *Meeting of the Minds*, Harvard Business Press, and other sources].

However to date, a short-coming of the process above as well as other processes, is that there has been no way to ensure that it can be applied to any decision regardless of type, complexity or number of decision makers. Furthermore, there has been no software that supports the complete sequence of these steps since each decision tends to be unique. This has resulted in each instantiation of decision processes being tailored to a particular decision. In the case of DDP, this has resulted in the process being a relatively sophisticated tool only used in certain circumstances and only when facilitated by experienced practitioners.

There is therefore a need for a computer-implemented method which may be utilized for implementing DDP in different environments in a universal manner.

SUMMARY

A decision making system, method and computer program product are provided. Initially, a plurality of attributes is defined. Thereafter, first information regarding the attributes is received from a receiving business. Second information is then received regarding proposed products or services in terms of the attributes. Such second information is received from a supplying business. In use, a decision process is executed based on the first information and the second information.

BRIEF DESCRIPTION OF THE DRAWINGS

FIG. 1b illustrates a networked decision making environment in accordance with one embodiment of the present invention;

FIG. 3 illustrates an example of Framing in accordance with one embodiment of the present invention;

FIG. 3a illustrates various logic associated with the Framing process of the present invention;

FIG. 5a illustrates various logic associated with the Analysis process of the present invention;

FIG. 7 illustrates the various logical connectivity between the various inputs and outputs of the Framing, Alternatives, Analysis, and Connection logic that comprises the users' interface;

FIGS. 8a-i illustrate an example of an application of the various logic components set forth in FIGS. 3-7;

FIGS. 19 through 30 illustrate an exemplary application of the customer centric collaborative protocol.

DETAILED DESCRIPTION

Figure 1:
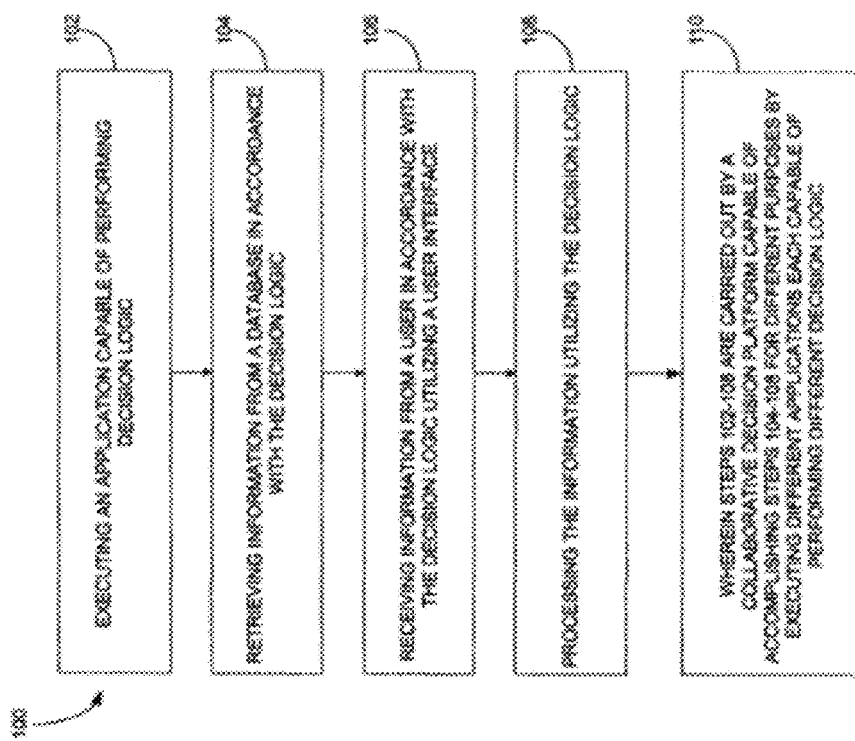
FIG. 1 illustrates a method for providing a collaborative decision platform adapted to run on a computer.

FIG. 1 illustrates a method 100 for providing a collaborative decision platform adapted to run on a computer. Initially, an application capable of performing decision logic is executed. See operation 102.

Information is then retrieved from a database in accordance with the decision logic, as indicated in operation 104. Information is then delivered to and received from a user in accordance with the decision logic utilizing a user interface. Note operation 106. The information is then processed in operation 108 utilizing the decision logic.

In use, the foregoing steps are carried out by a collaborative decision platform capable of retrieving and receiving the information, and processing such information for different purposes by executing different applications each capable of performing different decision logic. Note operation 110. It should be noted that the various steps set forth hereinabove may be carried out using universal modules capable of interfacing with different applications.

Figure 1A:
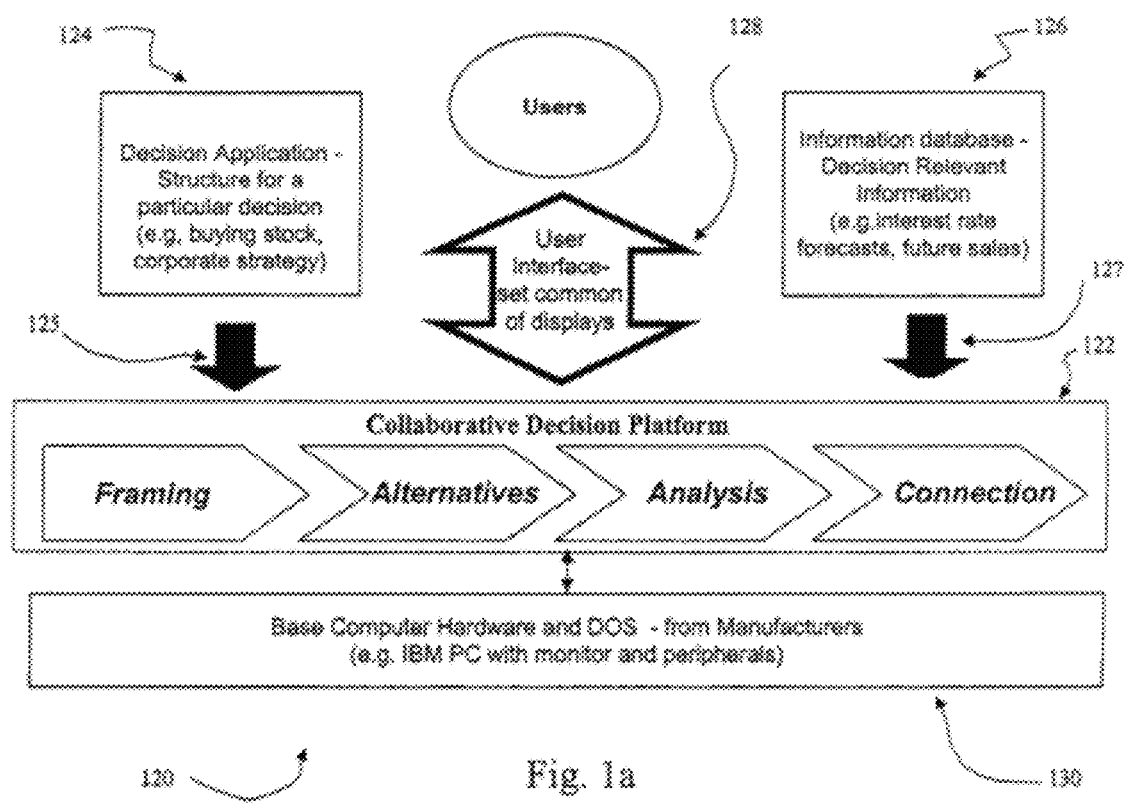
FIG. 1a illustrates a system by which the method of FIG. 1 may be carried out.
Figure 1:
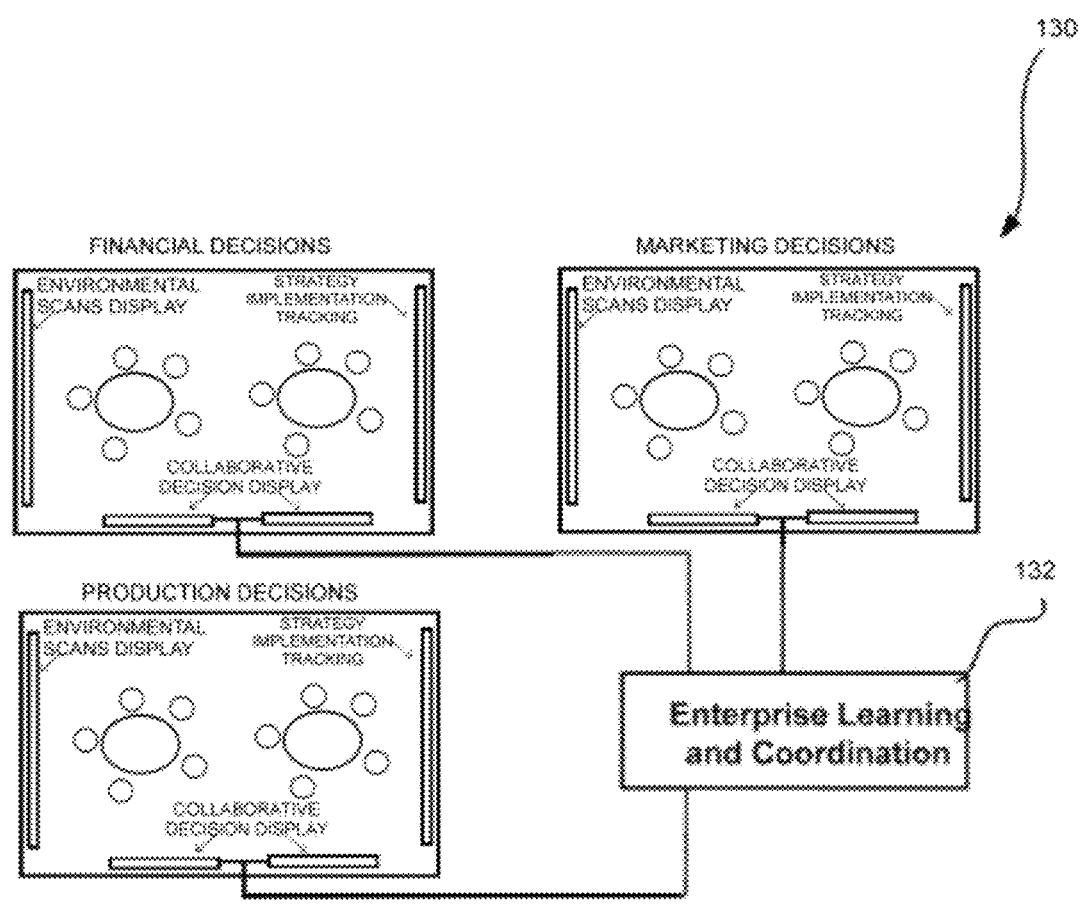

FIG. 1a illustrates a system 120 by which the foregoing method of FIG. 1 may be carried out. As shown, a collaborative decision platform 122 is provided which has an interface 125 with at least one application 124 for executing the decision logic, as set forth in operation 102 of FIG. 1. Further included, is a database 126, which has an interface 127 with the collaborative decision platform 122 in accordance with operation 104 of FIG. 1. Further, a user interface 128 is provided for receiving information from and providing information to the users. The interfaces 125, 127, and 128 are defined by the collaborative decision platform 122. The users may be an important element of the system 120. Note the two-headed arrow representing the users' interface 128 with the collaborative decision platform 122 to indicate the interaction, while the single arrowhead of the interface 125 and 127 indicates input. Note operation 106 of FIG. 1. The collaborative decision platform 122 may be run on any type of hardware architecture 130.

As set forth earlier, the various steps of FIG. 1 may be carried out using universal modules capable of interfacing with different applications. Such different applications 124 may be capable of performing decision logic relating to any type of decision-making process (e.g. financial, medical, buying a house, selecting a corporate strategy, etc.). In use, the collaborative decision platform 122 enables decision-making processes through the sequence and connectivity of a set of common displays, which describes the decision to be made. The collaborative decision platform 122 further enables asynchronous, remote decision-making processes, i.e. the ability to have different people input data into the set of common displays at different times, and from different places. Further, the database 126 may take the form of any one or a plurality of databases which may or may not be interconnected via a network such as the Internet. To this end, the present embodiment is designed to foster clear and conscientious decision-making.

FIG. 1b illustrates a plurality of network 130 of decision environments for allowing enterprises to learn more rapidly and coordinate more effectively. Such a network of decision environments each include at least one collaborative user interface which each communicate with an enterprise learning and coordination module 132 that may include one or more collaborative decision platforms 122. Such a network 130 may allow the decision environments to be a physical arrangement optimized for human decision making or a virtual environment consisting of only the computer hardware and the collaborative decision platform 122.

Figure 2:
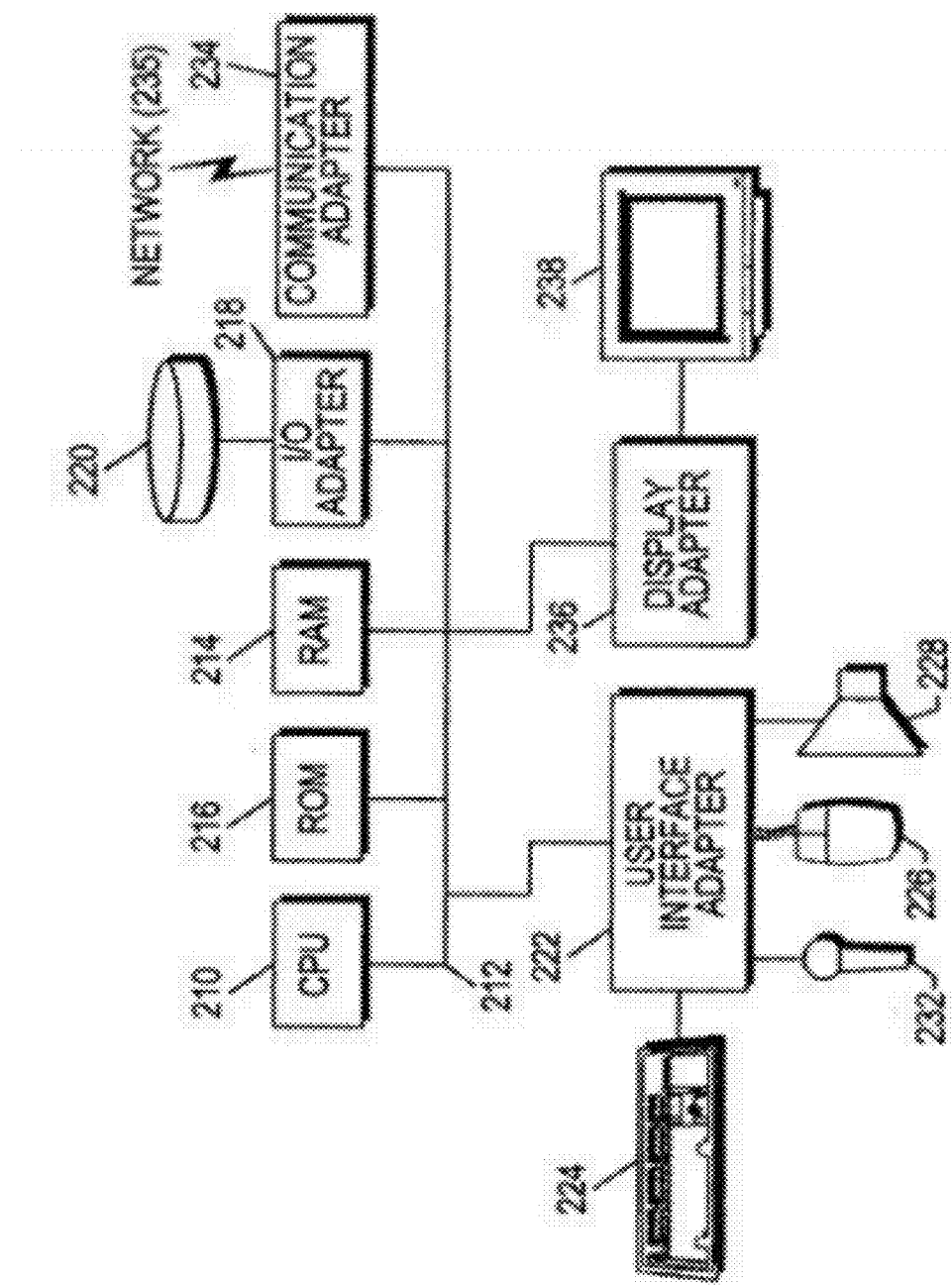
FIG. 2 shows a representative hardware environment on which the collaborative decision platform of FIG. 1a may be implemented.

FIG. 2 shows a representative hardware environment on which the collaborative decision platform 122 of FIG. 1a may be implemented. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown to the bus 212, communication adapter 234 for connecting the workstation to a communication network 235 (e.g., a data processing network) and a display adapter 236 for connecting the bus 212 to a display device 238.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed, as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing, the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Sonic typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters. OOP allows the software developer to design and implement a computer program that is a model of some aspects of reality, whether that reality is a physical emit, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore. C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch, Polymorphism and multiple inheritance make it possible for different programmers to mix and match characteristics of many different classes and create specialized objects that can still work with related objects in predictable ways.

Class hierarchies and containment hierarchies provide as flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control it must control. The interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just ORB way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding. H. Frystyk, T. Berners-Lee, J. Gettys and J. C. Mogul, "Hypertext Transfer Protocol—HTTP/1.1:HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and intemperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Suns Java language has emerged as an industry-recognized language for "programming the Internet." Sun defines Java as "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically. "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

It should be noted that, in one embodiment, the information database and the common displays may all be treated as objects by the platform. As such, the foregoing technology may be utilized in the implementation of the overall system, as embodied in FIG. 1a.

Preferred Embodiment

The platform of the present embodiment acts as a "decision engine" which drives the decision process through a sequence of logical steps to a conclusion. The users' interface during these steps is the set of common displays exhibited by the platform. The users receive and provide specific decision information to the platform by entering or modifying the structure of the decision and the decision-relevant information in the display areas where appropriate. In order to start the process, the platform hosts a decision application which provides the structure for the type of decision that the user wants to make. The application and platform communicate through a standard interlace protocol. The platform guides the user through four steps (framing, alternatives, analysis and connection), but these are tailored to the decision at hand through the decision application.

FIG. 3 illustrates an example of Framing 300 in accordance with one embodiment of the present invention. The purpose of Framing is to clearly communicate to the users the capabilities of the chosen decision application 124 and to allow the users to modify the problem definition to the extent that the capability for modification has been incorporated by the authors of the application. During Framing, the specific decision application provides certain key pieces of information about the decision at hand as input in a specific format or protocol 125 specified by the collaborative decision platform 122 that describe the capabilities of that application. Such input may include the policies that form boundary conditions for the decision, the strategic decisions that can be made, the values that are important to the decision makers, the uncertainties that may impact the values desired, and the relationship of the above elements.

The Framing process, using this key input from the decision application 1124 in the specific format 125, generates visual displays of a decision hierarchy 304 and an influence diagram 306, to be confirmed or modified by the users. The users' information 129 is seen as an input to the framing process 300, because the users interact with the platform 122 to produce a resultant decision hierarchy 304 and the influence diagram 306 that capture their collective view of the decision problem.

Note the two-headed arrow representing the users' interface 128 with the collaborative decision platform 122 to indicate the interaction, while the single arrow head of the interface 125 indicates input. In the event that the users are unable to successfully represent the decision problem as they see it with the initial decision application, they will select another application 124 and repeat the Framing process 300.

FIG. 3a illustrates various logic 310 associated, with the Framing process of the present invention. As shown, a first Framing module 314 receives information from the decision application 124, such as the specific policies, decisions (controllables) and tactics that it can accommodate with a logical structure. The first framing module 314 orders the precedence of decisions to output the decision hierarchy 304. Decisions that have already been made are referred to as "policy," as set of one or more decisions of immediate interest are referred to as "strategy" or "strategic decisions" or just "decisions," and decisions that can be deferred until later are referred to as "tactics". The users confirm or modify 129 the policies, decisions and tactics. For example, the users may not want to address a particular decision at this time, in which case it would become a tactic.

Working in parallel with the first Framing module 314 is a second Framing module 316. Such second Framing module 316 receives as input pertinent uncertainties or risks (uncontrollables), information sources and values that further describe the capabilities of the decision application 124. The second Framing module 316 also receives as input the decisions identified by the first Framing module 314 and users' confirmation or modification 129 of the values, information sources and uncertainties. With such, the second Framing module 316 structures a relationship of decisions, values and uncertainties in form of the influence diagram and a corresponding directory to sources of information 306.

Figure 4:
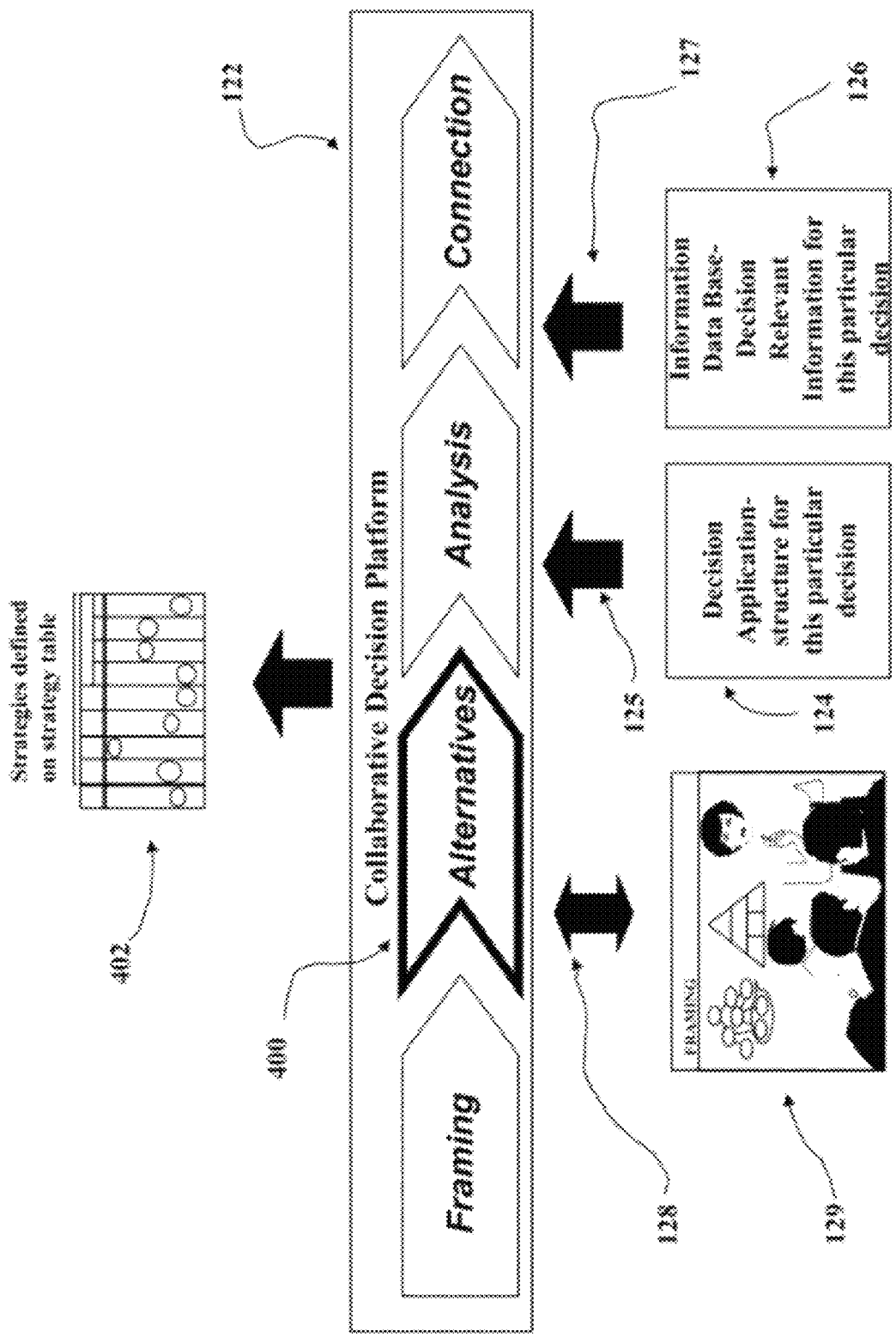
FIG. 4 illustrates an example of Alternatives in accordance with one embodiment of the present invention.

FIG. 4 illustrates an example of Alternatives 400 in accordance with one embodiment of the present invention. The purpose of the Alternatives process is to develop a set of strategic alternatives that capture the range of possibilities envisioned by the users. After Framing, the platform moves to Alternatives, and receives from the decision application 124 and the information data base 126 alternative strategies each comprised of a set of coherent choices for each of the strategic decision. The users confirm or modify 129 the alternative strategies. The platform generates the visual display of the strategies defined on a strategy table 402.

Figure 4A:
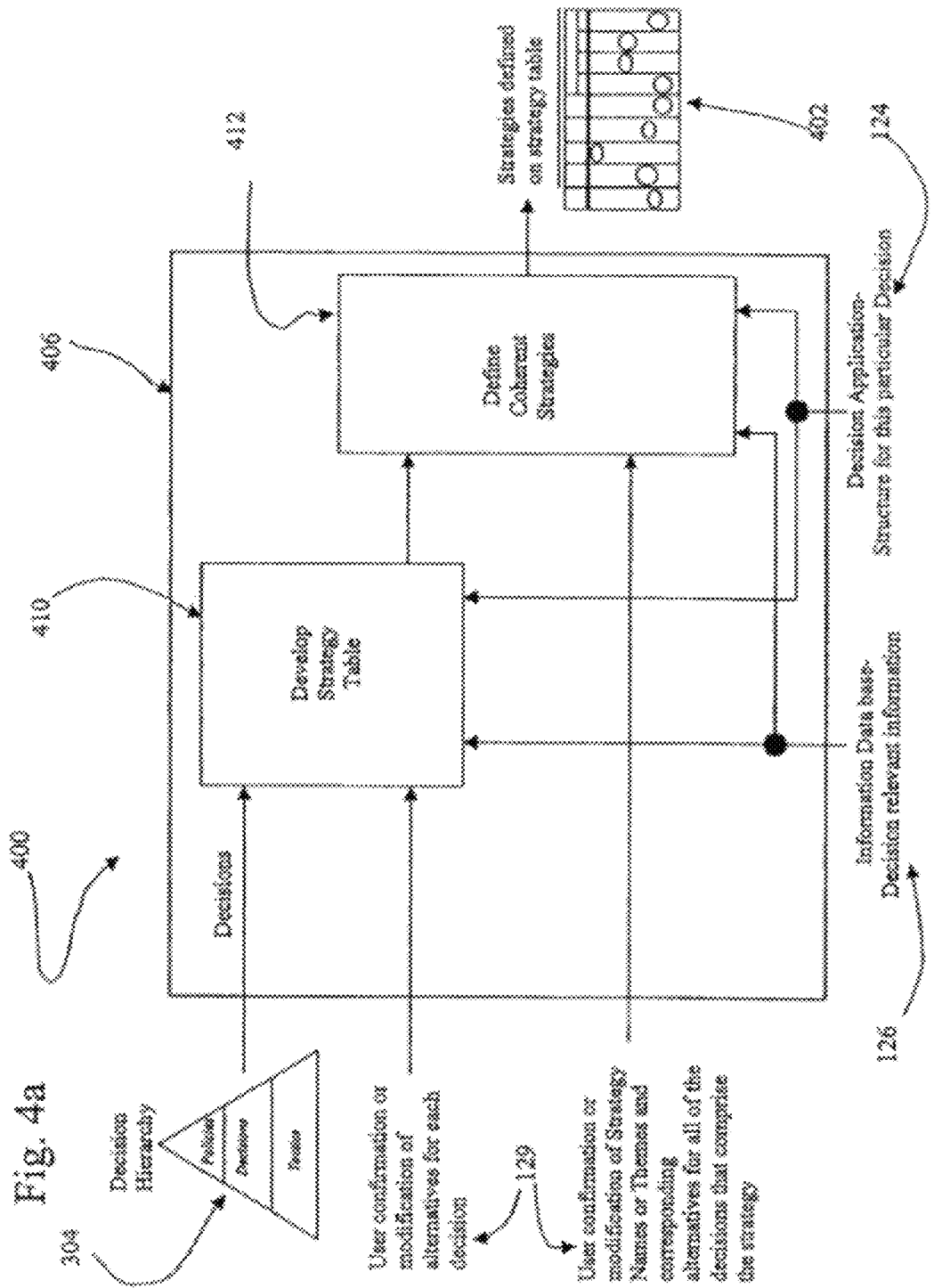
FIG. 4a illustrates various logic associated with the Alternatives process of the present invention which is capable of handling its various input for the purpose of generating a strategy table.

FIG. 4a illustrates various logic 406 associated with the Alternatives process of the present invention which is capable of generating several strategies defined on a strategy table 402. Included with the Alternatives logic 406 is a first Alternatives module 410 that receives the decision hierarchy 304 generated by the Framing logic 310. The first Alternatives module 410 obtains decision alternatives in each of the decision areas from the decision application 124 and from an information database 126 for the purpose of developing a strategy table. Each (strategic) decision from the decision hierarchy 304 becomes a column heading in the strategy table 402 with the alternatives for that decision arranged in a column beneath it. The first Alternatives module 410 also takes as input the users confirmation or modification 129 of the decision alternatives.

A second Alternatives module 412 combines the strategy table output of the first Alternatives module 410 with strategy descriptions from the decision application 124. The strategy descriptions include a strategy name and the selection of one alternative for each of the decisions that comprise the column headings in the strategy table 402. The second Alternatives module 412 can then display the strategies on a strategy table and incorporate the users' confirmation or modifications 129. For example, the users may want to define their own strategy, which they would do by providing the second Alternatives module 412 with a strategy name and the selection of and alternative in each column of the strategy table 402.

Figure 5:
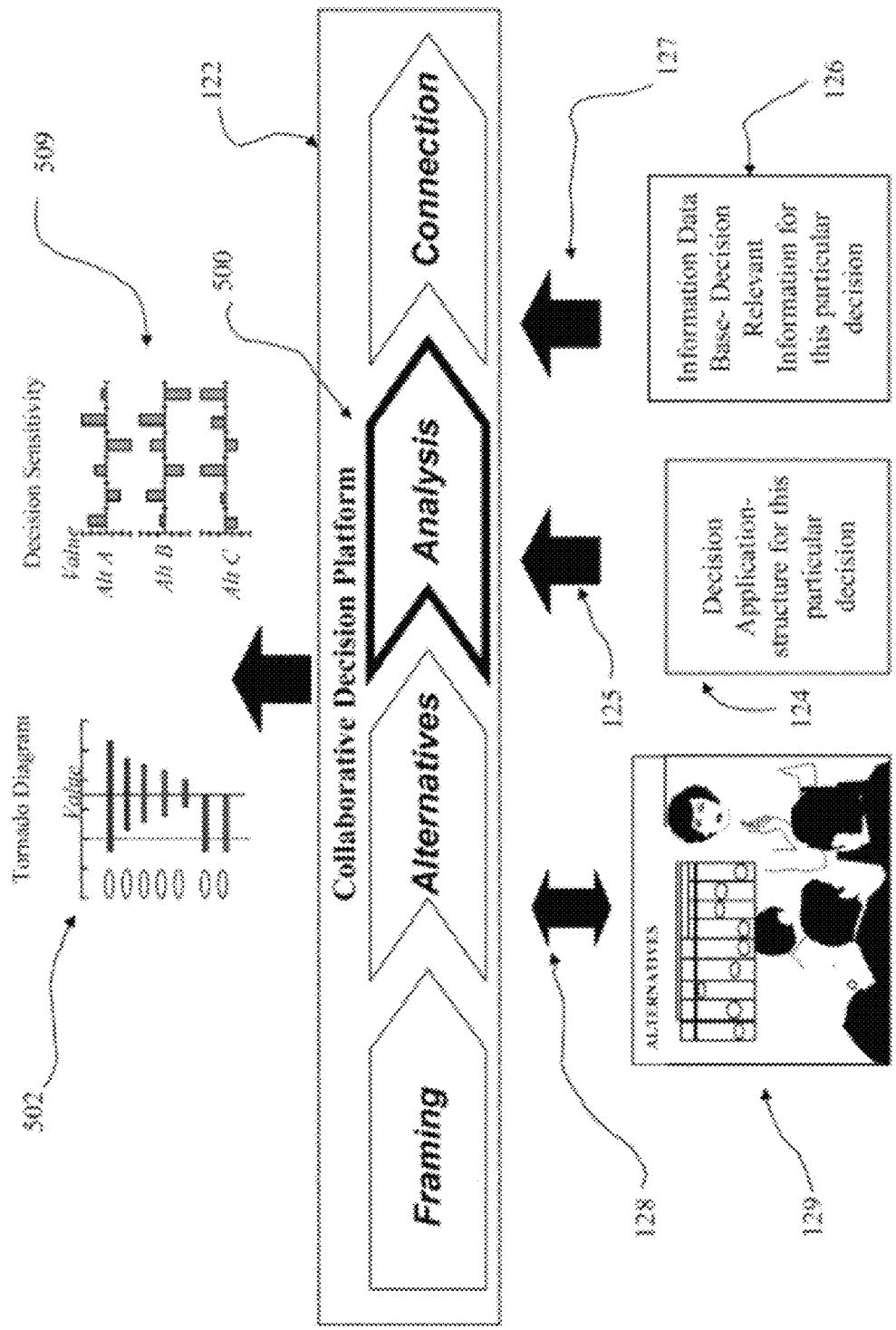
FIG. 5 illustrates an example of Analysis in accordance with one embodiment of the present invention.

FIG. 5 illustrates an example of Analysis 500 in accordance with one embodiment of the present invention. The purpose of the Analysis process is to enable the users to have a shared understanding of the significant sources of risk and value in each of the initially defined alternative strategies. During Analysis, the platform prompts the information database 126 for assessments on each of the uncertainties set forth in a format 127 specified as low estimate, nominal estimate, and high estimate. These assessments are made for uncertainties influenced by the choice of decision, as well as independent uncertainties.

Using the information generated previously and the model structure of the decision application 124, the platform makes the necessary calculations to output tornado diagrams 502 and decision sensitivity output displays for each of the alternative strategies 509. The users confirm or modify the input information 129 and structure from the decision application 124. The tornado diagrams identify the sources of significant risk in each alternative strategy and the decision sensitivity identifies the sources of significant value in each alternative strategy.

FIG. 5a illustrates various logic 506 associated with the Analysis process of the present invention. As shown, a first Analysis module 508 receives as input the influence diagram 306, identifying uncertainties and their relationship to the value and the decisions. The influence diagram also includes an information directory, which specifies the information database(s) 126 that will provide the decision-relevant information. This first Analysis module 508 also receives as input from the information data base(s) 126 assessed ranges or probabilities for each of the uncertainties identified by the influence diagram 306 generated using the Framing logic 310. These data ranges are confirmed or modified by the users 129.

The output of the first Analysis module 508 is further used by a second Analysis module 514. The second Analysis module 514 takes as input the structural relationship of decisions, values and uncertainties from the decision application 124. An example of such a structural relationship is a spreadsheet comprised of equations relating decisions, values and uncertainties. This output is, in turn, used to generate the tornado diagram 502 by varying each of the uncertainties over its range and recording the effect on value.

In parallel with the first and second Analysis modules is a third Analysis module 510 that takes as input the strategies defined on the strategy table 402, the output of the first Analysis module 508 and the structural relationship of decisions, values and uncertainties from the decision application 124. With such input, the third Analysis module 510 identifies a contribution to the total value of each alternative for each decision that comprises each strategy. Given this information, a decision sensitivity table 509 may be constructed.

Figure 6:
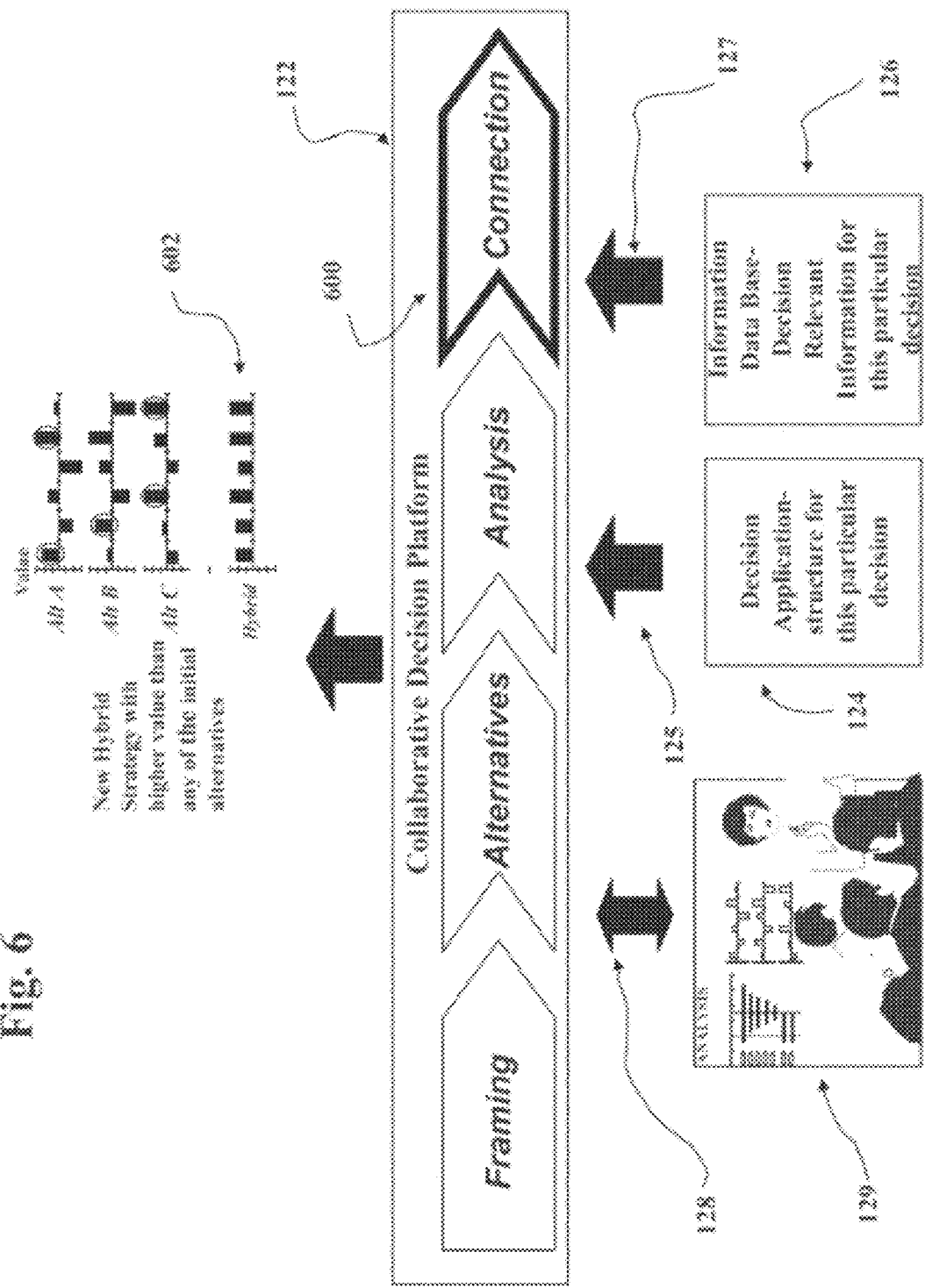
FIG. 6 illustrates an example of Connection in accordance with one embodiment of the present invention.

FIG. 6 illustrates an example of Connection 600 in accordance with one embodiment of the present invention. The purpose of Connection is for the users to develop a new, more valuable "hybrid" strategy 602 combining the most valuable decisions in each of the initially defined alternative strategies. During Connection, the users' insight into the sources of risk and value 129 interacts with new decision relevant information from the database 126 and the decision structure provided by the decision application 124 to output an evaluation of the hybrid strategy 602.

Figure 6A:
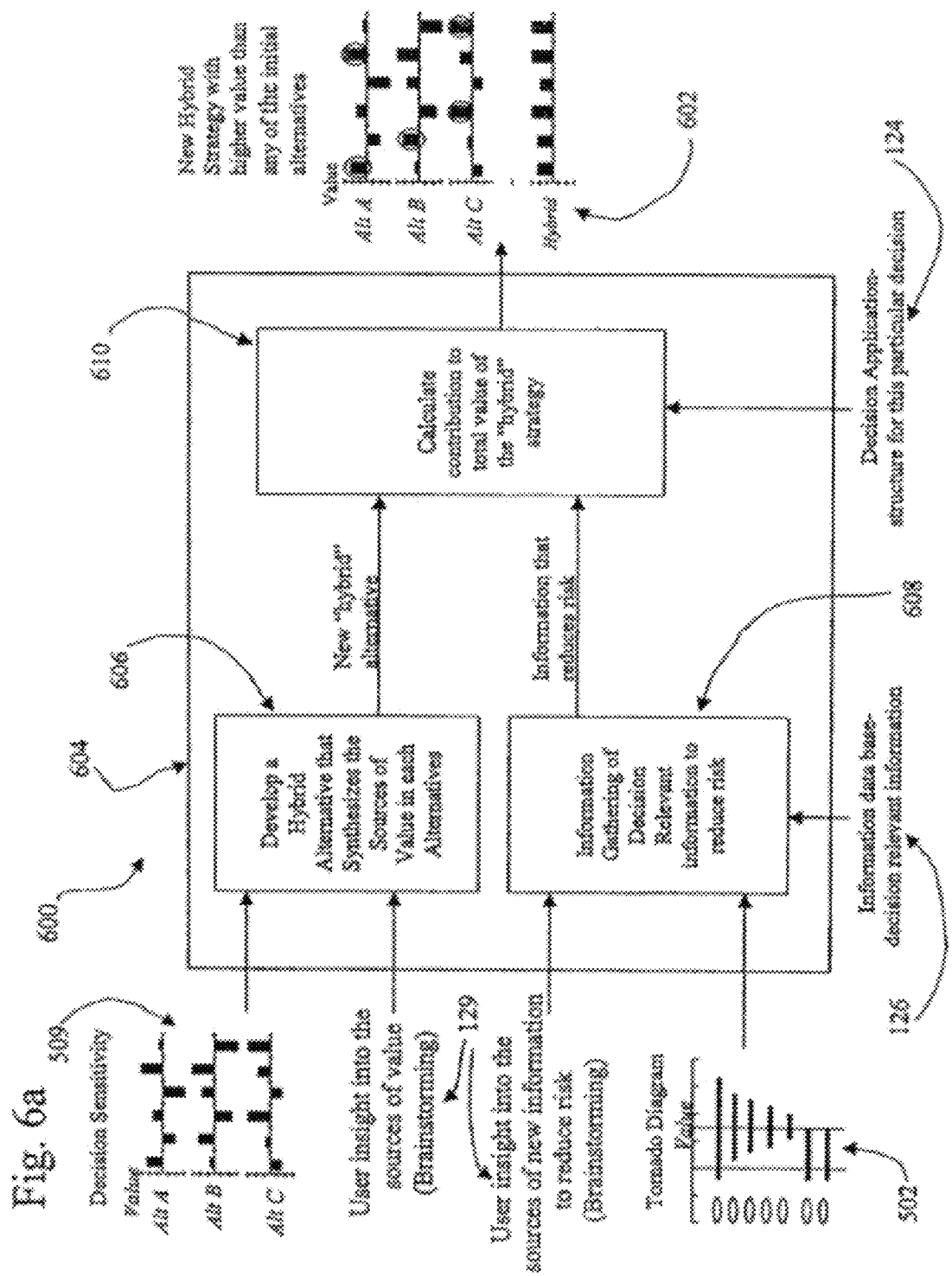
FIG. 6a illustrates various logic associated with the Connection process of the present invention.

FIG. 6a illustrates various logic 604 associated with the Connection process of the present invention. As shown, the logic 604 includes a first Connection module 606 which receives as input a value contribution of each alternative for each decision that comprise each strategy, the decision sensitivity 509 generated by the Analysis logic 506. The first connection module 606 also receives as input user insight 129 regarding how to combine the sources of value into a new, more valuable hybrid strategy. A second logic module 608 of the connection logic 604 takes as input the users' insight 129 about additional information sources that could reduce the significant uncertainties or risks identified in the tornado diagram 502. This second Connection module 608 then selects that new information from an appropriate decision relevant database (perhaps one not previously used for this decision problem) 126. The description of the new hybrid alternative from the first Connection module 606 and the new risk reducing information from the second Connection module 608 are input to a third module 610. This third module 610 uses the structural relationship of decisions, values and uncertainties (e.g., spreadsheet) from the decision application 124 to output the value of the hybrid strategy 602.

FIG. 7 illustrates the various logical connectivity among the various common displays of the Framing, Alternatives, Analysis, and Connection that comprise the users' interface 128.

FIGS. 8*a-i* illustrate an example of an application of the various logic components set forth in FIGS. 3-7. As shown, such illustrative application of the collaborative decision platform relates to an individual and his/her spouse, the users, selecting a strategy for participation in an employer's stock purchase program. Initially, the collaborative decision platform executes a decision application selected by the users for developing stock purchase strategies.

In the Framing process, the collaborative decision platform uses input from the decision application to present the users with an initial decision hierarchy, which the users confirm or modify. The collaborative decision platform produces the resulting decision hierarchy 800, shown in FIG. 8*a*, as an output, which identifies the decisions that are within the scope of the current decision making process.

The collaborative decision platform also uses input from the decision application to present the users with an initial influence diagram, which the users confirm or modify. The influence diagram identifies the critical uncertainties or risks, the decisions and the values that are important to the users, and it displays the relationships among, them. The users confirm or modify the influence diagram. The collaborative decision platform produces the resulting influence diagram 802, shown in FIG. 8*b*), as another output. Note that a directory of information sources 803 is included with the influence diagram.

The users are allowed to modify the influence diagram and the decision hierarchy only to the extent that the modifications were anticipated by the author of the application. This restriction assures that the alternative strategies that are defined in the Alternatives process can be analyzed with the spreadsheet provided by the decision application.

In the Alternatives process, the collaborative decision platform uses input from the decision application to present the users with an initial strategy table that is consistent with the decision hierarchy, which the users confirm or modify. One or more strategy names and their corresponding definitions on the strategy table are also presented to the users. The users may confirm or modify the strategies, including developing new strategies. The resulting strategy alternatives are displayed on strategy tables 804, as shown in FIGS. 8*c* and 8*d*.

Figure 8A:
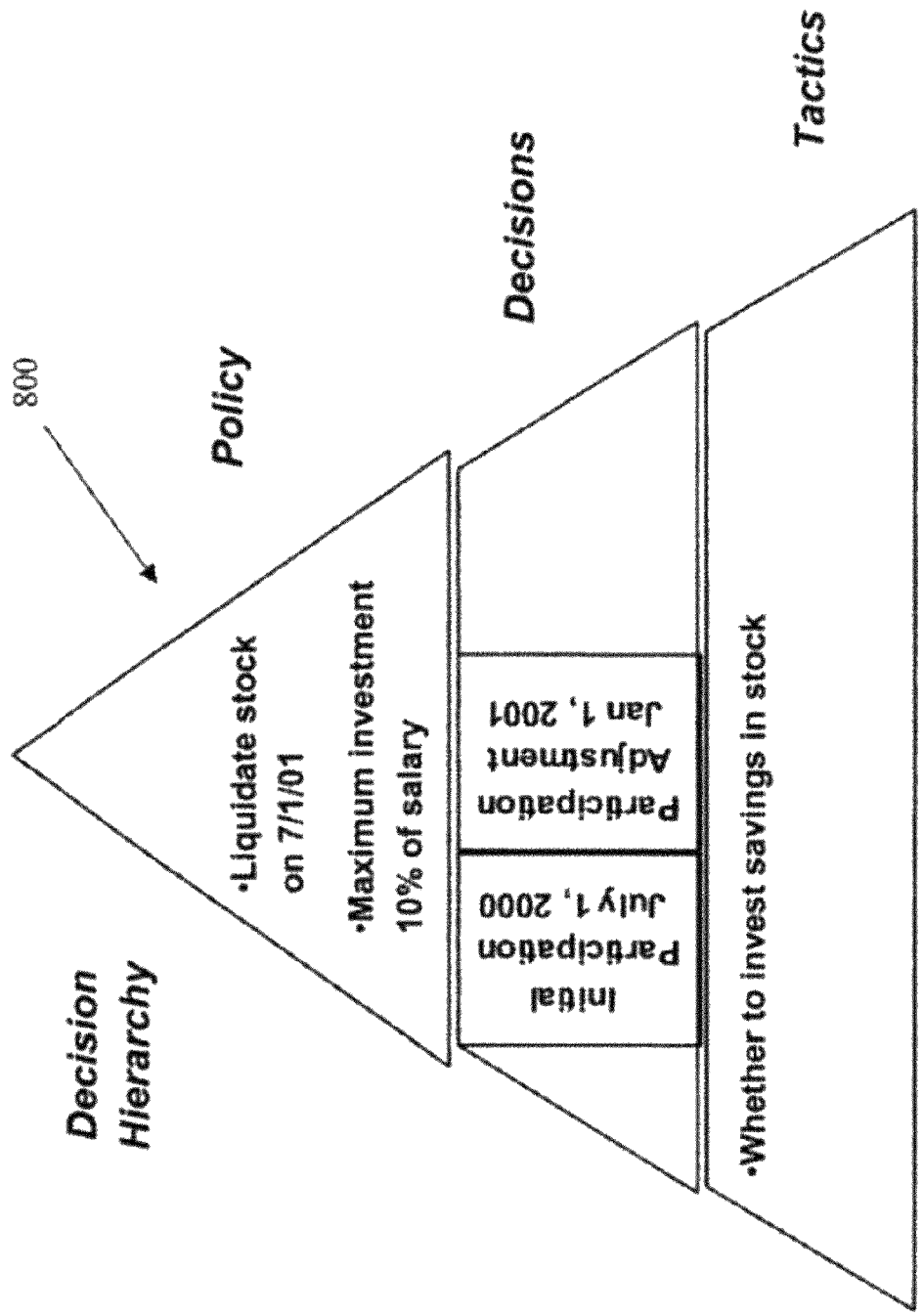
Figure 8B:
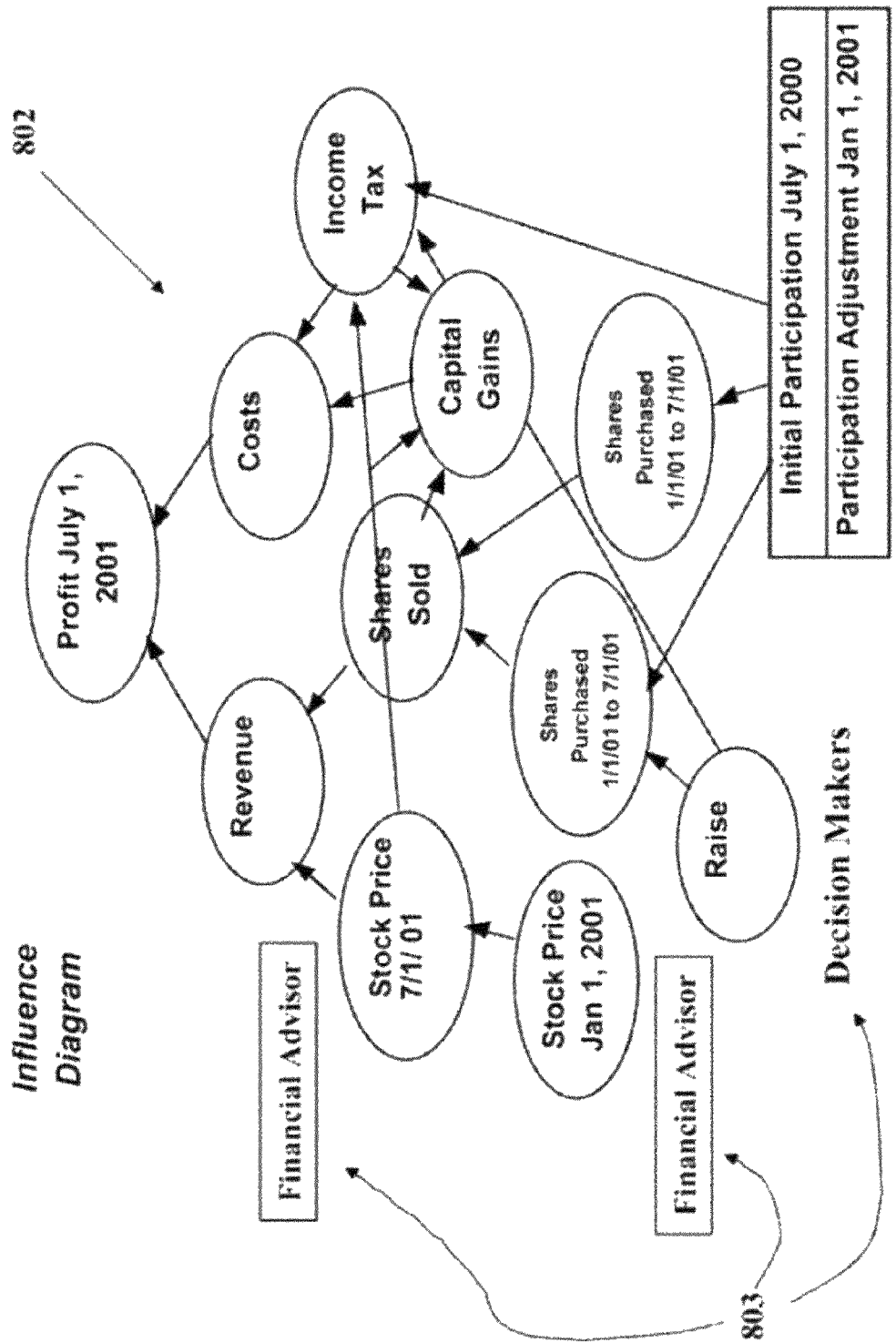
Figure 8F:
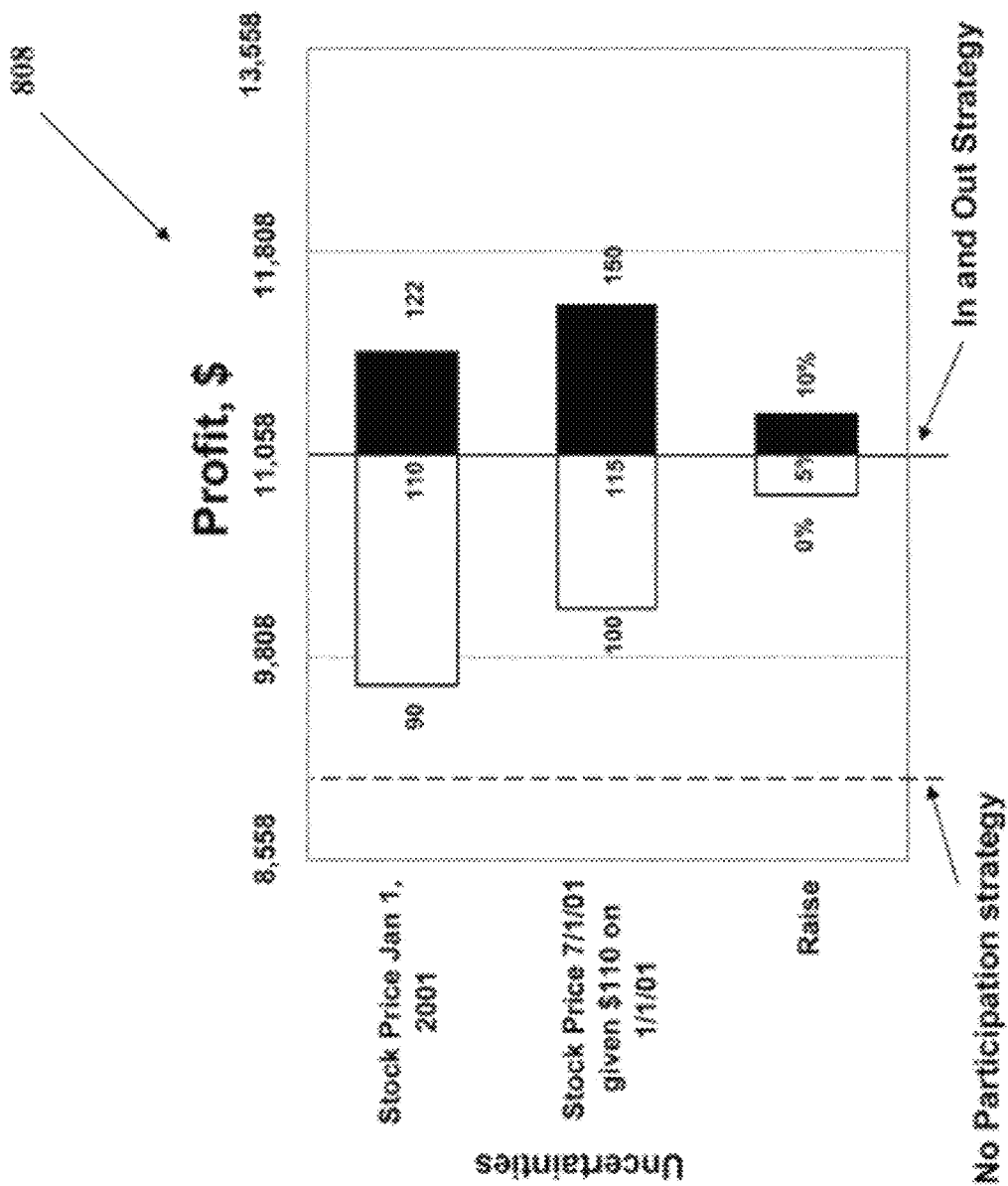
Figure 8G:
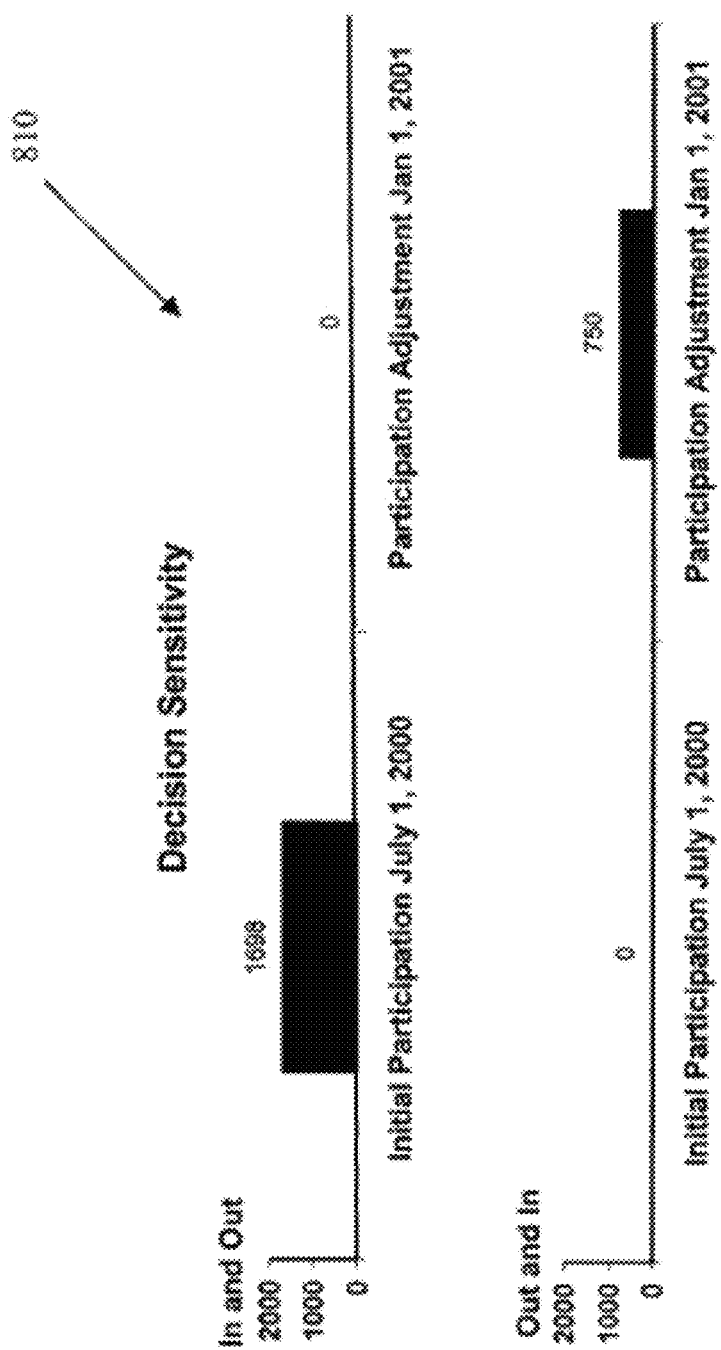
Figure 8I:
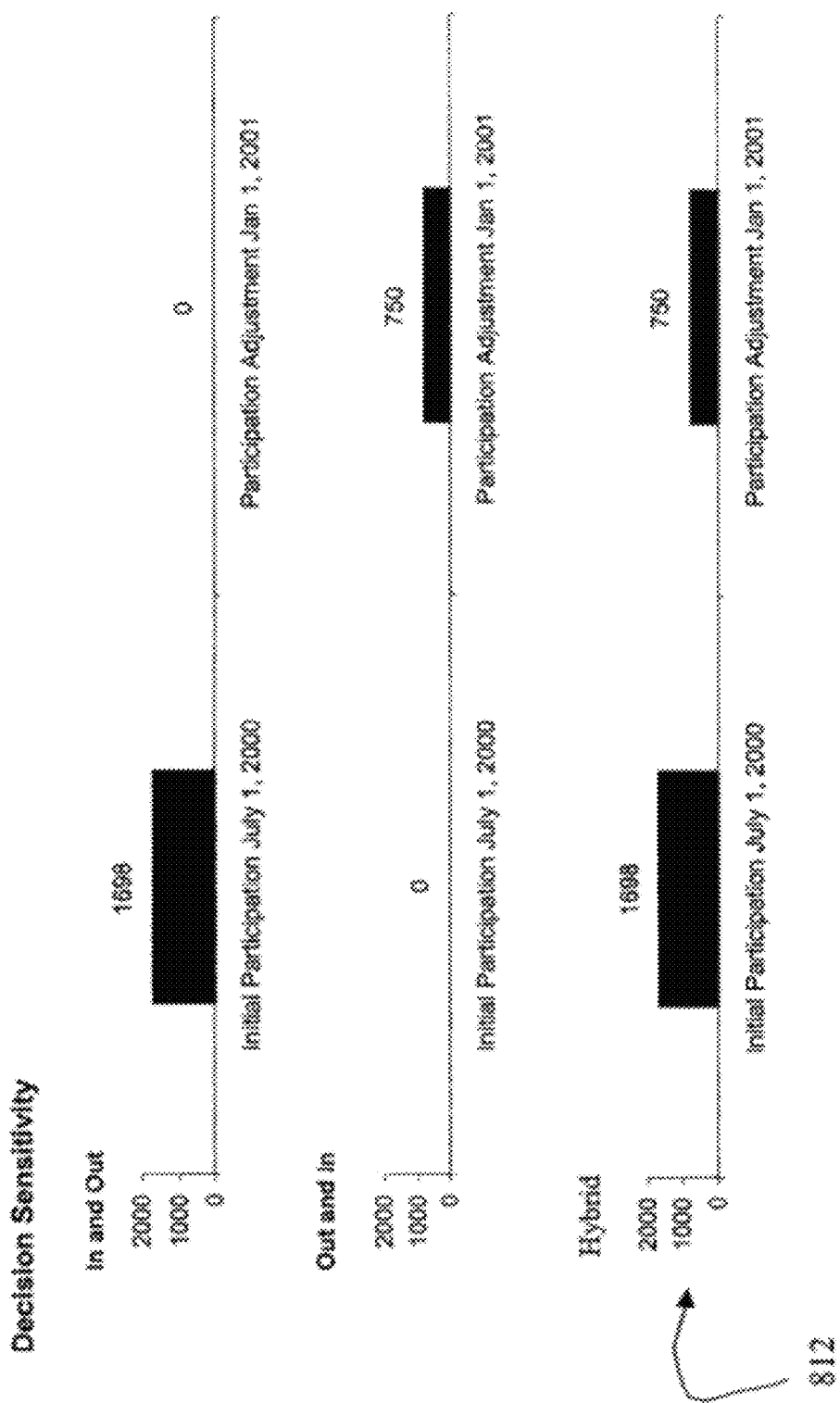

In the Analysis process, ranges on each uncertainty or risk 806, as shown in FIG. 8*e*, are input from the specified decision-relevant databases 803 of FIG. 8*b*. The users may confirm or modify the ranges. The collaborative decision platform takes as input the spreadsheet residing in the decision application that includes equations and data relating the decisions and uncertainties to the value, which in this case is profit. The collaborative decision platform uses the spreadsheet, strategies and uncertainty ranges to produce the tornado diagram 808 and decision sensitivity 810 shown in FIGS. 8*f* and 8*g*.

In the connection process, the users define on the strategy table 804 a new, more valuable "hybrid" strategy 811 that combines the most valuable alternatives from each of the initially defined alternative strategies, as shown in FIG. 8*h*. In defining this hybrid strategy, the users are relying heavily on the shared insight and understanding from the tornado diagram and decision sensitivity. The collaborative decision platform uses the spreadsheet from the decision application to calculate the value or the hybrid 812, as shown on FIG. 8*i*.

Figure 9:
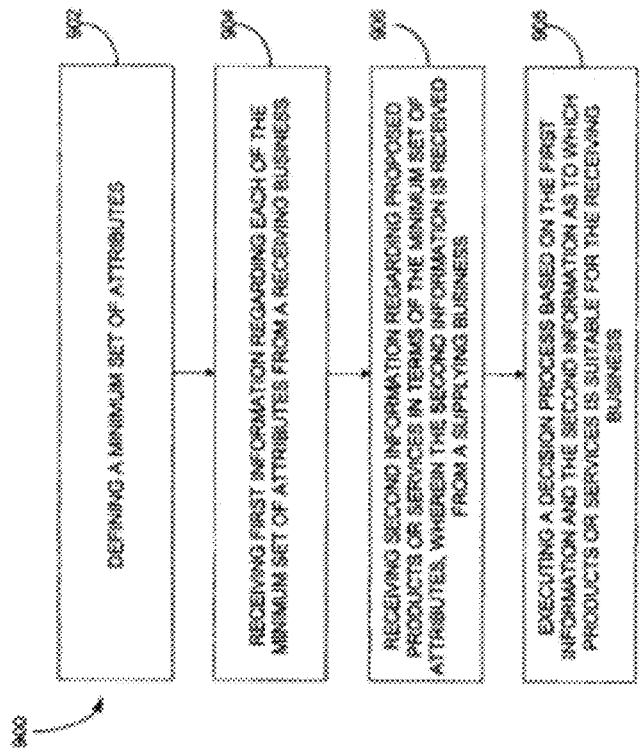
FIG. 9 illustrates a method for affording customer-centric collaborative decision making in a business-to-business framework.

FIG. 9 illustrates a method 900 for affording customer-centric collaborative decision-making in a business-to-business framework. In one embodiment, the method 900 may be carried using the collaborative decision platform set forth hereinabove. In the alternative, the present method may be executed using any other desired architecture.

Initially, in operation 902, a minimum set of attributes is defined. Thereafter, first information regarding each of the minimum set of attributes is received from a receiving business. Note operation 904. Second information is then received regarding proposed products or services in terms of the minimum set of attributes, as indicated in operation 906. Such second information is received from a supplying business.

In use, a decision process is executed based on the first information and the second information as to which products or services is suitable for the receiving business. Note operation 908. The present embodiment thus provides a customer-centric collaborative protocol that defines the minimum informational requirement for collaborative decision-making between enterprises (B2B).

The customer-centric collaborative protocol exploits a commonality in the attributes of the value structure of many enterprises that is sufficient to assess the implications of many decisions. An illustrative minimum set of attributes could include: price, sales, variable cost, fixed cost and investment. For many strategic decisions, knowing the affect of the decision on these attributes enables the enterprise to make an informed decision.

Figure 9A:
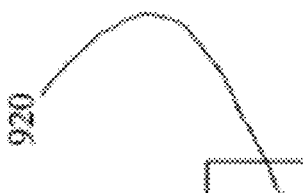
FIGS. 9a and 10 illustrates tables associated with the method of FIG. 9.

There are well-defined algorithms for the hierarchical expansion of each of the attributes in the minimum set in the event additional detail is required. When more detail is required, it may be nested within the higher level attributes. An expanded set of attributes could include: price, market share, market size, labor cost, material cost, administrative cost, annual expenses, working capital, plant and equipment, etc. The protocol or structure of the informational requirement is identical for a wide range of enterprises and many decisions within those enterprises, but the relative value of each attribute will be different. FIG. 9*a* illustrates a table 920 showing various customer-centric collaborative ($C^3$) attributes, and the value of a one-percent increases of such attributes in two different industries.

Figure 10:
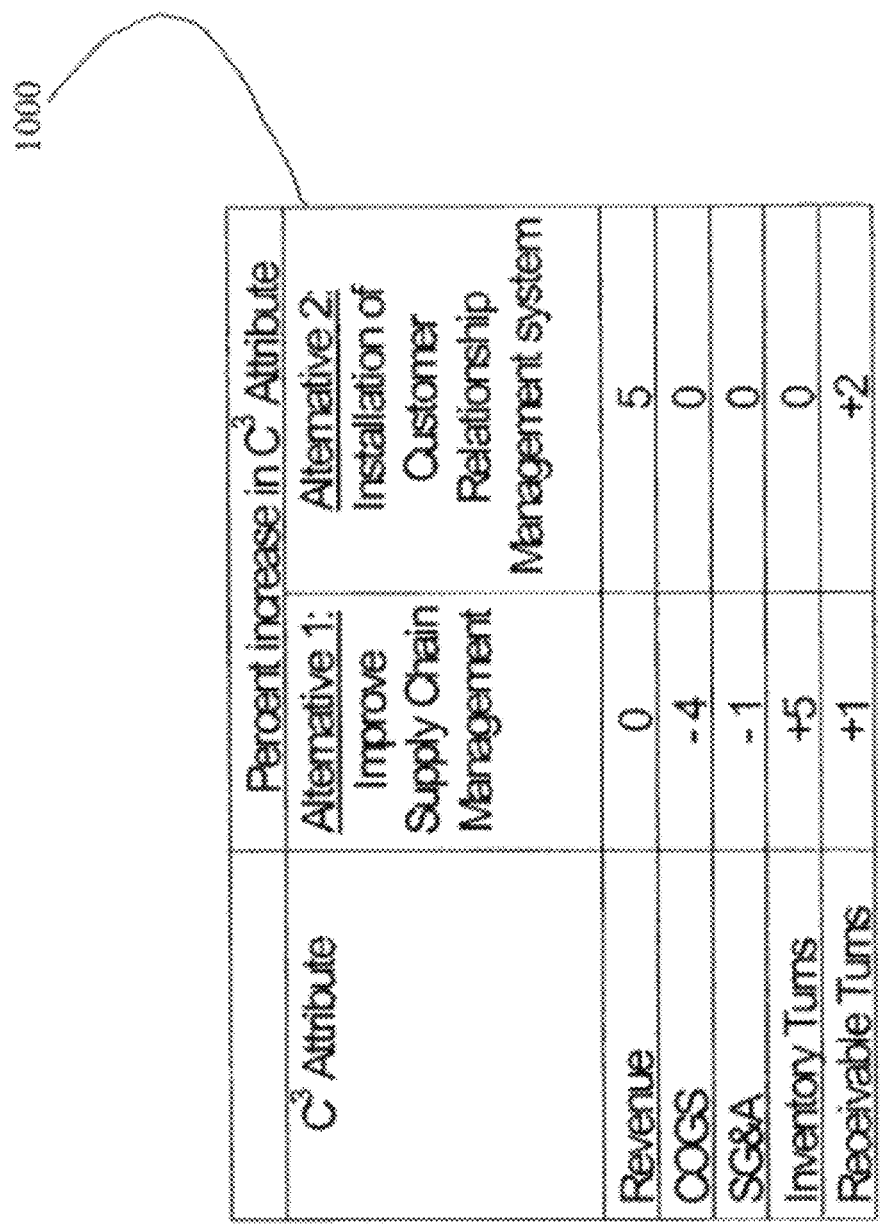

In accordance with the present invention, the supplying, enterprise is required to describe its alternatives in terms of their effect on the value attributes that matter to the receiving enterprise. FIG. 10 illustrates a table 1000 showing such an effect on the value attributes.

Figure 11:
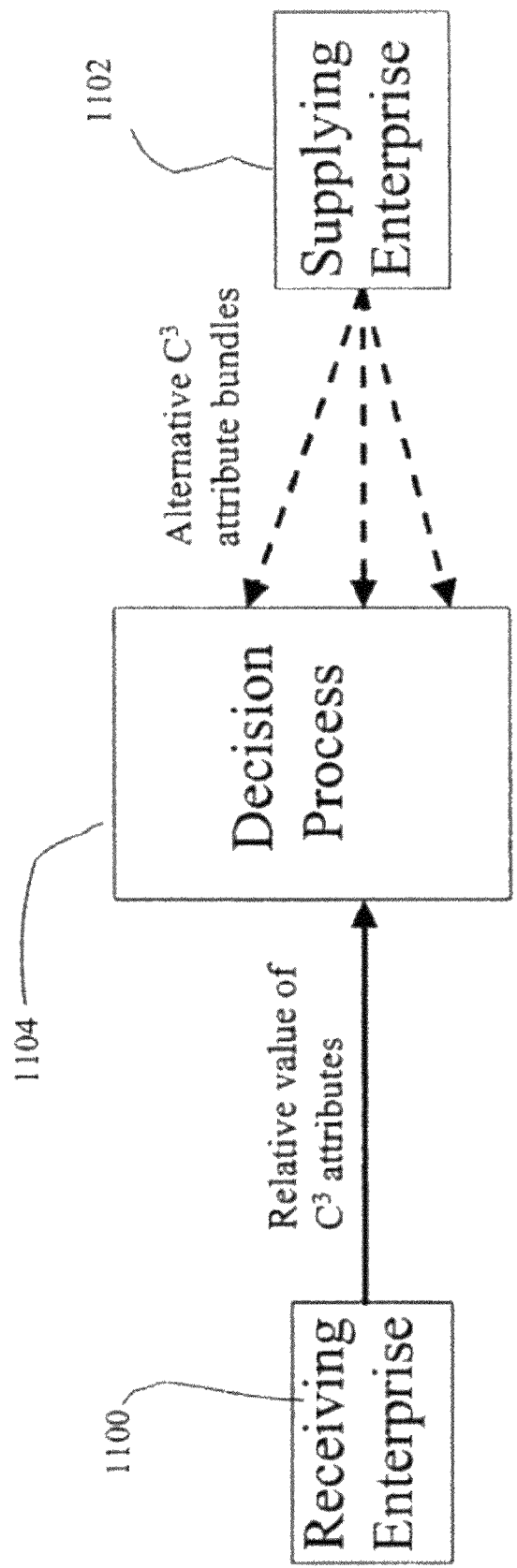
FIG. 11 is a schematic diagram showing the customer-centric collaborative protocol.
Figure 12:
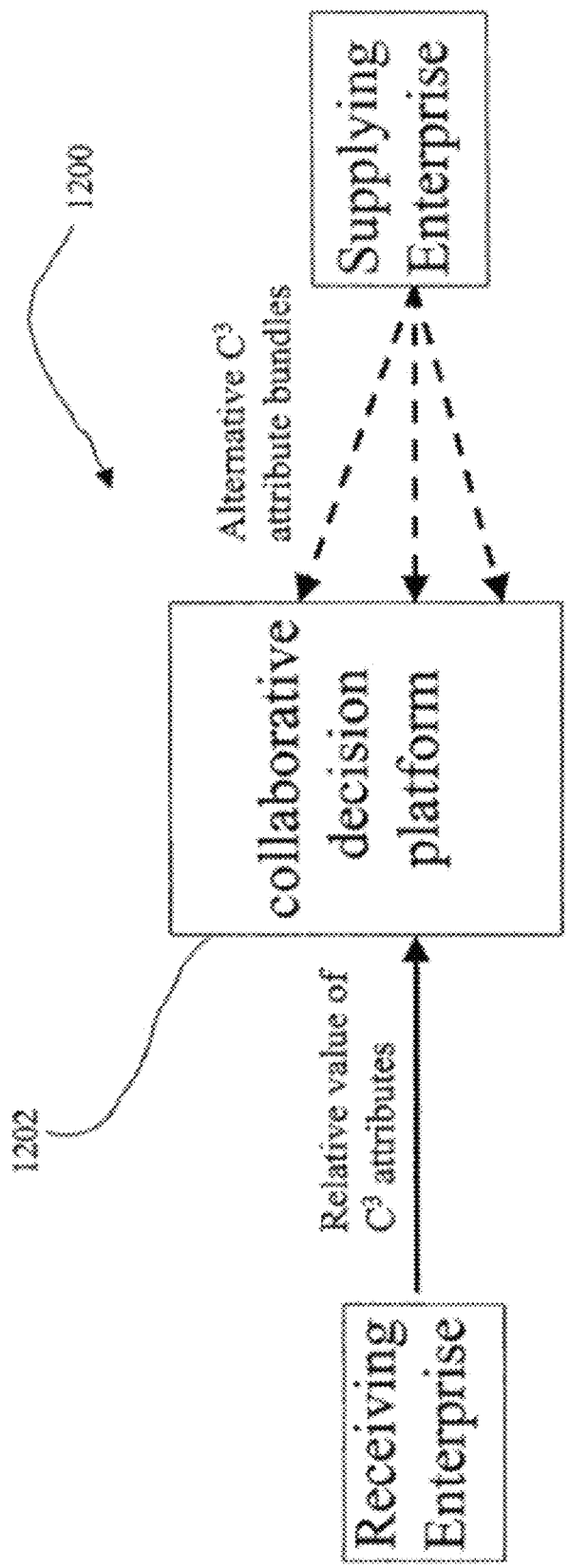
FIG. 12 illustrates a first example of the embodiment set forth in FIG. 11.

FIG. 11 is a schematic diagram showing the customer-centric collaborative ($C^3$) protocol. As set forth hereinabove, the protocol defines the minimum informational requirement for decision making between enterprises (B2B). The value of improvements of each of the attributes is specified for a receiving enterprise 1100. It should be noted that attributes are easily calculable for enterprises that focus on profit. However, even for enterprises that are not focused on profit, these same attributes are of critical importance. A supplying enterprise 1102 provides one or more alternative "attribute bundles" that describe products and services it is willing to deliver in terms of the attributes that matter to the receiving enterprise. An attribute bundle specifies how much of each attribute will be provided. It should be understood that the attribute levels can be assessed with little difficulty using for example an influence diagram. A decision module 1104 may then execute the method 900 of FIG. 9. FIG. 12 illustrates a first example 1200 of the embodiment set forth in FIG. 11. As shown, an industry independent, open and scalable platform may be provided that uses the customer-centric collaborative protocol for real-time, remote collaborative decision making among enterprises. The customer-centric collaborative protocol can be used with an architecture or process that supports collaborative decision-making, such as a collaborative decision platform 1202 which is similar to that set forth hereinabove.

Figure 13:
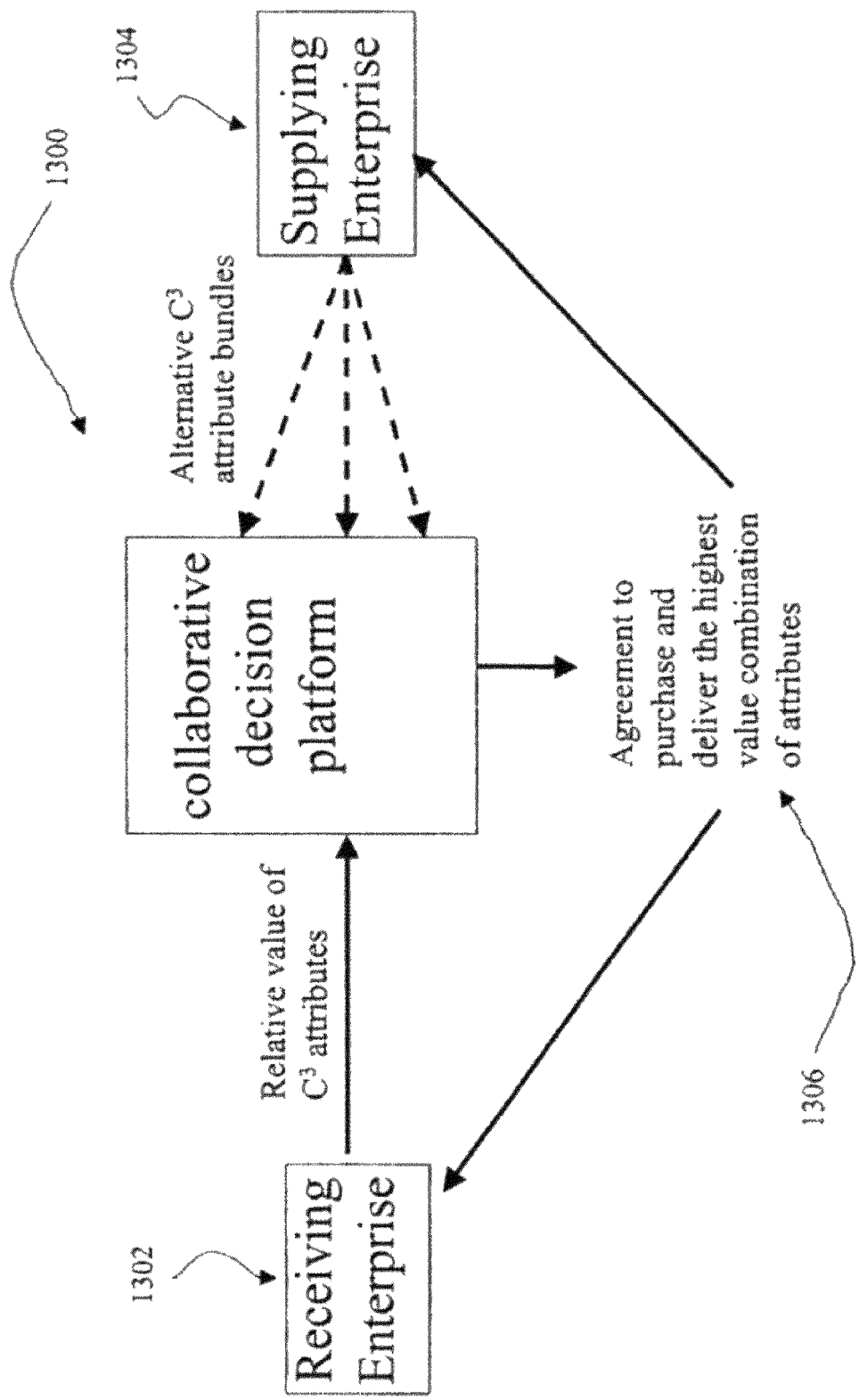
FIG. 13 illustrates a second example of the embodiment set forth in FIG. 11.
Figure 14:
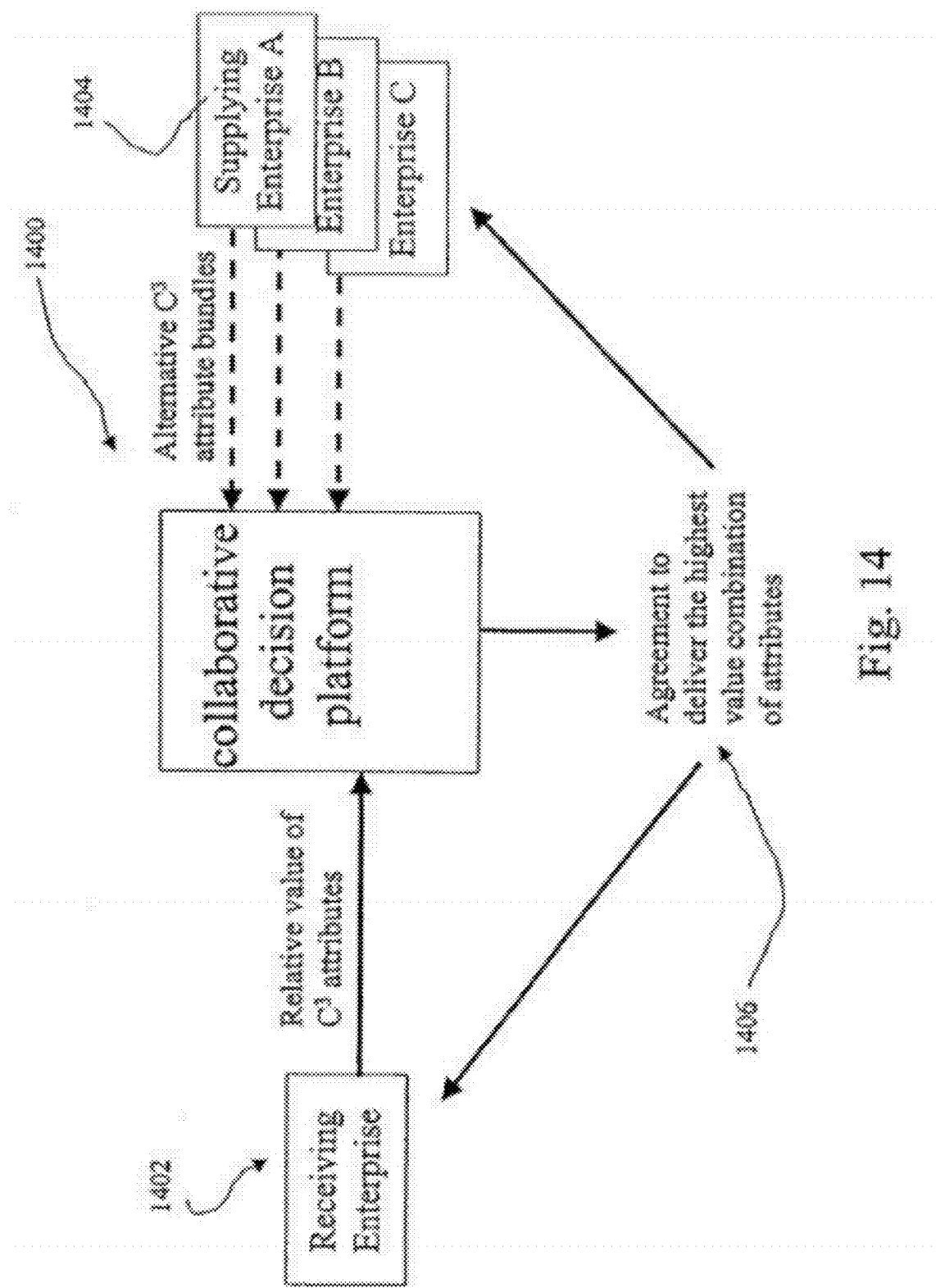
FIGS. 14 and 15 illustrate third and fourth examples, respectively, of the embodiment set forth in FIG. 11, where an industry independent, open and scalable platform is provided for business-to business exchange of existing goods and services that are not commodities.
Figure 15:
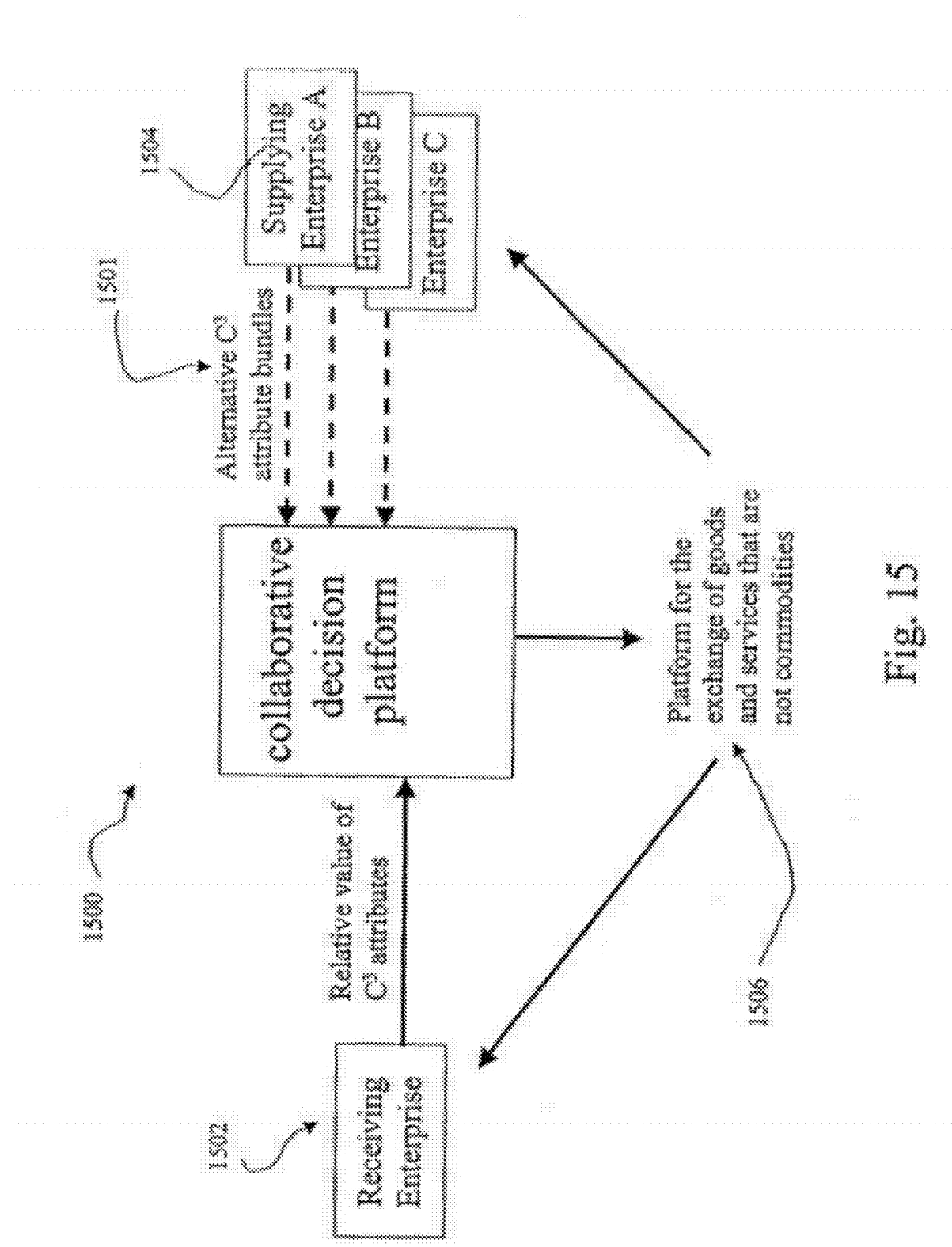

FIGS. 13 and 14 illustrate a second and third example 1300 and 1400 of the embodiment set forth in FIG. 11. In the embodiment of FIG. 13, the customer-centric collaborative protocol and an architecture or process that supports collaborative decision making, such as the collaborative decision platform, may together enable an open, scalable, industry independent process for real-time, remote decision-making between a receiving enterprise 1302 and a supplying enterprise 1304. As shown, the present embodiment may serve to negotiate an agreement 1306 to purchase and deliver the highest value combination of attributes. In a third embodiment shown in FIG. 14, the customer-centric collaborative protocol and an architecture or process that supports collaborative decision making, such as the collaborative decision platform; may together enable an open, scalable, industry independent process for real-time, remote decision-making among a receiving enterprise 1402 and supplying enterprises 1404. As shown, the present embodiment may serve to negotiate an agreement 1406 to purchase and deliver the highest value combination of attributes FIG. 15 illustrates a fourth examples 1500 of the embodiment set forth in FIG. 11, where an industry independent, open and scalable platform is provided for B2B exchange of existing goods and services that are not commodities. In other words, an effective platform for a non-commodity exchange is afforded.

As shown in FIG. 15, the alternative, attribute bundles 1501 can be offered by different enterprises 1504 and need not be commodities, but rather may differ on the level offered of every attribute. It should be understood that commodities are goods and services that can be defined without the information about or the interaction of the customer. As shown in FIG. 15, the customer-centric collaborative protocol and an architecture or process that supports collaborative decision making, such as the collaborative decision platform, together enable an industry-independent, open and scalable platform for the real-time B2B exchange of existing goods and services 1506 that are not commodities.

Figure 16:
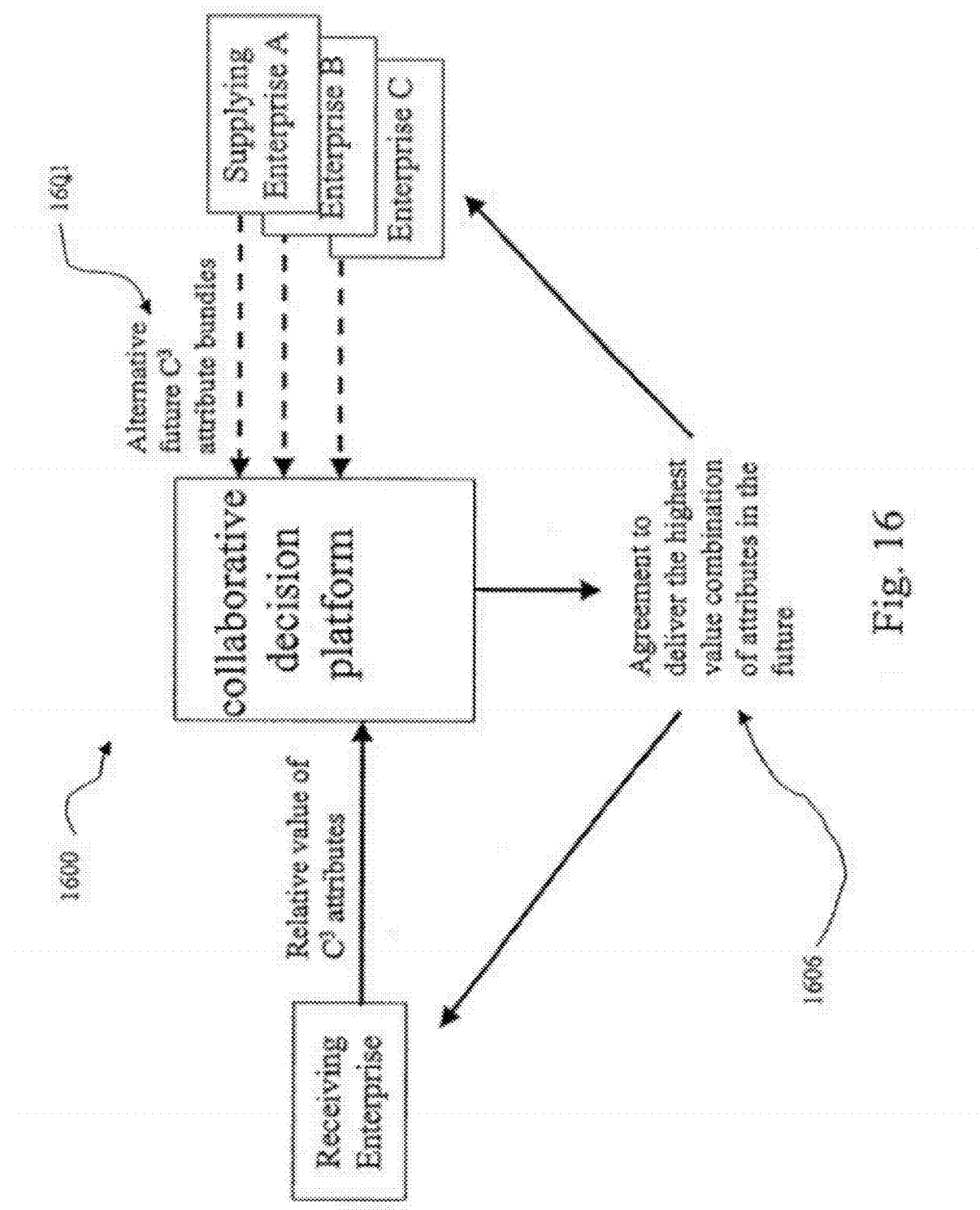
FIG. 16 illustrates a fifth example of the embodiment set forth in FIG. 11, where an industry independent, open and scalable platform is provided for B2B real-time collaboration in the definition of future, non-existent goods and services.
Figure 17:
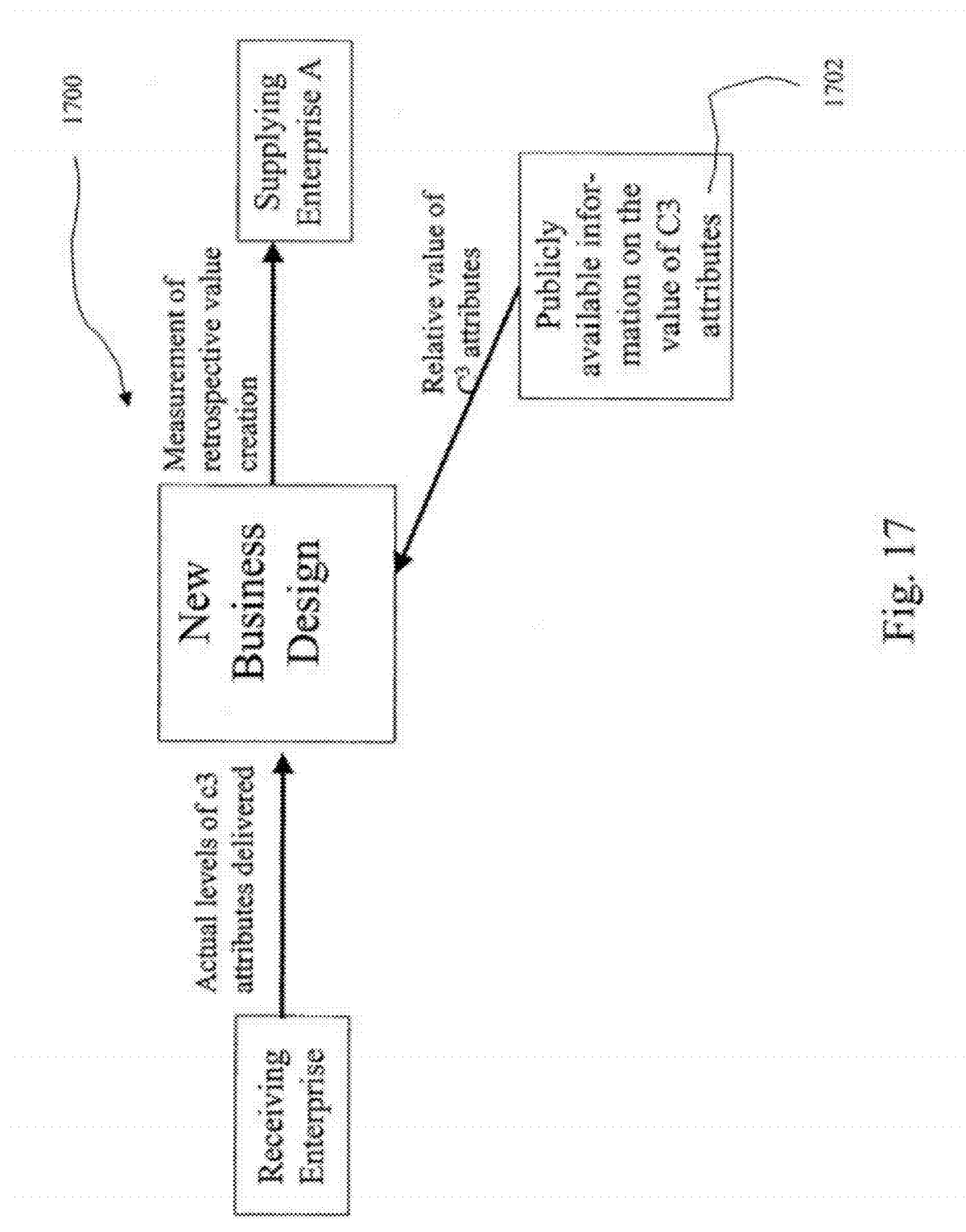
FIGS. 17 and 18 illustrate sixth and seventh examples, respectively, of the embodiment set forth in FIG. 11, where a new business design is provided that assists business-to-business enterprises in measuring the value creation for its customers.
Figure 18:
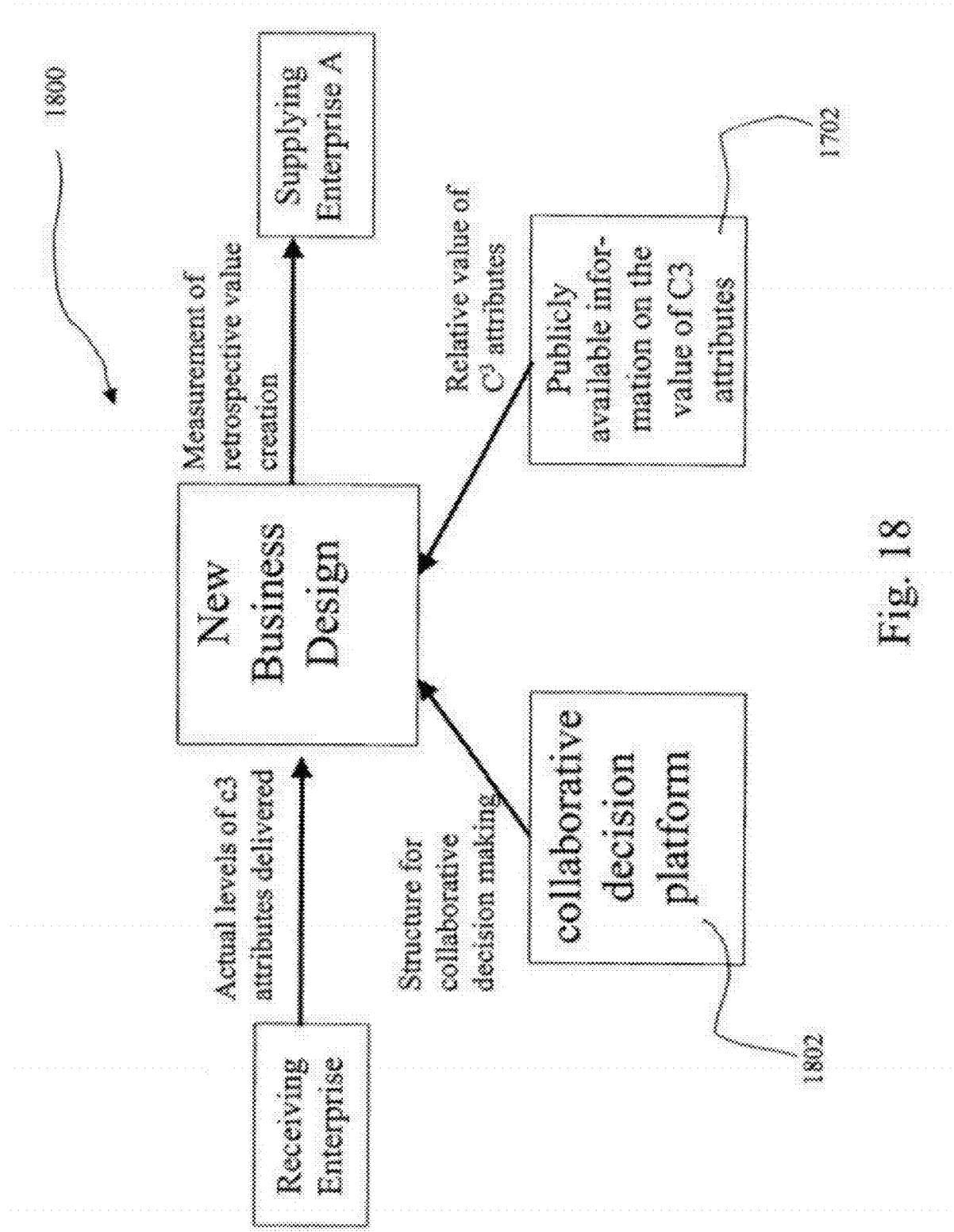

FIG. 16 illustrates a fifth example 1600 of the embodiment set forth in FIG. 11, where an industry independent, open and scalable platform is provided for B2B real-time collaboration in the definition of future, non-existent goods and services. As shown in FIG. 16, the alternative attribute bundles 1601 can be offered by different enterprises and need not exist. Rather, they may represent proposals to deliver goods and services that could be developed in the future. As shown, an agreement 1606 may be negotiated to deliver the highest value combination of attributes in the future. FIGS. 17 and 18 illustrate sixth and seventh examples 1700 and 1800, respectively, of the embodiment set forth in FIG. 11, where a new business design is provided that assists B2B enterprises in measuring the value creation for its customers.

As shown in FIG. 17, the customer-centric collaborative protocol and publicly available information 1702 may together enable a new business design that assists B2B enterprises in measuring the prospective value creation for its customers. With reference to FIG. 18, a particular embodiment of that business design could include the customer-centric collaborative protocol, publicly available information 1702 and a collaborative decision platform 1802, which together enable a new business design that assists B2B enterprises in measuring the retrospective value creation for its customers.

An exemplary application of a customer-centric collaborative protocol utilizing, the collaborative decision platform for the selection of a strategy for "Customer Relationship Management (CRM)" will now be set forth. In particular, the present B2B example relates to a receiving enterprise desirous of an improved CRM strategy and a supplying enterprise capable of delivering alternative CRM strategies.

Figure 19:
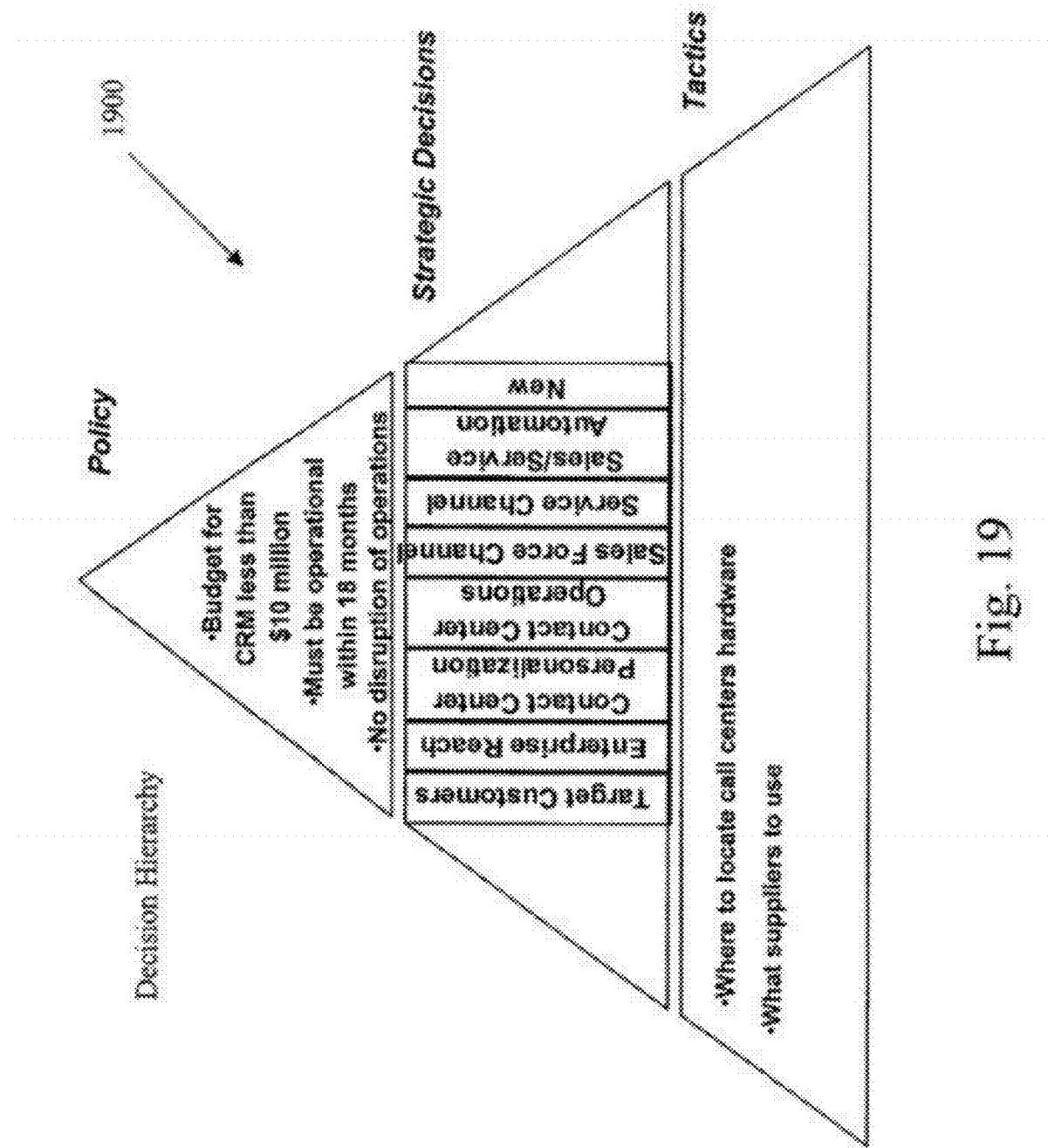
Figure 20:
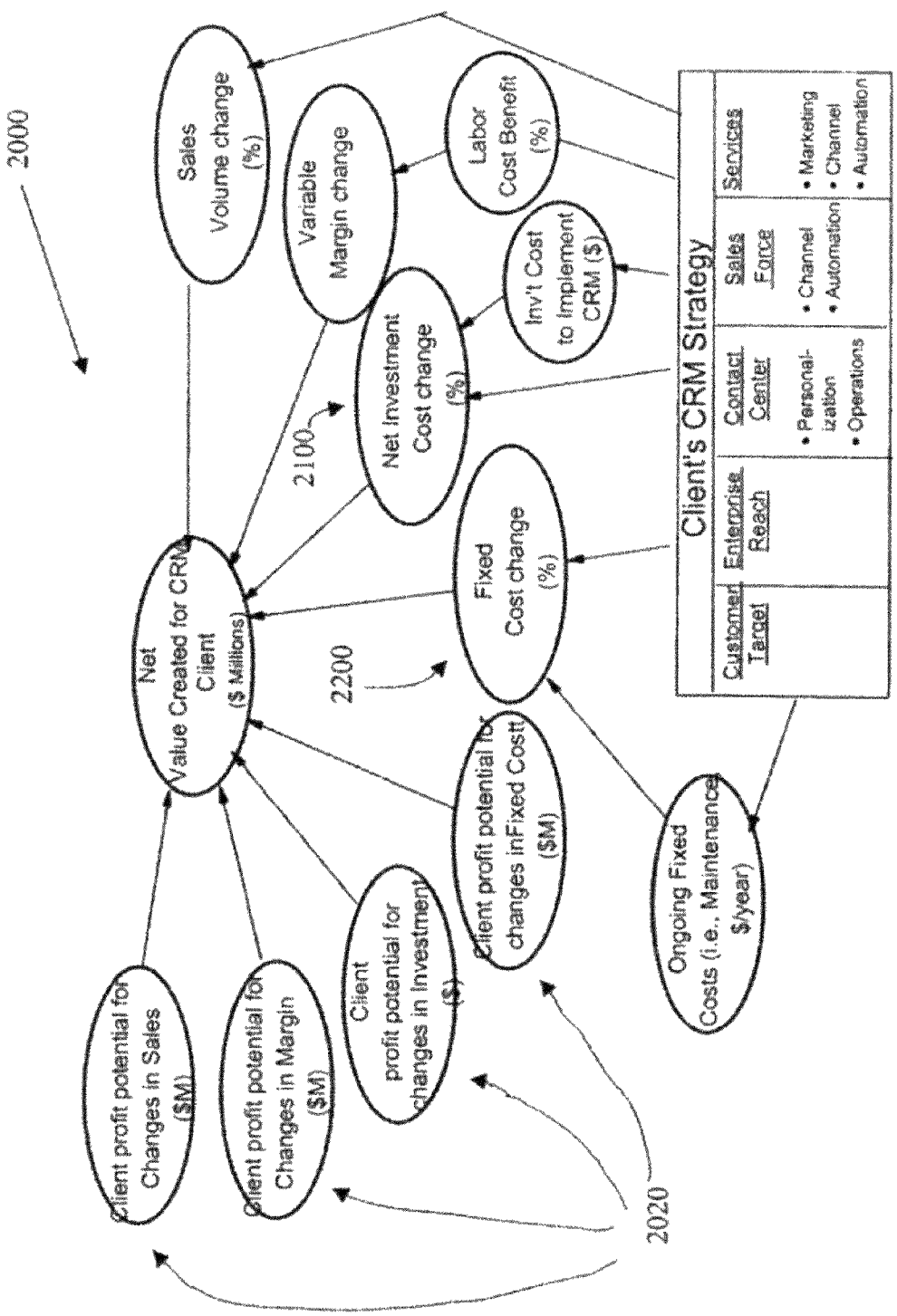
Figure 21:
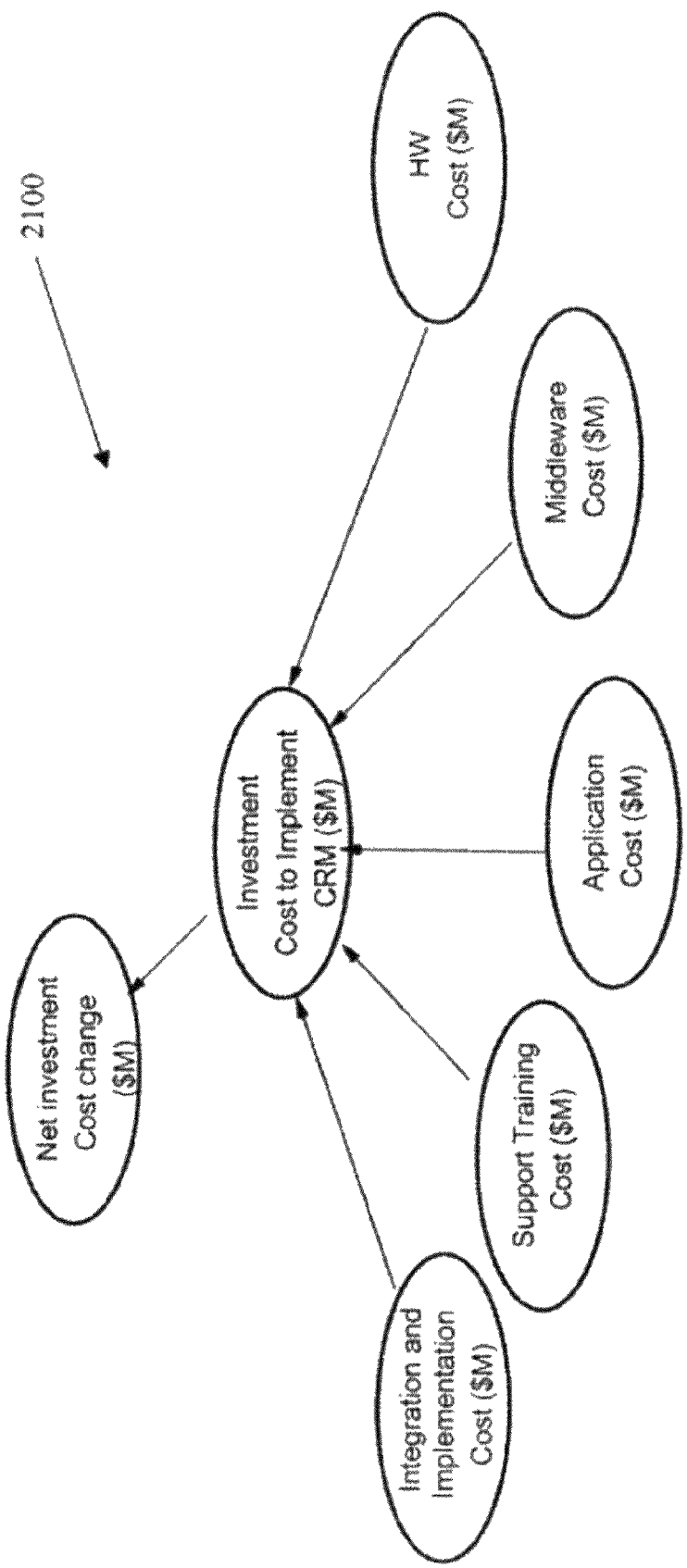
Figure 22:
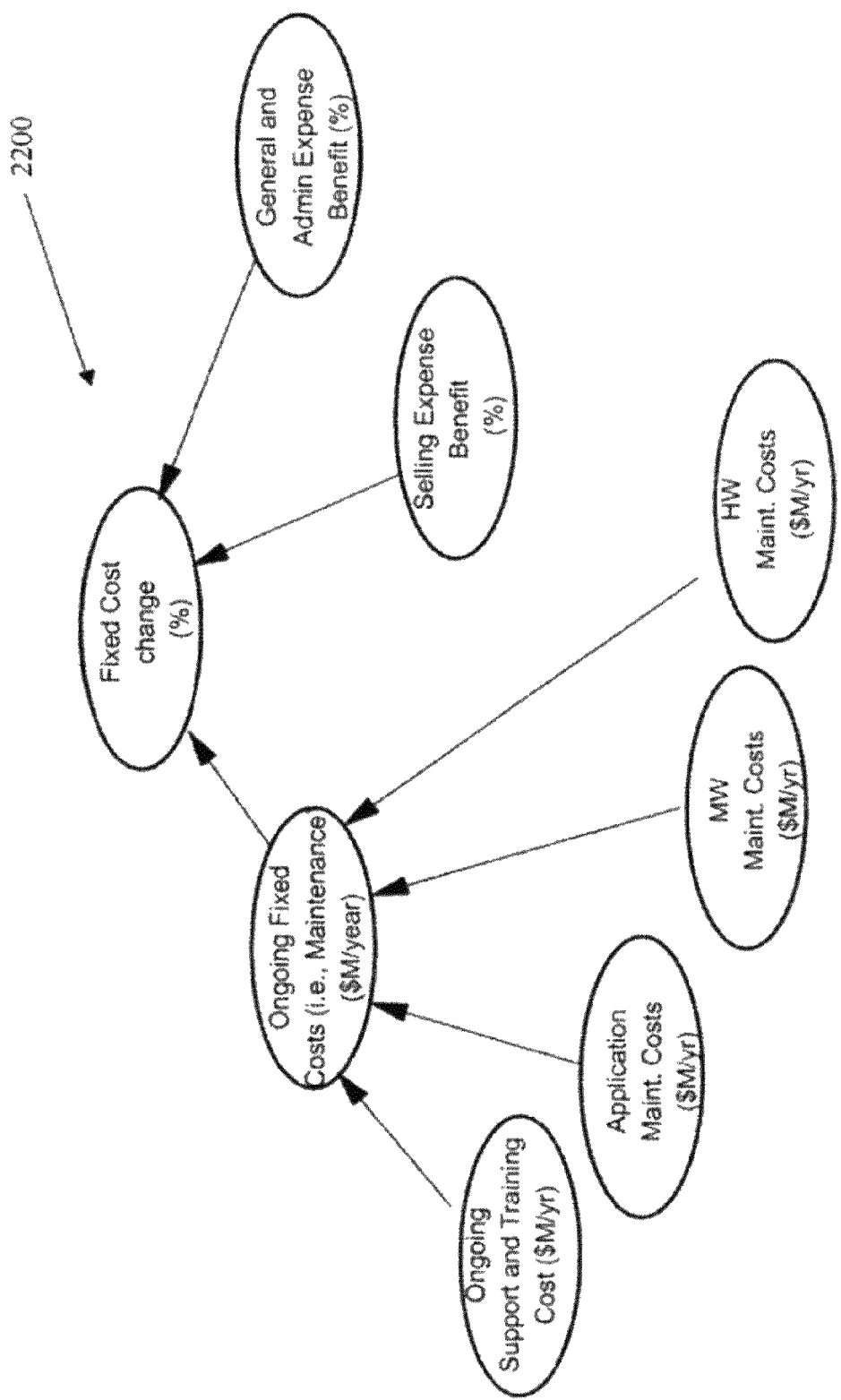

In this case during the Framing process, the receiving enterprise provides the policies, which constrain the strategic alternatives. The supplying enterprise demonstrates its experience by offering a list of strategic decisions. The receiving enterprise believes that two of the decisions are tactical, i.e. can be made later. FIG. 19 illustrates the resulting decision hierarchy 1900 developed collaboratively and asynchronously. FIG. 20 shows the influence diagram 2000, which identifies the critical uncertainties, the strategic decisions and the attributes 2020 that are of value to the receiving enterprise and which display the relationship among them. For two of the attributes, more detail is required and the higher level attributes are expanded hierarchically in those areas 2100 and 2200, as shown in FIGS. 21 and 22, respectively.

Figure 23B:
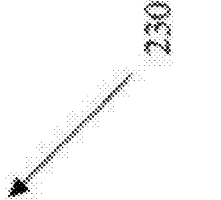
Figure 24:
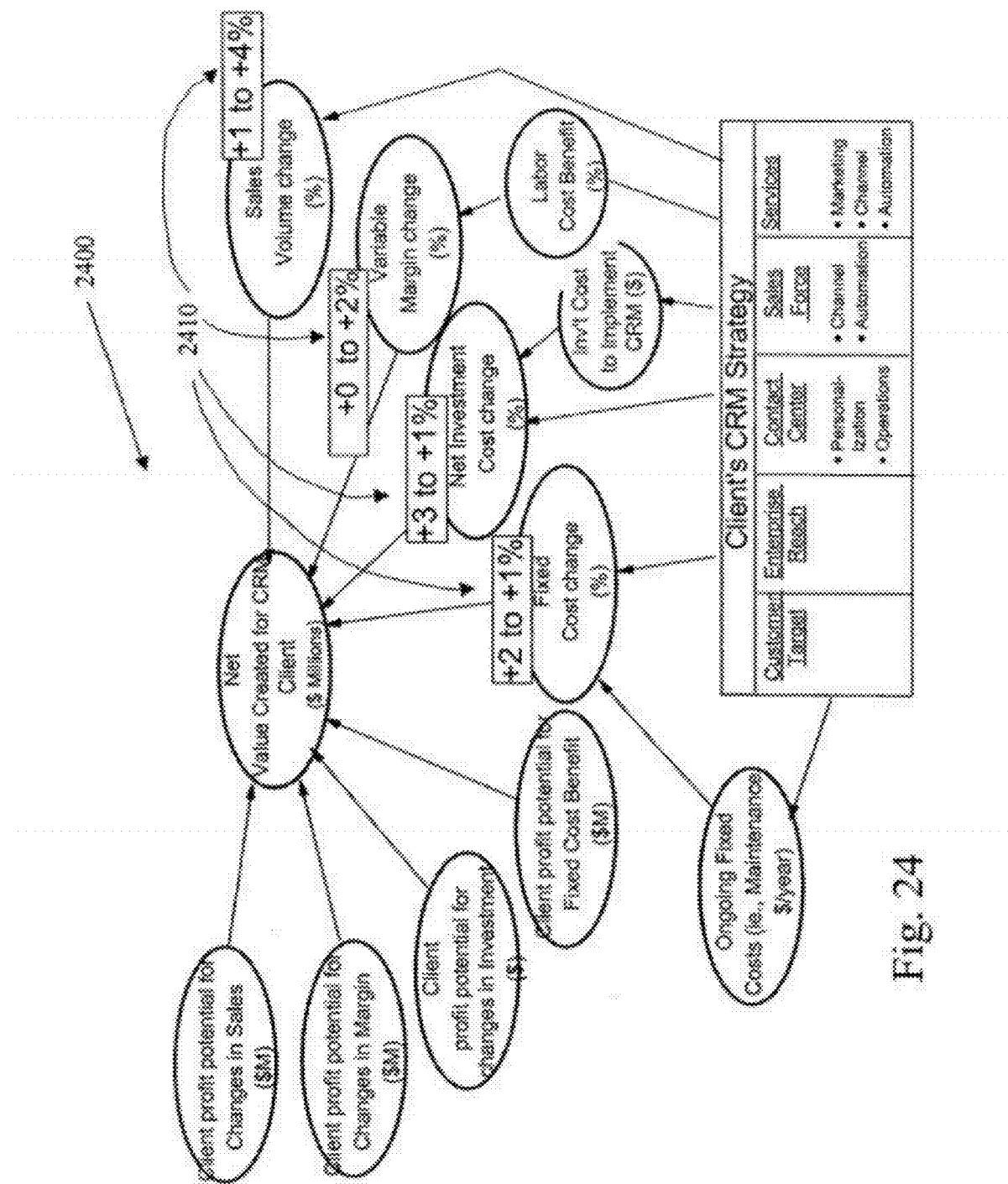
Figure 25:
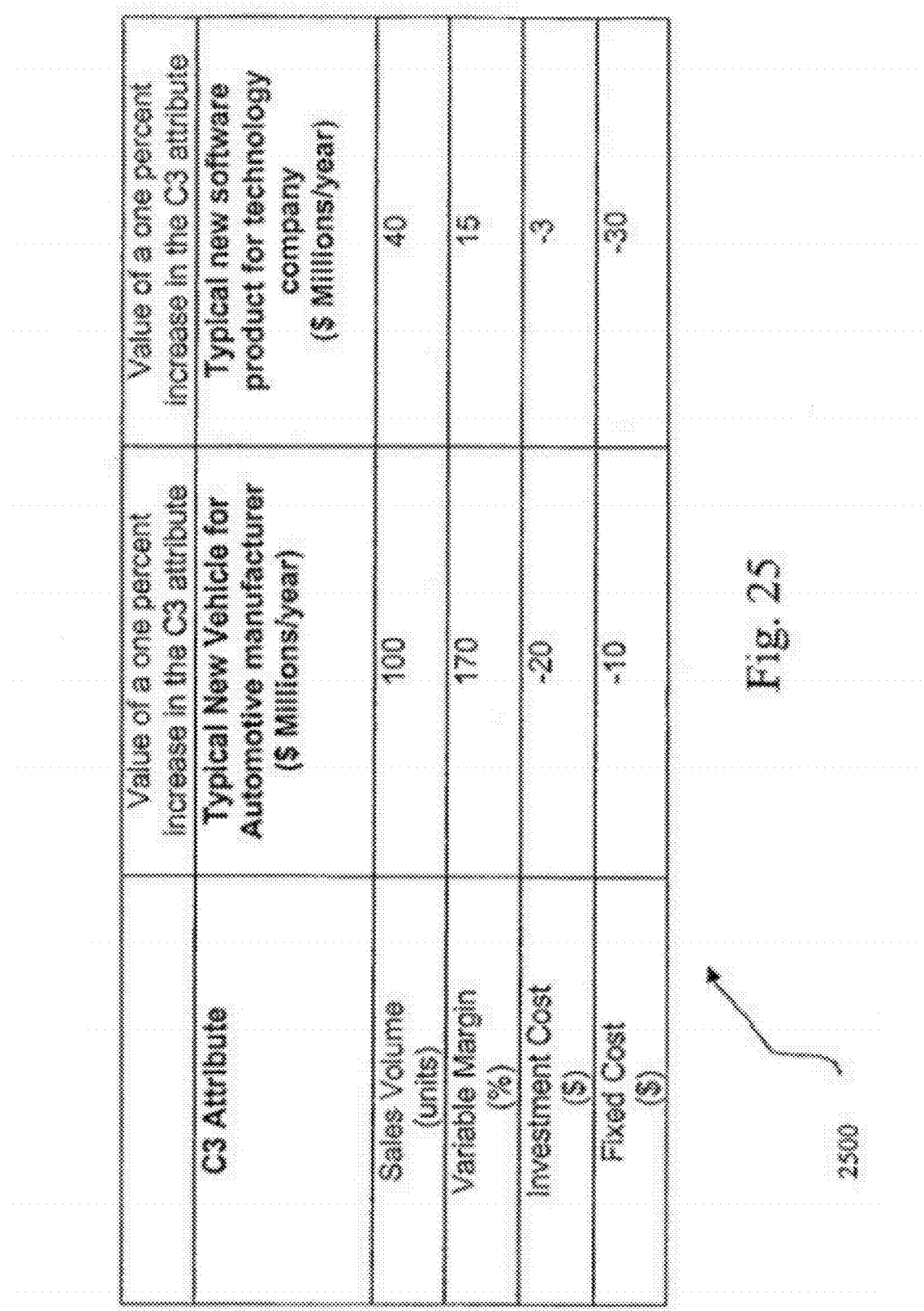

During the Alternatives process, three alternative strategies 2300, 2302, and 2304 are defined collaboratively on a strategy table in terms of the strategic decisions, as shown in FIGS. 23*a*, 23*b* and 23*c*, respectively. The strategy table developed remotely and asynchronously. The strategies are developed in the physical presence of both enterprises.

in the Analysis process, the supplying enterprise uses information from its database to assess the range of effect that the "Revenue Growth" strategy will have on each of the attributes 2410. Note 2400 in FIG. 24. Similar assessments are made for each of the other strategies. The receiving enterprise may establish its value for changes in each of the attributes as shown in the table 2500 of FIG. 25.

The table 2600 in FIG. 26 shows the calculations performed inside the collaborative decision platform when the customer-centric collaborative protocol is used. As shown, the value of an alternative to the client can be estimated by multiplying the improvement in each attribute by the customer's value for changes in that attribute.

Figure 27:
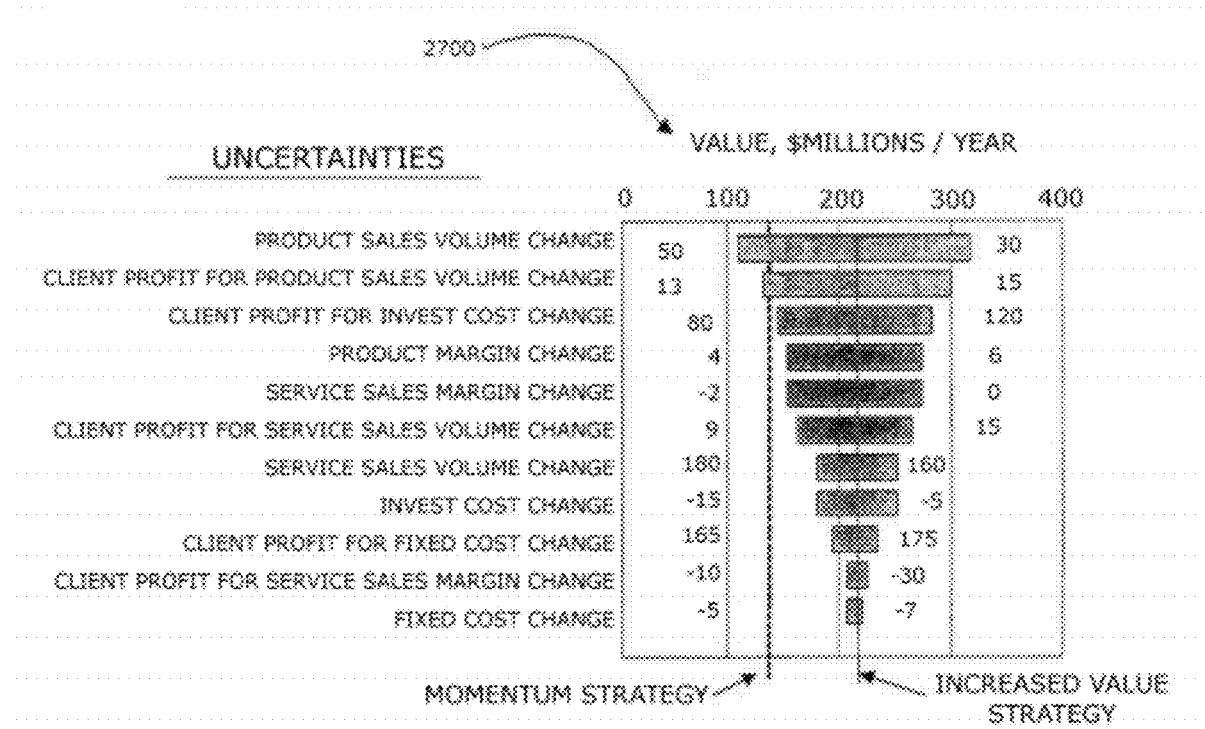
Figure 28:
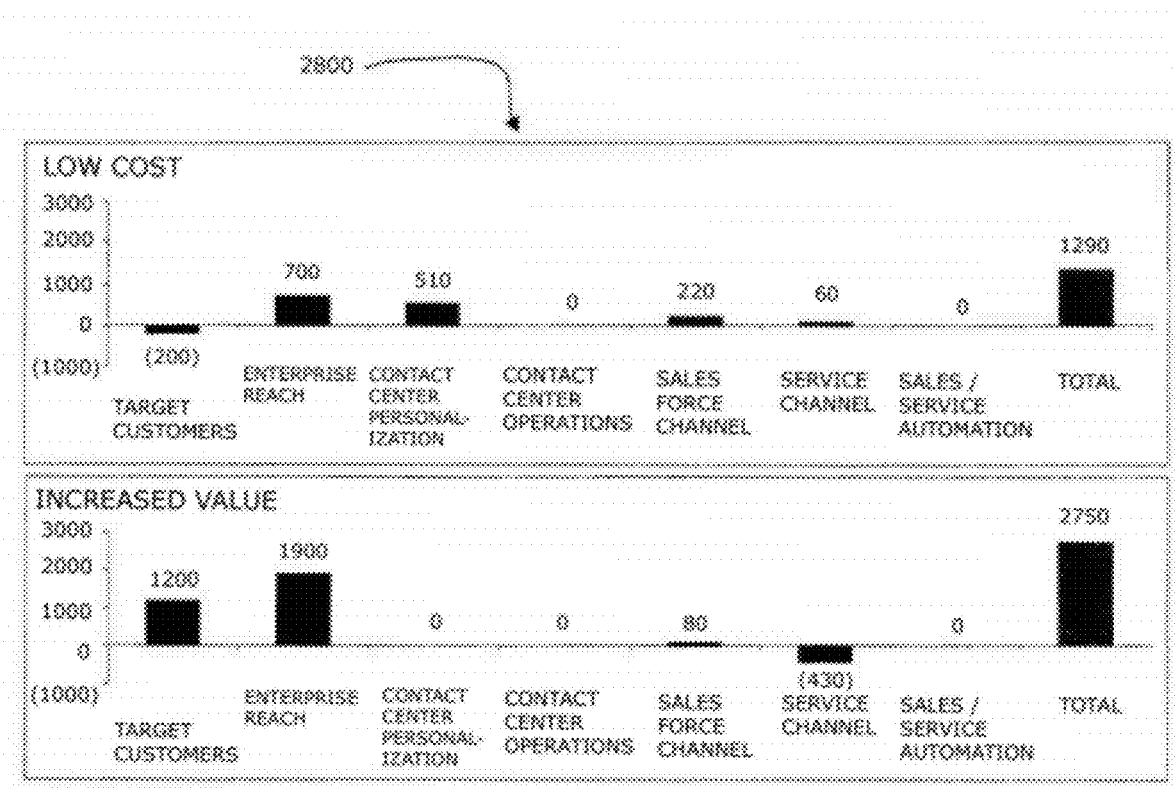

The remarkable simplicity of these calculations enables shared insight into the sources of risk and sources of value, which is displayed in the tornado diagram 2700 and decision sensitivity 2800 for each of the alternative strategies, as shown in FIGS. 27 and 28, respectively. It should be noted that different solutions might be appropriate for clients in different industries because of different client values for the $C^3$ attributes.

Figure 30:
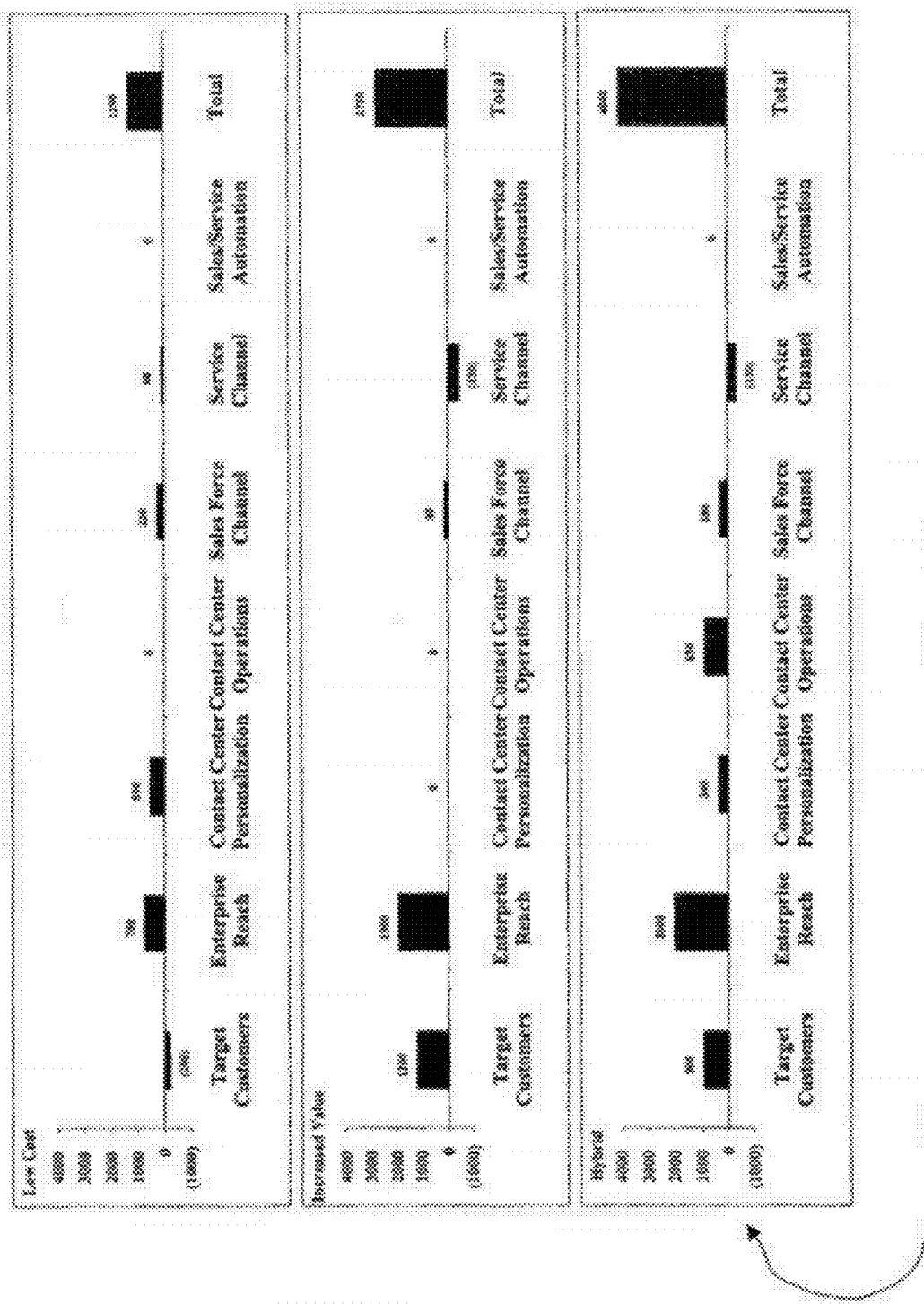

Using the shared understanding of the sources of risk and value in the initially defined alternative strategies, the supplying and receiving enterprise collaborate in developing a new, more valuable "hybrid" strategy 2900, as shown in FIG. 29. Its corresponding decision sensitivity 3000 of FIG. 30 compares the total value of the hybrid strategy with the initially defined alternatives and identifies its sources of value.

While various embodiments have been described above, it should be understood that they have been presented by way of example only, and not limitation. Thus, the breadth and scope of to preferred embodiment should not be limited by any of the above-described exemplary embodiments, but should be defined only in accordance with the following claims and their equivalents.

What is claimed is:

1. A method, comprising:
   causing execution of a process that is related to decision-making associated with identification of one or more products or services that is suitable for a receiving entity, utilizing an application that is a real estate-related application, a medical-related application, a corporate-related application, a product supply-related application, a service supply-related application, or a financial-related application;
   receiving first information regarding a plurality of attributes in association with the receiving entity;
   receiving second information regarding the one or more products or services in terms of the plurality of attributes;
   supporting the process that is related to the decision-making, utilizing the first information and the second information;
   receiving third information that includes public information, wherein the third information is received from a source separate from the receiving entity and a supplying business, and relates to a value of at least one aspect of at least one of the one or more products or services and is related to a retrospective value creation for a plurality of customers, wherein the process that is related to the decision-making is further supported utilizing the third information; and
   receiving fourth information from the receiving entity that relates to at least one aspect of at least one of the one or more products or services and is related to a retrospective value creation for the receiving entity;
   wherein the method is supported by a system capable of displaying a plurality of web page interfaces that receive user input that frames the decision-making and that display output which indicates alternatives in connection with the decision-making, and allowing real-time collaborative decision-making between the receiving entity and the supplying business.

2. A computer program product embodied on a non-transitory computer readable medium, comprising:
   computer code for causing execution of a process that is product supply-related and associated with identification of one or more products of a supplying business that is suitable for a receiving entity;
   computer code for receiving first information regarding a plurality of attributes in association with the receiving entity;
   computer code for identifying second information regarding the one or more products in terms of the plurality of attributes;
   computer code for supporting the process, utilizing the first information and the second information; and
   computer code for receiving third information that includes public information for further supporting the process, wherein the computer program product is operable such that the third information is received from a source separate from the receiving entity and the supplying business, and relates to at least one of the one or more products and a retrospective value creation for a plurality of customers.

3. The computer program product as recited in claim 2, wherein the retrospective value creation includes a relative retrospective value creation.

4. The computer program product as recited in claim 2, wherein the computer program product is operable such that a series of dynamic webpages is utilized to collect decision-relevant input and output decision-relevant output to further support the process.

5. The computer program product as recited in claim 2, wherein the computer program product is operable such that a series of dynamic webpages is utilized to: collect decision-relevant input including at least one boundary condition and values, and output decision-relevant output including alternatives, based on the at least one boundary condition and values, to further support the process.

6. The computer program product as recited in claim 5, wherein the computer program product is operable such that the at least one boundary condition involves price.

7. The computer program product as recited in claim 2, wherein the computer program product is operable such that a series of dynamic webpages is utilized to: collect decision-relevant input including at least one boundary condition and values, and output decision-relevant output including alternatives and at least one potential hybrid theme, based on the at least one boundary condition and values, to further support the process.

8. The computer program product as recited in claim 2, wherein the computer program product is operable to provide an ability to allow different people to input data into at least one display at different times, and from different places, in order to further support the process.

9. The computer program product as recited in claim 2, wherein the computer program product is operable such that the plurality of customers include customers of the supplying business.

10. The computer program product as recited in claim 2, wherein the computer program product is operable such that the identifying the second information includes receiving the second information.

11. The computer program product as recited in claim 2, wherein the computer program product is operable such that the plurality of attributes include price.

12. The computer program product as recited in claim 2, wherein the computer program product is operable such that the first information is received utilizing the Internet.

13. The computer program product as recited in claim 2, wherein the computer program product is operable such that the plurality of attributes are bundled.

14. The computer program product as recited in claim 2, further comprising computer code for hierarchical expansion of multiple of the plurality of attributes.

15. The computer program product as recited in claim 2, wherein the computer program product is operable such that the plurality of attributes includes price and relates to equipment.

16. The computer program product as recited in claim 2, wherein the computer program product is operable such that the process includes a dialogue decision process.

17. The computer program product as recited in claim 2, wherein the computer program product is operable such that a series of webpages is utilized to collect decision-relevant input and output decision-relevant output to further support the process, which is implemented utilizing software components including:
- a first software component that is capable of being used to initialize the process,
- a second software component that is capable of being used to develop decision-related alternatives in the process,
- a third software component that is capable of being used to analyze the decision-related alternatives in the process, and
- a fourth software component that is capable of being used to process the decision-related alternatives to develop a solution.

18. The computer program product as recited in claim 2, wherein the computer program product is operable such that the products include non-existent products.

19. The computer program product as recited in claim 2, wherein the computer program product is operable such that the products include existent products.

20. The computer program product as recited in claim 2, wherein the computer program product is operable such that the first information regarding the plurality of attributes is capable of being entered by the receiving entity.

21. The computer program product as recited in claim 2, wherein the computer program product is operable such that the third information is utilized as a function of a user input.

22. The computer program product as recited in claim 2, wherein the computer program product is operable such that the third information relates to one or more of the plurality of attributes.

23. The computer program product as recited in claim 2, wherein the computer program product is operable such that the third information relates to a value of one or more of the plurality of attributes.

24. The computer program product as recited in claim 2, wherein the computer program product is operable such that the third information is utilized in association with a collaborative decision platform.

25. The computer program product as recited in claim 2, further comprising computer code for allowing the receiving entity to provide insight in association with the source.

26. The computer program product as recited in claim 2, further comprising computer code for allowing the receiving entity to provide insight in association with the source, in order to reduce risk associated with decision-making.

27. The computer program product as recited in claim 2, further comprising computer code for allowing the receiving entity to effect a modification in association with the third information of the source.

28. The computer program product as recited in claim 2, further comprising computer code for allowing the receiving entity to provide a confirmation in association with the source.

29. The computer program product as recited in claim 2, further comprising computer code for providing source information that specifies the source.

30. The computer program product as recited in claim 29, wherein the computer program product is operable such that the source information includes a directory.

31. The computer program product as recited in claim 29, wherein the computer program product is operable such that the source information includes at least one person's name.

32. The computer program product as recited in claim 29, wherein the computer program product is operable such that the source information specifies a plurality of sources of the third information.

33. The computer program product as recited in claim 2, and further comprising computer code for causing display of at least one dynamic web page including a decision sensitivity display and a potential hybrid theme for further supporting the process.

34. The computer program product as recited in claim 2, wherein the computer program product is operable such that real-time collaborative decision-making is provided between the receiving entity and the supplying business.

35. The computer program product as recited in claim 2, wherein the computer program product is operable such that the process is related to a business-to-business transaction.

36. The computer program product as recited in claim 2, further comprising computer code for negotiating a delivery agreement.

37. The computer program product as recited in claim 2, wherein the computer program product is operable such that the receiving entity includes a business entity.

38. The computer program product as recited in claim 2, wherein the computer program product is operable such that the process includes a process that supports decision-making.

39. The computer program product as recited in claim 2, wherein the computer program product is operable such that the second information regarding the one or more products is received in association with a single supplying business.

40. The computer program product as recited in claim 2, wherein the computer program product is operable such that the second information regarding one or more products is received from a plurality of supplying businesses.

41. The computer program product as recited in claim 2, wherein the computer program product is operable such that the first information and the second information are received at and processed by an intermediate entity that is separate from the supplying business and the receiving entity.

42. The computer program product as recited in claim 2, wherein the computer program product is operable such that real-time decision-making is supported.

43. The computer program product as recited in claim 2, and further comprising computer code for providing a delivery agreement.

44. The computer program product as recited in claim 2, wherein at least a portion of the computer program product includes a plurality of objects associated with an object-oriented programming language.

45. The computer program product as recited in claim 2, and further comprising computer code for causing display of a web page including a decision sensitivity display for further supporting the process.

46. The computer program product as recited in claim 2, and further comprising computer code for causing display of a web page including a potential hybrid theme for further supporting the process.

47. A computer program product embodied on a non-transitory computer readable medium, comprising:
- computer code for causing execution of a process that is product supply-related and associated with identification of one or more products of a supplying business that is suitable for a receiving entity;

computer code for receiving first information regarding a plurality of attributes in association with the receiving entity;
computer code for identifying second information regarding the one or more products in terms of the plurality of attributes;
computer code for supporting the process, utilizing the first information and the second information;
computer code for receiving third information that includes public information from a source separate from the receiving entity and the supplying business, and relates to a relative value associated with at least one of the one or more products, to identify a retrospective value creation for a plurality of customers, in connection with prospective value creation measurement for at least one customer, for further supporting the process;
computer code for displaying a plurality of dynamic web page interfaces that receive input that frames decision-making and display output that indicates alternatives associated with the decision-making, in connection with a purchase and delivery agreement, for further supporting the process;
computer code for allowing real-time collaborative decision-making between the receiving entity and the supplying business; and
computer code for allowing different people to input data into at least one display at different times, and from different places, in order to further support the process.

48. A computer program product embodied on a non-transitory computer readable medium, comprising:
computer code for causing execution of a process that is product supply-related and associated with identification of one or more products of a supplying business that is suitable for a receiving entity;
computer code for receiving first information regarding a plurality of attributes in association with the receiving entity;
computer code for identifying second information regarding the one or more products in terms of the plurality of attributes;
computer code for supporting the process, utilizing the first information and the second information;
computer code for receiving third information that includes public information from a source separate from the receiving entity and the supplying business, and relates to a relative value associated with at least one of the one or more products, to identify a retrospective value creation for a plurality of customers, in connection with prospective value creation measurement for at least one customer, for further supporting the process;
computer code for receiving fourth information from the receiving entity that relates to at least one aspect of at least one of the one or more products and a retrospective value creation for the receiving entity;
computer code for displaying a plurality of dynamic web page interfaces that receive input that frames decision-making and display output that indicates alternatives associated with the decision-making, in connection with a purchase and delivery agreement;
computer code for allowing real-time collaborative decision-making between the receiving entity and the supplying business;
computer code for allowing different people to input data into at least one display at different times, and from different places, in order to further support the process; and computer code for causing display of a web page including a decision sensitivity display for further supporting the process.

49. A computer program product embodied on a non-transitory computer readable medium, comprising:
computer code for causing execution of a process that is related to decision-making associated with identification of one or more products of a supplying business that is suitable for a receiving entity;
computer code for receiving first information regarding a plurality of attributes in association with the receiving entity;
computer code for identifying second information regarding the one or more products in terms of the plurality of attributes;
computer code for supporting the process that is related to the decision-making, utilizing the first information and the second information;
computer code for causing display of a first interface that allows the receiving entity to provide first input indicative of a boundary condition that is related to the decision-making, wherein the computer program product is operable such that the boundary condition is capable of being modified;
computer code for causing display of a second interface that allows the receiving entity to provide second input indicative of aspects that is related to the decision-making, wherein the computer program product is operable such that the aspects are capable of being modified;
computer code for causing display of a third interface that displays a plurality of alternatives that include alternate choices, based, at least in part, on the boundary condition and the aspects;
computer code for causing display of a fourth interface that displays relative value associated with each of the plurality of alternatives;
computer code for receiving third information that includes public information from a source separate from the receiving entity and the supplying business, and relates to a relative value associated with at least one of the one or more products, to identify a retrospective value creation for a plurality of customers, in connection with prospective value creation measurement for at least one customer;
computer code for receiving fourth information from the receiving entity that relates to at least one aspect of at least one of the one or more products and a retrospective value creation for the receiving entity;
computer code for providing source information that specifies at least one of the sources, the source information including at least one person identifier; and
computer code for allowing the receiving entity to provide third input in association with at least one of the sources, the third input including a confirmation;
wherein the computer program product is operable to provide an ability to allow different people to input data into at least one display at different times, and from different places, in order to further support the process;
wherein the computer program product is operable such that the first interface, the second interface, the third interface, and the fourth interface include dynamic web pages.

50. A computer program product embodied on a non-transitory computer readable medium, comprising:
computer code for causing execution of a process that is related to decision-making associated with identification of one or more products of a supplying business that is suitable for a receiving entity;

computer code for receiving first information regarding a plurality of attributes in association with the receiving entity;

computer code for identifying second information regarding the one or more products in terms of the plurality of attributes;

computer code for supporting the process that is related to the decision-making, utilizing the first information and the second information;

computer code for causing display of a first interface that allows a user to provide first input indicative of a boundary condition that is related to the decision-making, wherein the computer program product is operable such that the boundary condition is capable of being modified;

computer code for causing display of a second interface that allows the user to provide second input indicative of aspects related to the decision-making, wherein the computer program product is operable such that the aspects are capable of being modified;

computer code for causing display of a third interface that displays a plurality of alternatives that include alternate choices, based, at least in part, on the boundary condition and the aspects;

computer code for causing display of a fourth interface that displays relative value associated with each of the plurality of alternatives;

computer code for receiving third information that includes public information from a source separate from the receiving entity and the supplying business, and relates to a value associated with at least one of the one or more products, for further supporting the process;

computer code for providing source information that specifies the source, the source information including at least one person identifier;

computer code for allowing the user to provide third input in association with the third information such that the third information is utilized as a function of the third input; and computer code for allowing the user to provide insight in association with the source;

wherein the computer program product is operable to provide an ability to allow different people to input data into at least one display at different times, and from different places, in order to further support the process that is related to the decision-making;

wherein the computer program product is operable such that the first interface, the second interface, the third interface, and the fourth interface include dynamic web pages.

51. A computer program product embodied on a non-transitory computer readable medium, comprising:

computer code for causing execution of a process that is related to decision-making associated with identification of one or more products of a supplying business that is suitable for a receiving entity;

computer code for receiving first information regarding a plurality of attributes;

computer code for identifying second information regarding the one or more products;

computer code for supporting the process that is related to the decision-making, utilizing the first information and the second information;

computer code for causing display of a first interface that allows a user to provide first input indicative of a boundary condition that is related to the decision-making, wherein the computer program product is operable such that the boundary condition is capable of being modified;

computer code for causing display of a second interface that allows the user to provide second input indicative of aspects related to the decision-making, wherein the computer program product is operable such that the aspects are capable of being modified;

computer code for causing display of a third interface that displays a plurality of alternatives that include alternate choices, based, at least in part, on the boundary condition and the aspects;

computer code for causing display of a fourth interface that displays relative value associated with each of the plurality of alternatives;

computer code for receiving third information that includes public information from a source separate from the receiving entity and the supplying business, and relates to a relative value associated with at least one of the one or more products, to identify a retrospective value creation for a plurality of customers, in connection with prospective value creation measurement for at least one customer, for further supporting the process;

computer code for receiving fourth information from the receiving entity that relates to a retrospective value creation for the receiving entity, for further supporting the process;

computer code for providing source information that specifies the source, the source information including at least one person identifier; and computer code for allowing the user to provide insight in association with the source;

wherein the computer program product is operable to provide an ability to allow different people to input data into at least one display at different times, and from different places, in order to further support the process that is related to the decision-making;

wherein the computer program product is operable such that the first interface, the second interface, the third interface, and the fourth interface include dynamic web pages.

* * * * *